(12) United States Patent
Mashiko et al.

(10) Patent No.: US 12,345,592 B2
(45) Date of Patent: Jul. 1, 2025

(54) SENSOR, DEVICE, SYSTEM, AND MANUFACTURING METHOD FOR PRODUCT

(71) Applicant: CANON KABUSHIKI KAISHA, Tokyo (JP)

(72) Inventors: Satoshi Mashiko, Ibaraki (JP); Haruhiko Horiguchi, Tokyo (JP); Akira Yajima, Saitama (JP); Takayuki Ogawara, Kanagawa (JP); Shuuichi Sato, Kanagawa (JP); Kohei Oyu, Kanagawa (JP); Haruyasu Ishikawa, Saitama (JP); Shoji Sasaki, Kanagawa (JP); Yoshiyuki Beniya, Chiba (JP); Yu Takahashi, Kanagawa (JP); Yoshiharu Irei, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 18/049,531

(22) Filed: Oct. 25, 2022

(65) Prior Publication Data

US 2023/0129177 A1    Apr. 27, 2023

(30) Foreign Application Priority Data

| Oct. 27, 2021 | (JP) | 2021-175762 |
| Oct. 27, 2021 | (JP) | 2021-175763 |
| Nov. 15, 2021 | (JP) | 2021-185817 |
| Dec. 28, 2021 | (JP) | 2021-213786 |

(51) Int. Cl.
*G01L 5/00* (2006.01)

(52) U.S. Cl.
CPC .................. *G01L 5/009* (2013.01)

(58) Field of Classification Search
CPC ......... G01L 5/009; G01L 5/0028; G01L 3/14; G01L 1/04; G01L 5/0019; G01L 5/0023; G01L 5/16; G01L 5/169; G01L 5/1627
USPC ...... 73/767, 774, 779, 780, 862.041–862.46, 73/862.05, 862.06, 862.29, 862.321, 73/862.324, 862.325, 862.326, 862.331, 73/862.332, 862.337, 862.338, 862.471, 73/862.473, 862.474, 862.621, 73/862.624–862.627, 862.632, 862.633, 73/862.637, 862.638, 862.69; 324/207.15
See application file for complete search history.

(56) References Cited

U.S. PATENT DOCUMENTS

| 4,809,557 A | 3/1989 | Maurer |
| 4,823,618 A | 4/1989 | Ramming |
| 4,862,751 A | 9/1989 | Asakawa |
| 5,445,036 A | 8/1995 | Hordnes |
| 2004/0187593 A1 | 9/2004 | Okada |
| 2014/0000388 A1 | 1/2014 | Sato |
| 2014/0041461 A1 | 2/2014 | Ueno |

(Continued)

FOREIGN PATENT DOCUMENTS

| DE | 102017102343 A1 | 8/2018 |
| JP | 65672323 A | 6/1981 |

(Continued)

*Primary Examiner* — Robert R Raevis
(74) *Attorney, Agent, or Firm* — Canon U.S.A., Inc. I.P. Division

(57) ABSTRACT

A sensor includes a structure and a detector. The detector is arranged to detect a deformation of the structure. The structure has at least four elastic sections. The at least four elastic sections are discretely disposed in an imaginary plane.

50 Claims, 49 Drawing Sheets

(56) References Cited

U.S. PATENT DOCUMENTS

| | | |
|---|---|---|
| 2016/0263749 A1 | 9/2016 | Ogata |
| 2017/0136629 A1 | 5/2017 | Nagata |
| 2018/0099421 A1 | 4/2018 | Ogata |
| 2018/0215047 A1* | 8/2018 | Sato .................. G01L 3/1435 |
| 2019/0025143 A1 | 1/2019 | Doll |
| 2019/0310151 A1 | 10/2019 | Nagura |
| 2021/0116315 A1 | 4/2021 | Endo |
| 2021/0131891 A1 | 5/2021 | Hoshino |
| 2021/0131892 A1 | 5/2021 | Endo |
| 2021/0231514 A1 | 7/2021 | Nagasaka |
| 2021/0325264 A1 | 10/2021 | Endo |
| 2022/0034392 A1* | 2/2022 | Damerau ............ F16H 49/001 |
| 2022/0404222 A1* | 12/2022 | Murata ................ G01L 1/225 |

FOREIGN PATENT DOCUMENTS

| | | |
|---|---|---|
| JP | H09280973 A | 10/1997 |
| JP | 2003028736 A | 1/2003 |
| JP | 2004077172 A | 3/2004 |
| JP | 2004245717 A | 9/2004 |
| JP | 2005134220 A | 5/2005 |
| JP | 2007040774 A | 2/2007 |
| JP | 2009058388 A | 3/2009 |
| JP | 2010210558 A | 9/2010 |
| JP | 2012093291 A | 5/2012 |
| JP | 2012189516 A | 10/2012 |
| JP | 2013064706 A | 4/2013 |
| JP | 2016070709 A | 5/2016 |
| JP | 2017096929 A | 6/2017 |
| JP | 2018059854 A | 4/2018 |
| JP | 2018132498 A | 8/2018 |
| JP | 2018179945 A | 11/2018 |
| JP | 2019027782 A | 2/2019 |
| JP | 2019045450 A | 3/2019 |
| JP | 2019158420 A | 9/2019 |
| JP | 2019174472 A | 10/2019 |
| JP | 2020116693 A | 8/2020 |
| JP | 2020118647 A | 8/2020 |
| JP | 2021018095 A * | 2/2021 |
| JP | 2021056145 A | 4/2021 |
| JP | 2021073457 A | 5/2021 |
| JP | 2021085755 A | 6/2021 |
| JP | 2021096269 A | 6/2021 |
| WO | 2019021442 A1 | 1/2019 |

* cited by examiner

FIG. 25A
FIG. 25B
FIG. 25C
FIG. 25D
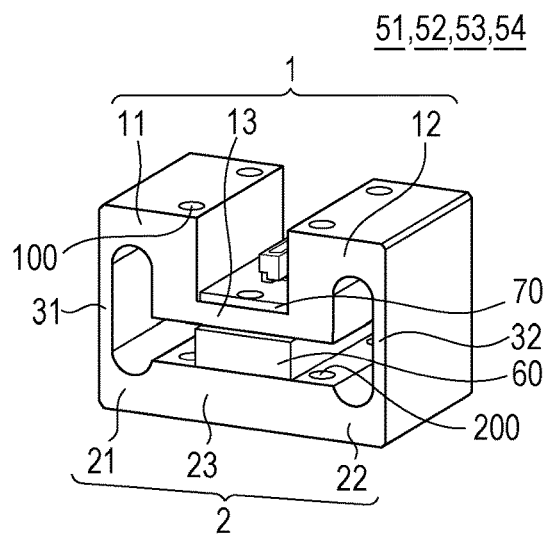
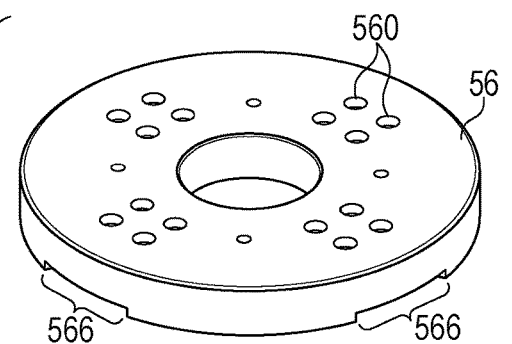
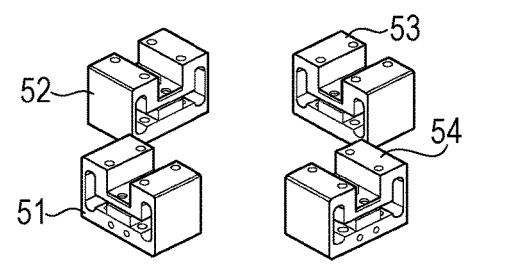
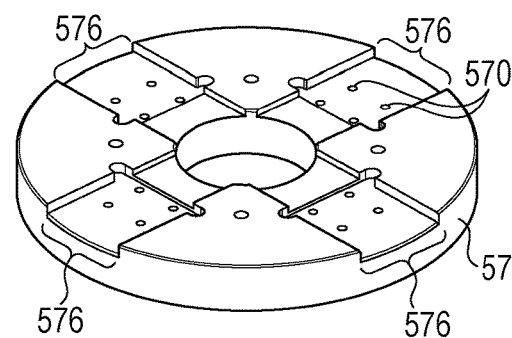
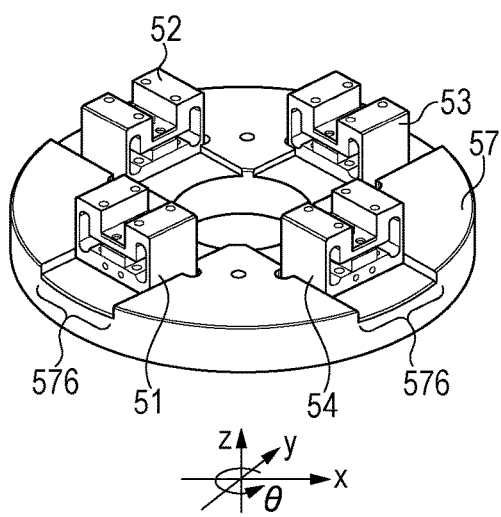
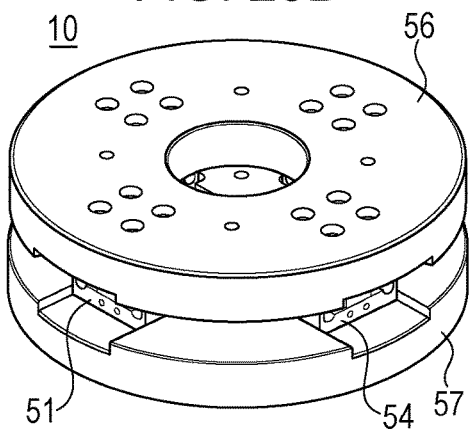

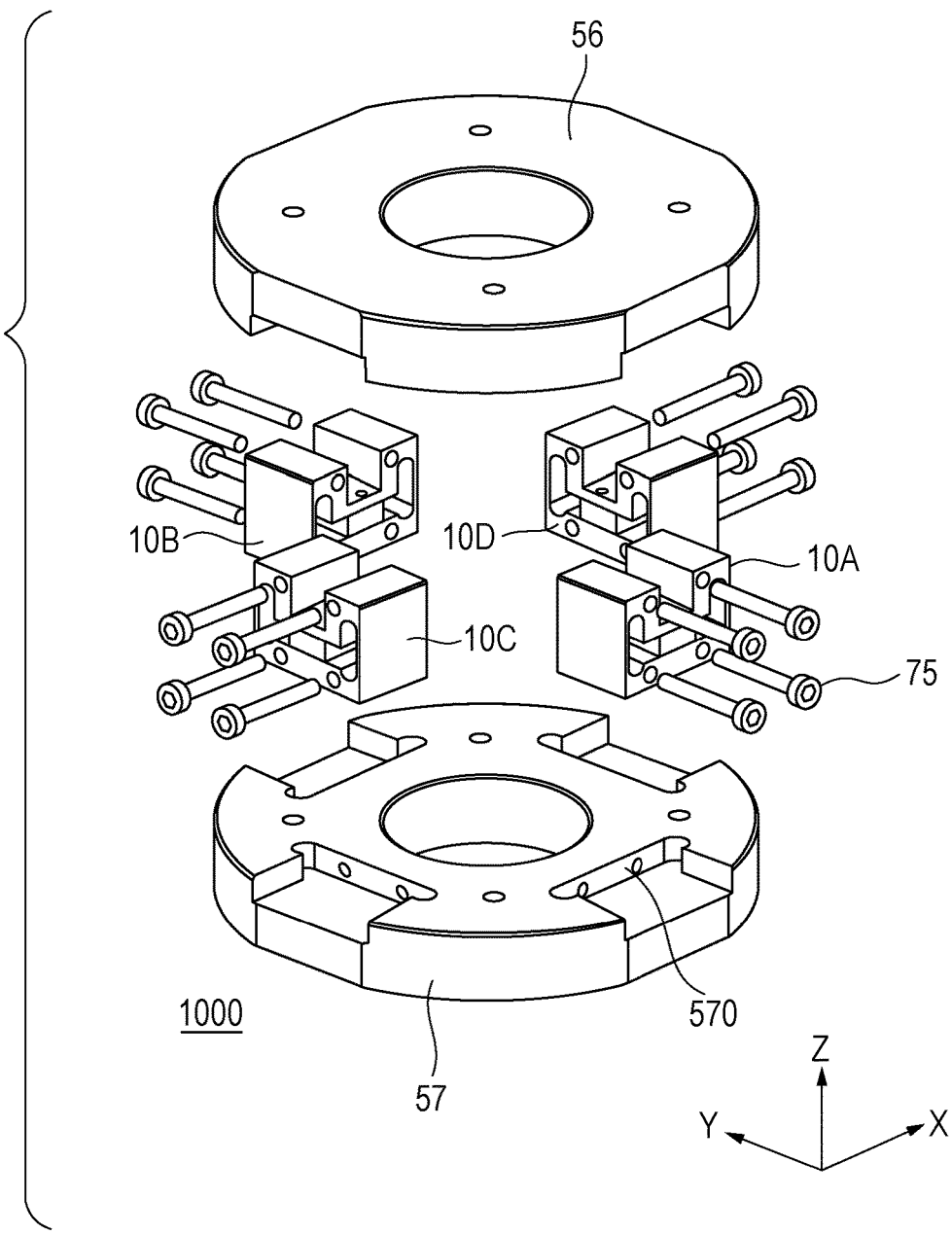

SENSOR, DEVICE, SYSTEM, AND MANUFACTURING METHOD FOR PRODUCT

BACKGROUND OF THE INVENTION

Field of the Invention

The present invention relates to a sensor, a device, a system, and a manufacturing method for a product.

Description of the Related Art

There is known a sensor that includes a structure and a detector arranged to detect a deformation of the structure and that measures the mechanical quantity applied to the structure. Japanese Patent Laid-Open No. 2017-096929 describes a torque sensor that includes an elastic member and optical encoders.

There is known a sensor that includes a structure and a detector arranged to detect a deformation of the structure and that measures the mechanical quantity applied to the structure. Japanese Patent Laid-Open No. 2019-174472 describes a torque sensor that includes a fixing member, a coupling member, an intermediate member, and a detection unit. In the intermediate member, the rigidity of the torque sensor in the radial direction is lower than the rigidity of the torque sensor in the rotation direction. Thus, the influence of deformation of the torque sensor, caused by a wave generator, on a detected torque is reduced.

In various machine devices, including industrial devices, such as robots, and transportation devices, such as automobiles, forces applied to links are detected by force/torque sensors. Here, links are machine elements with which a plurality of combined objects moves relatively, and the plurality of objects are referred to as a first link and a second link. The first link and the second link each receive a force applied to the link to be relatively displaced in at least one of an axial direction along a certain axis and a rotation direction about the certain axis as a rotation axis. The force/torque sensors detect displacements in the axial direction and the rotation direction. Force/torque sensors that detect a displacement in the rotation direction are referred to as torque sensors.

Japanese Patent Laid-Open No. 2017-096929 describes that, in a torque sensor disposed at a joint of a robotic device, the influence of disturbance, such as other-axis forces, is reduced by averaging output signals of a plurality of optical encoders.

Sensors that detect torques and output the detected torques as electrical signals are mounted on automobiles and robots. Each of the sensors includes a displacement detection device, such as an encoder device, and obtains a torque value by using displacement information detected by a displacement detection device. The encoder device is desired to highly accurately detect a torque applied to the sensor.

Japanese Patent Laid-Open No. 2012-189516 suggests a mode in which a detection head is disposed outside a scale in a Y-axis direction.

SUMMARY OF THE INVENTION

A sensor includes a structure, and a detector arranged to detect a deformation of the structure, wherein the structure has at least four elastic sections discretely disposed in an imaginary plane, the structure includes at least one metal component formed by bending a metal member, the one metal component has a top surface section disposed on one side of the plane and facing the plane, a bottom surface section disposed on the other side of the plane and facing the plane, and at least one elastic section of the four elastic sections, and the detector is arranged to output a signal according to a relative displacement between the top surface section and the bottom surface section in a direction along the plane.

A device includes a first link, a second link arranged to relatively move with respect to the first link, the above-described sensor, coupled to the first link and the second link, and a prime mover arranged to relatively move the first link and the second link.

A sensor includes a structure having at least four elastic sections discretely disposed in an imaginary plane, and a detector arranged to detect a deformation of the structure, wherein the structure includes a metal component having at least one elastic section of the four elastic sections, a first reinforcement component coupled to the metal component and overlapping at least a first elastic section and a second elastic section of the four elastic sections, and a second reinforcement component coupled to the metal component and overlapping at least a third elastic section and a fourth elastic section of the four elastic sections, wherein the first reinforcement component is disposed on one side with respect to the plane, and the second reinforcement component is disposed on the other side with respect to the plane, the metal component has a second joint with the second reinforcement component, the first joint is disposed on one side with respect to the plane, and the second joint is disposed on the other side with respect to the plane.

A device includes a first link, a second link arranged to relatively move with respect to the first link, the above-described sensor, coupled to the first link and the second link, a prime mover arranged to relatively move the first link and the second link, and a speed reducer, wherein the prime mover and the sensor are coupled via the speed reducer.

A device includes a first link, a second link; a first module, and a second module, wherein the first link and the second link are arranged to be displaced from each other in at least one direction of an axial direction along a certain axis and a rotation direction about the certain axis as a rotation axis, the first module includes a first metal component having an elastic section arranged to deform in accordance with a displacement of the second link with respect to the first link in the one direction, and a first detecting unit arranged to output a first signal according to a deformation of the elastic section of the first metal component, and the second module includes a second metal component having an elastic section arranged to deform in accordance with a displacement of the second link with respect to the first link in the one direction, and a second detecting unit arranged to output a second signal according to a deformation of the elastic section of the second metal component.

A system includes the above-described device, and a controller configured to control the prime mover in accordance with information obtained from the detector.

A manufacturing method for a product, includes manufacturing a product such that the above-described device cooperates with a human within a range of 1 m from the human.

An aspect of the invention provides a sensor. The sensor includes a structure, and a detector arranged to detect a deformation of the structure. The structure has at least four elastic sections discretely disposed in an imaginary plane. The structure includes at least one metal component formed by bending a metal member. The one metal component has at least two elastic sections of the four elastic sections.

Further features of the present invention will become apparent from the following description of exemplary embodiments with reference to the attached drawings.

BRIEF DESCRIPTION OF THE DRAWINGS

FIGS. 25A to 25D are schematic diagrams illustrating a sensor.

FIG. 34 is a schematic diagram illustrating the device and the sensor.

DESCRIPTION OF THE EMBODIMENTS

Figure 1A:
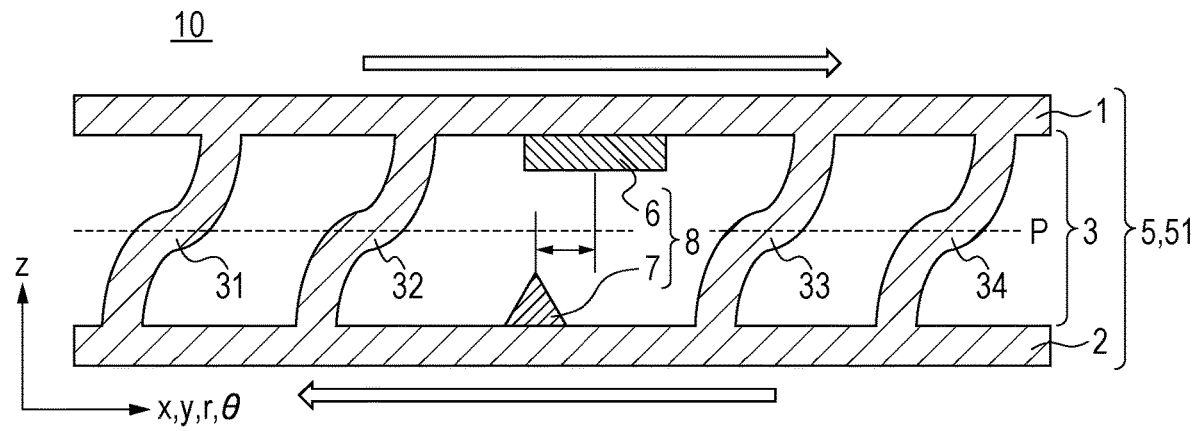
FIGS. 1A to 1C are schematic diagrams illustrating a sensor.

Hereinafter, embodiments of the present invention will be described with reference to the attached drawings. In the following description and the drawings, like reference signs are assigned to common components over a plurality of the drawings.

Therefore, common components will be described with reference to a plurality of drawings, and the description of components with common reference signs will not be repeated as needed. Different matters with the same name can be distinguished by prefixing "Xth" (X is a number) like a first matter and a second matter. In the following description, when the signs N, N+1, N+2, ..., n−1, n (n−N≥2) are consecutive natural numbers N to n, the signs N, N+1, N+2, ..., n−1, n can be abbreviated as the signs N to n. When the total number of elements is K, the number of elements may be expressed as at least k by using a number k (k≤K) smaller than or equal to K.

At this time, k elements are obtained by selecting from among K elements in a selected combination. In expressions, [A & B] means at least any one of A and B, and [C to D] means at least any one of C to D.

Japanese Patent Laid-Open No. 2017-096929 suggests pouring or machining a predetermined material, such as resin and metal, as a method of integrally molding a fastening portion and a spring portion in an elastic member. However, pouring or machining has an inconvenience in terms of production, such as a decrease in throughput and an increase in manufacturing cost. The present invention provides a beneficial technology to improve the productivity of sensors.

According to embodiments that will be described later, particularly, a first embodiment and other embodiments to which the first embodiment is applied, a beneficial technology to improve the productivity of sensors is provided.

Japanese Patent Laid-Open No. 2019-174472 studies rigidity in a radial direction and in a circumferential direction but does not sufficiently study rigidity in other directions. The present invention provides a beneficial technology to improve the detection accuracy of sensors.

According to embodiments that will be described later, particularly, a second embodiment and other embodiments to which the second embodiment is applied, a beneficial technology to improve the detection accuracy of sensors is provided.

With the technology of Japanese Patent Laid-Open No. 2017-096929, the elastic member is integrated, so, when there is a malfunction in the elastic member, each of the plurality of optical encoders receives the influence of the malfunction, with the result that the accuracy of detecting a torque decreases.

The present invention provides a beneficial technology to ensure the accuracy of detecting a displacement of a link in a device.

According to embodiments that will be described later, particularly, a third embodiment and other embodiments to which the third embodiment is applied, a beneficial technology to ensure the accuracy of detecting a displacement of a link in a device.

The sensor of Japanese Patent Laid-Open No. 2012-189516 structurally tends to make a displacement in directions other than a torque detection direction. To avoid this situation, a reinforcement structure to reduce a displacement in directions other than the intended torque detection direction is provided in an encoder (a linear scale and a detection head) portion that detects an elastic deformation due to external force, so the configuration is complicated, and, particularly, the detection accuracy can be decreased due to a displacement in a Z-axis direction that is not a torque detection direction. The present invention improves the detection accuracy of sensors.

According to embodiments that will be described later, particularly, an eleventh embodiment and other embodiments to which the eleventh embodiment is applied, a beneficial technology to improve the detection accuracy of sensors is provided.

First Embodiment

FIG. 1A schematically shows a sensor 10 according to the present embodiment. The sensor 10 includes a structure 5 and a detector 8 for detecting a deformation of the structure 5. FIG. 1A shows an imaginary plane P parallel to an x-y plane in an xyz orthogonal coordinate system and parallel to an r-θ plane in an rθz cylindrical coordinate system. The cylindrical coordinate system is represented by r direction, θ direction, and z direction. The r direction may be referred to as radial direction, the θ direction may be referred to as circumferential direction, and the z direction may be referred to as axial direction. In the cylindrical coordinate system, the r-θ plane coincides with the x-y plane, and the z direction coincides with the z direction of the orthogonal coordinate system. The structure 5 has an elastic section group that is a group of a plurality of elastic sections discretely disposed in the imaginary plane P. The elastic section group has at least four elastic sections 31, 32, 33, 34 discretely disposed in the imaginary plane P. In other words, the number of elastic sections discretely disposed in the imaginary plane P and included in the elastic section group 3 is four or more. The sensor 10 may have one or a plurality of elastic sections not present in the imaginary plane P in which the elastic section group 3 is disposed. However, one or a plurality of elastic sections not present in the imaginary plane P is not counted as the elastic section of the elastic section group 3 present in the imaginary plane P. The structure 5 includes at least one metal component 51. The one metal component 51 has at least two elastic sections 31, 32 of the four elastic sections 31, 32, 33, 34. In other words, the elastic sections 31, 32 are part of the one metal component 51.

A range in which a metallic bond of metal atoms included in the metal component is continuous is included in the one metal component. A metallic bond is discontinuous between two metal components only screwed to each other or only bonded by adhesive, so two metal components are separate metal components.

A metal material of the metal component 51 is an elemental metal or a mixture (alloy) of metals. The metal component 51 may be the one obtained by plating a base material made of a metal material. To ensure the rigidity of the structure 5, the metal component 51 can be hard and can be, for example, a metal material with a Vickers hardness of 90 HV or higher. Iron alloys (steels), such as carbon steels and alloy steels, aluminum alloys, titanium alloys, and the like may be used as the material of the metal component 51. In terms of a material cost, iron alloys are suitable.

The one metal component 51 can have a top surface section 1 and a bottom surface section 2 facing the top surface section 1. The at least two elastic sections 31, 32 (in this example, the four elastic sections 31 to 34) are provided such that the plane P is located between the top surface section 1 and the bottom surface section 2. In the following description, the words "top" and "bottom" just correspond to a positive side and a negative side in the z direction, and, for the posture of the sensor 10 during usage of the sensor 10, the z direction does not need to coincide with a vertical direction. The top surface section 1 may be referred to as front surface section, and the bottom surface section 2 may be referred to as back surface section.

The detector 8 includes one or a plurality of detecting units. The detecting unit of the detector 8 can include a plurality of components 6, 7. With a deformation of the structure 5, a relative positional relationship between the component 6 and the component 7 changes, and the relative positional relationship between the component 6 and the component 7 can be detected by using the component 6 and the component 7.

The detecting unit of the detector 8 is, for example, an encoder including a head and a scale. An example of the component 6 is a head. An example of the component 7 is a scale. The component 6 may be a scale. The component 7 may be a head. The detector 8 can include a component that processes a signal output from the component 6 or the component 7, in addition to the components 6, 7. The encoder of the detector 8 may be an optical encoder or may be a magnetic encoder. When an optical encoder is used as the detector 8, magnetic constraints on the metal component 51 are small. The head of the optical encoder has at least a light receiving portion and, where necessary, may have a light emitting portion that emits light to be applied to the scale. Here, the example in which the component 6 and the component 7 face each other in the z direction is described. Alternatively, the component 6 and the component 7 may face each other in any one of the x direction, the y direction, the r direction, and the θ direction. The encoder serving as the detector 8 may be a linear encoder or may be a rotary encoder. The output method may be of an incremental type or an absolute type. The encoder can adopt a configuration in which the component 6 and the component 7 relatively move in a direction orthogonal to a direction in which the component 6 and the component 7 face each other. The encoder may be arranged to, for example, detect a change in distance between the component 6 and the component 7 optically, magnetically, or electrostatically by the adoption of the configuration in which the component 6 and the component 7 relatively move in the direction in which the component 6 and the component 7 face each other. For example, the detecting unit of the detector 8 may be a capacitance displacement sensor. The detecting unit of the detector 8 may be a strain gauge. A displacement of the structure 5 may be detected by a strain gauge bonded to at least any one of the elastic sections of the elastic section group 3 of the structure 5.

The sensor 10 can be a force/torque sensor. Here, a force (detection target force) to be detected by the force/torque sensor is at least any one of a force in the x direction, a force in the y direction, a force in the z direction, a force around the x axis, a force around the y axis, and a force around the z axis. A force around the z axis in the above-described rθz cylindrical coordinate system is a force in the θ direction. When the sensor 10 detects f (f≤6) forces of the six forces, the sensor 10 can be referred to as f-axis force/torque sensor. When the sensor 10 exclusively detects at least any one of a force around the x axis, a force around the y axis, and a force around the z axis, the sensor 10 can be referred to as torque sensor. When the sensor 10 detects only a force around the z axis, the sensor 10 may be referred to as single-axis force/torque sensor or single-axis torque sensor.

When the detector 8 includes a plurality of detecting units, a mode in which the plurality of detecting units detects a force in the same direction can be adopted. By statistically processing the outputs from the plurality of detecting units, the influence of variations in characteristics among the detecting units is reduced, with the result that the detection accuracy of the sensor 10 is improved. Here, a statistical process is to extract a maximum value, a minimum value, a mean value, a total value, a median value, or the like from the outputs from the plurality of detecting units. An E/2-th or ((E/2)+1)-th largest value can be adopted as the median value in the case where the number of detecting units is E (E is an even number).

Figure 1B:
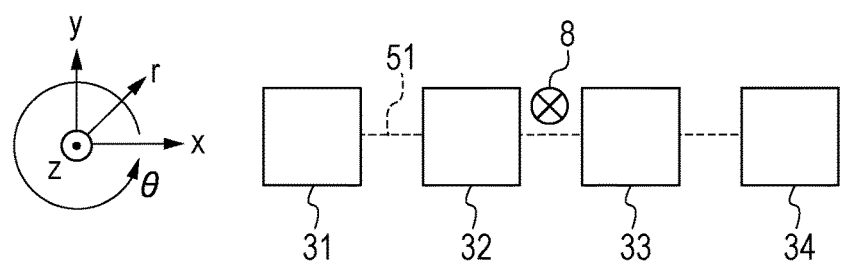

FIG. 1B shows a first layout example of four elastic sections 31 to 34 when the imaginary plane P is viewed in plan in the z direction. In the first layout example, the four elastic sections 31 to 34 are arranged in a one-dimensional array. In FIG. 1B, the dashed lines connecting the elastic sections 31 to 34 represent that one metal component 51 has these elastic sections 31, 32, 33, 34. At least one detecting unit 8 is provided in the metal component 51.

Figure 1C:
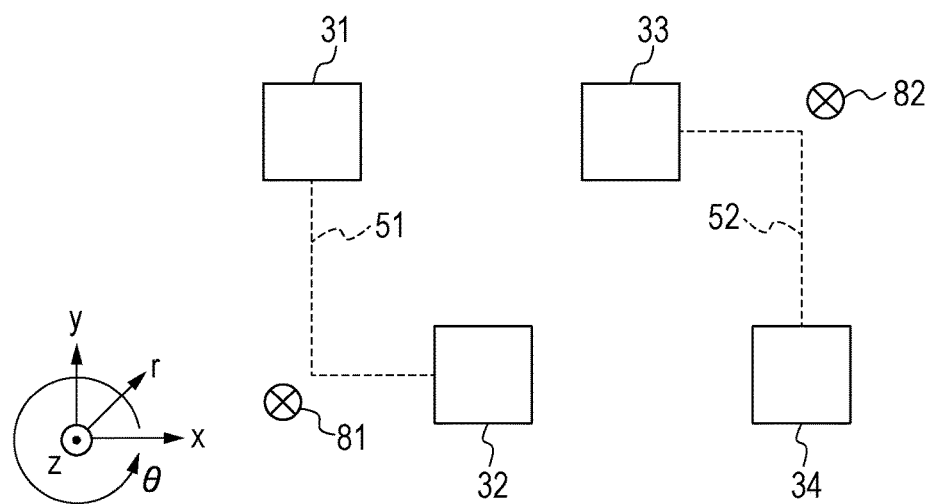

FIG. 1C shows a second layout example of four elastic sections 31, 32, 33, 34 when the imaginary plane P is viewed in plan in the z direction. In the second layout example, the four elastic sections 31, 32, 33, 34 are arranged in a two-dimensional array. In FIG. 1C, the dashed line connecting the elastic sections 31, 32 represents that one metal component 51 has the elastic sections 31, 32. In FIG. 1C, the dashed line connecting the elastic sections 33, 34 represents that one metal component 52 has the elastic sections 33, 34. Since no dashed line connects the elastic section 31 with the elastic section 33 or the elastic section 34 and no dashed line connects the elastic section 32 with the elastic section 33 or the elastic section 34, it represents that the metal component 51 and the metal component 52 are separate metal components. In other words, of the four elastic sections 31 to 34, the metal component 52 has the two elastic sections 33, 34 different from the two elastic sections 31, 32 of the metal component 51.

In the second layout example, at least one detecting unit 81 is provided in the metal component 51, and at least one detecting unit 82 is provided in the metal component 52.

Figure 3A:
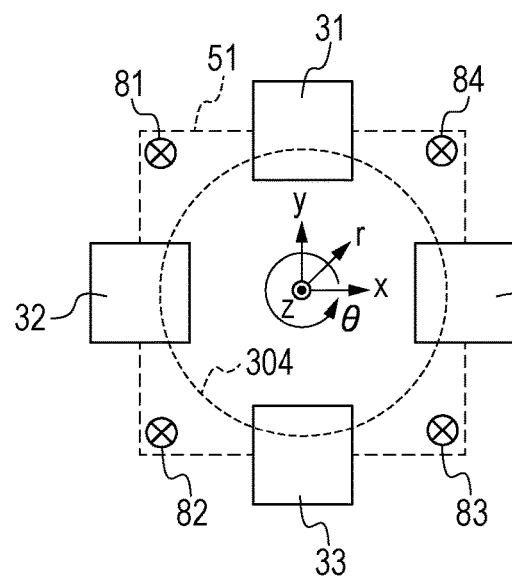
FIGS. 3A to 3D are schematic diagrams illustrating the sensor.

FIG. 3A shows a third layout example of four elastic sections 31, 32, 33, 34 when the imaginary plane P is viewed in plan in the z direction. In the third layout example, the four elastic sections 31 to 34 are disposed in the plane P such that an imaginary circle 304 passes through the four elastic sections 31 to 34. Such a layout is beneficial to detect a deformation that occurs in the θ direction (circumferential direction) in the cylindrical coordinate system. Alternatively, such a layout is beneficial to detect a deformation that occurs in the x direction and the y direction in the orthogonal coordinate system. In the third layout example, one metal component 51 has the four elastic sections 31 to 34. In the third layout example, at least four detecting units 81, 82, 83, 84 are provided in the metal component 51.

Figure 3B:
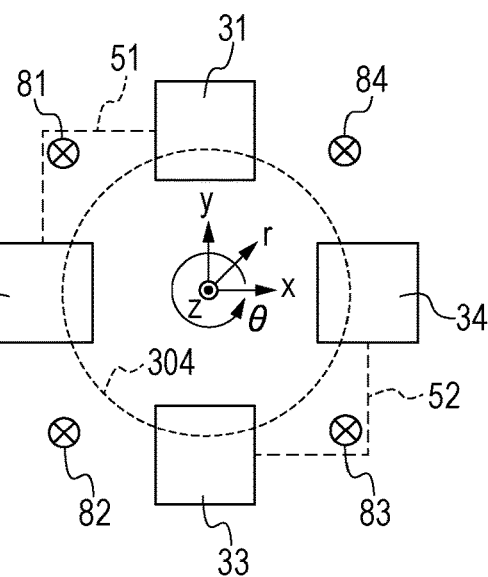

FIG. 3B shows a fourth layout example of four elastic sections 31, 32, 33, 34 when the imaginary plane P is viewed in plan in the z direction. The fourth layout example differs from the third layout example in that one metal component 51 has the elastic sections 31, 32 and one metal component 52 has the elastic sections 33, 34. In the fourth layout example, at least two detecting units 81, 82 are provided in the metal component 51, and at least two detecting units 83, 84 are provided in the metal component 52. The other configuration can be similar to that of the third layout example.

Figure 3C:
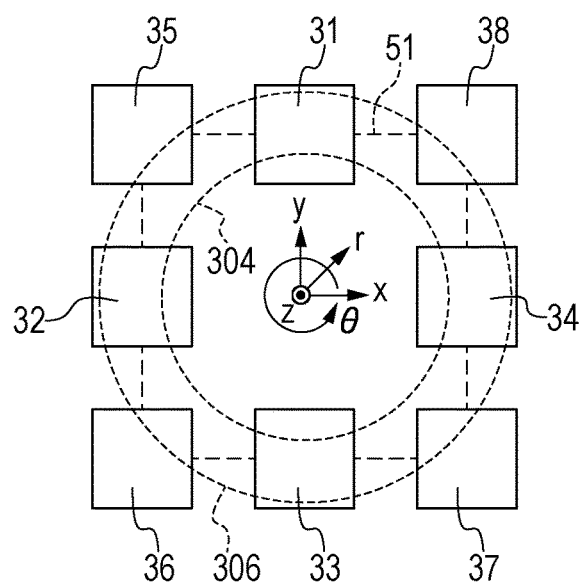

FIG. 3C shows a fifth layout example of at least six elastic sections when the imaginary plane P is viewed in plan in the z direction. In the fifth layout example, the at least six elastic sections include elastic sections 35, 36, 37, 38 in addition to the above-described four elastic sections 31 to 34 and include the eight elastic sections 31, 32, 33, 34, 35, 36, 37, 38 in total. In the fifth layout example, one metal component 51 includes the at least six elastic sections (for example, the elastic sections 31 to 36) of the eight elastic sections 31 to 38 and includes the eight elastic sections 31 to 38 of the eight elastic sections 31 to 38. In the fifth layout example, the six elastic sections (for example, the elastic sections 31 to 36) are disposed in the plane P such that an imaginary circle 306 passes through the at least six elastic sections (for example, the elastic sections 31 to 36). In this example, the imaginary circle 306 passes through the eight elastic sections 31 to 38.

Figure 3D:
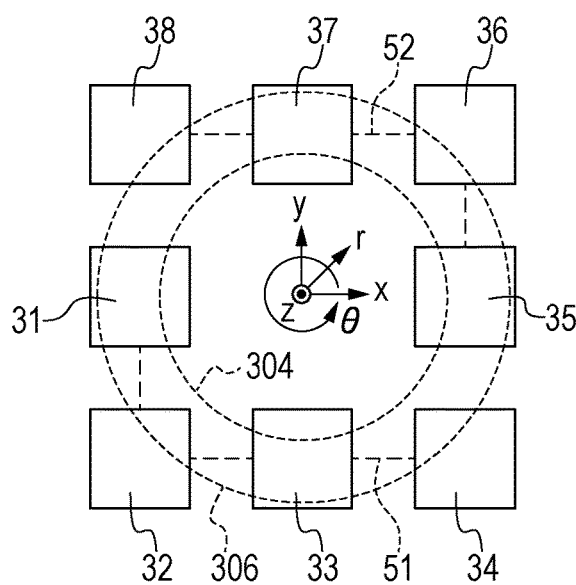

FIG. 3D shows a sixth layout example of at least six elastic sections when the imaginary plane P is viewed in plan in the z direction. In the sixth layout example, one metal component 51 includes the four elastic sections 31 to 34 of the eight elastic sections 31 to 38, and another metal component 52 includes the four elastic sections 35 to 38 of the eight elastic sections 31 to 38.

In FIGS. 3A to 3D, each of the elastic sections included in the elastic section group 3 deforms, for example, in the θ direction, and each of the detecting units 81 to 84 included in the detector 8 can detect a force in the θ direction as a torque. Alternatively, each of the elastic sections included in the elastic section group 3 deforms in the x direction or in the y direction to make it possible to detect a force in the x direction or in the y direction.

As described above, in the sensor 10 according to the present embodiment, the one metal component 51 has the at least two elastic sections 31, 32 of the four elastic sections 31 to 34.

In the present embodiment, the one metal component 51 is characteristically formed by bending a metal member. A metal member to be subjected to bending is a metal plate, and bending is, for example, press working. In preparing the metal component 51, not only bending but also various sheet metal workings, such as punching, are used. As compared to casting or machining of metal, the productivity of sensors is improved by using bending. In other words, in casting (molding) of metal, a sand mold is needed to form a complicated shape but the sand mold is not suitable for mass production; whereas, when a metal mold is used, a cost for the metal mold is excessively high to form a complicated shape. In machining, a solid material serving as a base material is expensive, but the usage rate of the base material is low and not efficient, and cutting using an NC processing machine or the like takes a long processing time. When bending is used, a metal component 51 having at least two elastic sections can be manufactured at high throughput and low cost, so the productivity of sensors 10 is improved. When the structure 5 is made up of a metal component 51 and one metal component 52 different from the metal component 51, the metal component 52 can also be formed by bending a metal member.

Second Embodiment

Figure 2A:
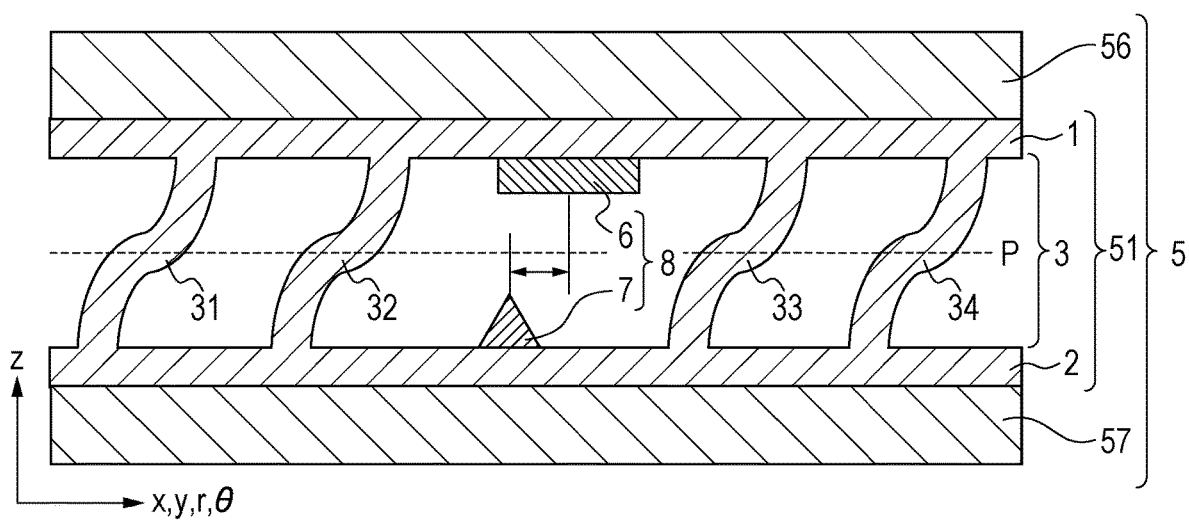
FIGS. 2A to 2C are schematic diagrams illustrating a sensor.

FIG. 2A schematically shows a sensor 10 according to the present embodiment. The sensor 10 includes a structure 5 and a detector 8 for detecting a deformation of the structure 5. FIG. 2A shows an imaginary plane P parallel to an x-y plane in an xyz orthogonal coordinate system and parallel to an r-θ plane in an rθz cylindrical coordinate system. The cylindrical coordinate system is represented by r direction, θ direction, and z direction. The r direction may be referred to as radial direction, the θ direction may be referred to as circumferential direction, and the z direction may be referred to as axial direction. In the cylindrical coordinate system, the r-θ plane coincides with the x-y plane, and the z direction coincides with the z direction of the orthogonal coordinate system. The structure 5 has an elastic section group that is a group of a plurality of elastic sections discretely disposed in the imaginary plane P. The elastic section group has at least four elastic sections 31, 32, 33, 34 discretely disposed in the imaginary plane P. In other words, the number of elastic sections discretely disposed in the imaginary plane P and included in the elastic section group 3 is four or more. The sensor 10 may have one or a plurality of elastic sections not present in the imaginary plane P in which the elastic section group 3 is disposed. However, one or a plurality of elastic sections not present in the imaginary plane P is not counted as the elastic section of the elastic section group 3 present in the imaginary plane P.

The structure 5 includes at least one metal component 51. The one metal component 51 has at least two elastic sections 31, 32 of the four elastic sections 31, 32, 33, 34. In other words, the elastic sections 31, 32 are part of the one metal component 51.

A range in which a metallic bond of metal atoms included in the metal component is continuous is included in the one metal component. A metallic bond is discontinuous between two metal components only screwed to each other or only bonded by adhesive, so two metal components are separate metal components.

A metal material of the metal component 51 is an elemental metal or a mixture (alloy) of metals. The metal component 51 may be the one obtained by plating a base material made of a metal material. To ensure the rigidity of the structure 5, the metal component 51 can be hard and can be, for example, a metal material with a Vickers hardness of 90 HV or higher. Iron alloys (steels), such as carbon steels and alloy steels, aluminum alloys, titanium alloys, and the like may be used as the material of the metal component 51. In terms of a material cost, iron alloys are suitable.

The one metal component 51 can have a top surface section 1 and a bottom surface section 2 facing the top surface section 1. The at least two elastic sections 31, 32 (in this example, the four elastic sections 31 to 34) are provided such that the plane P is located between the top surface section 1 and the bottom surface section 2. In the following description, the words "top" and "bottom" just correspond to a positive side and a negative side in the z direction, and, for the posture of the sensor 10 during usage of the sensor 10, the z direction does not need to coincide with a vertical direction. The top surface section 1 may be referred to as front surface section, and the bottom surface section 2 may be referred to as back surface section.

The detector 8 includes one or a plurality of detecting units. The detecting unit of the detector 8 can include a plurality of components 6, 7. With a deformation of the structure 5, a relative positional relationship between the component 6 and the component 7 changes, and the relative positional relationship between the component 6 and the component 7 can be detected by using the component 6 and the component 7.

The detecting unit of the detector 8 is, for example, an encoder including a head and a scale. An example of the component 6 is a head. An example of the component 7 is a scale. The component 6 may be a scale. The component 7 may be a head. The detector 8 can include a component that processes a signal output from the component 6 or the component 7, in addition to the components 6, 7. The encoder of the detector 8 may be an optical encoder or may be a magnetic encoder. When an optical encoder is used as the detector 8, magnetic constraints on the metal component 51 are small. The head of the optical encoder has at least a light receiving portion and, where necessary, may have a light emitting portion that emits light to be applied to the scale. Here, the example in which the component 6 and the component 7 face each other in the z direction is described. Alternatively, the component 6 and the component 7 may face each other in any one of the x direction, the y direction, the r direction, and the θ direction. The encoder serving as the detector 8 may be a linear encoder or may be a rotary encoder. The output method may be of an incremental type or an absolute type. The encoder can adopt a configuration in which the component 6 and the component 7 relatively move in a direction orthogonal to a direction in which the component 6 and the component 7 face each other. The encoder may be arranged to, for example, detect a change in distance between the component 6 and the component 7 optically, magnetically, or electrostatically by the adoption of the configuration in which the component 6 and the component 7 relatively move in the direction in which the component 6 and the component 7 face each other. For example, the detecting unit of the detector 8 may be a capacitance displacement sensor. The detecting unit of the detector 8 may be a strain gauge. A displacement of the structure 5 may be detected by a strain gauge bonded to at least any one of the elastic sections of the elastic section group 3 of the structure 5.

The structure 5 includes a reinforcement component 56 and a reinforcement component 57. The reinforcement component 56 is disposed on one side (+z side) in the z direction with respect to the plane P, and the reinforcement component 57 is disposed on the other side (−z side) in the z direction with respect to the plane P. The plane P can be located between the reinforcement component 56 and the reinforcement component 57. In this example, the metal component 51 is located between the reinforcement component 56 and the reinforcement component 57. The reinforcement component 56 is coupled to the metal component 51, and the reinforcement component 57 is also coupled to the metal component 51. More specifically, the reinforcement component 56 is coupled to the top surface section 1 of the metal component 51, and the reinforcement component 57 is coupled to the bottom surface section 2 of the metal component 51. In this example, the metal component 51 is located between the reinforcement component 56 and the reinforcement component 57. However, at least one of the reinforcement component 56 and the reinforcement component 57 may be located between the top surface section 1 and the bottom surface section 2. For example, the reinforcement component 56 may be disposed on the side adjacent to the bottom surface section 2 with respect to the top surface section 1 and coupled to the top surface section 1, and the reinforcement component 57 may be disposed on the side adjacent to the top surface section 1 with respect to the bottom surface section 2 and coupled to the bottom surface section 2.

A force intended to be detected with the detector 8 is referred to as detection target force, and a force in a direction different from a direction in which a force to be detected is applied is referred to as non-detection target force. When, for example, a force that is applied in the θ direction is intended to be detected with the detector 8, a force that is applied in the r direction and a force that is applied in the z direction are non-detection target forces. Non-detection target forces may be referred to as other-axis forces. Non-detection target forces are a disturbance factor in detecting a detection target force. A disturbance in detecting a detection target force due to other-axis forces is referred to as other-axis interference. It is beneficial to reduce the influence of other-axis interference and improve the detection accuracy of the sensor 10 for a detection target force.

Since the structure 5 includes the reinforcement components 56, 57 that reinforce the metal component 51, the rigidity of the structure 5 against non-detection target forces increases, so the detection accuracy of the sensor 10 for a detection target force is improved.

The sensor 10 can be a force/torque sensor. Here, a force (detection target force) to be detected by the force/torque sensor is at least any one of a force in the x direction, a force in the y direction, a force in the z direction, a force around the x axis, a force around the y axis, and a force around the z axis. A force around the z axis in the above-described rθz cylindrical coordinate system is a force in the θ direction. When the sensor 10 detects f (f≤6) forces of the six forces, the sensor 10 can be referred to as f-axis force/torque sensor. When the sensor 10 exclusively detects at least any one of a force around the x axis, a force around the y axis, and a force around the z axis, the sensor 10 can be referred to as torque sensor. When the sensor 10 detects only a force around the z axis, the sensor 10 may be referred to as single-axis force/torque sensor or single-axis torque sensor.

When the detector 8 includes a plurality of detecting units, a mode in which the plurality of detecting units detects a force in the same direction can be adopted. By statistically processing the outputs from the plurality of detecting units, the influence of variations in characteristics among the detecting units is reduced, with the result that the detection accuracy of the sensor 10 is improved. Here, a statistical process is to extract a maximum value, a minimum value, a mean value, a total value, a median value, or the like from the outputs from the plurality of detecting units. An E/2-th or ((E/2)+1)-th largest value can be adopted as the median value in the case where the number of detecting units is E (E is an even number).

Figure 2B:
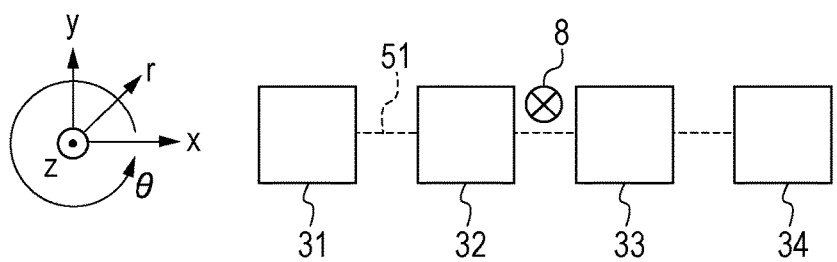

FIG. 2B shows the first layout example of the four elastic sections 31 to 34 when the imaginary plane P is viewed in plan in the z direction. In the first layout example, the four elastic sections 31 to 34 are arranged in a one-dimensional array. In FIG. 2B, the dashed lines connecting the elastic sections 31 to 34 represent that one metal component 51 has these elastic sections 31, 32, 33, 34. At least one detecting unit 8 is provided in the metal component 51.

Figure 2C:
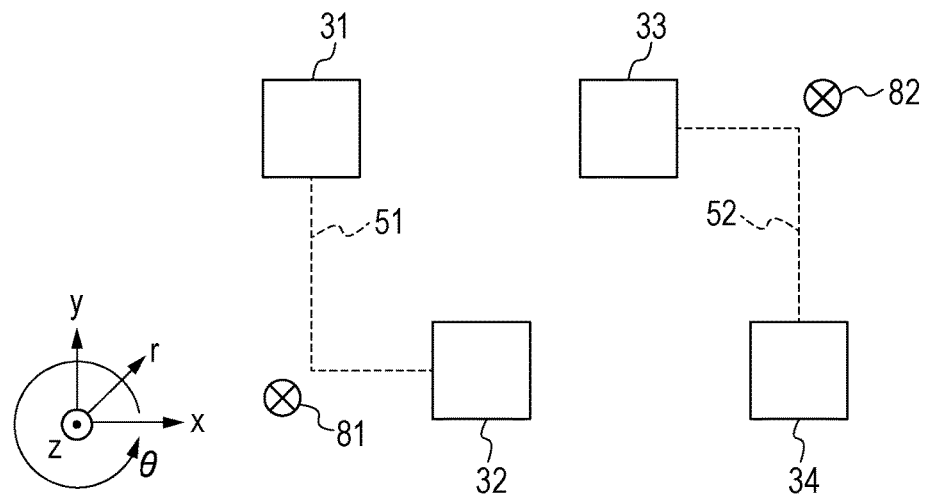

FIG. 2C shows the second layout example of the four elastic sections 31, 32, 33, 34 when the imaginary plane P is viewed in plan in the z direction. In the second layout example, the four elastic sections 31, 32, 33, 34 are arranged in a two-dimensional array. In FIG. 2C, the dashed line connecting the elastic sections 31, 32 represents that one metal component 51 has the elastic sections 31, 32. In FIG. 2C, the dashed line connecting the elastic sections 33, 34 represents that one metal component 52 has the elastic sections 33, 34. Since no dashed line connects the elastic section 31 with the elastic section 33 or the elastic section 34 and no dashed line connects the elastic section 32 with the elastic section 33 or the elastic section 34, it represents that the metal component 51 and the metal component 52 are separate metal components. In other words, of the four elastic sections 31 to 34, the metal component 52 has the two elastic sections 33, 34 different from the two elastic sections 31, 32 of the metal component 51.

In the second layout example, at least one detecting unit 81 is provided in the metal component 51, and at least one detecting unit 82 is provided in the metal component 52.

FIG. 3A shows the third layout example of four elastic sections 31, 32, 33, 34 when the imaginary plane P is viewed in plan in the z direction. In the third layout example, the four elastic sections 31 to 34 are disposed in the plane P such that an imaginary circle 304 passes through the four elastic sections 31 to 34. Such a layout is beneficial to detect a deformation that occurs in the θ direction (circumferential direction) in the cylindrical coordinate system. Alternatively, such a layout is beneficial to detect a deformation that occurs in the x direction and the y direction in the orthogonal coordinate system. In the third layout example, one metal component 51 has the four elastic sections 31 to 34. In the third layout example, at least four detecting units 81, 82, 83, 84 are provided in the metal component 51.

FIG. 3B shows the fourth layout example of four elastic sections 31, 32, 33, 34 when the imaginary plane P is viewed in plan in the z direction. The fourth layout example differs from the third layout example in that one metal component 51 has the elastic sections 31, 32 and one metal component 52 has the elastic sections 33, 34. In the fourth layout example, at least two detecting units 81, 82 are provided in the metal component 51, and at least two detecting units 83, 84 are provided in the metal component 52. The other configuration can be similar to that of the third layout example.

FIG. 3C shows the fifth layout example of at least six elastic sections when the imaginary plane P is viewed in plan in the z direction. In the fifth layout example, the at least six elastic sections include elastic sections 35, 36, 37, 38 in addition to the above-described four elastic sections 31 to 34 and include the eight elastic sections 31, 32, 33, 34, 35, 36, 37, 38 in total. In the fifth layout example, one metal component 51 includes the at least six elastic sections (for example, the elastic sections 31 to 36) of the eight elastic sections 31 to 38 and includes the eight elastic sections 31 to 38 of the eight elastic sections 31 to 38. In the fifth layout example, the six elastic sections (for example, the elastic sections 31 to 36) are disposed in the plane P such that an imaginary circle 306 passes through the at least six elastic sections (for example, the elastic sections 31 to 36). In this example, the imaginary circle 306 passes through the eight elastic sections 31 to 38.

FIG. 3D shows the sixth layout example of at least six elastic sections when the imaginary plane P is viewed in plan in the z direction. In the sixth layout example, one metal component 51 includes the four elastic sections 31 to 34 of the eight elastic sections 31 to 38, and another metal component 52 includes the four elastic sections 35 to 38 of the eight elastic sections 31 to 38.

In FIGS. 3A to 3D, each of the elastic sections included in the elastic section group 3 deforms, for example, in the θ direction, and each of the detecting units 81 to 84 included in the detector 8 can detect a force in the θ direction as a torque. Alternatively, each of the elastic sections included in the elastic section group 3 deforms in the x direction or in the y direction to make it possible to detect a force in the x direction or in the y direction.

As described above, in the sensor 10 according to the present embodiment, the one metal component 51 has the at least two elastic sections 31, 32 of the four elastic sections 31 to 34.

The third to sixth layout examples shown in FIGS. 3A to 3D are applicable to both the first embodiment and the second embodiment.

The sensor 10 can be mounted on various machine devices. Various machine devices each can include a prime mover (electric motor), such as a motor and an engine, and the sensor 10. Various machine devices include video devices, such as cameras, optical devices, such as lenses, business devices, such as printers and copying machines, medical devices, such as CTs and MRIs, industrial devices, such as robots and exposure machines, and transportation devices, such as vehicles, ships, and airplanes. Vehicles can include automobiles, bicycles, and railroad vehicles. Various machine devices may be medical devices or nursing-care devices, such as powered suits and artificial limbs. When the sensor 10 that measures the amount of mechanical energy is mounted on these machine devices and then a force that occurs in a movable portion and near the movable portion, the operations of the machine devices can be controlled.

Figure 4A:
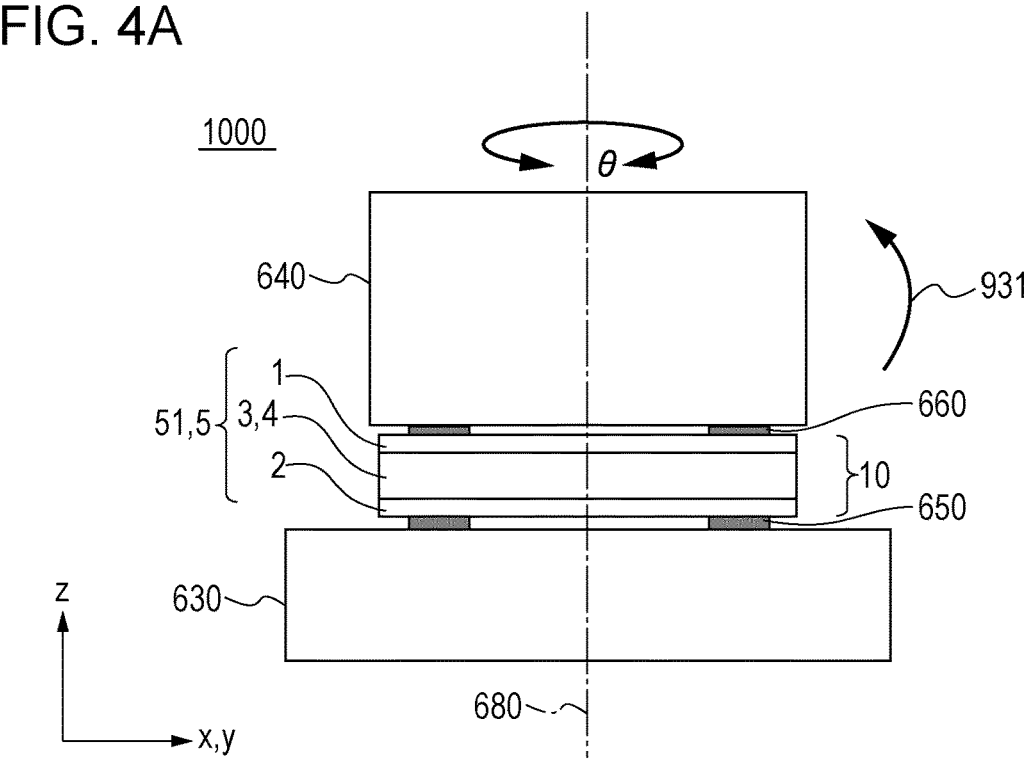
FIGS. 4A and 4B are schematic diagrams illustrating the sensor.
Figure 4B:
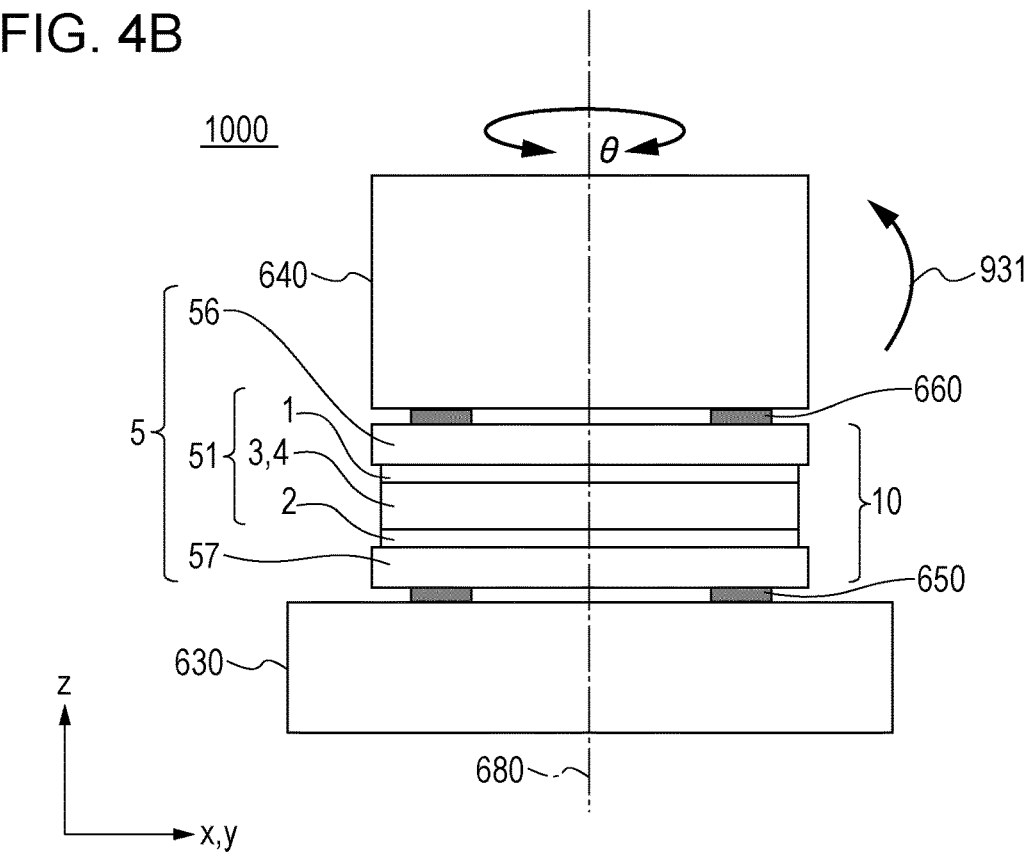

FIGS. 4A and 4B illustrate examples of the usage mode of the sensor 10. A machine device 1000 including the sensor 10 includes a link 630 and a link 640. A link is a machine element that relatively moves, and a coupling portion between a link and a link is a joint. For example, the link 630 and the link 640 relatively rotate about an axis 680 that is a rotation axis. The sensor 10 is provided between the link 630 and the link 640. The sensor 10 is fixed to the link 630 by fixing members 650, such as screws. The sensor 10 is fixed to the link 640 by fixing members 660, such as screws and bolts.

In the sensor 10 of FIG. 4A, the top surface section 1 of the metal component 51 is fixed to the link 640 by the fixing members 660, and the bottom surface section 2 of the metal component 51 is fixed to the link 630 by the fixing members 650. In the sensor 10 of FIG. 4B, the reinforcement component 56 fixed to the top surface section 1 is fixed to the link 640 by the fixing members 660, and the reinforcement component 57 fixed to the bottom surface section 2 is fixed to the link 630 by the fixing members 650.

Figure 36A:
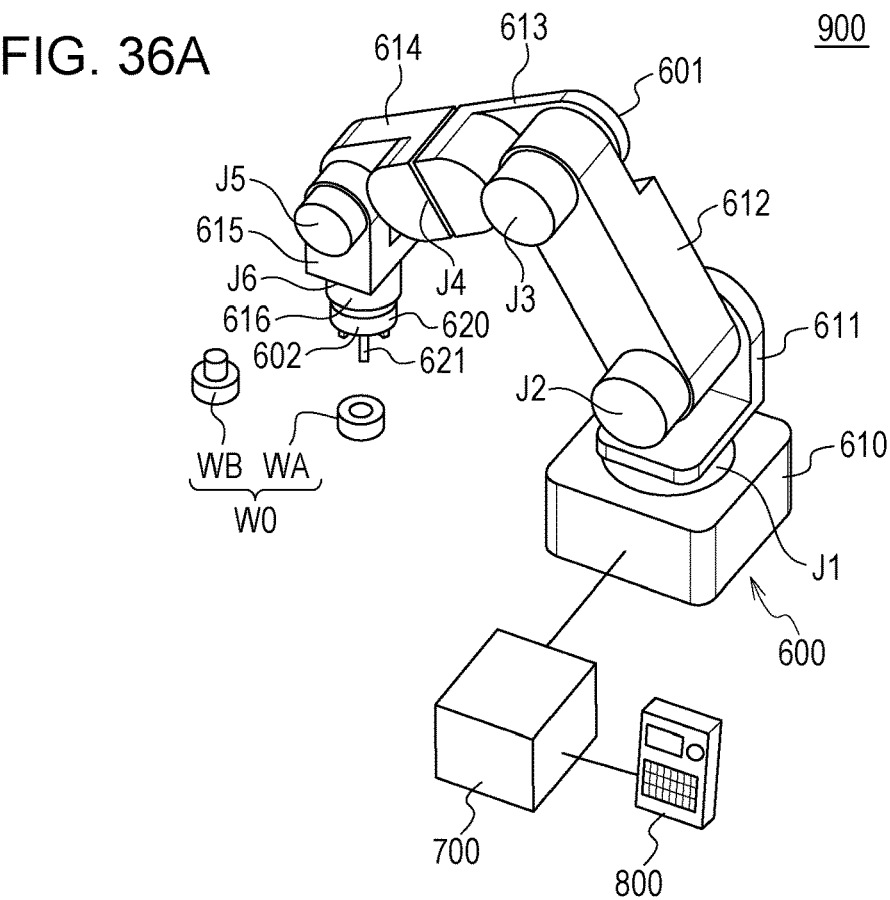
FIGS. 36A and 36B are schematic diagrams illustrating the device and the sensor.
Figure 36B:
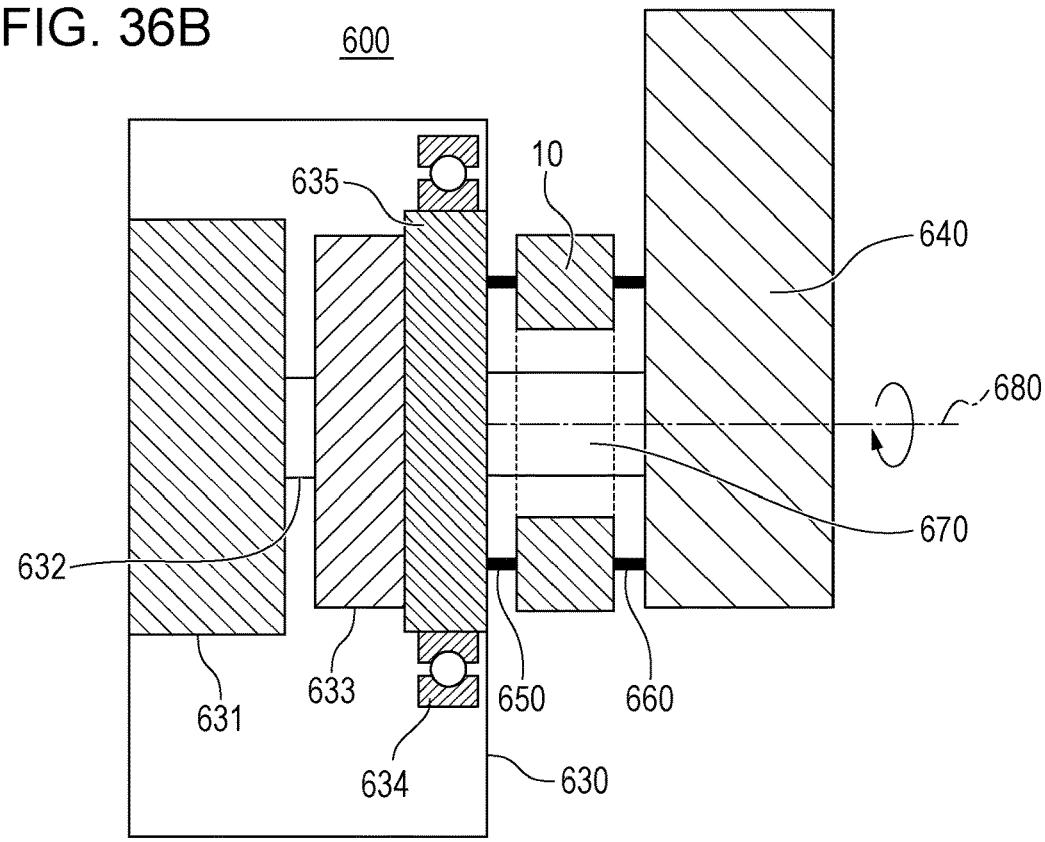

In recent years, a robot 600 as shown in FIGS. 36A and 36B is used. The robot 600 operates in accordance with a robot program for the purpose of production of products. As for production of products that need accuracy in assembly operation, the following control method is used. In the control method, the sensor 10 capable of acquiring mechanical information, such as torque, is disposed in the robot 600, a force that is applied to a joint is measured, and the operation of the robot 600 is controlled. A torque sensor that uses a detector capable of detecting a deformation of the structure 5 that is a component of the sensor 10 and that detects a torque applied to the joint in accordance with the detected deformation and the rigidity of the structure 5 has become a focus of attention as the sensor 10 of this type. In twisting about a rotation axis, a force of Mz is on the rotation axis of torque, and forces in the other directions are other-axis forces. Other-axis forces become a disturbance (other-axis interference) on torque detection. A twisting amount caused by other-axis interference becomes a factor of disturbance on torque detection. When the structure 5 includes the top surface section 1 and the bottom surface section 2 and further includes the reinforcement components 56, 57, other-axis interference is reduced.

Figure 5A:
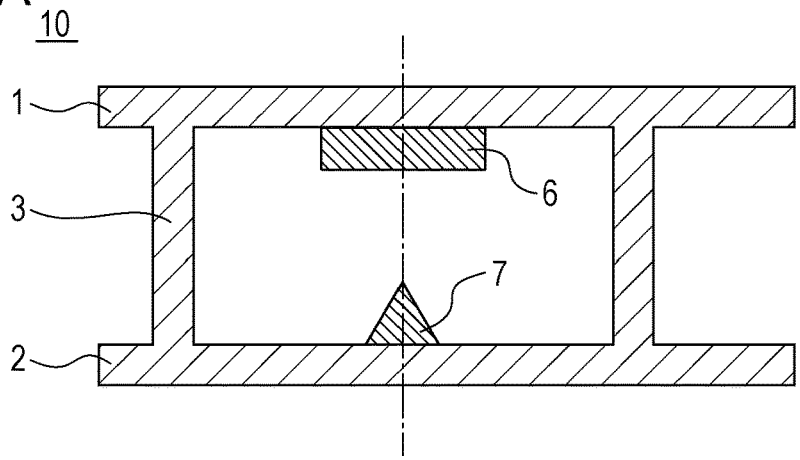
FIGS. 5A to 5C are schematic diagrams illustrating the sensor.
Figure 5B:
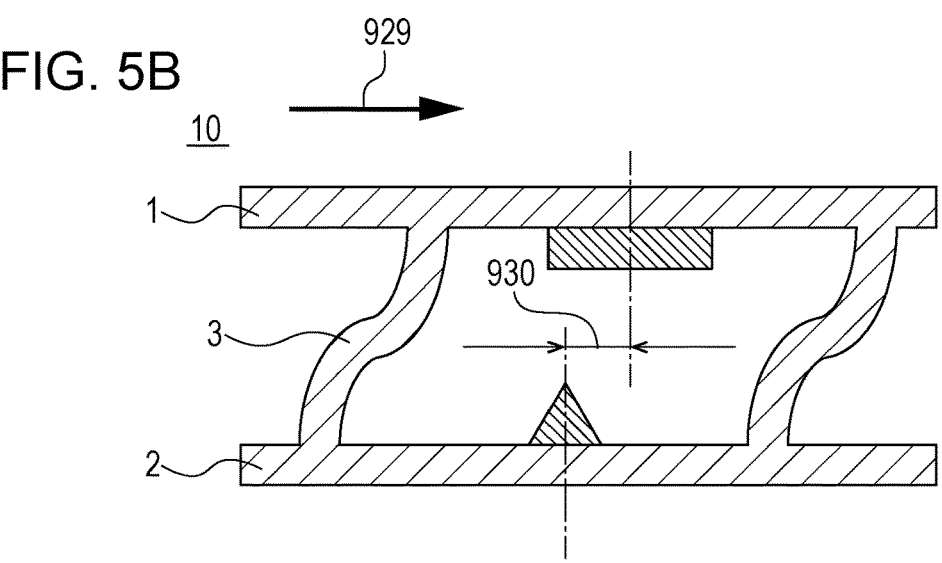
Figure 5C:
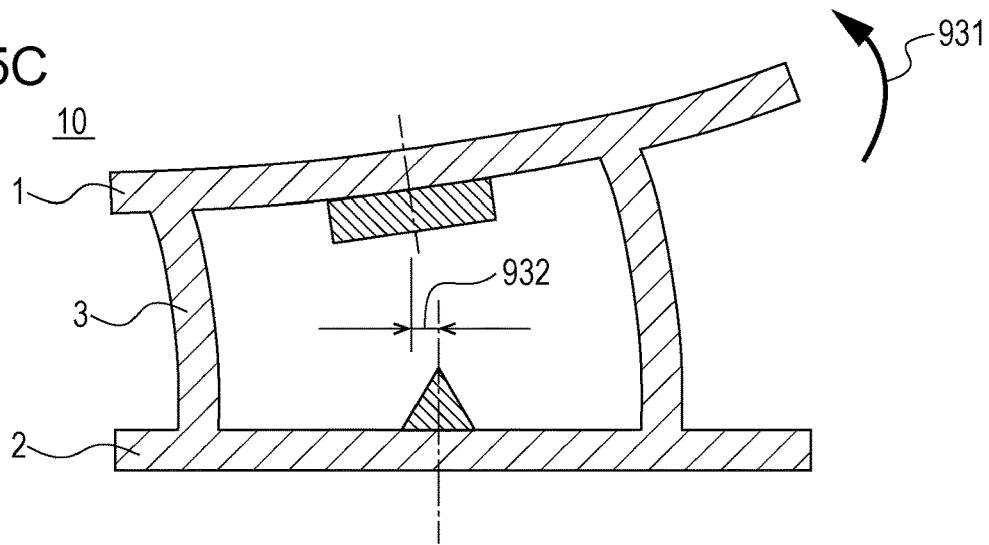
Figure 6A:
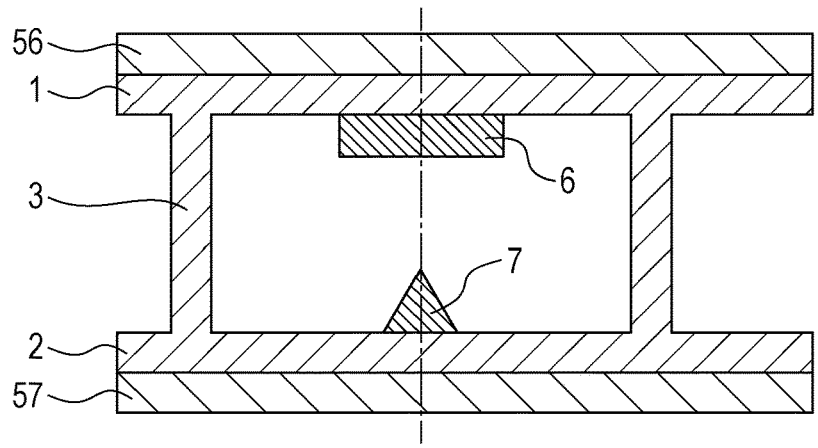
FIGS. 6A to 6C are schematic diagrams illustrating the sensor.
Figure 6B:
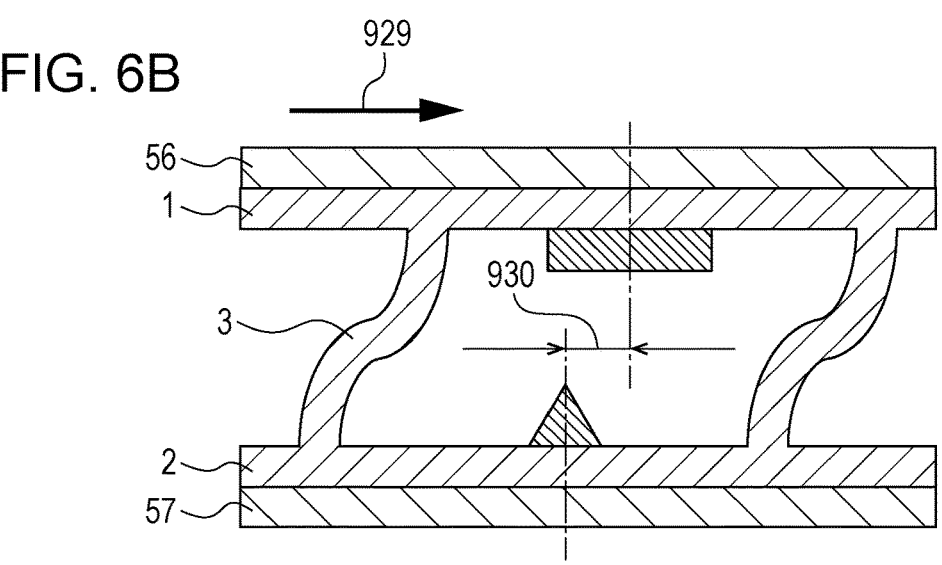
Figure 6C:
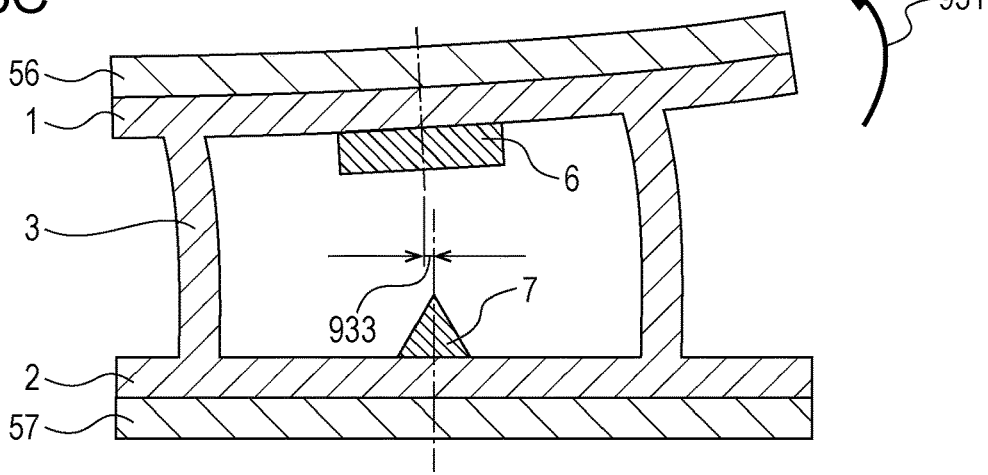

FIGS. 5A to 6C schematically illustrate methods of torque detection using the sensor 10. FIGS. 5A to 5C are associated with the mode of FIG. 4A. FIGS. 6A to 6C are associated with the mode of FIG. 4B.

FIG. 5A and FIG. 6A show a state where no torque is occurring. This state is defined as an initial position of the component 6, attached to the top surface section 1, and the component 7.

FIG. 5B and FIG. 6B show a state where, for example, the axis 680 shown in FIG. 4A or FIG. 4B rotates to generate a torque. In this case, the top surface section 1 coupled to the link 640 and the bottom surface section 2 coupled to the link 630 are displaced in the rotation direction. Furthermore, the top surface section 1 and the bottom surface section 2 elastically deform, and the amount of deformation is proportional to the magnitude of torque generated.

Here, in the positional relationship between the component 6 and the component 7 in FIG. 5B or FIG. 6B, there is a change 930 from the initial position shown in FIG. 5A or FIG. 6A. The sensor 10 measures the change 930 and detects the value of torque generated in accordance with the measured value. For this purpose, a rotational rigidity Gz [kNm/rad] that is a torque Nt [kNm] used to rotate the sensor 10 by a unit angle [rad] is obtained in advance by measurement or finite element method. When the rotational angle measured by the component 6 and the component 7 is θ, a torque Nt generated is detected as Nt=Gz×θ [kNm]. In terms of this point, the sensors 10 of FIG. 4A and FIG. 4B can similarly detect a detection target force.

FIG. 5C and FIG. 6C show a state where bending moment 931 as shown in FIGS. 4A and 4B is generated. In this case, with a bending deformation of the top surface section 1, the component 6 is displaced to the left in the drawing. As a result of this displacement, there occurs a displacement 932 from the initial position in the component 6 and the component 7. The displacement caused by the bending moment 931 may appear as other-axis interference to decrease the detection accuracy of the sensor 10.

In the mode of FIG. 6C, the rigidity of the structure 5 increases by the addition of the reinforcement components 56, 57.

Therefore, a displacement 933 from the initial position of the component 6 and the component 7 in the event of occurrence of the bending moment 931 is smaller than the displacement 932 in the case of the configuration of FIG. 5C, so the influence of other-axis interference is reduced.

The shape of the structure 5 will be specifically described with reference to FIG. 7. The reinforcement component 56 has an overlapping portion 561 overlapping the elastic section 31, an overlapping portion 562 overlapping the elastic section 32, and a relay portion 563 connecting the overlapping portion 561 and the overlapping portion 562. Similarly, the reinforcement component 57 has an overlapping portion 571 overlapping the elastic section 31, an overlapping portion 572 overlapping the elastic section 32, and a relay portion 573 connecting the overlapping portion 571 and the overlapping portion 572. Here, the state that two portions "overlap" means that the two portions are arranged in the z direction. The state that one portion "connects" two portions means that the two portions are continuous via the one portion in the x direction, the y direction, the θ direction, or the r direction. One portion connecting two portions is not limited to being located between the two portions and may be located at a portion not between the two portions.

The metal component 51 has a metal portion 11 overlapping the overlapping portion 561 and a metal portion 12 overlapping the overlapping portion 562. The metal component 51 has a metal portion 21 overlapping the overlapping portion 571 and a metal portion 22 overlapping the overlapping portion 572. The elastic section 31 couples the metal portion 11 with the metal portion 21. The elastic section 32 is located between the metal portion 12 and the metal portion 22. The elastic section 32 couples the metal portion 12 with the metal portion 22. The elastic section 31 is located between the metal portion 11 and the metal portion 21. The metal portion 11 is located between the elastic section 31 and the overlapping portion 561, and the metal portion 12 is located between the elastic section 32 and the overlapping portion 562. The metal portion 21 is located between the elastic section 31 and the overlapping portion 571, and the metal portion 22 is located between the elastic section 32 and the overlapping portion 572.

The metal component 51 has a metal portion 13. The metal portion 13 satisfies at least any one of overlapping the relay portion 563 and coupling the elastic section 31 with the elastic section 32. The metal component 51 has a metal portion 23. The metal portion 23 satisfies at least any one of overlapping the relay portion 573 and coupling the elastic section 31 with the elastic section 32. An air gap 30 is provided between the metal portion 13 and the metal portion 23. The air gap 30 is present between the elastic section 31 and the elastic section 32 in any one of the x direction, the y direction, the r direction, and the θ direction. By providing the air gap 30, the rigidity of the metal component 51 decreases, and the elastic sections 31, 32 elastically deform.

The metal portions 11, 12, 13 make up the top surface section 1 of the metal component 51. The metal portions 21, 22, 23 make up the bottom surface section 2 of the metal component 51.

The reinforcement component 56 has an extended portion 564 extending from the overlapping portion 561 to the side opposite to the relay portion 563, and an extended portion 565 extending from the overlapping portion 562 to the side opposite to the relay portion 563. The reinforcement component 57 has an extended portion 574 extending from the overlapping portion 571 to the side opposite to the relay portion 573, and an extended portion 575 extending from the overlapping portion 572 to the side opposite to the relay portion 573.

The metal component 51 has a metal portion 14. The metal portion 14 satisfies at least any one of overlapping the extended portion 564 and extending from the metal portion 11 to the side opposite to the metal portion 13. The metal component 51 has a metal portion 15. The metal portion 15 satisfies at least any one of overlapping the extended portion 565 and extending from the metal portion 12 to the side opposite to the metal portion 13. The metal component 51 has a metal portion 24. The metal portion 24 satisfies at least any one of overlapping the extended portion 574 and extending from the metal portion 21 to the side opposite to the metal portion 23. The metal component 51 has a metal portion 25. The metal portion 25 satisfies at least any one of overlapping the extended portion 575 and extending from the metal portion 22 to the side opposite to the metal portion 23.

When the relay portion 563 and the extended portions 564, 565 each overlap the metal component 51 (the metal portions 13, 14, 15), the relay portion 563 and the extended portions 564, 565 each may be referred to as overlapping portion. When the relay portion 573 and the extended portions 574, 575 each overlap the metal component 51 (the metal portions 23, 24, 25), the relay portion 573 and the extended portions 574, 575 each may be referred to as overlapping portion. The relay portion 563, the extended portions 564, 565, the relay portion 573, and the extended portions 574, 575 do not need to overlap the metal component 51.

The reinforcement component 56 and the metal component 51 are coupled by joints 58. The reinforcement component 57 and the metal component 51 are coupled by joints 59. Various modes, such as bonding, welding, and fastening, may be used for coupling by the joints 58. When the reinforcement components 56, 57 are metal components, coupling of each of the reinforcement components 56, 57 with the metal component 51 can be welding. In this case, the joints 58, 59 may be referred to as welding portions.

Figure 7:
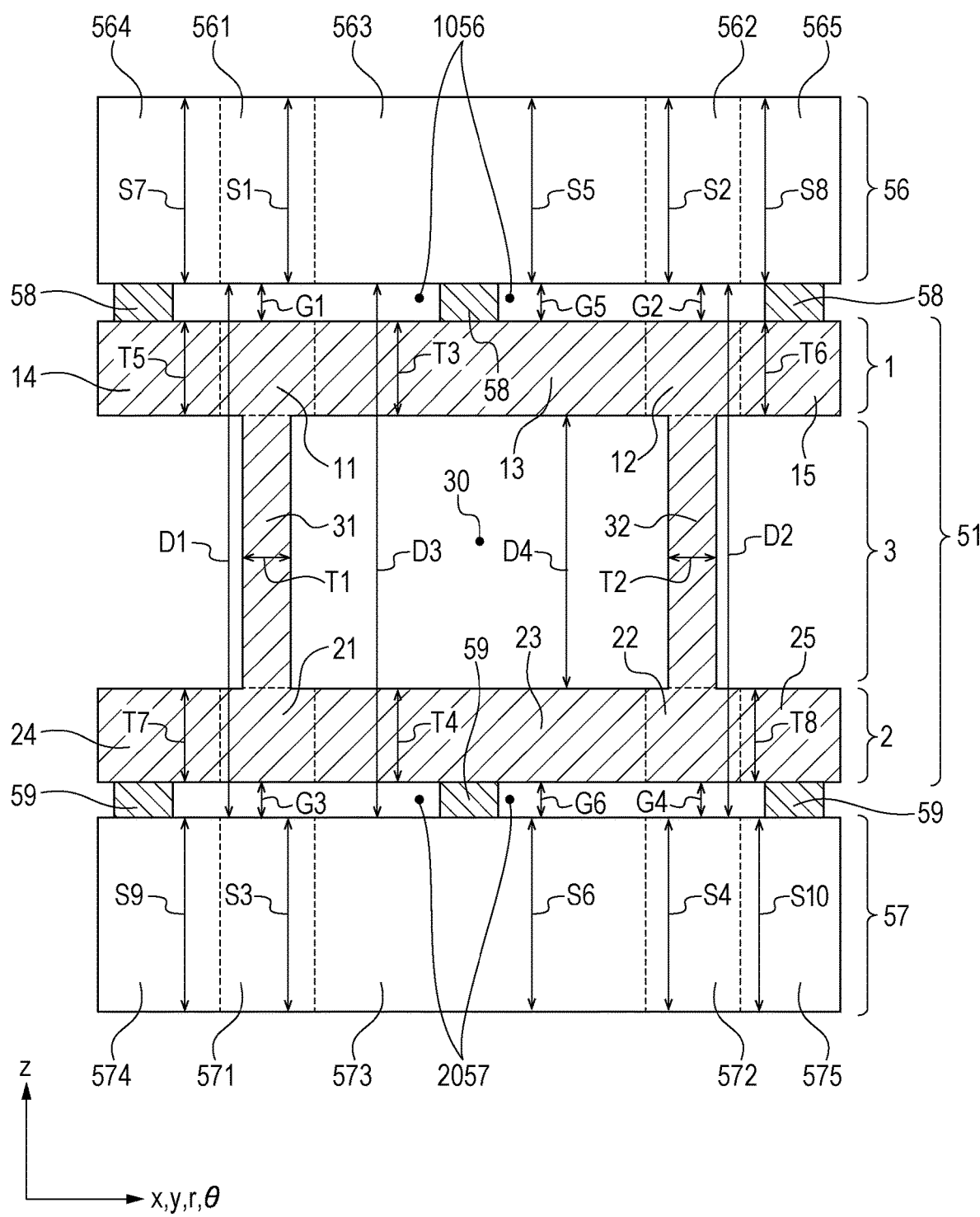
FIG. 7 is a schematic diagram illustrating the sensor.

FIG. 7 shows the thickness S1 of the overlapping portion 561, the thickness S2 of the overlapping portion 562, the thickness S3 of the overlapping portion 571, and the thickness S4 of the overlapping portion 572. FIG. 7 shows the thickness S5 of the relay portion 563, the thickness S6 of the relay portion 573, the thickness S7 of the extended portion 564, the thickness S8 of the extended portion 565, the thickness S9 of the extended portion 574, and the thickness S10 of the extended portion 575. The thicknesses S1 to S10 are the dimensions of the reinforcement components 56, 57 in the z direction. It means that, as the thicknesses S1 to S10 increase, the rigidity of the reinforcement components 56, 57 in the z direction increases. At least two of the thicknesses S1 to S10 may be different from each other, and at least two of the thicknesses S1 to S10 may be equal to each other. In this example, the description will be made on the assumption that all the thicknesses S1 to S10 are equal. When the maximum value of the thicknesses S1 to S10 is less than 110% of the minimum value, all the thicknesses S1 to S10 may be regarded to be equal. In this case, a larger one of at least two of the thicknesses S1 to S10 is less than 110% of a smaller one.

FIG. 7 shows the thickness T1 of the elastic section 31 and the thickness T2 of the elastic section 32. The thicknesses T1, T2 are the dimensions of the elastic sections 31, 32 of the metal component 51 in the x direction, the y direction, the r direction, or the θ direction. It means that, as the thicknesses T1, T2 reduce, the rigidity of the metal component 51 in the x direction, the y direction, the r direction, or the θ direction reduce. The thicknesses T1, T2 are small in a predetermined direction, so the rigidity of the elastic sections 31, 32 reduces, with the result that the elastic sections 31, 32 are easy to elastically deform in the predetermined direction. The thicknesses T1, T2 may be different from each other or the thicknesses T1, T2 may be equal to each other. In this example, the description will be made on the assumption that the thicknesses T1, T2 are equal. When the larger one of the thicknesses T1, T2 is less than 110% of the smaller one, T1 and T2 may be regarded to be equal in this example.

FIG. 7 shows the thickness T3 of the metal portion 13, the thickness T4 of the metal portion 23, the thickness T5 of the metal portion 14, the thickness T6 of the metal portion 15, the thickness T7 of the metal portion 24, and the thickness T8 of the metal portion 25. The thicknesses T3 to T8 are the dimensions of the top surface section 1 and bottom surface section 2 of the metal component 51 in the z direction. It means that, as the thicknesses T3 to T8 reduce, the rigidity of the metal component 51 in the z direction reduces. The thicknesses T3 to T8 may be different from one other or the thicknesses T3 to T8 may be equal to one other. In this example, the description will be made on the assumption that the thicknesses T3 to T8 are equal. When the maximum value of the thicknesses T3 to T8 is less than 110% of the minimum value, all the thicknesses T3 to T8 may be regarded to be equal. In this case, a larger one of at least two of the thicknesses T3 to T8 is less than 110% of a smaller one.

FIG. 7 shows the distance G1 between the overlapping portion 561 and the metal component 51 (metal portion 11) and the distance G2 between the overlapping portion 562 and the metal component 51 (metal portion 12). FIG. 7 shows the distance G3 between the overlapping portion 571 and the metal component 51 (metal portion 21) and the distance G4 between the overlapping portion 572 and the metal component 51 (metal portion 22). FIG. 7 shows the distance G5 between the relay portion 563 and the metal component 51 (metal portion 13) and the distance G6 between the relay portion 573 and the metal component 51 (metal portion 23). The distances G1 to G6 may be different from one other or the distances G1 to G6 may be equal to one other. In this example, the description will be made on the assumption that the distances G1 to G6 are equal. When the maximum value of the distances G1 to G6 is less than 110% of the minimum value, all the distances G1 to G6 may be regarded to be equal. In this case, a larger one of at least two of the distances G1 to G6 is less than 110% of a smaller one. At least any one of the distances G1 to G6 may be zero, that is, at least one of the overlapping portions 561, 562, 571, 572, and the relay portions 563, 573 may be in contact with the metal component 51.

However, the distances G1 to G6 are preferably greater than zero. Even when one part of each of the overlapping portions 561, 562, 571, 572 and the relay portions 563, 573 is in contact with the metal component 51, the other part of each of the overlapping portions 561, 562, 571, 572, and the relay portions 563, 573 can be spaced away from the metal component 51. In this example, a gap 1056 is provided between the reinforcement component 56 and the metal component 51, and a gap 2057 is provided between the reinforcement component 57 and the metal component 51. Each of the distances G1 to G6 can be the distance between the metal component 51 and any one of the reinforcement components 56, 57 via the gap 1056 or the gap 2057.

FIG. 7 shows the distance D1 between the overlapping portion 561 and the overlapping portion 571, the distance D2 between the overlapping portion 562 and the overlapping portion 572, the distance D3 between the relay portion 563 and the relay portion 573, and the distance D4 between the metal portion 13 and the metal portion 23. The distances D1 to D3 may be different from one other or the distances D1 to D3 may be equal to one other. In this example, the description will be made on the assumption that the distances D1 to D3 are equal. When the maximum value of the distances D1 to D3 is shorter than 110% of the minimum value, all the distances D1 to D3 may be regarded to be equal. In this case, a larger one of at least two of the distances D1 to D3 is shorter than 110% of a smaller one.

In the present embodiment, the reinforcement components 56, 57 that reinforce the top surface section 1 and the bottom surface section 2 are provided such that the top surface section 1 and the bottom surface section 2 do not elastically deform as much as possible when the elastic sections 31, 32 elastically deform. It is desirable that the rigidity of the reinforcement components 56, 57 be higher than that of the elastic sections 31, 32 that impart elasticity (that reduce rigidity) in the structure 5. In terms of this viewpoint, the thicknesses S1 to S10 of the portions of the reinforcement components 56, 57 can be set so as to be greater than the thicknesses T1, T2 of the elastic sections 31, 32 ([S1 to S10]>[T1 & T2]). For example, the thickness S5 of the relay portion 563 is greater than the thickness T1 of the elastic section 31 (S5>T1), and the thickness S6 of the relay portion 573 is greater than the thickness T2 of the elastic section 32 (S6>T2).

The reinforcement components 56, 57 are particularly effective when the rigidity of the top surface section 1 and the bottom surface section 2 is not sufficient. It is desirable that the rigidity of the reinforcement components 56, 57 be higher than that of the top surface section 1 and the bottom surface section 2 that impart rigidity to the structure 5. In terms of this viewpoint, the thicknesses S1 to S10 of the portions of the reinforcement components 56, 57 can be set so as to be greater than the thicknesses T3 to T8 of the portions of the top surface section 1 and the bottom surface section 2, associated with the portions of the reinforcement components 56, 57 ([S1 to S10]>[T3 to T8]). For example, the thickness S5 of the relay portion 563 is greater than the thickness T3 of the metal portion 13 (S5>T3), and the thickness S6 of the relay portion 573 is greater than the thickness T4 of the metal portion 23 (S6>T4).

Since the reinforcement components 56, 57 are provided, the thicknesses T1 to T8 of the portions of the top surface section 1 and the bottom surface section 2 may be closer to the thicknesses T1, T2 of the elastic sections 31, 32 than to the thicknesses S1 to S10 of the portions of the reinforcement components 56, 57, associated with the portions of the top surface section 1 and the bottom surface section 2. In other words, a difference between each of the thicknesses T1, T2 of the elastic sections 31, 32 and each of the thicknesses T3 to T8 of the portions of the top surface section 1 and the bottom surface section 2 may be less than a difference between each of the thicknesses S1 to S10 of the portions of the reinforcement components 56, 57 and each of the thicknesses T3 to T8 of the portions of the top surface section 1 and the bottom surface section 2, associated with the portions of the reinforcement components 56, 57 (|[T3 to T8]−[T1 & T2]|<|[S1 to S10]−[T3 to T8]|). For example, a difference between the thickness T1 of the elastic section 31 and the thickness T3 of the metal portion 13 is less than a difference between the thickness S5 of the relay portion 563 and the thickness T3 of the metal portion 13. A difference between the thickness T2 of the elastic section 32 and the thickness T4 of the metal portion 23 is less than a difference between the thickness S6 of the relay portion 573 and the thickness T4 of the metal portion 23.

To impart appropriate elasticity to the elastic sections 31, 32 and impart appropriate rigidity to the top surface section 1 and the bottom surface section 2, each of the thicknesses T1, T2 of the elastic sections 31, 32 can be less than each of the thicknesses T3 to T8 of the portions of the top surface section 1 and the bottom surface section 2 ([T1 & T2]<[T3 to T8]). However, when appropriate elasticity and rigidity are imparted to the elastic sections 31, 32, the rigidity of the structure 5 can be imparted to the reinforcement components 56, 57 even when the rigidity of the top surface section 1 and the bottom surface section 2 is small. Therefore, each of the thicknesses T1, T2 of the elastic sections 31, 32 may be equal to each of the thicknesses T3 to T8 of the portions of the top surface section 1 and the bottom surface section 2 ([T1 & T2]=[T3 to T8]) and may be greater than each of the thicknesses T3 to T8 of the portions of the top surface section 1 and the bottom surface section 2 (([T1 & T2]>[T3 to T8])). When each of the thicknesses T3 to T8 of the portions of the top surface section 1 and the bottom surface section 2 is equal to each of the thicknesses T1, T2 of the elastic sections 31, 32 or less than each of the thicknesses T1, T2 of the elastic sections 31, 32, a cost for the metal component 51 having the elastic sections 31, 32 is reduced. When each of the thicknesses T1, T2 of the elastic sections 31, 32 is equal to each of the thicknesses T3 to T8 of the portions of the top surface section 1 and the bottom surface section 2, a difference between each of the thicknesses T1, T2 of the elastic sections 31, 32 and each of the thicknesses T3 to T8 of the portions of the top surface section 1 and the bottom surface section 2 is zero.

The elasticity of the metal component 51 mostly depends on the thicknesses T1, T2 of the elastic sections 31, 32 and the lengths of the elastic sections 31, 32, and the lengths (dimensions in the z direction) of the elastic sections 31, 32 can correlate with the distance D4 between the metal portion 13 and the metal portion 23. As the distance D4 between the metal portion 13 and the metal portion 23 increases, the rigidity of the metal component 51 can reduce. In this example, the length of each of the elastic sections 31, 32 coincides with the distance D4 between the metal portion 13 and the metal portion 23. On the other hand, as the distances G1 to G3 between the reinforcement component 56 and the reinforcement component 57 reduce, the rigidity of the structure 5 can increase. To reduce the rigidity of the metal component 51 while increasing the rigidity of the structure 5, the distance D4 between the metal portion 13 and the metal portion 23 can be greater than or equal to two thirds of each of the distances G1 to G3 between the reinforcement component 56 and the reinforcement component 57. For example, the distance G1 between the overlapping portion 561 and the overlapping portion 571 can be greater than or equal to two thirds of the length of the elastic section 31, and the distance G2 between the overlapping portion 562 and the overlapping portion 572 can be greater than or equal to two thirds of the length of the elastic section 32. The distance D4 between the metal portion 13 and the metal portion 23 can be greater than or equal to two thirds of the distance D3 between the relay portion 563 and the relay portion 573 (D4≥D3×⅔).

When the thicknesses S1 to S10 of the portions of the reinforcement components 56, 57 are extremely increased, it leads to an increase in the size, weight, and cost of the structure 5.

Each of the thicknesses S1 to S10 of the portions of the reinforcement components 56, 57 can be less than each of the distances D1 to D3 between the reinforcement component 56 and the reinforcement component 57. For example, the thickness S1 of the overlapping portion 561 is less than the distance D1 between the overlapping portion 561 and the overlapping portion 571 (S1<D1), and the thickness S3 of the overlapping portion 571 is less than the distance D1 between the overlapping portion 561 and the overlapping portion 571 (S3<D1). The thickness S5 of the relay portion 563 is less than the distance D3 between the relay portion 563 and the relay portion 573 (S5<D3), and the thickness S6 of the relay portion 573 is less than the distance D3 between the relay portion 563 and the relay portion 573 (S6<D3). In addition, each of the thicknesses S1 to S10 of the portions of the reinforcement components 56, 57 may be less than each of the lengths of the elastic sections 31, 32 and may be less than the distance D4 between the metal portion 13 and the metal portion 23 ([S1 to S10]<D4). For example, the thickness S5 of the relay portion 563 is less than the distance D4 between the metal portion 13 and the metal portion 23 (S5<D4), and the thickness S6 of the relay portion 573 is less than the distance D4 between the metal portion 13 and the metal portion 23 (S6<D4).

In order for the reinforcement components 56, 57 to effectively function for (reinforce) the metal component 51, the reinforcement components 56, 57 can be disposed near the metal component 51 as much as possible. Therefore, each of the distances G1, G2, G5 between the positions of the reinforcement component 56 and the top surface section 1 of the metal component 51 can be shorter than the distance between the top surface section 1 and the bottom surface section 2, and each of the distances G3, G4, G6 between the positions of the reinforcement component 57 and the bottom surface section 2 of the metal component 51 can be shorter than the distance between the top surface section 1 and the bottom surface section 2. For example, the distance G5 between the relay portion 563 and the metal portion 13 is shorter than the distance D4 between the relay portion 563 and the relay portion 573 (G5<D4), and the distance G6 between the relay portion 573 and the metal portion 23 is shorter than the distance D4 between the relay portion 563 and the relay portion 573 (G6<D4).

Each of the distances G1 to G6 between the portions of the reinforcement components 56, 57 and the top surface section 1 and bottom surface section 2 of the metal component 51 can be shorter than each of the thicknesses S1 to S10 of the portions of the reinforcement components 56, 57, associated with the portions of the top surface section 1 and bottom surface section 2. For example, the distance G5 between the relay portion 563 and the metal portion 13 is shorter than the thickness S5 of the relay portion 563 (G5<S5), and the distance G6 between the relay portion 573 and the metal portion 23 is shorter than the thickness S6 of the relay portion 573 (G6<S6). The structure 5 may satisfy G3<S3 and/or G6<S6.

Each of the distances G1 to G6 between the portions of the reinforcement components 56, 57 and the top surface section 1 and bottom surface section 2 of the metal component 51 can be shorter than each of the thicknesses T3 to T8 of the portions of the top surface section 1 and bottom surface section 2, associated with the portions of the reinforcement components 56, 57. For example, the distance G5 between the relay portion 563 and the metal portion 13 is shorter than the thickness T3 of the metal portion 13 (G5<T3), and the distance G6 between the relay portion 573 and the metal portion 23 is shorter than the thickness T4 of the relay portion 23 (G6<T4).

Each of the distances G1 to G6 between the portions of the reinforcement components 56, 57 and the top surface section 1 and bottom surface section 2 of the metal component 51 can be shorter than each of the thicknesses (T1, T2) of the elastic sections 31, 32 ([G1 to G6]<[T1 & T2]). For example, the distance G1 between the overlapping portion 561 and the metal component 51 (metal portion 11) is shorter than the thickness T1 of the elastic section 31 (G1<T1), and the distance G2 between the overlapping portion 562 and the metal component 51 (metal portion 12) is shorter than the thickness T2 of the elastic section 32 (G2<T2). For example, the distance G3 between the overlapping portion 571 and the metal component 51 (metal portion 21) is shorter than the thickness T1 of the elastic section 31 (G3<T1), and the distance G4 between the overlapping portion 572 and the metal component 51 (metal portion 22) is shorter than the thickness T2 of the elastic section 32 (G4<T2). The distance G5 between the relay portion 563 and the metal component 51 (metal portion 13) is shorter than the thickness T1 of the elastic section 31 or the thickness T2 of the elastic section 32 (G5<[T1 & T2]). The distance G6 between the relay portion 573 and the metal component 51 (metal portion 23) is shorter than the thickness T1 of the elastic section 31 or the thickness T2 of the elastic section 32 (G6<[T1 & T2]).

Each of the thicknesses S1 to S10 of the portions of the reinforcement components 56, 57 may be between the length of each of the elastic sections 31, 32 or the distance D4 from the metal portion 13 to the metal portion 23 and the thickness of each of the portions of the top surface section 1 and the bottom surface section 2. For example, the thickness S5 of the relay portion 563 can be between the distance D4 from the metal portion 13 to the metal portion 23 and the thickness T3 of the metal portion 13 (T3<S5<D4 or T3>S5>D4).

The thickness S6 of the relay portion 573 can be between the distance D4 from the metal portion 13 to the metal portion 23 and the thickness T4 of the metal portion 23 (T4<S6<D4 or T4>S6>D4). When both the above-described [S1 to S10]<D4 and [S1 to S10]>[T3 to T8] are satisfied, this relationship can be satisfied.

Specific numeric value ranges in the above-described mode are, for example, [G1 to G6] ranges from 0 mm to 1 mm, [T1 & T2] ranges from 1 mm to 3 mm, [T3 to T8] ranges from 1 mm to 10 mm, [S1 to S10] ranges from 1 mm to 20 mm, D4 ranges from 5 mm to 15 mm, and [D1 to D3] ranges from 5 mm to 30 mm. Among these ranges, preferably [G1 to G6]<[T1 & T2]≤[T3 to T8]<[S1 to S10]<D4<[D1 to D3] is satisfied.

A gap can be provided between each of the portions of the reinforcement components 56, 57 and each of the top surface section 1 and bottom surface section 2 of the metal component 51. For example, the gap 1056 is provided between the reinforcement component 56 and the metal component 51 (top surface section 1). The gap 2057 is provided between the reinforcement component 57 and the metal component 51 (bottom surface section 2). In other words, each of the reinforcement components 56, 57 and the metal component 51 (the top surface section 1 or the bottom surface section 2) can face each other via the gap 1056 or the gap 2057. Each of the above-described distances G1 to G6 can be the distance between any one of the reinforcement components 56, 57 and the metal component 51 (the top surface section 1 or the bottom surface section 2), facing each other via the gap 1056 or the gap 2057.

When the reinforcement components 56, 57 are respectively in contact with the top surface section 1 and the bottom surface section 2 of the metal component 51, friction can occur between each of the reinforcement components 56, 57 and the metal component 51 in the event of a deformation of the structure 5. This friction can decrease the detection accuracy of the sensor 10. When the gaps 1056, 2057 are provided as described above, friction between each of the reinforcement components 56, 57 and the metal component 51 is reduced, with the result that the detection accuracy of the sensor 10 is improved. In a region in which the reinforcement components 56, 57 overlap the metal component 51, the area of each of the gaps 1056, 2057 can be increased as much as possible. When the gaps 1056, 2057 are provided, there may be a portion where the reinforcement components 56, 57 are in contact with the metal component 51. The area in which the reinforcement component 56 and the metal component 51 (top surface section 1) face each other via the gap 1056 to the area of a region in which the reinforcement component 56 and the metal component 51 (top surface section 1) overlap is preferably higher than or equal to 25%. The area in which the reinforcement component 56 and the metal component 51 (top surface section 1) face each other via the gap 1056 to the area of a region in which the reinforcement component 56 and the metal component 51 (top surface section 1) overlap may be lower than or equal to 75% or may be lower than or equal to 50%. The area in which the reinforcement component 57 and the metal component 51 (bottom surface section 2) face each other via the gap 2057 to the area of a region in which the reinforcement component 57 and the metal component 51 (bottom surface section 2) overlap is preferably higher than or equal to 25%. The area in which the reinforcement component 57 and the metal component 51 (bottom surface section 2) face each other via the gap 2057 to the area of a region in which the reinforcement component 57 and the metal component 51 (bottom surface section 2) overlap may be lower than or equal to 75% or may be lower than or equal to 50%.

Various methods can be adopted to form the gaps 1056, 2057. For example, a protruding portion can be provided on one of the metal component 51-side surface of each of the reinforcement components 56, 57 and the reinforcement components 56, 57-side surface of the metal component 51, and the protruding portion can be brought into contact with the other. Thus, the gaps 1056, 2057 according to the height of the protruding portion can be formed. A plurality of protruding portions may be provided on one of the metal component 51-side surface of each of the reinforcement components 56, 57 and the reinforcement components 56, 57-side surface of the metal component 51. In this case, gaps 1056, 2057 can be formed between the plurality of protruding portions. Alternatively, a recess may be provided on one of the metal component 51-side surface of each of the reinforcement components 56, 57 and the reinforcement components 56, 57-side surface of the metal component 51. Thus, the gaps 1056, 2057 according to the depth of the recess can be formed. Alternatively, a space regulating component (spacer or shim) that regulates the space between each of the reinforcement components 56, 57 and the metal component 51 may be disposed between each of the reinforcement components 56, 57 and the metal component 51. Thus, the gaps 1056, 2057 according to the thickness of the space regulating component can be formed.

The size of each of the gaps 1056, 2057 can be set such that, even when the structure 5 (the metal component 51, and the reinforcement components 56, 57) deforms, the metal component 51 (the top surface section 1 and the bottom surface section 2) does not contact with the reinforcement components 56, 57. When, for example, the amounts of deformation of the top surface section 1, the bottom surface section 2, and the reinforcement components 56, 57 in the z direction, which are estimated from a normal use of the sensor 10, are obtained, the dimensions of the gaps 1056, 2057 in the z direction should be increased so as to be larger than the amounts of deformation. The dimension of each of the gaps 1056, 2057 in the z direction may be greater than or equal to 1 μm, may be less than or equal to 1 mm, may range from 10 μm to 100 μm, or may range from 10 μm to 50 μm.

Third Embodiment

Figure 8A:
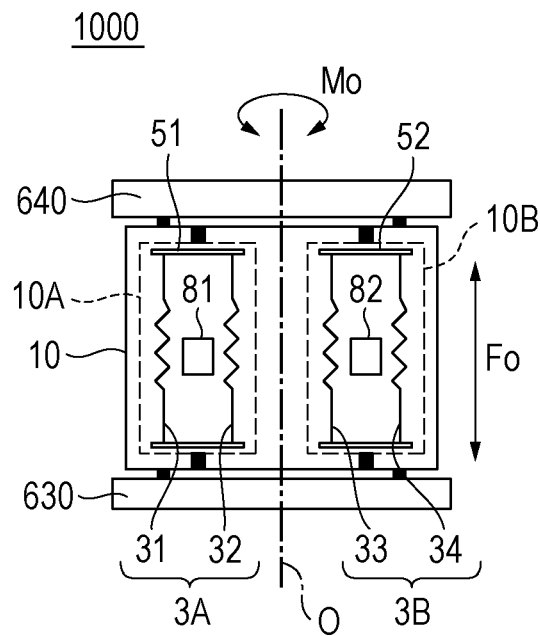
FIGS. 8A to 8D are schematic diagrams illustrating a device and a sensor.
Figure 8B:
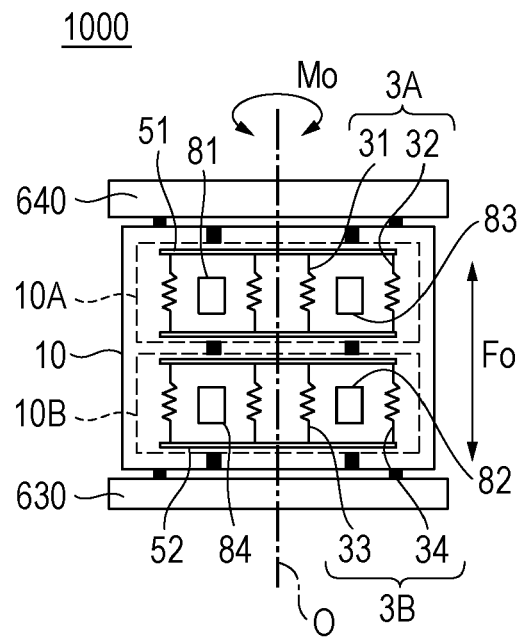

FIGS. 8A and 8B schematically show at least part of the machine device 1000 according to the present embodiment. The machine device 1000 includes a link 630, a link 640, a sensor module 10A, and a sensor module 10B. The link 630 and the link 640 are displaced relative to each other in an axial direction Fo along a certain intended axis o and in at least one intended direction of a rotation direction Mo about the certain intended axis o that is a rotation axis. The machine device 1000 includes a sensor 10 coupled to the link 630 and the link 640 for a joint between the link 630 and the link 640, and the sensor 10 is made up of the sensor module 10A and the sensor module 10B.

The intended axis o can be, for example, any one of the x axis, the y axis, and the z axis in the orthogonal coordinate system. The axial direction Fo can be any one of an axial direction Fx along the x axis, an axial direction Fy along the y axis, and an axial direction Fz along the z axis. The rotation direction Mo can be any one of a rotation direction Mx of which the rotation axis is the x axis, a rotation direction My of which the rotation axis is the y axis, and a rotation direction Mz of which the rotation axis is the z axis.

Hereinafter, for the sake of convenience, the description will be made on the assumption that the intended direction is the rotation direction Mo. Alternatively, a detection direction may be the axial direction Fo.

The sensor module 10A includes a metal component 51 having an elastic section group 3A that deforms in accordance with a displacement of the link 640 with respect to the link 630 in one intended direction (rotation direction Mo) and a detecting unit 81 that outputs a first signal according to a deformation of the elastic section group 3A.

The sensor module 10B includes a metal component 52 having an elastic section group 3B that deforms in accordance with a displacement of the link 640 with respect to the link 630 in one intended direction (rotation direction Mo) and a detecting unit 82 that outputs a second signal according to a deformation of the elastic section group 3B.

In this way, in the present embodiment, a force in one intended direction is detected by using the plurality of detecting units 81, 82. At this time, the plurality of sensor modules 10A, 10B is used. A plurality of the sensor modules 10A, 10B are respectively made up of the separate metal components 51, 52. Using the separate metal components 51, 52 is beneficial to ensure the accuracy of detecting a displacement of a link as compared to the case where the plurality of detecting units 81, 82 is provided in an integrated metal component. This is because, even when one of the metal components 51, 52 has a structural malfunction, the influence of the malfunction on the other one of the metal components 51, 52 can be suppressed. When the sensor module 10A or the sensor module 10B is replaceable with another sensor module, ease of maintenance is increased.

When, for example, one of the metal components 51, 52 with a malfunction is selected and replaced with another metal component with no malfunction, the other metal component with no malfunction does not need to be replaced, so it is economical. Better metal components 51, 52 can be selected and mounted on the device 1000 during manufacturing, the quality of the device 1000 improves.

In the mode of FIG. 8A, the at least two elastic sections 31, 32 included in the elastic section group 3A and the at least two elastic sections 33, 34 included in the elastic section group 3B are discretely disposed in an imaginary plane. Since the sensor module 10A and the sensor module 10B are arranged in a direction perpendicular to the intended axis o, the plane in which the elastic sections 31 to 34 are discretely disposed is, for example, a plane perpendicular to the intended axis o.

In the mode of FIG. 8B, the sensor module 10A and the sensor module 10B are arranged in a direction along the intended axis o (axial direction Mo).

Figure 8C:
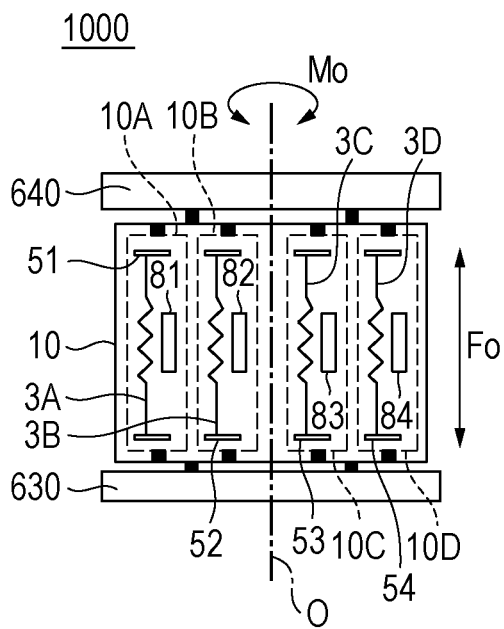
Figure 8D:
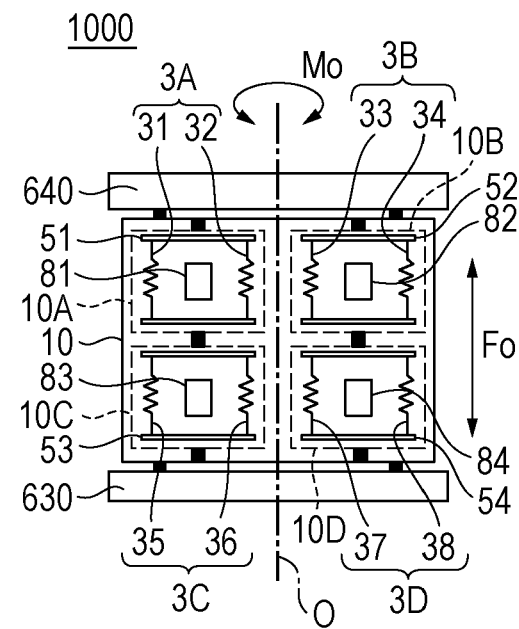

In the modes of FIGS. 8C and 8D, the machine device 1000 further includes a sensor module 10C and a sensor module 10D.

The sensor module 10C includes a metal component 53 having an elastic section group 3C that deforms in accordance with a displacement of the link 640 with respect to the link 630 in one intended direction and a detecting unit 83 that outputs a signal according to a deformation of the elastic section group 3C. In FIG. 8C, two elastic sections 35, 36 included in the elastic section group 3C are not shown.

The sensor module 10D includes a metal component 54 having an elastic section group 3D that deforms in accordance with a displacement of the link 640 with respect to the link 630 in one intended direction and a detecting unit 84 that outputs a signal according to a deformation of the elastic section group 3D. In FIG. 8C, two elastic sections 37, 38 included in the elastic section group 3D are not shown.

In the modes of FIGS. 8C and 8D, the at least two elastic sections 35, 36 included in the elastic section group 3C and the at least two elastic sections 37, 38 included in the elastic section group 3D are discretely disposed in an imaginary plane.

In the mode of FIG. 8C, the at least two elastic sections 31, 32 included in the elastic section group 3A, the at least two elastic sections 33, 34 included in the elastic section group 3B, the at least two elastic sections included in the elastic section group 3C, and the at least two elastic sections included in the elastic section group 3D are discretely disposed in the imaginary plane.

In the mode of FIG. 8D, the at least two elastic sections 31, 32 included in the elastic section group 3A and the at least two elastic sections 33, 34 included in the elastic section group 3B are discretely disposed not in an imaginary first plane but in an imaginary second plane. The at least two elastic sections included in the elastic section group 3C and the at least two elastic sections included in the elastic section group 3D are discretely disposed not in the imaginary second plane but in the imaginary first plane.

Figure 9A:
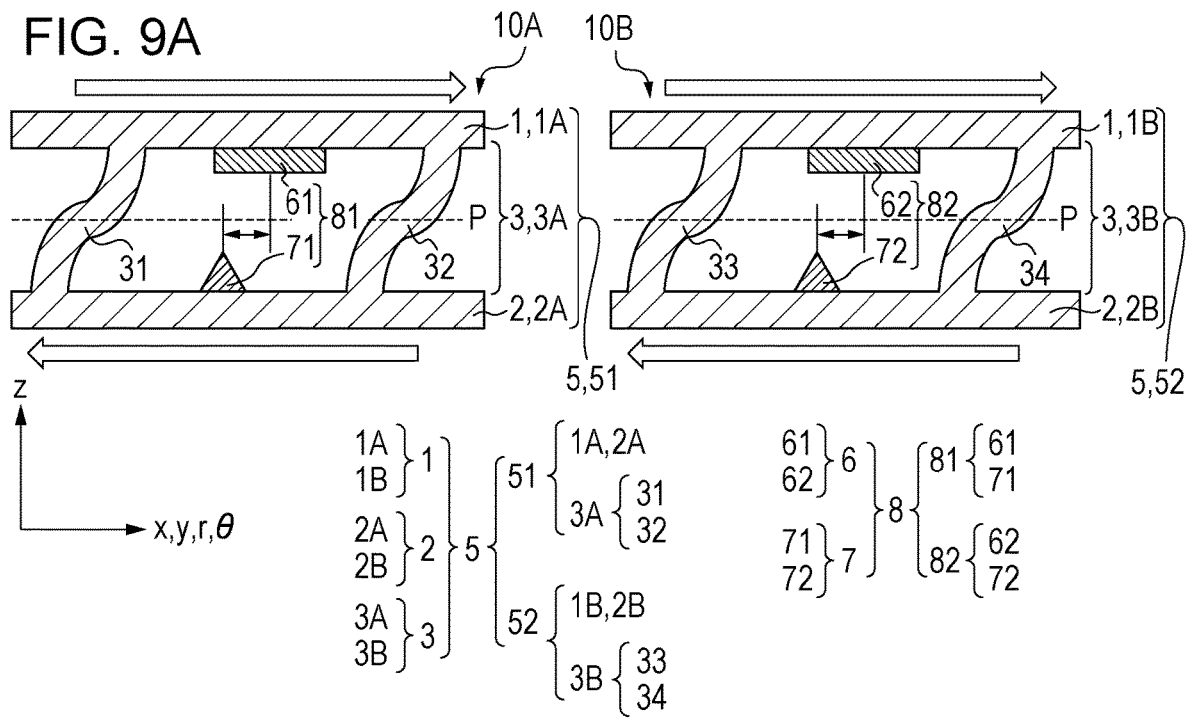
FIGS. 9A to 9C are schematic diagrams illustrating the sensor and the device.

FIG. 9A schematically shows the sensor 10 according to the present embodiment. The sensor 10 includes a structure 5 and a detector 8 for detecting a deformation of the structure 5. FIG. 9A shows an imaginary plane P parallel to an x-y plane in an xyz orthogonal coordinate system and parallel to an r-θ plane in an rθz cylindrical coordinate system. The cylindrical coordinate system is represented by r direction, θ direction, and z direction. The r direction may be referred to as radial direction, the θ direction may be referred to as circumferential direction, and the z direction may be referred to as axial direction. In the cylindrical coordinate system, the r-θ plane coincides with the x-y plane, and the z direction coincides with the z direction of the orthogonal coordinate system. The structure 5 has an elastic section group that is a group of a plurality of elastic sections discretely disposed in the imaginary plane P. The elastic section group has at least four elastic sections 31, 32, 33, 34 discretely disposed in the imaginary plane P. In other words, the number of elastic sections discretely disposed in the imaginary plane P and included in the elastic section group 3 is four or more. The sensor 10 may have one or a plurality of elastic sections not present in the imaginary plane P in which the elastic section group 3 is disposed. However, one or a plurality of elastic sections not present in the imaginary plane P is not counted as the elastic section of the elastic section group 3 present in the imaginary plane P. Two or more elastic sections included in the elastic section group 3 and included in the sensor module 10A are the elastic section group 3A. Two or more elastic sections included in the elastic section group 3 and included in the sensor module 10B are the elastic section group 3B. Two or more elastic sections included in one sensor module may be referred to as a set of elastic sections (elastic section set), a pair of elastic sections (elastic section pair), or the like, other than elastic section group.

In the present embodiment, the structure 5 includes a plurality of metal components. As long as the number of metal components is two or more, the number f metal components may be four or more, may be six or more, or may be eight or more.

The structure 5 includes at least one metal component 51. The one metal component 51 has at least two elastic sections 31, 32 of the four elastic sections 31, 32, 33, 34. In other words, the elastic sections 31, 32 are part of the one metal component 51.

The structure 5 includes at least one metal component 52. The one metal component 52 has at least two elastic sections 33, 34 of the four elastic sections 31, 32, 33, 34. In other words, the elastic sections 33, 34 are part of the one metal component 52.

A range in which a metallic bond of metal atoms included in the metal component is continuous is included in the one metal component. A metallic bond is discontinuous between two metal components only screwed to each other or only bonded by adhesive, so two metal components are separate metal components.

A metal material of the metal component 51 is an elemental metal or a mixture (alloy) of metals. The metal component 51 may be the one obtained by plating a base material made of a metal material. To ensure the rigidity of the structure 5, the metal component 51 can be hard and can be, for example, a metal material with a Vickers hardness of 90 HV or higher. Iron alloys (steels), such as carbon steels and alloy steels, aluminum alloys, titanium alloys, and the like may be used as the material of the metal component 51. In terms of a material cost, iron alloys are suitable.

The one metal component 51 can have a top surface section 1 and a bottom surface section 2 facing the top surface section 1. The at least two elastic sections 31, 32 (in this example, the four elastic sections 31 to 34) are provided such that the plane P is located between the top surface section 1 and the bottom surface section 2. In the following description, the words "top" and "bottom" just correspond to a positive side and a negative side in the z direction, and, for the posture of the sensor 10 during usage of the sensor 10, the z direction does not need to coincide with a vertical direction. The top surface section 1 may be referred to as front surface section, and the bottom surface section 2 may be referred to as back surface section. Each of the top surface section and the bottom surface section may be referred to as supporting section that supports elastic sections. In the top surface section 1, the section included in the metal component 51 of the sensor module 10A is a top surface section 1A. In the bottom surface section 2, the section included in the metal component 51 of the sensor module 10A is a bottom surface section 2A.

In the top surface section 1, the section included in the metal component 52 of the sensor module 10B is a top surface section 1B. In the bottom surface section 2, the section included in the metal component 52 of the sensor module 10B is a bottom surface section 2B.

The detector 8 includes one or a plurality of detecting units 81, 82. The detecting unit of the detector 8 can include a plurality of components 6, 7. An example of the component 6 included in the detecting unit 81 that is a component of the detector 8 is a component 61. An example of the component 7 included in the detecting unit 81 that is a component of the detector 8 is a component 71. An example of the component 6 included in the detecting unit 82 that is a component of the detector 8 is a component 62. An example of the component 7 included in the detecting unit 82 that is a component of the detector 8 is a component 72. With a deformation of the structure 5, a relative positional relationship between the component 6 and the component 7 changes, and the relative positional relationship between the component 6 and the component 7 can be detected by using the component 6 and the component 7. The detecting unit of the detector 8 is, for example, an encoder including a head and a scale. An example of the component 6 is a head. An example of the component 7 is a scale. The component 6 may be a scale. The component 7 may be a head. The detector 8 can include a component that processes a signal output from the component 6 or the component 7, in addition to the components 6, 7. The encoder of the detector 8 may be an optical encoder or may be a magnetic encoder. When an optical encoder is used as the detector 8, magnetic constraints on the metal component 51 are small. The head of the optical encoder has at least a light receiving portion and, where necessary, may have a light emitting portion that emits light to be applied to the scale. Here, the example in which the component 6 and the component 7 face each other in the z direction is described. Alternatively, the component 6 and the component 7 may face each other in any one of the x direction, the y direction, the r direction, and the θ direction. The encoder serving as the detector 8 may be a linear encoder or may be a rotary encoder. The output method may be of an incremental type or an absolute type. The encoder can adopt a configuration in which the component 6 and the component 7 relatively move in a direction orthogonal to a direction in which the component 6 and the component 7 face each other. The encoder may be arranged to, for example, detect a change in distance between the component 6 and the component 7 optically, magnetically, or electrostatically by the adoption of the configuration in which the component 6 and the component 7 relatively move in the direction in which the component 6 and the component 7 face each other. For example, the detecting unit of the detector 8 may be a capacitance displacement sensor. The detecting unit of the detector 8 may be a strain gauge. A displacement of the structure 5 may be detected by a strain gauge bonded to at least any one of the elastic sections of the elastic section group 3 of the structure 5.

A force intended to be detected with the detector 8 is referred to as detection target force, and a force in a direction different from a direction in which a force to be detected is applied is referred to as non-detection target force. When, for example, a force that is applied in the θ direction is intended to be detected with the detector 8, a force that is applied in the r direction and a force that is applied in the z direction are non-detection target forces. Non-detection target forces may be referred to as other-axis forces. Non-detection target forces are a disturbance factor in detecting a detection target force. A disturbance in detecting a detection target force due to other-axis forces is referred to as other-axis interference. It is beneficial to reduce the influence of other-axis interference and improve the detection accuracy of the sensor 10 for a detection target force.

The sensor 10 can be a force/torque sensor. Here, a force (detection target force) to be detected by the force/torque sensor is at least any one of a force in the x direction, a force in the y direction, a force in the z direction, a force around the x axis, a force around the y axis, and a force around the z axis. A force around the z axis in the above-described rθz cylindrical coordinate system is a force in the θ direction. When the sensor 10 detects f (f≤6) forces of the six forces, the sensor 10 can be referred to as f-axis force/torque sensor. When the sensor 10 exclusively detects at least any one of a force around the x axis, a force around the y axis, and a force around the z axis, the sensor 10 can be referred to as torque sensor. When the sensor 10 detects only a force around the z axis, the sensor 10 may be referred to as single-axis force/torque sensor or single-axis torque sensor.

When the detector 8 includes a plurality of detecting units, a mode in which the plurality of detecting units detects a force in the same direction can be adopted. By statistically processing the outputs from the plurality of detecting units, the influence of variations in characteristics among the detecting units is reduced, with the result that the detection accuracy of the sensor 10 is improved. Here, a statistical process is to extract a maximum value, a minimum value, a mean value, a total value, a median value, or the like from the outputs from the plurality of detecting units. An E/2-th or ((E/2)+1)-th largest value can be adopted as the median value in the case where the number of detecting units is E (E is an even number).

Figure 9B:
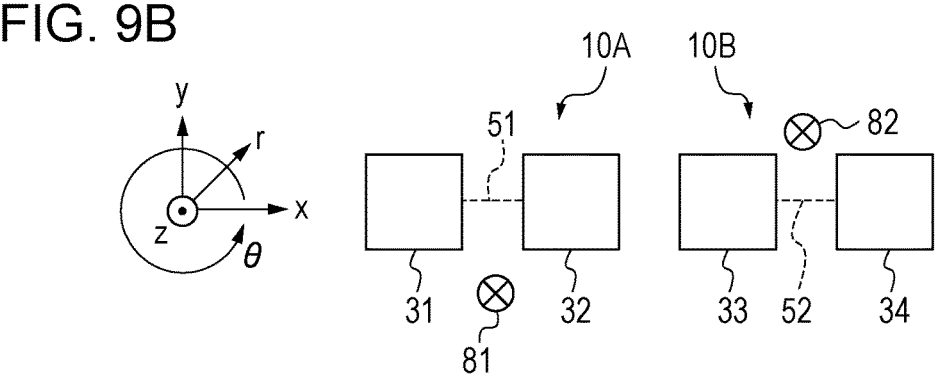

FIG. 9B shows the first layout example of four elastic sections 31 to 34 when the imaginary plane P is viewed in plan in the z direction. In the first layout example, the four elastic sections 31 to 34 are arranged in a one-dimensional array. In FIG. 9B, the dashed line connecting the elastic sections 31, 32 represents that the one metal component 51 has these elastic sections 31, 32. At least one detecting unit 81 is provided in the metal component 51. The module 10A that is a component of the sensor 10 includes the metal component 51 and the detecting unit 81. In FIG. 9B, the dashed line connecting the elastic sections 33, 34 represents that the one metal component 52 has these elastic sections 33, 34. At least one detecting unit 82 is provided in the metal component 52. The module 10B that is a component of the sensor 10 includes the metal component 52 and the detecting unit 82.

Figure 9C:
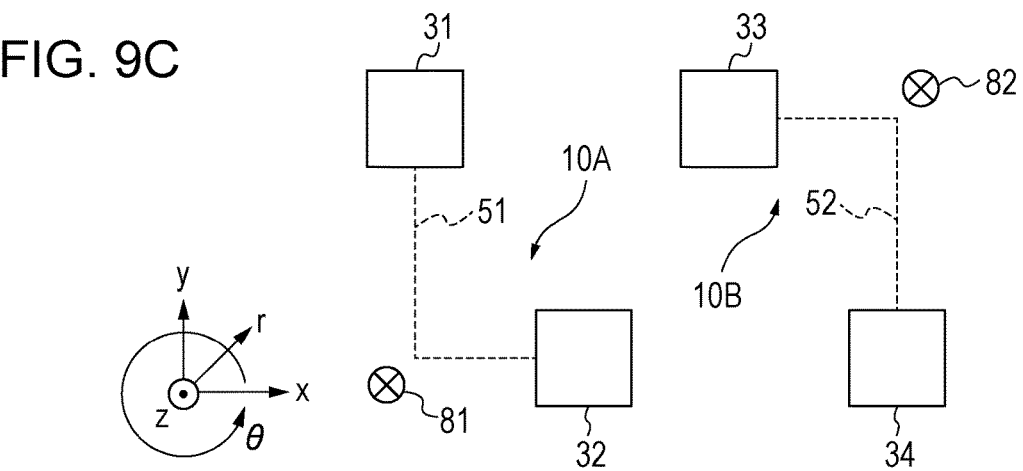

FIG. 9C shows the second layout example of four elastic sections 31, 32, 33, 34 when the imaginary plane P is viewed in plan in the z direction. In the second layout example, the four elastic sections 31, 32, 33, 34 are arranged in a two-dimensional array. In FIG. 9C, the dashed line connecting the elastic sections 31, 32 represents that one metal component 51 has the elastic sections 31, 32. In FIG. 9C, the dashed line connecting the elastic sections 33, 34 represents that one metal component 52 has the elastic sections 33, 34. Since no dashed line connects the elastic section 31 with the elastic section 33 or the elastic section 34 and no dashed line connects the elastic section 32 with the elastic section 33 or the elastic section 34, it represents that the metal component 51 and the metal component 52 are separate metal components. In other words, of the four elastic sections 31 to 34, the metal component 52 has the two elastic sections 33, 34 different from the two elastic sections 31, 32 of the metal component 51.

In the second layout example, at least one detecting unit 81 is provided in the metal component 51, and at least one detecting unit 82 is provided in the metal component 52.

Figure 10A:
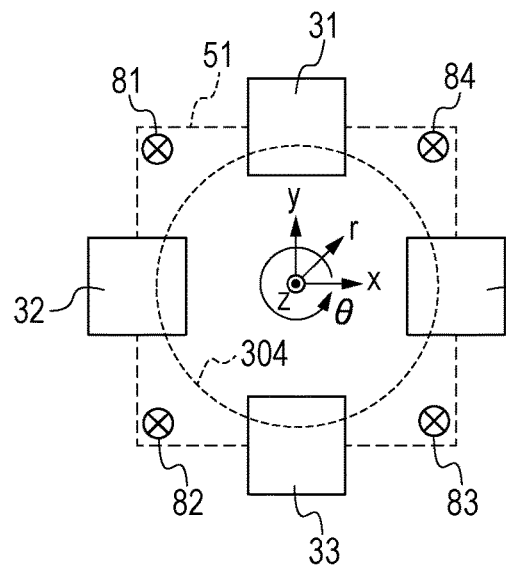
FIGS. 10A to 10D are schematic diagrams illustrating the sensor and the device.

FIG. 10A shows the third layout example of four elastic sections 31, 32, 33, 34 when the imaginary plane P is viewed in plan in the z direction. In the third layout example, the four elastic sections 31 to 34 are disposed in the plane P such that an imaginary circle 304 passes through the four elastic sections 31 to 34. Such a layout is beneficial to detect a deformation that occurs in the θ direction (circumferential direction) in the cylindrical coordinate system. Alternatively, such a layout is beneficial to detect a deformation that occurs in the x direction and the y direction in the orthogonal coordinate system. In the third layout example, one metal component 51 has the four elastic sections 31 to 34. In the third layout example, at least four detecting units 81, 82, 83, 84 are provided in the metal component 51. Two sensor units in which elastic sections are disposed as in the case of the metal component 51 of the third layout example can overlap in the z direction as in the case of FIG. 8B.

Figure 10B:
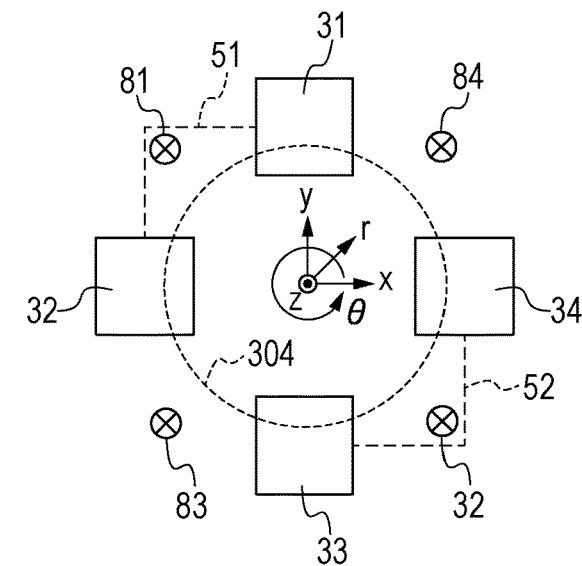

FIG. 10B shows the fourth layout example of four elastic sections 31, 32, 33, 34 when the imaginary plane P is viewed in plan in the z direction. The fourth layout example differs from the third layout example in that one metal component 51 has the elastic sections 31, 32 and one metal component 52 has the elastic sections 33, 34. In the fourth layout example, at least two detecting units 81, 82 are provided in the metal component 51, and at least two detecting units 83, 84 are provided in the metal component 52. The other configuration can be similar to that of the third layout example.

Figure 10C:
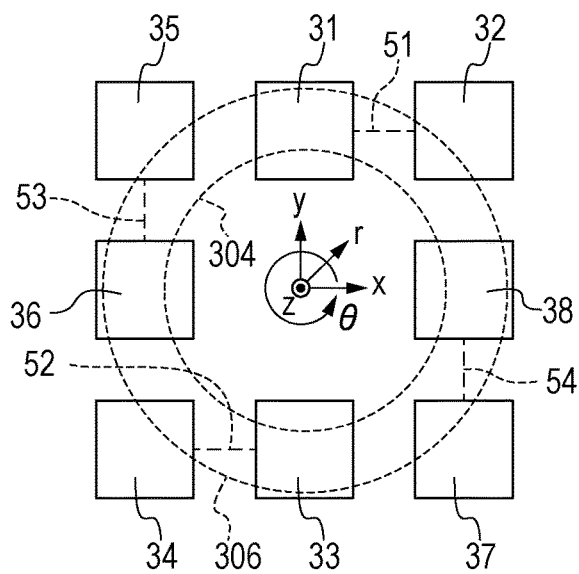

FIG. 10C shows the fifth layout example of at least six elastic sections when the imaginary plane P is viewed in plan in the z direction. In the fifth layout example, the at least six elastic sections include elastic sections 35, 36, 37, 38 in addition to the above-described four elastic sections 31 to 34 and include the eight elastic sections 31, 32, 33, 34, 35, 36, 37, 38 in total. In the fifth layout example, the plurality of metal components 51 to 54 includes the at least six elastic sections (for example, the elastic sections 31 to 36) of the eight elastic sections 31 to 38 and includes the eight elastic sections 31 to 38 of the eight elastic sections 31 to 38. In the fifth layout example, the six elastic sections (for example, the elastic sections 31 to 36) are disposed in the plane P such that an imaginary circle 306 passes through the at least six elastic sections (for example, the elastic sections 31 to 36). In this example, the imaginary circle 306 passes through the eight elastic sections 31 to 38. The one metal component 52 includes at least two elastic sections (for example, the elastic sections 31, 32) of the eight elastic sections 31 to 38. The one metal component 52 includes at least two elastic sections (for example, the elastic sections 33, 34) of the eight elastic sections 31 to 38. The one metal component 53 includes at least two elastic sections (for example, the elastic sections 35, 36) of the eight elastic sections 31 to 38. The one metal component 54 includes at least two elastic sections (for example, the elastic sections 37, 38) of the eight elastic sections 31 to 38.

Figure 10D:
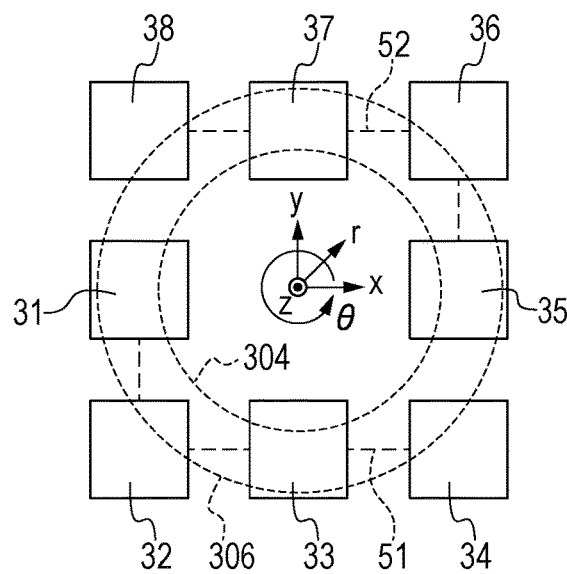

FIG. 10D shows the sixth layout example of at least six elastic sections when the imaginary plane P is viewed in plan in the z direction. In the sixth layout example, one metal component 51 includes the four elastic sections 31 to 34 of the eight elastic sections 31 to 38, and another metal component 52 includes the four elastic sections 35 to 38 of the eight elastic sections 31 to 38.

In FIGS. 10A to 10D, each of the elastic sections included in the elastic section group 3 deforms, for example, in the θ direction, and each of the detecting units 81 to 84 included in the detector 8 can detect a force in the θ direction as a torque. Alternatively, each of the elastic sections included in the elastic section group 3 deforms in the x direction or in the y direction to make it possible to detect a force in the x direction or in the y direction.

As described above, in the sensor 10 according to the present embodiment, the one metal component 51 has the at least two elastic sections 31, 32 of the four elastic sections 31 to 34.

The sensor 10 can be mounted on various machine devices. Various machine devices each can include a prime mover (electric motor), such as a motor and an engine, and the sensor 10. A prime mover relatively moves a first link and a second link. Various machine devices include video devices, such as cameras, optical devices, such as lenses, business devices, such as printers and copying machines, medical devices, such as CTs and MRIs, industrial devices, such as robots and exposure machines, and transportation devices, such as vehicles, ships, and airplanes. Vehicles can include automobiles, bicycles, and railroad vehicles. Various machine devices may be medical devices or nursing-care devices, such as powered suits and artificial limbs. When the sensor 10 that measures the amount of mechanical energy is mounted on these machine devices and then a force that occurs in a movable portion and near the movable portion, the operations of the machine devices can be controlled.

The matters described in the first and second embodiments are also applicable to the third embodiment. For example, the matter described with reference to FIG. 7 is applicable to FIGS. 8A to 9C.

Fourth Embodiment

A mode beneficial to ensure sensor accuracy by using a structure formed by bending a metal member will be described. The present embodiment is applicable to the first to third embodiments.

Figure 11A:
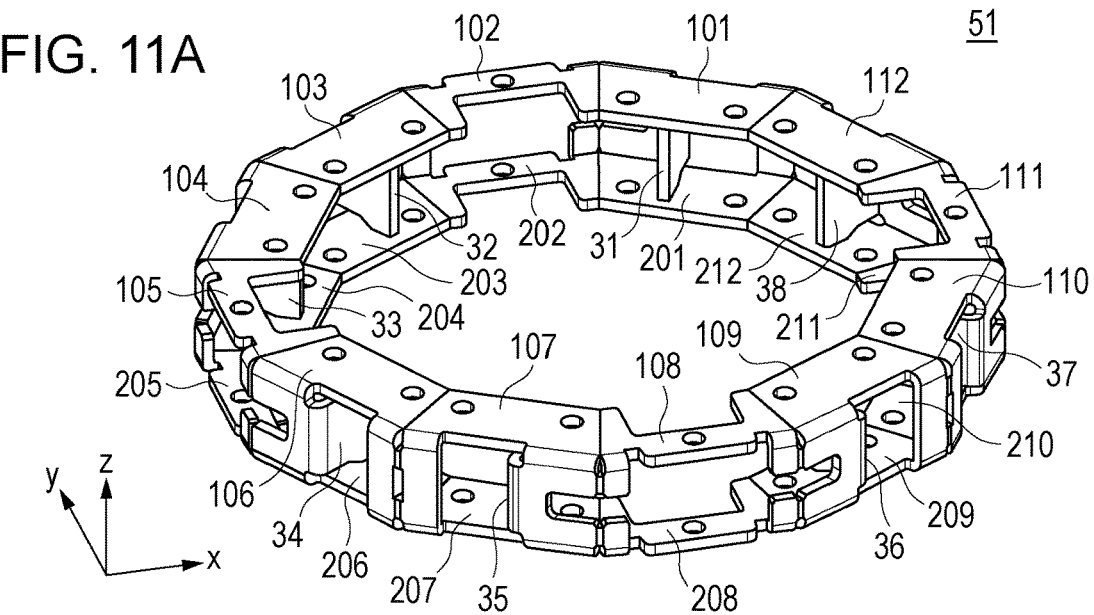
FIGS. 11A to 11C are schematic diagrams illustrating a sensor.
Figure 11B:
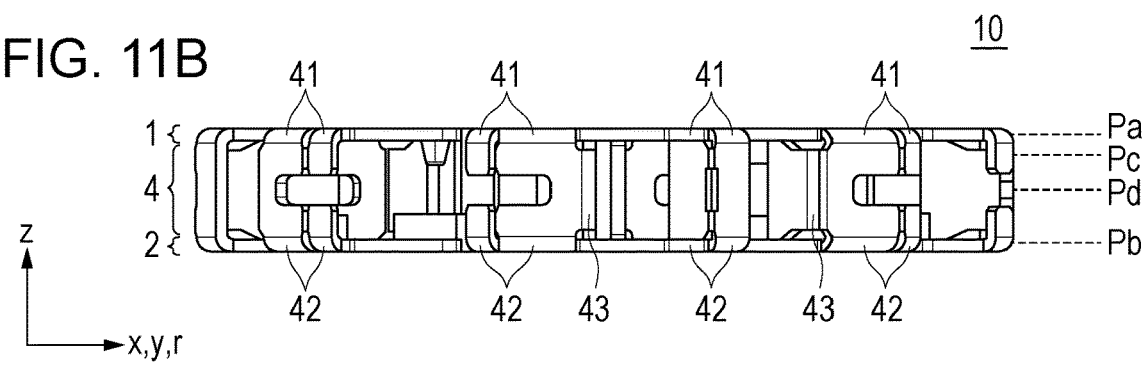
Figure 11C:
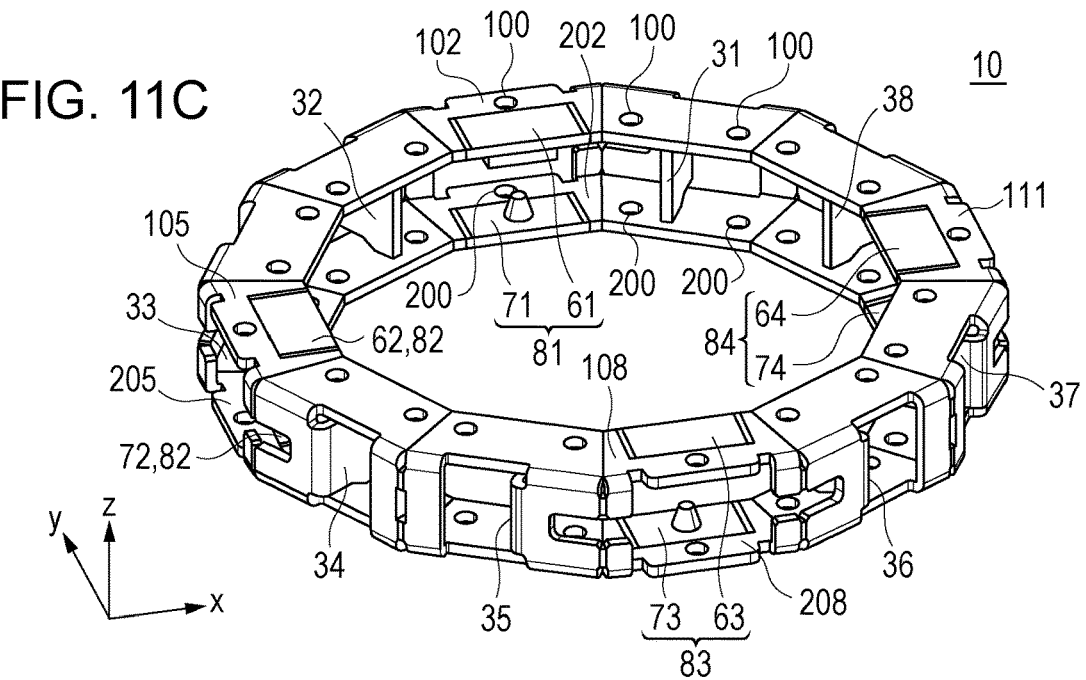
Figure 12A:
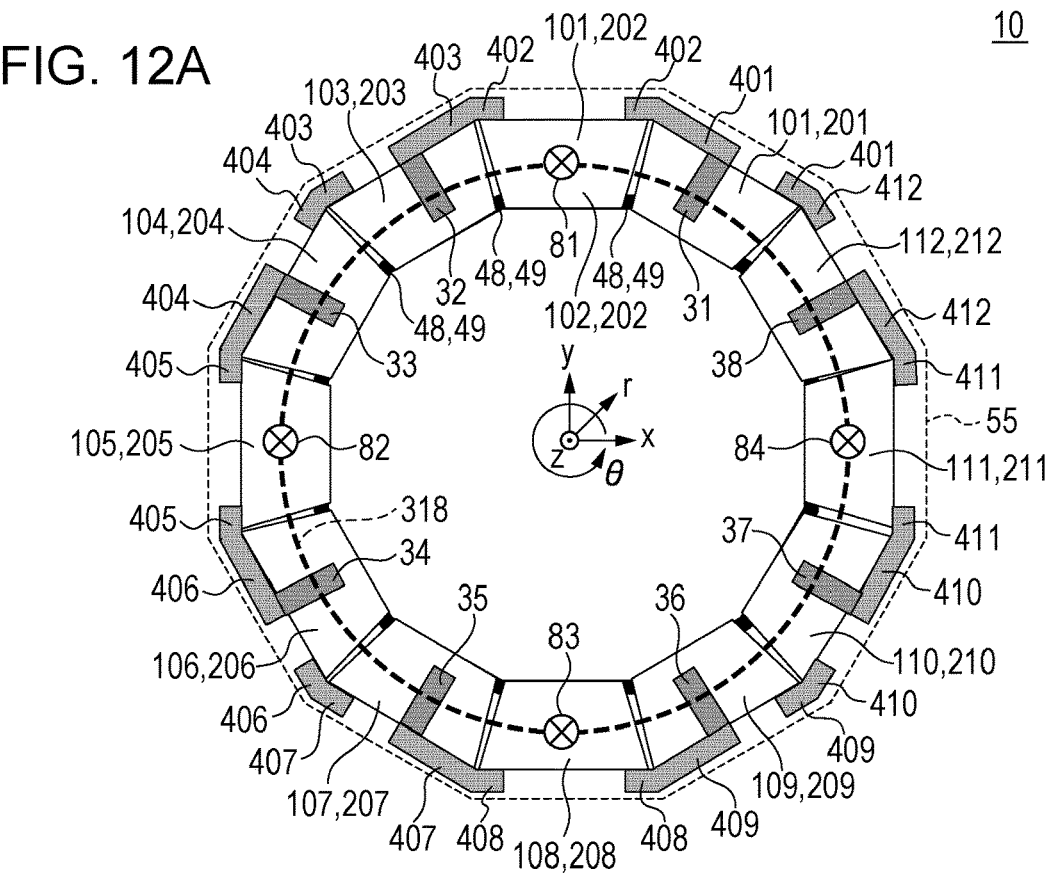
FIGS. 12A and 12B are schematic diagrams illustrating the sensor.
Figure 12B:
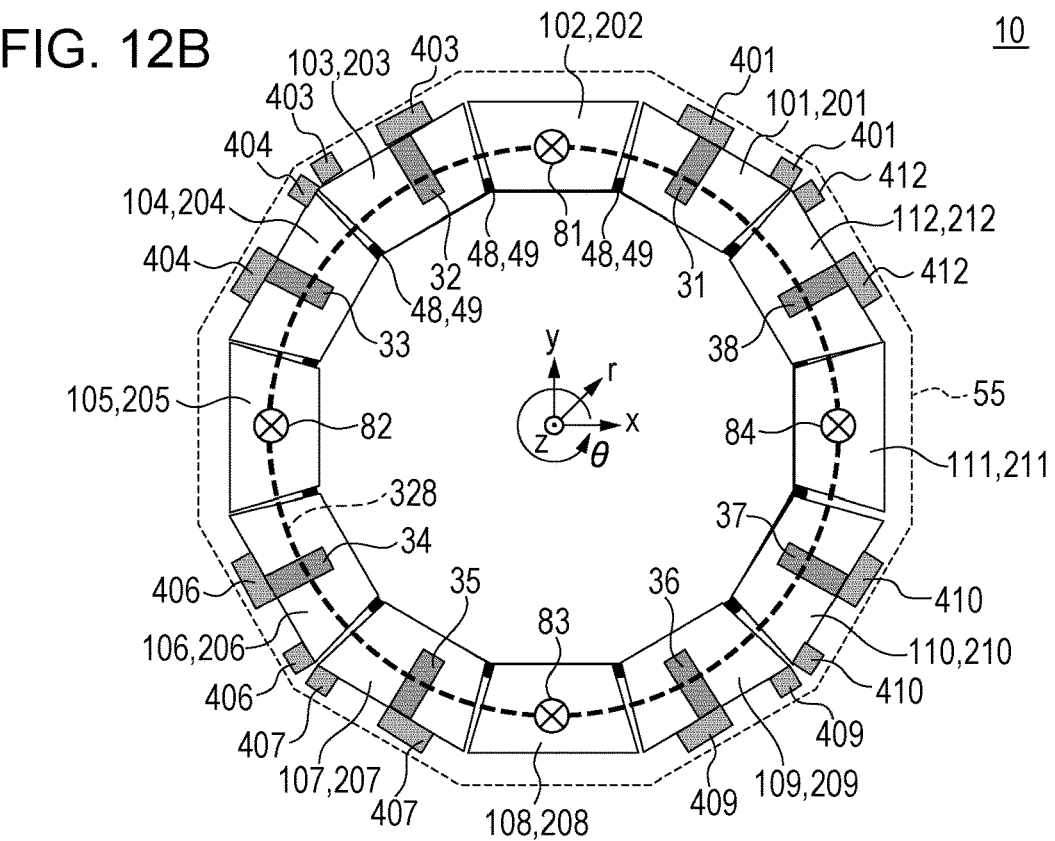

FIG. 11A is a perspective view of an example of one metal component 51 formed by bending a metal member. FIG. 11B is a side view of the example of the one metal component 51 formed by bending a metal member. FIG. 11B shows imaginary planes Pa, Pb, Pc, Pd parallel to one another. FIG. 11C is a perspective view of one example of a sensor 10 including the metal component 51 and a detector 8 (detecting units 81 to 84). FIG. 12A is a sectional view of the metal component 51, taken along the plane Pc, and shows the structure of the metal component 51 in the plane Pc. FIG. 12B is a sectional view of the metal component 51, taken along the plane Pd, and shows the structure of the metal component 51 in the plane Pd. When the present embodiment is applied to the third embodiment, the sensor 10 can be formed by placing a sensor module 10A including the metal component 51 shown in FIG. 11A and a sensor module 10B including a metal component 52 similar to the metal component 51 in the z direction as in the case of FIG. 8B.

The metal component 51 has a substantially regular M-gon outline 55 (see FIGS. 12A and 12B) in plan view to the planes Pa, Pb, Pc, Pd and has a substantially regular dodecagon (that is, M=12) outline 55 in this example. M can be greater than or equal to three, M may be four, M is preferably greater than or equal to five, and M is preferably less than or equal to 24. As M increases, the outline 55 of the metal component 51 approaches a circular shape, so the accuracy of detecting a displacement in the θ direction improves. However, as M increases, bending (described later) becomes more complicated, so $5 \leq M \leq 24$ is appropriate. M is preferably a multiple of 2 (even number) from the viewpoint of symmetry. Furthermore, from the viewpoint of symmetry in the x direction and in the y direction orthogonal to the x direction, M is more preferably a multiple of 4. To provide a shape close to a circular shape, M is preferably greater than or equal to six where the ratio of the circumference of a circle to its diameter is about three. When the above conditions are considered, M=8, 12, 16 is preferable. In the following description, a natural number M can be read as a positive real number m ($M-0.5 \leq m < M+0.5$) that is rounded off to M.

As shown in FIG. 11B, the metal component 51 has a top surface section 1 and a bottom surface section 2 facing the top surface section 1. The top surface section 1 is provided in the plane Pa. The bottom surface section 2 is provided in the plane Pb. The metal component 51 has eight elastic sections 31 to 38. As shown in FIG. 12A, the eight elastic sections 31 to 38 are discretely disposed in the plane Pc. As shown in FIG. 12B, the eight elastic sections 31 to 38 are discretely disposed in the plane Pd. The eight elastic sections 31 to 38 disposed in the planes Pc, Pd are provided such that the planes Pc, Pd are located between the top surface section 1 and the bottom surface section 2.

As shown in FIG. 11B, the metal component 51 has a side surface section 4. The side surface section 4 connects with the top surface section 1 and the bottom surface section 2. The metal component 51 is bent by bending at connections 41 between the top surface section 1 and the side surface section 4. The metal component 51 is bent by bending at connections 42 between the bottom surface section 2 and the side surface section 4. Each of the elastic sections 31 to 38 connects with the side surface section 4, and the metal component 51 is bent by bending at a connection 43 between the side surface section 4 and each of the elastic sections 31 to 38.

The top surface section 1 shown in FIG. 11B is made up of a plurality of top plate portions 101, 102, 103, 104, 105, 106, 107, 108, 109, 110, 111, 112 arranged along the plane Pa as shown in FIG. 11A. The plurality of top plate portions 101 to 112 is disposed in the plane Pa. FIGS. 12A and 12B show the positional relationship between the plurality of top plate portions 101 to 112 and the plurality of elastic sections 31 to 38 by superposing the plurality of top plate portions 101 to 112, disposed in the plane Pa, over the elastic sections 31 to 38.

As shown in FIGS. 12A and 12B, of the plurality of top plate portions 101 to 112, two top plate portions adjacent to each other are joined with each other by a joint 48. The joint 48 may be, for example, a welding portion welding two top plate portions adjacent to each other or may be a bonding portion bonding two top plate portions adjacent to each other. For example, the top plate portion 101 and the top plate portion 102 of the plurality of top plate portions 101 to 112 are joined with each other by the joint 48 formed by welding. The top plate portion 102 and the top plate portion 103 of the plurality of top plate portions 101 to 112 are joined with each other by the joint 48 formed by welding. The top plate portion 103 and the top plate portion 104 of the plurality of top plate portions 101 to 112 are joined with each other by the joint 48 formed by welding.

The bottom surface section 2 shown in FIG. 11B is made up of a plurality of bottom plate portions 201, 202, 203, 204, 205, 206, 207, 208, 209, 210, 211, 212 arranged along the plane Pb as shown in FIG. 11A. The plurality of bottom plate portions 201 to 212 is disposed in the plane Pb. FIGS. 12A and 12B show the positional relationship between the plurality of bottom plate portions 201 to 212 and the plurality of elastic sections 31 to 38 by superposing the plurality of bottom plate portions 201 to 212, disposed in the plane Pb, over the elastic sections 31 to 38.

As shown in FIGS. 12A and 12B, of the plurality of bottom plate portions 201 to 212, two bottom plate portions adjacent to each other are joined with each other by a joint 49. The joint 49 may be, for example, a welding portion welding two bottom plate portions adjacent to each other or may be a bonding portion bonding two bottom plate portions adjacent to each other. For example, the bottom plate portion 201 and the bottom plate portion 202 of the plurality of bottom plate portions 201 to 212 are joined with each other by the joint 49 formed by welding. The bottom plate portion 202 and the bottom plate portion 203 of the plurality of bottom plate portions 201 to 212 are joined with each other by the joint 49 formed by welding. The bottom plate portion 203 and the bottom plate portion 204 of the plurality of bottom plate portions 201 to 212 are joined with each other by the joint 49 formed by welding.

The metal component 51 according to the present embodiment has a structure in which the mode of the metal component 51 shown in FIG. 7 is repeatedly disposed in an annular shape. In the mode shown in FIG. 11A, the elastic sections 31, 32 correspond to the elastic sections 31, 32 in FIG. 7, and the elastic sections 33 to 38 also correspond to the elastic sections 31, 32 in FIG. 7. For example, the elastic sections 31, 33, 35, 37 in the mode shown in FIG. 11A correspond to the elastic section 31 in FIG. 7, and the elastic sections 32, 34, 36, 38 in the mode shown in FIG. 11A correspond to the elastic section 32 in FIG. 7.

In the mode shown in FIG. 11A, the top plate portion 101 can correspond to the metal portion 11 in FIG. 7, the top plate portion 103 can correspond to the metal portion 12 in FIG. 7, and the top plate portion 102 can correspond to the metal portion 13 in FIG. 7. In the mode shown in FIG. 11A, the bottom plate portion 201 can correspond to the metal portion 21 in FIG. 7, the bottom plate portion 203 can correspond to the metal portion 22 in FIG. 7, and the bottom plate portion 202 can correspond to the metal portion 23 in FIG. 7. Similarly, the top plate portion 104 can correspond to the metal portion 11 in FIG. 7, the top plate portion 106 can correspond to the metal portion 12 in FIG. 7, and the top plate portion 105 can correspond to the metal portion 13 in FIG. 7. In the mode shown in FIG. 11A, the bottom plate portion 204 can correspond to the metal portion 21 in FIG. 7, the bottom plate portion 206 can correspond to the metal portion 22 in FIG. 7, and the bottom plate portion 205 can correspond to the metal portion 23 in FIG. 7. Similarly, the top plate portion 107 can correspond to the metal portion 11 in FIG. 7, the top plate portion 109 can correspond to the metal portion 12 in FIG. 7, and the top plate portion 108 can correspond to the metal portion 13 in FIG. 7. In the mode shown in FIG. 11A, the bottom plate portion 207 can correspond to the metal portion 21 in FIG. 7, the bottom plate portion 209 can correspond to the metal portion 22 in FIG. 7, and the bottom plate portion 208 can correspond to the metal portion 23 in FIG. 7. Similarly, the top plate portion 110 can correspond to the metal portion 11 in FIG. 7, the top plate portion 112 can correspond to the metal portion 12 in FIG. 7, and the top plate portion 111 can correspond to the metal portion 13 in FIG. 7. In the mode shown in FIG. 11A, the bottom plate portion 210 can correspond to the metal portion 21 in FIG. 7, the bottom plate portion 212 can correspond to the metal portion 22 in FIG. 7, and the bottom plate portion 211 can correspond to the metal portion 23 in FIG. 7.

As shown in FIGS. 12A and 12B, the side surface section 4 shown in FIG. 11B is made up of a plurality of side plate portions 401, 402, 403, 404, 405, 406, 407, 408, 409, 410, 411, 412 arranged along the planes Pc, Pd. The plurality of side plate portions 401 to 412 is disposed in the planes Pc, Pd.

Of the plurality of side plate portions 401 to 412, two side plate portions adjacent to each other are connected with each other by a connection 44 (the reference sign is omitted in the drawing). The number of the connections 44 can be M or M−1 (for example, M=12). For example, the metal component 51 is bent by bending at the connection 44 between the side plate portion 401 and the side plate portion 402 of the plurality of side plate portions 401 to 412. The metal component 51 is bent by bending at the connection 44 between the side plate portion 402 and the side plate portion 403 of the plurality of side plate portions 401 to 412. The metal component 51 is bent by bending at the connection 44 between the side plate portion 403 and the side plate portion 404 of the plurality of side plate portions 401 to 412. The metal component 51 is bent by bending at the connection 44 between the side plate portion 411 and the side plate portion 412 of the plurality of side plate portions 401 to 412. The side plate portion 412 and the side plate portion 401 of the plurality of side plate portions 401 to 412 may be joined with each other by welding or the like at a joint between the side plate portion 412 and the side plate portion 401, or the side plate portion 412 and the side plate portion 401 may be separated.

Each of the plurality of top plate portions 101 to 112 and one of the plurality of side plate portions 401 to 412 adjacent to an associated one of the plurality of top plate portions 101 to 112 are connected by the connection 41 (see FIG. 11B). For example, the metal component 51 is bent by bending at the connection 41 between the side plate portion 401 and the top plate portion 101 of the plurality of top plate portions 101 to 112. The metal component 51 is bent by bending at the connection 41 between the side plate portion 402 and the top plate portion 102 of the plurality of top plate portions

101 to 112. The metal component 51 is bent by bending at the connection 41 between the side plate portion 403 and the top plate portion 103 of the plurality of top plate portions 101 to 112. The metal component 51 is bent by bending at the connection 41 between the side plate portion 404 and the top plate portion 104 of the plurality of top plate portions 101 to 112.

Each of the plurality of bottom plate portions 201 to 212 and one of the plurality of side plate portions 401 to 412 adjacent to an associated one of the plurality of bottom plate portions 201 to 212 are connected by the connection 42 (see FIG. 11B). For example, the metal component 51 is bent by bending at the connection 42 between the side plate portion 401 and the bottom plate portion 201 of the plurality of bottom plate portions 201 to 212. The metal component 51 is bent by bending at the connection 42 between the side plate portion 402 and the bottom plate portion 202 of the plurality of bottom plate portions 201 to 212.

The metal component 51 is bent by bending at the connection 42 between the side plate portion 403 and the bottom plate portion 203 of the plurality of bottom plate portions 201 to 212. The metal component 51 is bent by bending at the connection 42 between the side plate portion 404 and the bottom plate portion 204 of the plurality of bottom plate portions 201 to 212.

As described above, in the metal component 51, two portions connected to each other via any one of the connections 41, 42, 43, 44 are bent at the connection therebetween. An angle formed between two portions is defined by an inferior angle of 0° to 180° or a superior angle of 180° to 360°. A bending angle between two portions is defined by an angle obtained by subtracting an inferior angle from 180°.

An inferior angle formed by two side plate portions connected to each other substantially coincides with the interior angle of a regular M-gon and is about (180−(360/M)°). The inferior angle is an obtuse angle when M≥5, the inferior angle is 1080 when M=5, and the inferior angle is 1500 when M=12. When M is replaced with m (M−0.5≤m<M+0.5) where M=12, an inferior angle formed between two side plate portions connected to each other ranges from 148.7° to 151.2°. An inferior angle formed between each of the top plate portions 101 to 112 and an associated one of the side plate portions 401 to 412, connected to each other, and an inferior angle formed between each of the bottom plate portions 201 to 212 and an associated one of the side plate portions 401 to 412, connected to each other, are typically right angle (90°) and may range from 800 to 100°.

Therefore, where M≥5, an inferior angle formed between two side plate portions connected to each other is larger than an inferior angle formed between each of the top plate portions 101 to 112 and an associated one of the side plate portions 401 to 412, connected to each other, and is larger than an inferior angle formed between each of the bottom plate portions 201 to 212 and an associated one of the side plate portions 401 to 412, connected to each other. For example, an inferior angle formed between the side plate portion 401 and the side plate portion 402 is larger than an inferior angle formed between the top plate portion 101 and the side plate portion 401 and is larger than an inferior angle formed between the top plate portion 102 and the side plate portion 402. An inferior angle formed between the side plate portion 401 and the side plate portion 402 is larger than an angle formed between the bottom plate portion 201 and the side plate portion 401 and is larger than an angle formed between the bottom plate portion 202 and the side plate portion 402. An inferior angle formed between the side plate portion 402 and the side plate portion 403 is larger than an inferior angle formed between the top plate portion 102 and the side plate portion 402 and is larger than an inferior angle formed between the top plate portion 103 and the side plate portion 403. An inferior angle formed between the side plate portion 402 and the side plate portion 403 is larger than an angle formed between the bottom plate portion 202 and the side plate portion 402 and is larger than an angle formed between the bottom plate portion 203 and the side plate portion 403.

As shown in FIG. 12A, the eight elastic sections 31 to 38 are disposed in the plane Pc such that an imaginary circle 318 passes through the eight elastic sections 31 to 38. As shown in FIG. 12B, the eight elastic sections 31 to 38 are disposed in the plane Pd such that an imaginary circle 328 passes through the eight elastic sections 31 to 38.

Figure 13A:
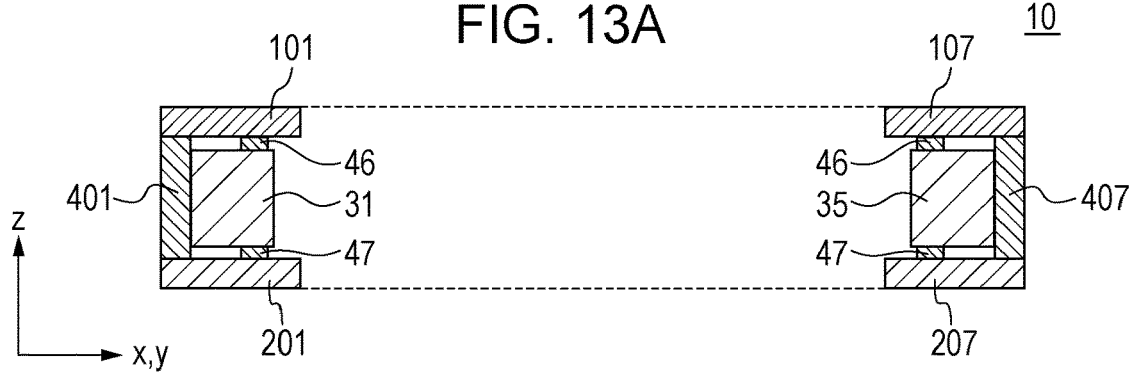
FIGS. 13A to 13D are schematic diagrams illustrating the sensor.

FIG. 13A is a sectional view, including the elastic sections 31, 35, of the sensor 10 shown in FIGS. 11A to 12B.

The elastic section 31 is provided under the top plate portion 101 such that the elastic section 31 overlaps the top plate portion 101 in the z direction. The elastic section 31 is provided over the bottom plate portion 201 such that the elastic section 31 overlaps the bottom plate portion 201 in the z direction. The elastic section 31 is provided between the top plate portion 101 and the bottom plate portion 201, facing each other.

The elastic section 35 is provided under the top plate portion 107 such that the elastic section 35 overlaps the top plate portion 107 in the z direction. The elastic section 35 is provided over the bottom plate portion 207 such that the elastic section 35 overlaps the bottom plate portion 207 in the z direction. The elastic section 35 is provided between the top plate portion 107 and the bottom plate portion 207, facing each other.

In FIGS. 11A to 12B as well, the elastic section 32 is provided under the top plate portion 103 such that the elastic section 32 overlaps the top plate portion 103 in the z direction. The elastic section 32 is provided over the bottom plate portion 203 such that the elastic section 32 overlaps the bottom plate portion 203 in the z direction. The elastic section 32 is provided between the top plate portion 103 and the bottom plate portion 203, facing each other.

In FIGS. 11A to 12B as well, the elastic section 33 is provided under the top plate portion 104 such that the elastic section 33 overlaps the top plate portion 104 in the z direction. The elastic section 33 is provided over the bottom plate portion 204 such that the elastic section 33 overlaps the bottom plate portion 204 in the z direction. The elastic section 33 is provided between the top plate portion 104 and the bottom plate portion 204, facing each other.

Similarly, each of the elastic sections 34 to 38 overlaps an associated one of the top plate portions 106, 107, 109, 110, 112 and overlaps an associated one of the bottom plate portions 206, 207, 209, 210, 212.

As shown in FIG. 13A, each of the elastic sections 31 to 38 is joined with the top surface section 1 by a joint 46. The joint 46 may be, for example, a welding portion welding the top surface section 1 with each of the elastic sections 31 to 38, adjacent to each other, or may be a bonding portion bonding the top surface section 1 to each of the elastic sections 31 to 38, adjacent to each other. For example, the elastic section 31 and the top plate portion 101 that overlap each other are joined with each other by the joint 46 formed by welding. The elastic section 35 and the top plate portion 107 that overlap each other are joined with each other by the joint 46 formed by welding. Similarly, each of the elastic sections 32 to 34, 36 to 38 and an associated one of the top plate portions 103, 104, 106, 109, 110, 112, which overlaps the elastic section, are joined with each other by the joint 46.

As shown in FIG. 13A, each of the elastic sections 31 to 38 is joined with the bottom surface section 2 by a joint 47. The joint 47 may be, for example, a welding portion welding the bottom surface section 2 with each of the elastic sections 31 to 38, adjacent to each other, or may be a bonding portion bonding the bottom surface section 2 to each of the elastic sections 31 to 38, adjacent to each other. For example, the elastic section 31 and the bottom plate portion 201 that overlap each other are joined with each other by the joint 47 formed by welding. The elastic section 35 and the bottom plate portion 207 that overlap each other are joined with each other by the joint 47 formed by welding. Similarly, each of the elastic sections 32 to 34, 36 to 38 and an associated one of the bottom plate portions 203, 204, 206, 209, 210, 212, which overlaps the elastic section, are joined with each other by the joint 47.

Figure 13B:
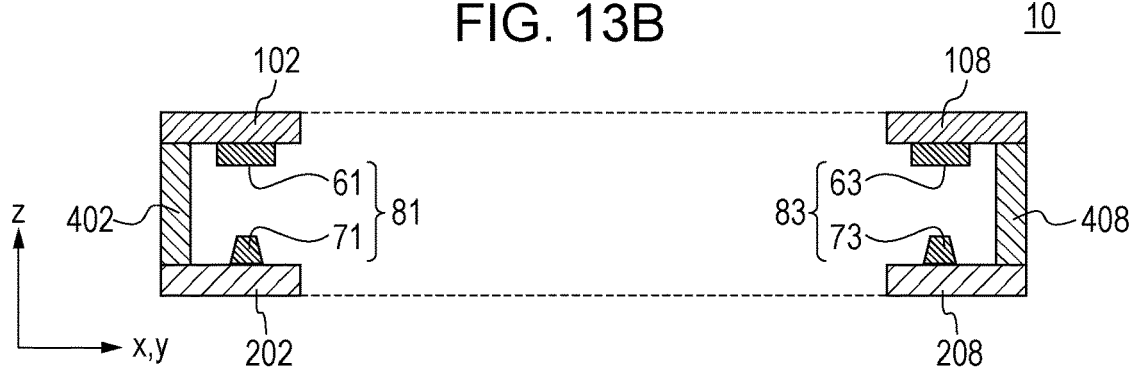

FIG. 13B is a sectional view, including the detecting units 81, 83, of the sensor 10 shown in FIGS. 11B, 12A, and 12B. As shown in FIGS. 11C and 13B, the component 61 of the detecting unit 81 is fixed to the top plate portion 102, and the component 71 of the detecting unit 81 is fixed to the bottom plate portion 202. The component 62 of the detecting unit 82 is fixed to the top plate portion 105, and the component 72 of the detecting unit 82 is fixed to the bottom plate portion 205. The component 63 of the detecting unit 83 is fixed to the top plate portion 108, and the component 73 of the detecting unit 83 is fixed to the bottom plate portion 208. The component 64 of the detecting unit 84 is fixed to the top plate portion 111, and the component 74 of the detecting unit 84 is fixed to the bottom plate portion 211. Each of the components 61 to 64 is fixed to the structure 5 (for example, the top surface section 1) by, for example, adhesive. Each of the components 71 to 74 is also fixed to the structure 5 (for example, the bottom surface section 2) by, for example, adhesive.

As is apparent from FIGS. 11A to 11C, 12A, 12B, 13A, and 13B, the side surface section 4 makes up the outer side surface of the metal component 51. Therefore, as shown in FIG. 13A, for example, the elastic section 31 and the elastic section 35 can be located between the side plate portion 401 and the side plate portion 407. The distance between the elastic section 31 and the elastic section 35 is shorter than the distance between the side plate portion 401 and the side plate portion 407. As shown in FIG. 13B, for example, the detecting unit 81 and the detecting unit 83 can be located between the side plate portion 402 and the side plate portion 408.

Figure 13C:
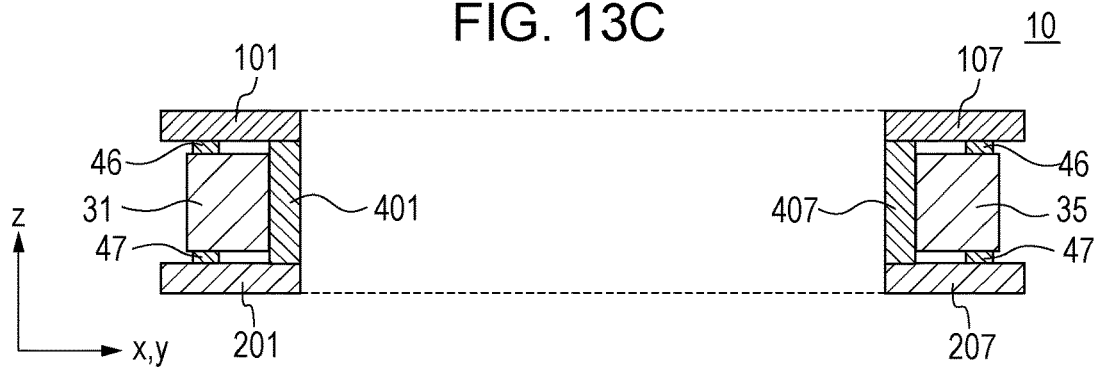
Figure 13D:
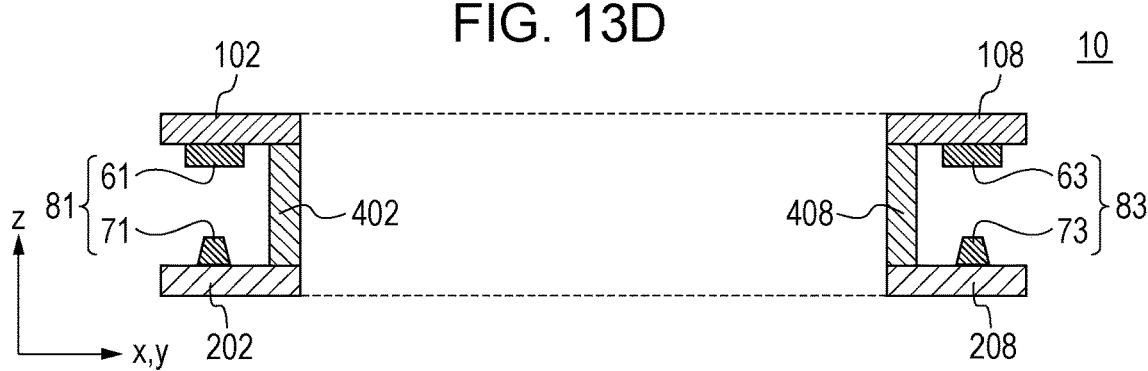

In another mode, the side surface section 4 may make up the inner side surface of the metal component 51. Therefore, as shown in FIG. 13C, for example, the side plate portion 401 and the side plate portion 407 can be located between the elastic section 31 and the elastic section 35. The distance between the elastic section 31 and the elastic section 35 may be longer than the distance between the side plate portion 401 and the side plate portion 407. As shown in FIG. 13D, for example, the side plate portion 402 and the side plate portion 408 can be located between the detecting unit 81 and the detecting unit 83.

Here, the mode in which the component 6 is fixed to the top surface section 1, the component 7 is fixed to the bottom surface section 2, and the component 6 and the component 7 face each other in the z direction has been described. However, the component 6 and the component 7 just need to be relatively displaced as a result of a deformation of the structure 5, and, for example, the component 6 and the component 7 may face each other in the r direction. In this case, for example, an inner side surface section and an outer side surface section may be provided, one of the component 6 and the component 7 may be fixed to the inner side surface section, and the other one of the component 6 and the component 7 may be fixed to the outer side surface section. Alternatively, the component 6 and the component 7 may face each other in the θ direction. Alternatively, the components 6, 7 may be fixed to a component (for example, a reinforcement component (described later)) of the structure 5, different from a metal component having the elastic section group 3. Alternatively, one of the components 6, 7 may be fixed to a component (for example, a link (described later)) outside the sensor 10, and the other one of the components 6, 7 may be fixed to the sensor 10.

In the above-described mode, the description has been made on the assumption that the detection target force is a force in the θ direction (circumferential direction), so the top surface section 1, the bottom surface section 2, and the side surface section 4, which are portions of the structure 5, other than the elastic sections 31 to 38 of the structure 5, can function as rigid sections. However, when, for example, a force in the x direction, the y direction, or the r direction is set for a detection target force, the side surface section 4 can function as an elastic section, and portions described as the elastic sections 31 to 38 can function as rigid sections. When a force in the z direction is set for a detection target force, portions described as the elastic sections 31 to 38 and the side surface section 4 can function as elastic sections.

As shown in FIG. 11C, the top surface section 1 (top plate portions 101 to 112) has holes 100. The bottom surface section 2 (bottom plate portions 201 to 212) has holes 200. The holes 100, 200 are used to couple a metal component, another component (for example, a link or a reinforcement component (described later)), and the sensor 10 with one another. For example, a threaded groove is formed on the inner surface of each of the holes 100, 200, screws extending through another component are screwed to the holes 100, 200, and the another component is fastened to the metal component 51. Alternatively, bolts extending through another component extend through the holes 100, 200 and screwed to nuts separately provided, and the another component is fastened to the metal component 51 by bolts and nuts.

Figure 19A:
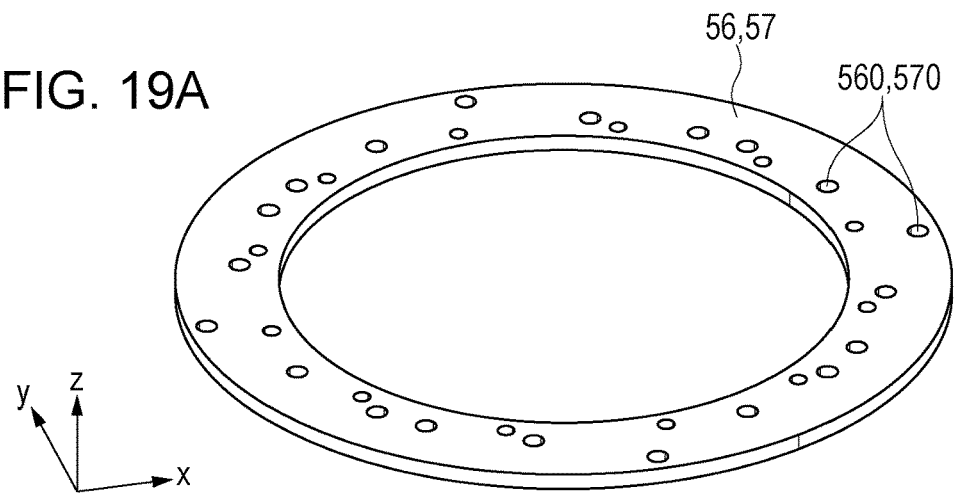
FIGS. 19A to 19C are schematic diagrams illustrating the sensor.
Figure 19B:
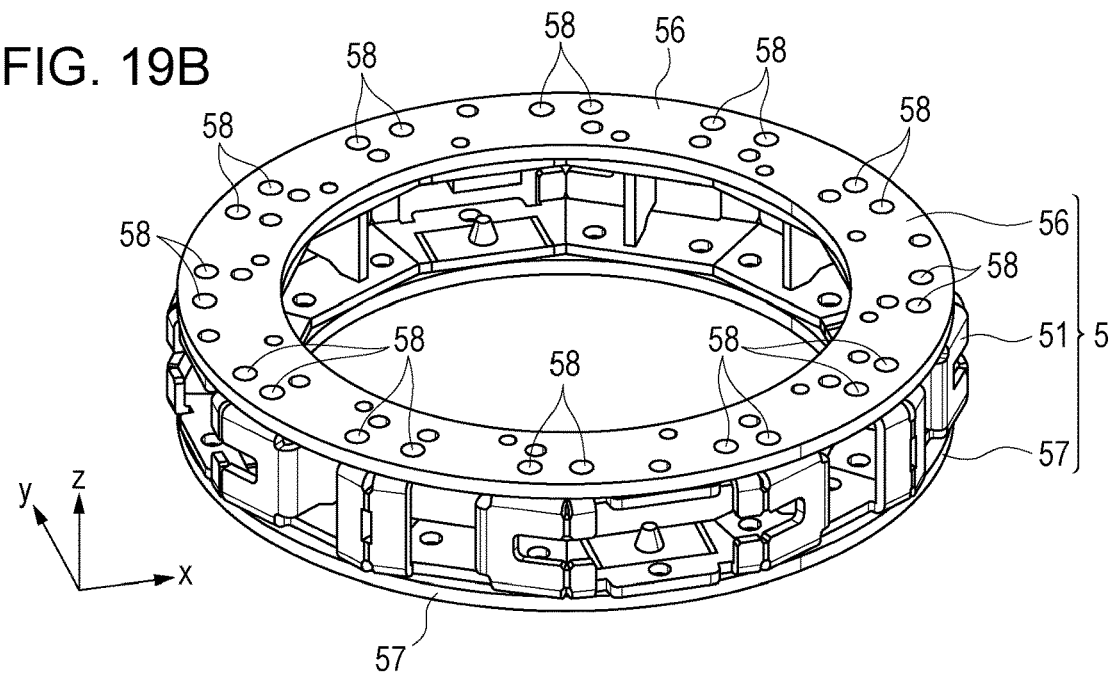

The structure 5 of the sensor 10 shown in FIG. 19B can include a reinforcement component 56 shown in FIG. 19A in addition to the metal component 51. The reinforcement component 56 overlaps a plurality of elastic sections of at least four elastic sections included in the elastic section group 3. The reinforcement component 56 is coupled to the metal component 51, and the reinforcement component 56 can be typically coupled to the top surface section 1 of the metal component 51. The structure 5 of the sensor 10 can include a reinforcement component 57 shown in FIG. 19A in addition to the metal component 51. The reinforcement component 57 overlaps a plurality of elastic sections of at least four elastic sections included in the elastic section group 3. The reinforcement component 57 is coupled to the metal component 51, and the reinforcement component 57 can be typically coupled to the bottom surface section 2 of the metal component 51. In this example, the reinforcement components 56, 57 have substantially the same shape as shown in FIG. 19A.

Figure 19C:
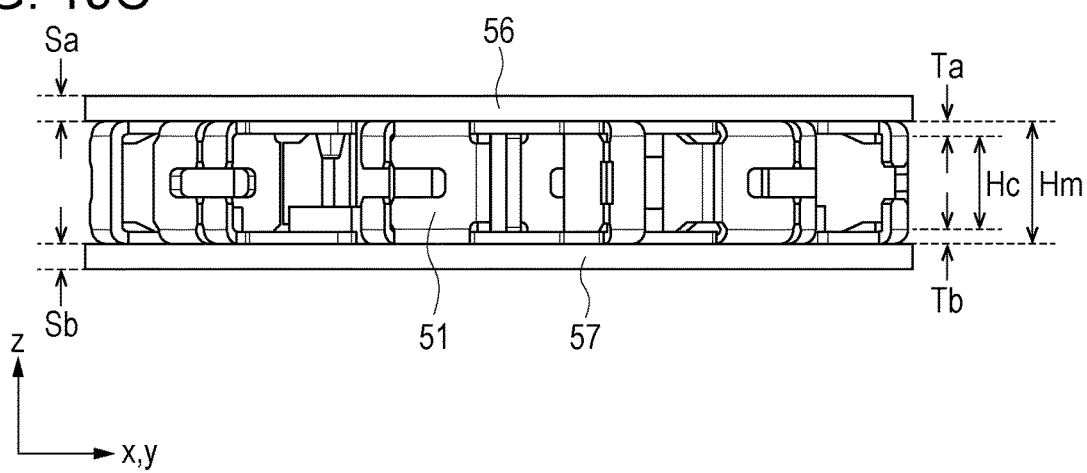

The metal component 51 is disposed between the reinforcement component 56 and the reinforcement component 57 and is coupled to the reinforcement component 56 and the reinforcement component 57. The plane shape of the metal component 51 is substantially an annular shape (regular M-gon), and the reinforcement components 56, 57 also have a substantially annular shape as shown in FIG. 19A. As shown in FIG. 19C, the annular reinforcement component 56 and the annular reinforcement component 57 are disposed so as to sandwich the annular metal component 51.

The metal component 51 according to the present embodiment has a structure in which the mode of the reinforcement components 56, 57 shown in FIG. 7 is repeatedly disposed in an annular shape. In the mode shown in FIG. 19B, a portion of the reinforcement component 56, overlapping the top plate portion 101 (which corresponds to the metal portion 11), can correspond to an overlapping portion 561, and a portion of the reinforcement component 56, overlapping the top plate portion 103 (which corresponds to the metal portion 12), can correspond to an overlapping portion 562. A portion of the reinforcement component 56, overlapping the top plate portion 102 (which corresponds to the metal portion 13), can correspond to a relay portion 563. A portion of the reinforcement component 57, overlapping the bottom plate portion 201 (which corresponds to the metal portion 21), can correspond to an overlapping portion 571, and a portion of the reinforcement component 57, overlapping the bottom plate portion 203 (which corresponds to the metal portion 22), can correspond to an overlapping portion 572. A portion of the reinforcement component 57, overlapping the bottom plate portion 202 (which corresponds to the metal portion 23), can correspond to a relay portion 573. In the mode shown in FIG. 19B, a portion of the reinforcement component 56, overlapping the top plate portion 104 (which corresponds to the metal portion 11), can correspond to an overlapping portion 561, and a portion of the reinforcement component 56, overlapping the top plate portion 106 (which corresponds to the metal portion 12), can correspond to an overlapping portion 562. A portion of the reinforcement component 56, overlapping the top plate portion 105 (which corresponds to the metal portion 13), can correspond to a relay portion 563. A portion of the reinforcement component 57, overlapping the bottom plate portion 204 (which corresponds to the metal portion 21), can correspond to an overlapping portion 571, and a portion of the reinforcement component 57, overlapping the bottom plate portion 206 (which corresponds to the metal portion 22), can correspond to an overlapping portion 572. A portion of the reinforcement component 57, overlapping the bottom plate portion 205 (which corresponds to the metal portion 23), can correspond to a relay portion 573. In the mode shown in FIG. 19B, a portion of the reinforcement component 56, overlapping the top plate portion 107 (which corresponds to the metal portion 11), can correspond to an overlapping portion 561, and a portion of the reinforcement component 56, overlapping the top plate portion 109 (which corresponds to the metal portion 12), can correspond to an overlapping portion 562. A portion of the reinforcement component 56, overlapping the top plate portion 108 (which corresponds to the metal portion 13), can correspond to a relay portion 563. A portion of the reinforcement component 57, overlapping the bottom plate portion 207 (which corresponds to the metal portion 21), can correspond to an overlapping portion 571, and a portion of the reinforcement component 57, overlapping the bottom plate portion 209 (which corresponds to the metal portion 22), can correspond to an overlapping portion 572. A portion of the reinforcement component 57, overlapping the bottom plate portion 208 (which corresponds to the metal portion 23), can correspond to a relay portion 573. In the mode shown in FIG. 19B, a portion of the reinforcement component 56, overlapping the top plate portion 110 (which corresponds to the metal portion 11), can correspond to an overlapping portion 561, and a portion of the reinforcement component 56 overlapping the top plate portion 112 (which corresponds to the metal portion 12), can correspond to an overlapping portion 562. A portion of the reinforcement component 56, overlapping the top plate portion 111 (which corresponds to the metal portion 13), can correspond to a relay portion 563. A portion of the reinforcement component 57, overlapping the bottom plate portion 210 (which corresponds to the metal portion 21), can correspond to an overlapping portion 571, and a portion of the reinforcement component 57, overlapping the bottom plate portion 212 (which corresponds to the metal portion 22), can correspond to an overlapping portion 572. A portion of the reinforcement component 57, overlapping the bottom plate portion 211 (which corresponds to the metal portion 23), can correspond to a relay portion 573. A portion of the reinforcement component 56, overlapping any one of the top plate portions 101, 103, 104, 106, 107, 110, 112, also serves as an extended portion 564 or an extended portion 565 (see FIG. 7). A portion of the reinforcement component 57, overlapping any one of the bottom plate portions 201, 203, 204, 206, 207, 210, 212, also serves as an extended portion 574 or an extended portion 575 (see FIG. 7).

A method of forming the metal component 51 shown in FIGS. 11A to 14B will be described with reference to FIGS. 14A to 17C. This example shows one example that can be conceived to be industrially reasonably manufactured, and the embodiment is not limited thereto.

Figure 14A:
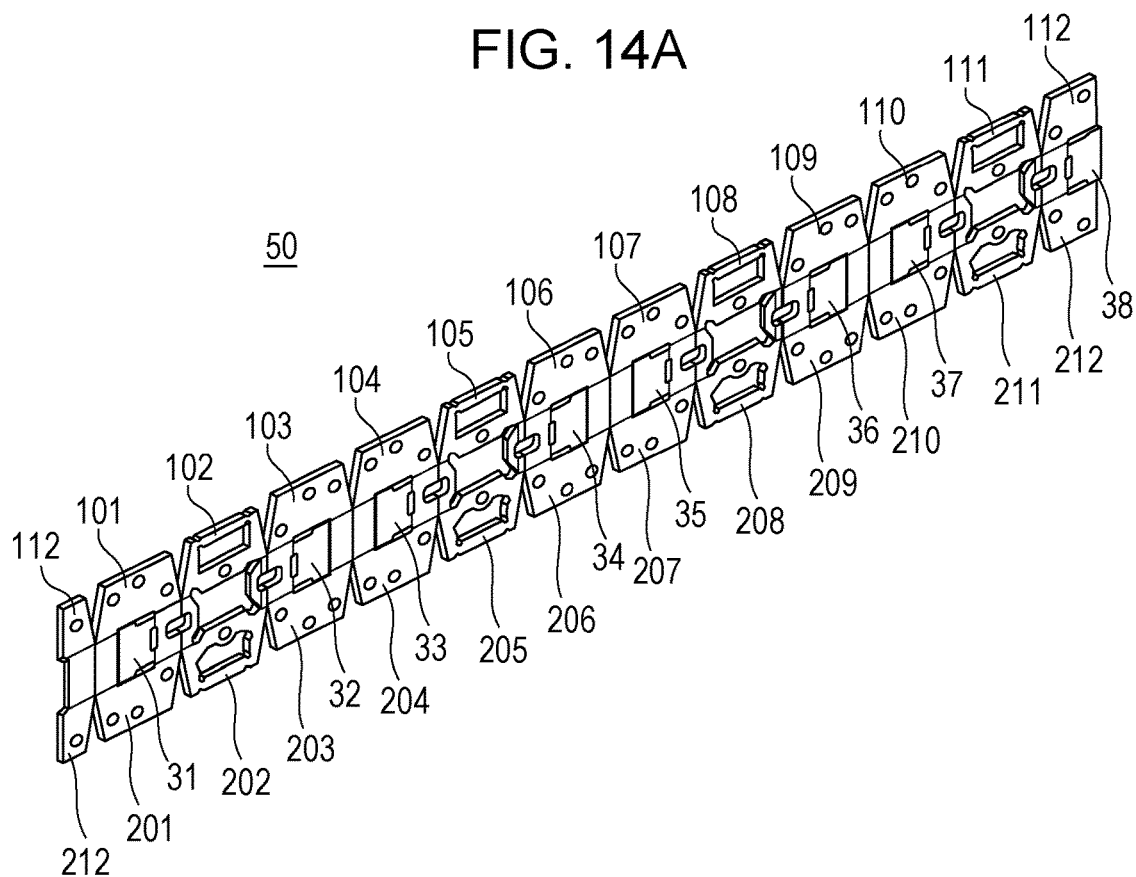
FIGS. 14A and 14B are schematic diagrams illustrating a manufacturing method for a sensor.

Initially, a metal member 50 shown in FIG. 14A is prepared. The metal member 50 at this stage is a narrow long plate-shaped member (metal plate) with a thickness of Tm. The thickness Tm can, for example, range from 0.4 mm to 3.2 mm. The metal member 50 can be prepared by punching a metal plate that is a raw material into a desired shape as shown in FIG. 14A. The metal material of the metal component 51 is desirably easy to be bent, so a common steel (carbon steel with a carbon content of 0.6% or lower) can be used. Examples of the metal member for the metal component 51 can include a cold-rolled steel (SPCC) and an electrolytic zinc-coated steel (SECC, bonderizing plate) that is an electrogalvanized cold-rolled steel.

The metal member 50 has a top surface portion that will be a top surface section 1, a bottom surface portion that will be a bottom surface section 2, and a center portion that is located between the top surface portion and the bottom surface portion and that will be elastic sections 3 and a side surface section 4. Top plate portions 101 to 112 are provided in the top surface portion. Portions that will be bottom plate portions 201 to 212 are provided in the bottom surface portion. Portions that will be elastic sections 31 to 38 and portions that will be side plate portions 401 to 412 are provided in the center portion. The metal member 50 at this stage is, for example, formed by shearing a sheet metal. The metal member 50 at this stage may be formed by machining from a square material or may be formed by casting. Forming the metal member 50 by shearing is beneficial in cost.

Figure 14B:
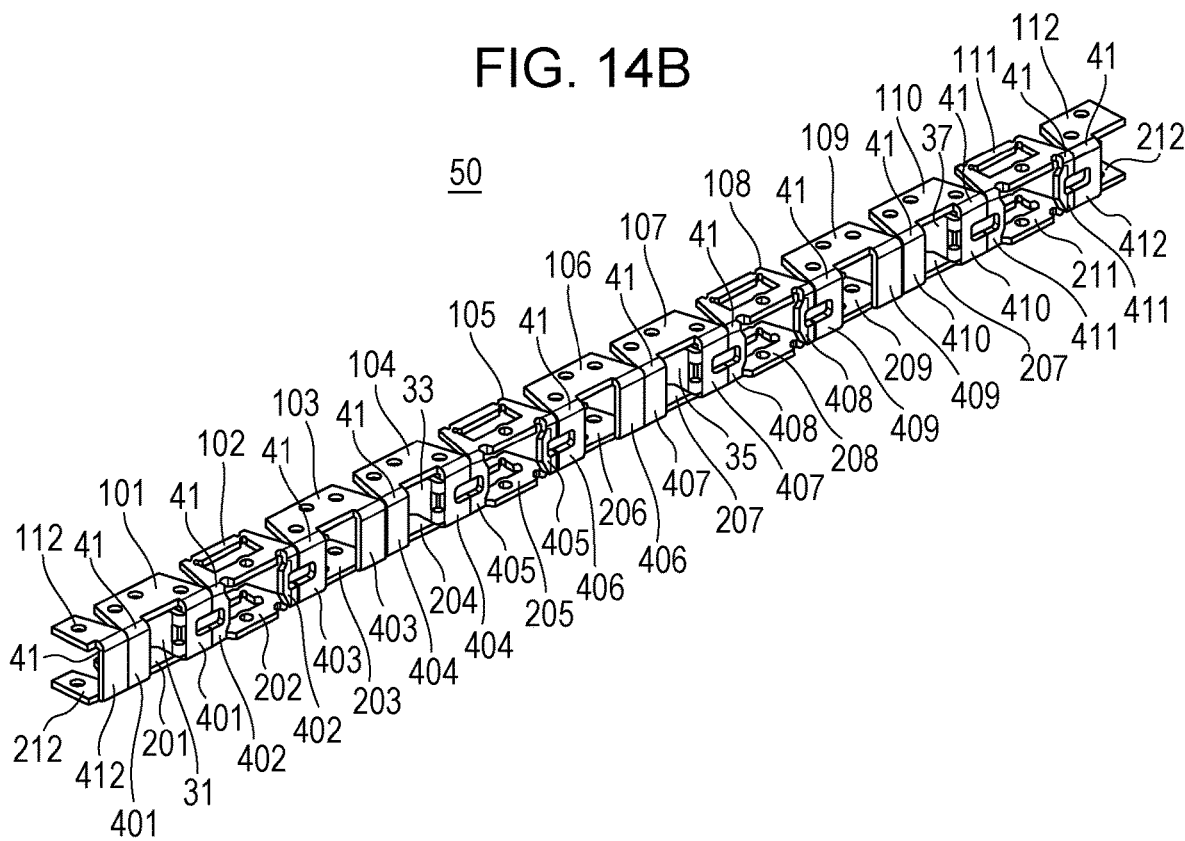

Subsequently, the metal member 50 is formed into a shape shown in FIG. 14B by performing first to third bending works on the metal member 50 shown in FIG. 14A. The metal member 50 at this stage is a narrow long U-shaped member. The top surface portion and the bottom surface portion face each other. The elastic sections 31 to 38 overlap the top surface portion and the bottom surface portion. In this example, the number of connections 44 between the side plate portions 401 to 412 is M, the side plate portion 401 and part of the side plate portion 412 are connected via a connection, and the side plate portion 411 and the remaining part of the side plate portion 412 are connected via a connection.

Figure 15A:
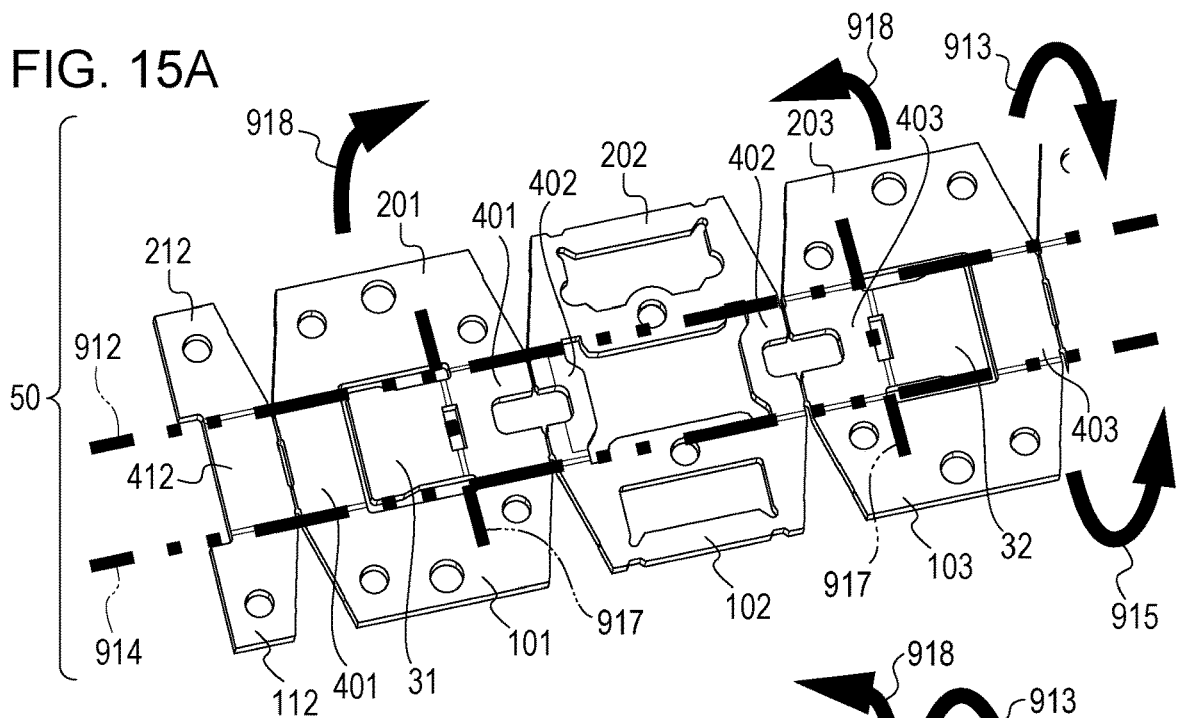
FIGS. 15A to 15C are schematic diagrams illustrating the manufacturing method for a sensor.
Figure 15B:
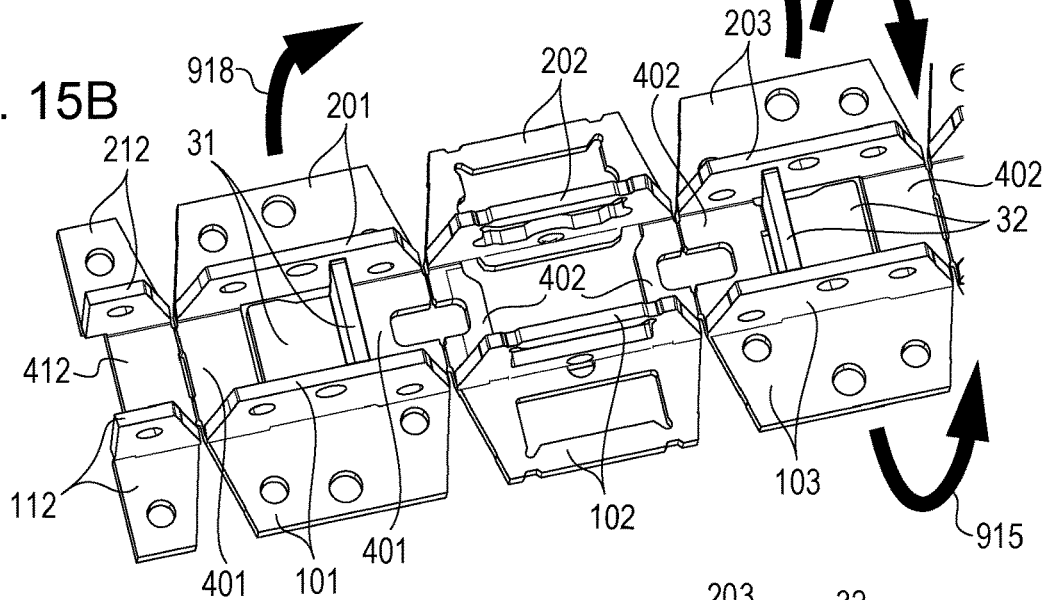
Figure 15C:
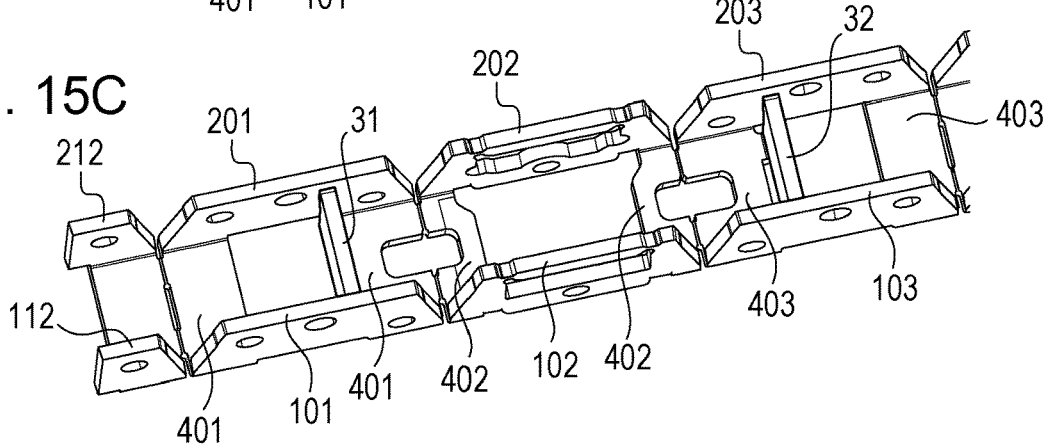

FIG. 15A is a partially enlarged view of the metal member 50 for the sake of illustration. FIG. 15A shows a state before the metal member 50 is subjected to first to third bending works. FIG. 15C shows a state after the metal member 50 is subjected to first to third bending works. FIG. 15B shows a state before and after the metal member 50 is subjected to first to third bending works.

The first bending work is performed as shown in FIG. 15B such that the elastic sections 31 to 38 are bent by 800 to 1000 (in this example, 90°) in the direction of arrows 918 with folding lines set to rounding portions 917 indicated by the alternate long and two-short dashed lines in FIG. 15A.

The second bending work is performed as shown in FIG. 15B such that the bottom plate portions 201 to 212 are bent by 800 to 1000 (in this example, 90°) in the direction of an arrow 913 with a folding line set to a rounding portion 912 indicated by the alternate long and two-short dashed line in FIG. 15A.

The third bending work is performed as shown in FIG. 15B such that the top plate portions 101 to 112 are bent by 800 to 1000 (in this example, 90°) in the direction of an arrow 915 with folding line set to a rounding portion 914 indicated by the alternate long and two-short dashed line in FIG. 15A.

As shown in FIG. 15C, each of the elastic sections 31 to 38 overlaps an associated one of the top plate portions 101 to 112 and an associated one of the bottom plate portions 201 to 212.

The order of the first to third bending works is optional; however, the second bending work and the third bending work can be performed after the first bending work. This is because, when the first bending work is performed after the second bending work and the third bending work, the top plate portions 101 to 112 and the bottom plate portions 201 to 212 tend to interfere with the first bending work during the first bending work.

Subsequently, the metal member 50 is formed into a shape shown in FIG. 15A by performing a fourth bending work on the metal member 50 shown in FIG. 14B. Furthermore, the metal member 50 is formed into a shape shown in FIG. 15B by performing the fourth bending work on the metal member 50 shown in FIG. 15A.

Figure 17A:
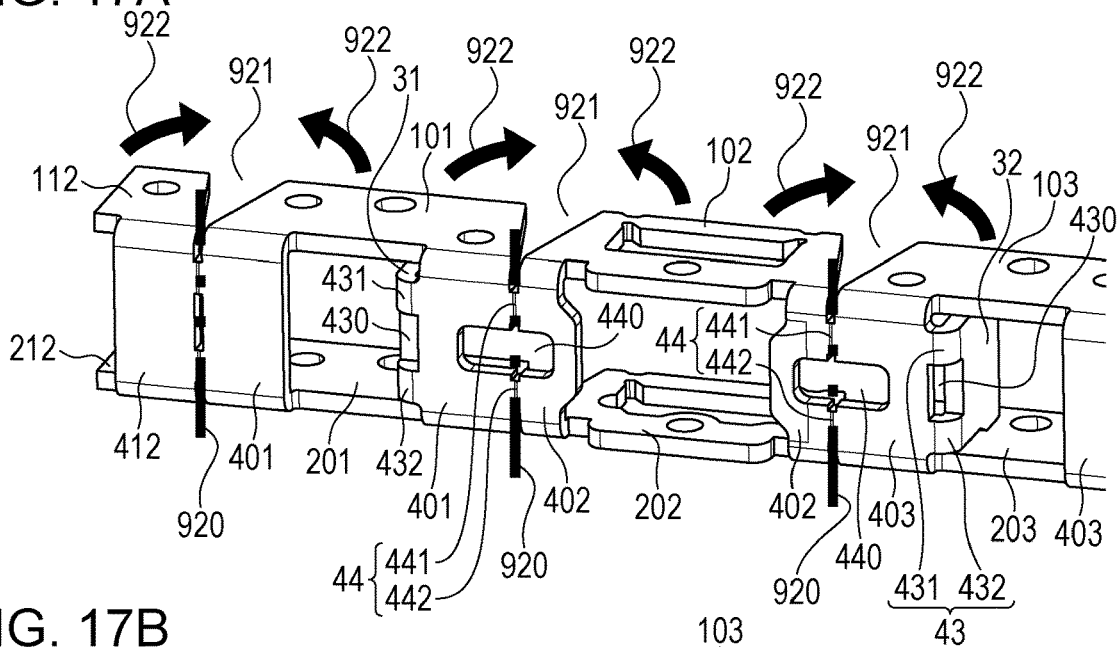
FIGS. 17A to 17C are schematic diagrams illustrating the manufacturing method for a sensor.
Figure 17B:
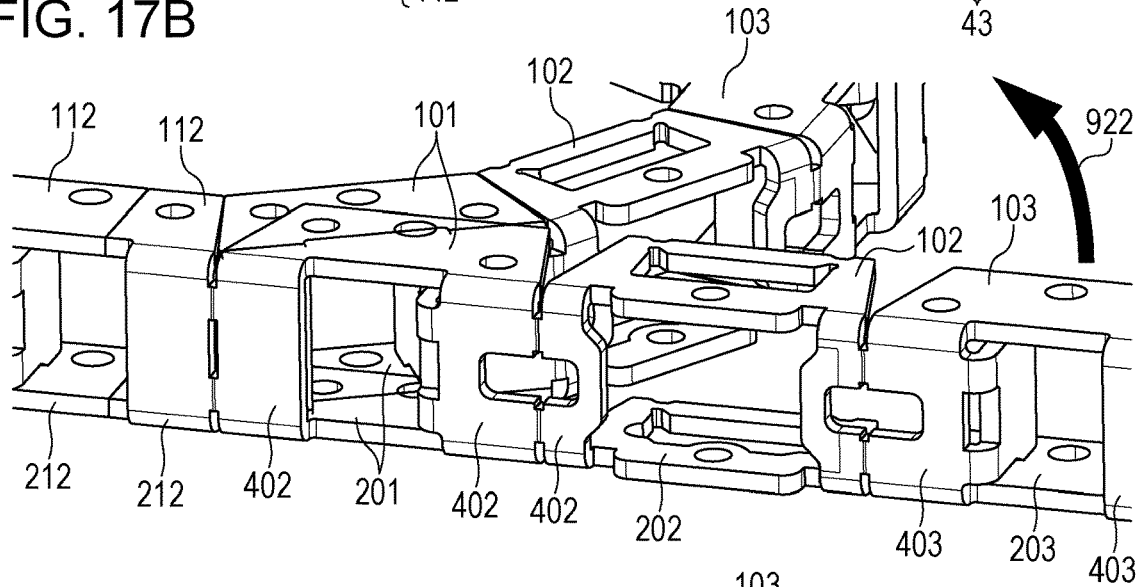
Figure 17C:
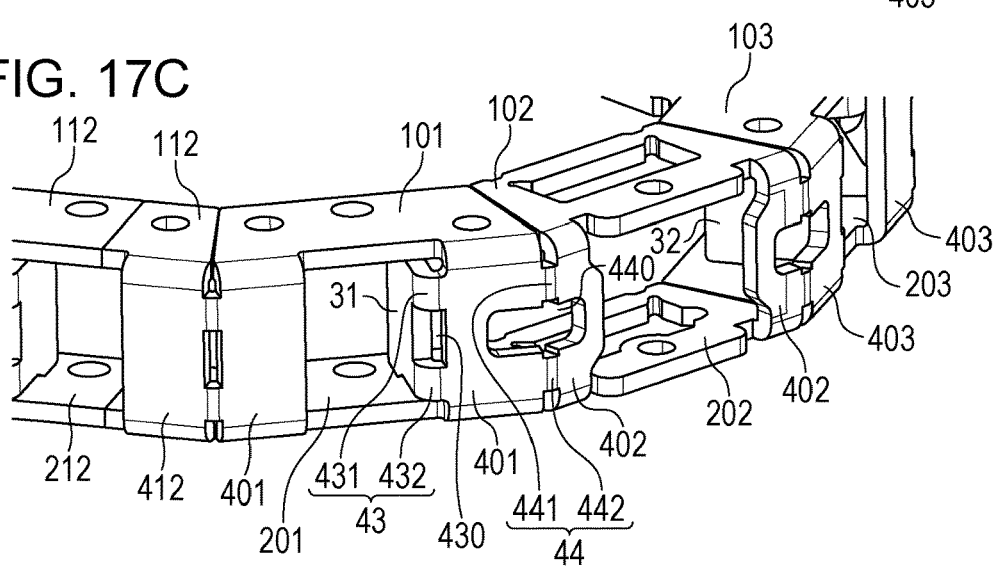

FIG. 17A is a partially enlarged view of the metal member 50 for the sake of illustration. FIG. 17A shows a state before the metal member 50 is subjected to fourth bending work. FIG. 17C shows a state after the metal member 50 is subjected to fourth bending work. FIG. 17B shows a state before and after the metal member 50 is subjected to the fourth bending work.

The fourth bending work is performed as shown in FIGS. 17A and 17B such that the side surface sections 401 to 412 are bent by 300 ((360/M)°) in the directions of arrows 922 with folding lines set to rounding portions 920 indicated by the alternate long and two-short dashed lines in FIG. 17A. Through the fourth bending work, two adjacent top plate portions (for example, the top plate portion 101 and the top plate portion 102) of the top plate portions 101 to 112 can contact with each other. In order not to form a gap between two adjacent top plate portions as much as possible, in a state before the fourth bending work, an angle between facing surfaces of two adjacent top plate portions (for example, the top plate portion 101 and the top plate portion 102) of the top plate portions 101 to 112 is set to ((360/M)°). Part of the side plate portion 412, connected to the side plate portion 401, and the remaining part of the side plate portion 412, connected to the side plate portion 411, are connected.

As shown in FIGS. 17A and 17C, a connection 43 between the connected side plate portion and elastic section (for example, the side plate portion 401 and the elastic section 31, and the side plate portion 403 and the elastic section 32) includes an upper portion 431 and a lower portion 432 arranged in the z direction, and an air gap 430 is provided between the upper portion 431 and the lower portion 432. The air gap 430 can function as a clearance hole in the third bending work. By providing the air gap 430 to decrease the rigidity of the connection 43, the rigidity of the elastic section group 3 is decreased, with the result that the structure 5 is easy to deform.

As shown in FIGS. 17A and 17C, a connection 44 between two adjacent side plate portions (for example, the side plate portion 401 and the side plate portion 402) includes an upper portion 441 and a lower portion 442 arranged in the z direction, and an air gap 440 is provided between the upper portion 441 and the lower portion 442. The air gap 440 can function as a clearance hole in the third bending work. By providing the air gap 440 to decrease the rigidity of the connection 44, the rigidity of the side surface section 4 is decreased, with the result that the structure 5 is easy to deform.

Figure 16A:
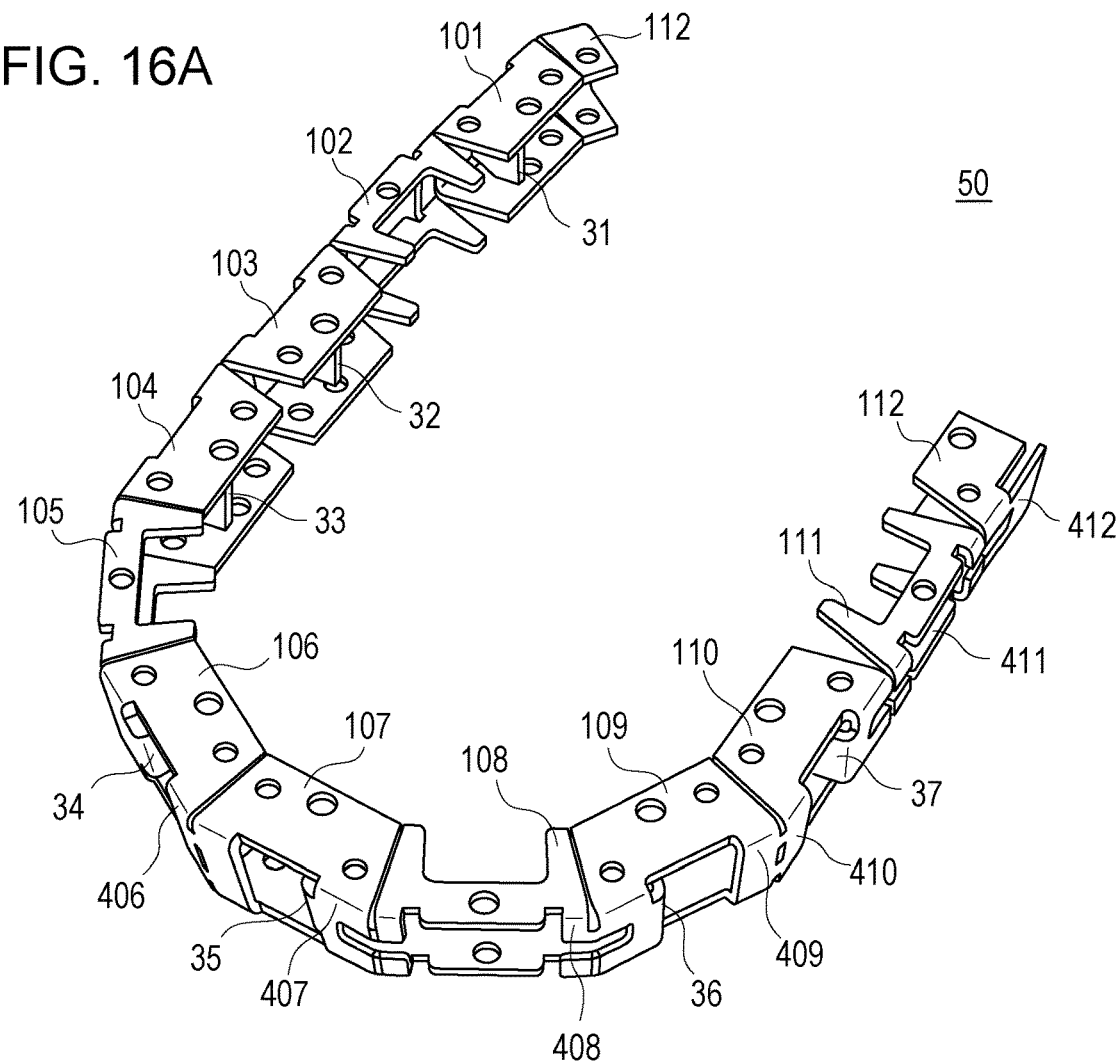
FIGS. 16A and 16B are schematic diagrams illustrating the manufacturing method for a sensor.
Figure 16B:
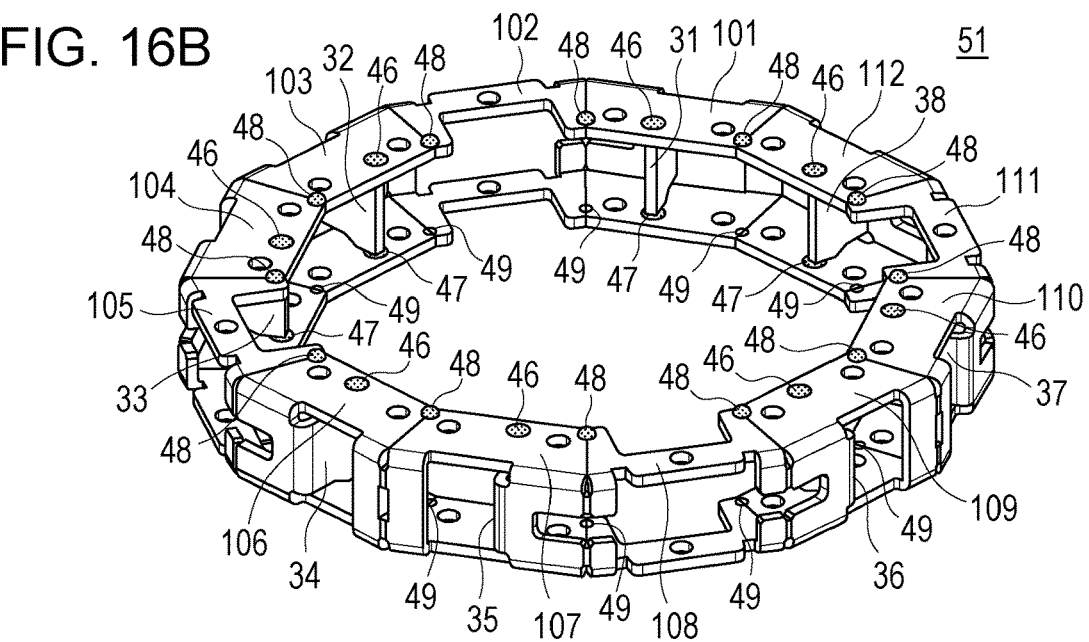

Subsequently, in FIG. 16B, a joint 46 between a top plate portion, of the top plate portions 101, 103, 104, 106, 107, 109, 110, 112, and an elastic section, of the elastic sections 31 to 38, overlapping each other, is formed. A joint 47 between a bottom plate portion, of the bottom plate portions 201, 203, 204, 206, 207, 209, 210, 212, and an elastic section, of the elastic sections 31 to 38, overlapping each other, is formed. A joint 48 between adjacent top plate portions of the top plate portions 101 to 112 is formed. A joint 49 between adjacent bottom plate portions of the bottom plate portions 201 to 212 is formed. Arc welding, spot welding, or laser welding can be used to form the joints 46 to 49.

In this way, by bending the metal member 50 having the plurality of elastic sections 31 to 38, the metal component 51 having the plurality of elastic sections 31 to 38 can be formed.

Figure 18A:
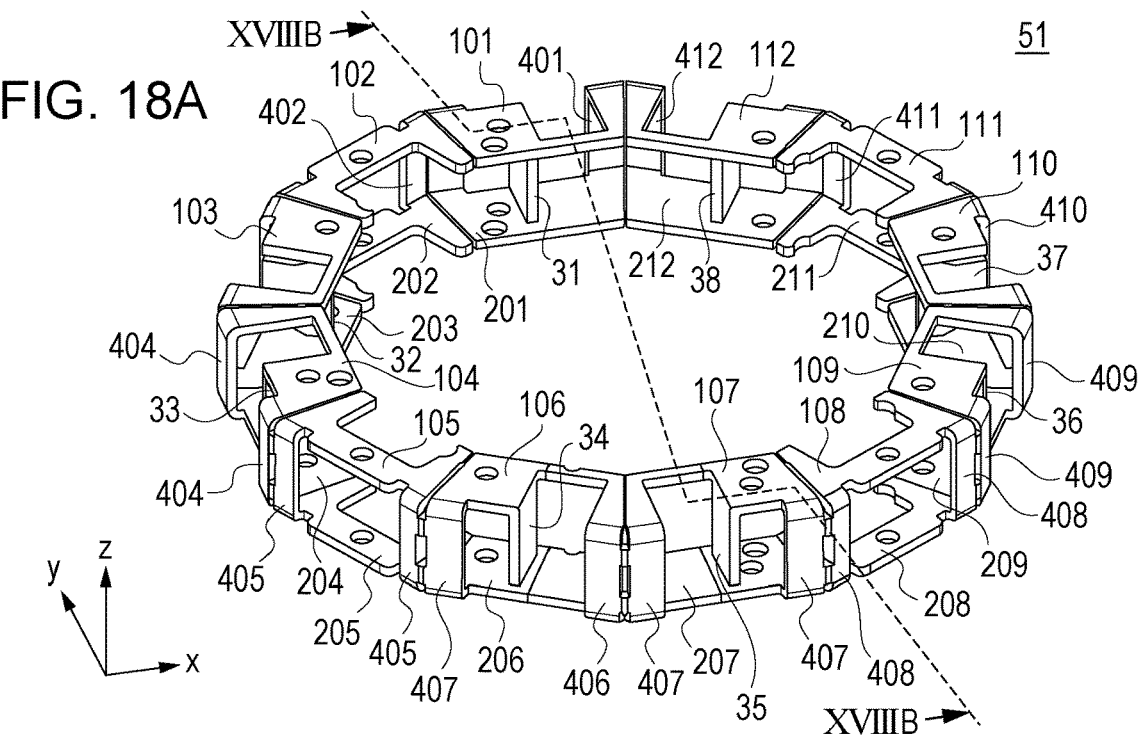
FIGS. 18A to 18C are schematic diagrams illustrating the sensor.
Figure 18B:
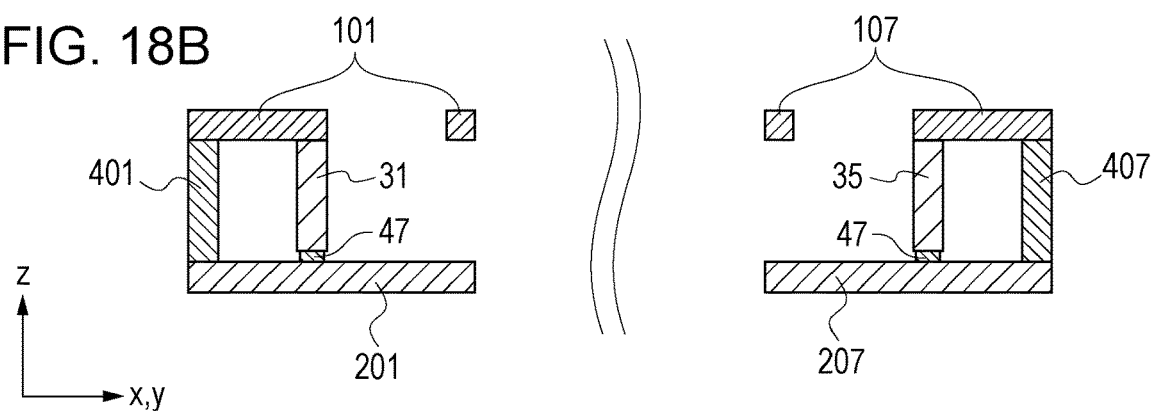
Figure 18C:
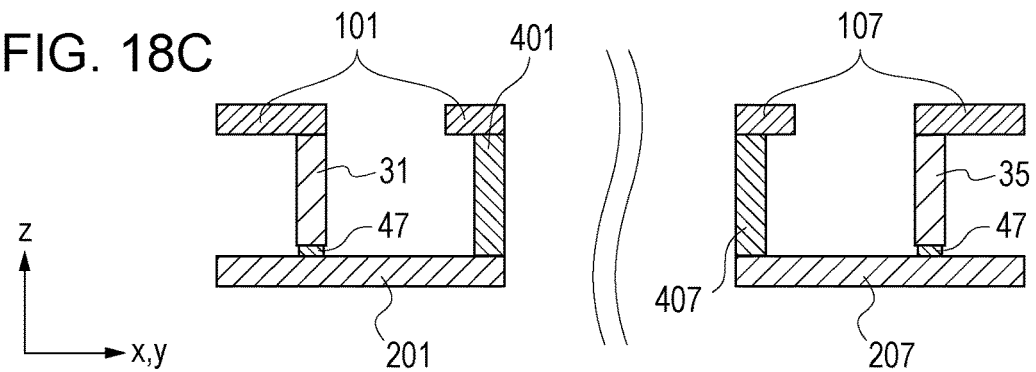

A modification of the metal component 51 will be described with reference to FIGS. 18A to 18C. FIG. 18A is a perspective view of the metal component 51. FIG. 18B is a sectional view, including the elastic sections 31, 35, of the metal component 51, taken along the line XVIIIB-XVIIIB in FIG. 18A.

In the metal component 51 shown in FIGS. 11A to 13D, the metal component 51 is bent at the connection between the side surface section 4 and the elastic section group 3. However, in the present embodiment, each of the elastic sections 31 to 38 of the elastic section group 3 connects with the top surface section 1. The metal component 51 is bent by bending at the connection between the top surface section 1 and each of the elastic sections 31 to 38 of the elastic section group 3. For example, the metal component 51 is bent by bending at the connection between the top plate portion 101 and the elastic section 31. The elastic section 31 is provided over the bottom plate portion 201 such that the elastic section 31 overlaps the bottom plate portion 201 in the z direction. The metal component 51 is bent by bending at the connection between the top plate portion 103 and the elastic section 32. The elastic section 32 is provided over the bottom plate portion 203 such that the elastic section 32 overlaps the bottom plate portion 203 in the z direction. The metal component 51 is bent by bending at the connection between the top plate portion 107 and the elastic section 35. The elastic section 35 is provided over the bottom plate portion 207 such that the elastic section 35 overlaps the bottom plate portion 207 in the z direction. Similarly, each of the elastic sections 33, 34, 36, 37, 38 overlaps an associated one of the bottom plate portions 206, 207, 209, 210, 212.

As shown in FIG. 18B, each of the elastic sections 31 to 38 is joined with the bottom surface section 2 by a joint 47. The joint 47 may be, for example, a welding portion welding the bottom surface section 2 with each of the elastic sections 31 to 38, adjacent to each other, or may be a bonding portion bonding the bottom surface section 2 to each of the elastic sections 31 to 38, adjacent to each other. For example, the elastic section 31 and the bottom plate portion 201 that overlap each other are joined with each other by the joint 47 formed by welding. The elastic section 35 and the bottom plate portion 207 that overlap each other are joined with each other by the joint 47 formed by welding. Similarly, each of the elastic sections 32 to 34, 36 to 38 and an associated one of the bottom plate portions 203, 204, 206, 209, 210, 212, which overlaps the elastic section, are joined with each other by the joint 47.

As is apparent from FIGS. 18A and 18B, the side surface section 4 may make up the outer side surface of the metal component 51. Therefore, as shown in FIG. 18B, for example, the distance between the elastic section 31 and the elastic section 35 is shorter than the distance between the side plate portion 401 and the side plate portion 407. In another mode, the side surface section 4 may make up the inner side surface of the metal component 51. Therefore, as shown in FIG. 18C, for example, the distance between the elastic section 31 and the elastic section 35 may be longer than the distance between the side plate portion 401 and the side plate portion 407. Other embodiments of the sensor 10 will be described. A force intended to be detected with the detector 8 is referred to as detection target force, and a force in a direction different from a direction in which a force to be detected is applied is referred to as non-detection target force. When, for example, a force that is applied in the θ direction is intended to be detected with the detector 8, a force that is applied in the r direction and a force that is applied in the z direction are non-detection target forces. Non-detection target forces may be referred to as other-axis forces. Non-detection target forces are a disturbance factor in detecting a detection target force. A disturbance in detecting a detection target force due to other-axis forces is referred to as other-axis interference. It is beneficial to reduce the influence of other-axis interference and improve the detection accuracy of the sensor 10 for a detection target force. Since the structure 5 includes the reinforcement components that reinforce the metal component 51, the rigidity of the structure 5 against non-detection target forces increases, so the detection accuracy of the sensor 10 for a detection target force is improved.

The structure 5 of the sensor 10 shown in FIG. 19B can include a reinforcement component 56 shown in FIG. 19A in addition to the metal component 51. The reinforcement component 56 overlaps a plurality of elastic sections of at least four elastic sections included in the elastic section group 3. The reinforcement component 56 is coupled to the metal component 51, and the reinforcement component 56 can be typically coupled to the top surface section 1 of the metal component 51. The structure 5 of the sensor 10 can include a reinforcement component 57 shown in FIG. 19A in addition to the metal component 51. The reinforcement component 57 overlaps a plurality of elastic sections of at least four elastic sections included in the elastic section group 3. The reinforcement component 57 is coupled to the metal component 51, and the reinforcement component 57 can be typically coupled to the bottom surface section 2 of the metal component 51. In this example, the reinforcement components 56, 57 have substantially the same shape as shown in FIG. 19A.

The metal component 51 is disposed between the reinforcement component 56 and the reinforcement component 57 and is coupled to the reinforcement component 56 and the reinforcement component 57. The plane shape of the metal component 51 is substantially an annular shape (regular M-gon), and the reinforcement components 56, 57 also have a substantially annular shape as shown in FIG. 19A. As shown in FIG. 19C, the annular reinforcement component 56 and the annular reinforcement component 57 are disposed so as to sandwich the annular metal component 51.

FIG. 19C shows the thickness Ta of the top surface section 1, the thickness Tb of the bottom surface section 2, the height Hc of the side surface section 4, and the height Hm of the metal component 51. Here, the height Hm is the sum of the thickness Ta, the thickness Tb, and the height Hc (Hm=Ta+Tb+Hc). Each of the thickness Ta of the top surface section 1 and the thickness Tb of the bottom surface section 2 corresponds to the thickness Tm of the metal member 50 (metal plate). Each of the thickness of the side surface section 4 and the thickness of each of the elastic sections 31 to 38 also corresponds to the thickness Tm of the metal member (sheet metal). Typically, each of the thickness Ta and the thickness Tb is less than the height Hc (Ta & Tb<Hc). In this way, by extending the height Hc of the side surface section 4 as compared to each of the thickness Ta of the top surface section 1 and the thickness Tb of the bottom surface section 2, the rigidity of the metal component 51 against a detection target force is decreased. Each of the thickness Ta and the thickness Tb, for example, ranges from 0.4 mm to 3.2 mm and typically ranges from 1.0 mm to 2.5 mm. The height Hc, for example, ranges from 5 mm to 20 mm and typically ranges from 10 mm to 15 mm. The height Hm, for example, ranges from 6 mm to 26 mm and typically ranges from 12 mm to 19 mm.

FIG. 19C shows the thickness Sa of the reinforcement component 56 and the thickness Sb of the reinforcement component 57.

The thickness Sa of the reinforcement component 56 can be greater than the thickness Ta of the top surface section 1 (Sa>Ta). The thickness Sb of the reinforcement component 57 can be greater than the thickness Tb of the bottom surface section 2 (Sb>Tb). In this way, by reducing the thickness of each of the top surface section 1 and the bottom surface section 2 as compared to the reinforcement components 56, 57, the workability (ease of bending) of the metal component 51 is improved while the rigidity of the structure 5 is ensured with the reinforcement components 56, 57. To achieve the above, each of the thicknesses Sa, Sb of the reinforcement components 56, 57 can be greater than the thickness Tm of the metal member 50 (Sa & Sb>Tm).

Each of the thickness Sa of the reinforcement component 56 and the thickness Sb of the reinforcement component 57 can be less than the height Hm of the metal component 51 (Sa & Sb<Hm). Each of the thickness Sa of the reinforcement component 56 and the thickness Sb of the reinforcement component 57 can be less than the height Hc of the side surface section 4 (Sa & Sb<Hc).

In this way, by extending the height Hm of the metal component 51 and the height Hc of the side surface section 4 as compared to the thicknesses Sa, Sb of the reinforcement components 56, 57, the rigidity of the metal component 51 against a detection target force is decreased. The height Hm of the metal component 51 substantially corresponds to the distance between the reinforcement component 56 and the reinforcement component 57 at a portion sandwiching any one of the elastic sections 31 to 38. Therefore, each of the thicknesses Sa, Sb of the reinforcement components 56, 57 may be less than the distance between the reinforcement component 56 and the reinforcement component 57. Each of the thickness Sa and the thickness Sb, for example, ranges from 1.0 mm to 5.0 mm and typically ranges from 1.5 mm to 3.0 mm. When the above-described conditions are generalized, the relationship Ta & Tb & Tm<Sa & Sb<Hc<Hm can be satisfied.

The thickness Ta of the top surface section 1 shown in FIG. 19C corresponds to each of the thicknesses T3, T5, T6 in FIG. 7, and the thickness Tb of the bottom surface section 2 corresponds to each of the thicknesses T4, T7, T8 in FIG. 7. The thickness Sa of the reinforcement component 56 shown in FIG. 19C corresponds to each of the thicknesses S1, S2, S5, S7, S8 in FIG. 7, and the thickness Sb of the reinforcement component 57 corresponds to each of the thicknesses S3, S4, S6, S9, S10 in FIG. 7. The thickness Tm of each of the elastic sections of the elastic section group 3 corresponds to each of the thicknesses T1, T2 in FIG. 7.

The material of the reinforcement components 56, 57 can be a material that ensures a desired rigidity. A metal material, a ceramic material, a glass material, a plastic material, or the like may be used. A metal material with a high ductility can be more preferable than a ceramic material or a glass material with a high brittleness. A metal material used for the reinforcement components 56, 57 is an elemental metal or a mixture (alloy) of metals. The reinforcement components 56, 57 may be the ones obtained by plating a base material made of a metal material. To ensure the rigidity of the structure 5, the reinforcement components 56, 57 can be hard and can be, for example, a metal material with a Vickers hardness of 90 HV or higher. Iron alloys (steels), such as carbon steels and alloy steels, aluminum alloys, titanium alloys, and the like may be used as the material of the reinforcement components 56, 57. In terms of a material cost, iron alloys are suitable. Alloy steels, particularly, stainless steels (SUS) are suitable as the metal material of the reinforcement components 56, 57. For example, a stainless steel with magnetism can be used for the reinforcement components 56, 57. Since each of the reinforcement components 56, 57 has a simpler structure than the metal component 51 having the elastic sections 31 to 38, the reinforcement components 56, 57 can be prepared at low cost by a method, such as machining and casting.

When the metal component 51 has the eight elastic sections 31 to 38, the reinforcement components 56, 57 can overlap the eight elastic sections 31 to 38. The reinforcement components 56, 57 do not need to overlap all the elastic sections included in the elastic section group 3, and the elastic sections that the reinforcement component 56 overlaps do not need to completely coincide with the elastic sections that the reinforcement component 57 overlaps.

The reinforcement component 56 and the top surface section 1 are joined with each other by joints 58 shown in FIG. 19B. Each of the joints 58 may be, for example, a welding portion welding the top surface section 1 with the reinforcement component 56 or may be, for example, a bonding portion bonding the top surface section 1 with the reinforcement component 56. The reinforcement component 57 and the bottom surface section 2 are joined with each other by joints 59 (not shown) as in the case of the joints 58. Each of the joints 59 may be, for example, a welding portion welding the bottom surface section 2 with the reinforcement component 57 or may be, for example, a bonding portion bonding the bottom surface section 2 with the reinforcement component 57.

The joints 58 join the top plate portions 101, 103, 104, 106, 107, 109, 110, 112, overlapping the elastic sections 31 to 38, with the reinforcement component 56. As described above, the elastic sections 31 to 38 are joined with the top plate portions 101, 103, 104, 106, 107, 109, 110, 112 by the joints 46. Therefore, the reinforcement component 56 is coupled to the elastic sections 31 to 38 via the top plate portions 101, 103, 104, 106, 107, 109, 110, 112 by the joints 46, 58. The joints 58 join the top plate portions 102, 105, 108, 111, to which the components 61 to 64 are fixed, with the reinforcement component 56. Therefore, the reinforcement component 56 is coupled to the components 61 to 64 via the top plate portions 102, 105, 108, 111 by the joints 58.

Similarly, the joints 59 join the bottom plate portions 201, 203, 204, 206, 207, 209, 210, 212, which overlap the elastic sections 31 to 38, with the reinforcement component 57. As described above, the elastic sections 31 to 38 are joined with the bottom plate portions 201, 203, 204, 206, 207, 209, 210, 212 by the joints 47. Therefore, the reinforcement component 57 is coupled to the elastic sections 31 to 38 via the bottom plate portions 201, 203, 204, 206, 207, 209, 210, 212 by the joints 46, 58. The joints 59 join the bottom plate portions 202, 205, 208, 211, to which the components 71 to 74 are fixed, with the reinforcement component 57. Therefore, the reinforcement component 57 is coupled to the components 71 to 74 via the bottom plate portions 202, 205, 208, 211 by the joints 59. In this way, since the reinforcement components 56, 57 are coupled to the elastic sections 31 to 38 or the detecting units 81 to 84, the detection accuracy of the sensor 10 increases.

At least any one of the components 61, 71 of the detecting unit 81, any one of the components 62, 72 of the detecting unit 82, any one of the components 63, 73 of the detecting unit 83, or any one of the components 64, 74 of the detecting unit 84 may be fixed to the reinforcement component 56 or the reinforcement component 57. In this case, at least any one of the components 61, 71, any one of the components 62, 72, any one of the components 63, 73, or any one of the components 64, 74 may be directly bonded to the reinforcement component 56 or the reinforcement component 57 or may be directly bonded to a supporting component fixed to the reinforcement component 56 or the reinforcement component 57.

As shown in FIG. 19A, the reinforcement component 56 has holes 560, and the reinforcement component 57 has holes 570. The holes 560, 570 are used to couple the structure 5, another component (for example, a link (described later) or the metal component 51), and the sensor 10 with one another. For example, a threaded groove is formed on the inner surface of each of the holes 560, 570, screws extending through another component are screwed to the holes 560, 570, and the another component is fastened to the reinforcement component. In this case, of the screws screwed to the holes 560, 570, portions projecting from the reinforcement components 56, 57 (holes 560, 570) may be accommodated in the holes 100, 200 of the metal component 51. Alternatively, bolts extending through another component extend through the holes 560, 570 and screwed to nuts separately provided, and the another component is fastened to the reinforcement component 56 or the reinforcement component 57 by bolts and nuts. Alternatively, screws extending through another component extend through the holes 560, 570 and screwed to the holes 100, 200 of the metal component 51, and the another component can be fastened to the reinforcement component 56 or the reinforcement component 57 by screws. Each of the holes 560 of the reinforcement component 56 and an associated one of the holes 100 of the top surface section 1 are aligned with each other, and a screw or a bolt can be inserted through both holes. Each of the holes 570 of the reinforcement component 57 and an associated one of the holes 200 of the bottom surface section 2 are aligned with each other, and a screw or a bolt can be inserted through both holes.

Another mode in which the structure 5 includes reinforcement components will be described with reference to FIGS. 20A to 20D.

Figure 20A:
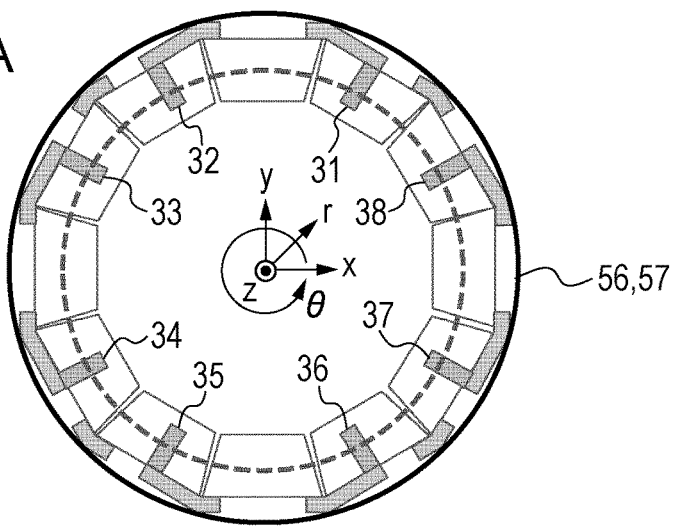
FIGS. 20A to 20D are schematic diagrams illustrating the sensor.

FIG. 20A is a plan view showing an overlap between the metal component 51 and the reinforcement components 56, 57 when viewed in the Z direction. The reinforcement components 56, 57 shown in FIG. 20A have a disc shape. The disc-shaped reinforcement components 56, 57 overlap the eight elastic sections 31 to 38. When the reinforcement components 56, 57 have a disc shape, the rigidity of the reinforcement components 56, 57 improves, and the rigidity of the structure 5 also improves, as compared to the case where the reinforcement components 56, 57 have an annular shape. The reinforcement component 56 and the reinforcement component 57 overlap each other at portions that do not overlap the metal component 51 (portions sandwiching a portion surrounded by the metal component 51).

Figure 20B:
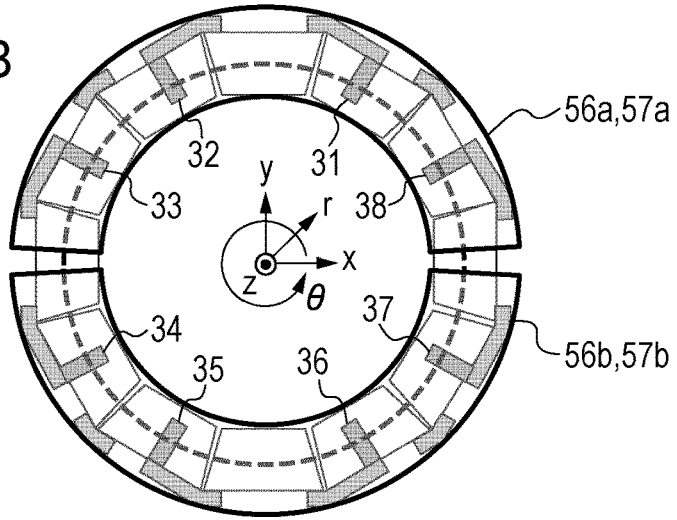

FIG. 20B shows an example in which the reinforcement component 56 shown in FIG. 19A is divided into a plurality of reinforcement components 56a, 56b and the reinforcement component 57 shown in FIG. 19A is divided into a plurality of reinforcement components 57a, 57b. The structure 5 of the sensor 10 includes four reinforcement components, that is, the two reinforcement components 56a, 56b coupled to the top surface section 1 of the metal component 51 and two reinforcement components 57a, 57b coupled to the bottom surface section 2 of the metal component 51. The reinforcement components 56a, 57a overlap the four elastic sections 31 to 33, 38 of the eight elastic sections 31 to 38. The four elastic sections 31 to 33, 38 are provided between the reinforcement component 56a and the reinforcement component 57a. The reinforcement components 56b, 57b overlap the four elastic sections 34 to 37 of the eight elastic sections 31 to 38. The four elastic sections 34 to 37 are provided between the reinforcement component 56b and the reinforcement component 57b.

Figure 20C:
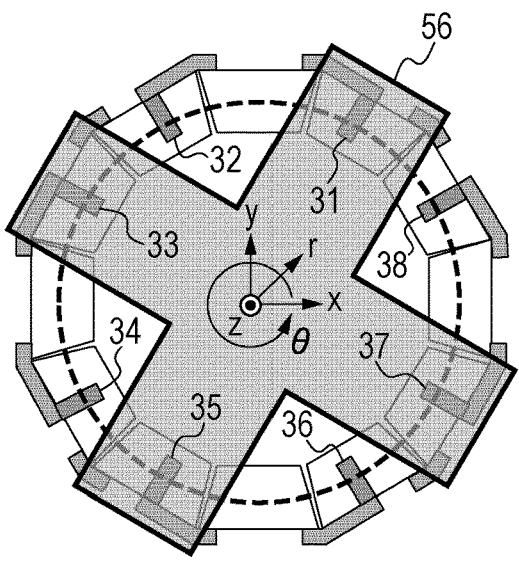

FIG. 20C shows an example in which cross reinforcement components 56, 57 are used. The reinforcement component 56 overlaps the elastic sections 31, 33, 35, 37 and does not overlap the elastic sections 32, 34, 36, 38. The reinforcement component 57 overlaps the elastic sections 32, 34, 36, 38 and does not overlap the elastic sections 31, 33, 35, 37. The reinforcement component 56 and the reinforcement component 57 overlap each other at portions that do not overlap the metal component 51.

Figure 20D:
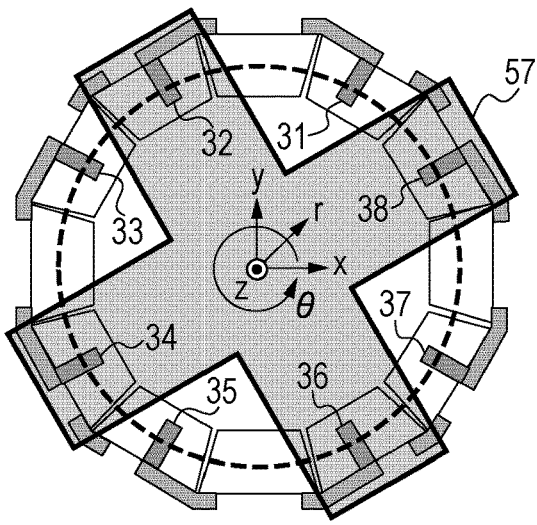

In FIG. 20C, a portion of the reinforcement component 56, connecting a portion overlapping the elastic section 31 (which corresponds to an overlapping portion 561) with a portion overlapping the elastic section 35 (which corresponds to an overlapping portion 562) in the r direction (radial direction), corresponds to a relay portion 563. A portion of the reinforcement component 56, connecting a portion overlapping the elastic section 33 (which corresponds to an overlapping portion 561) with a portion overlapping the elastic section 37 (which corresponds to an overlapping portion 562) in the r direction (radial direction), corresponds to a relay portion 563. In FIG. 20D, a portion of the reinforcement component 57, connecting a portion overlapping the elastic section 32 (which corresponds to an overlapping portion 571) with a portion overlapping the elastic section 36 (which corresponds to an overlapping portion 572) in the r direction (radial direction), corresponds to a relay portion 573. A portion of the reinforcement component 57, connecting a portion overlapping the elastic section 34 (which corresponds to an overlapping portion 571) with a portion overlapping the elastic section 38 (which corresponds to an overlapping portion 572) in the r direction (radial direction), corresponds to a relay portion 573. A portion of the reinforcement component 56, corresponding to a relay portion 563, and a portion of the reinforcement component 57, corresponding to a relay portion 573, overlap each other in the z direction, and the metal component 51 is not located therebetween.

The outline of each of the reinforcement components 56, 57 may be substantially the same as the outline 55 of the metal component 51 or may be different from the outline 55 of the metal component 51. In this example, the outline 55 of the metal component 51 is substantially regular dodecagon, and the outline of each of the reinforcement components 56, 57 is circular. Extended portions that the reinforcement components 56, 57 are extended outward from the outline 55 of the metal component 51 may be provided. For example, the components 6, 7 of the detector 8 may be fixed to the extended portions of the reinforcement components 56, 57.

Fifth Embodiment

Figure 21A:
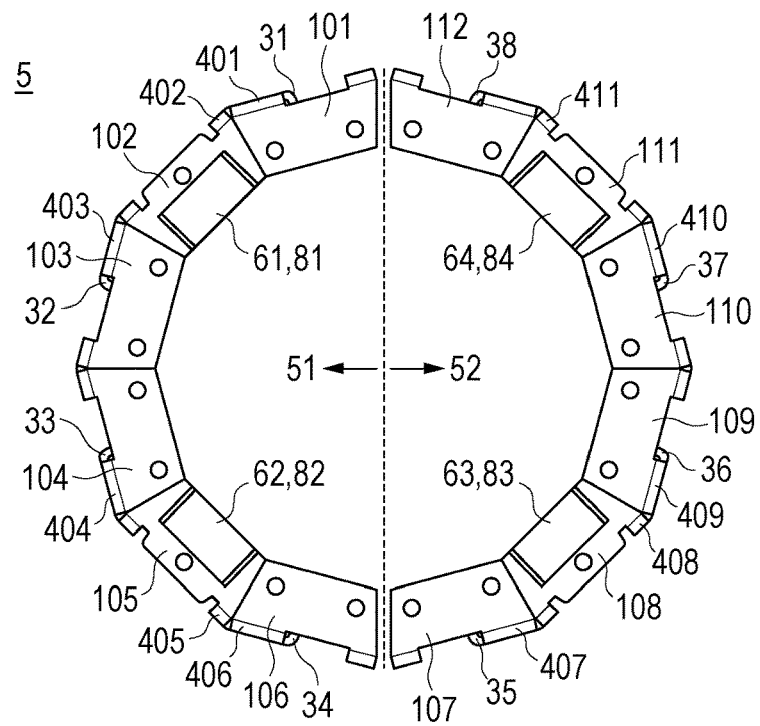
FIGS. 21A to 21C are schematic diagrams illustrating a sensor.

In a fifth embodiment, the elastic section group 3 of the structure 5 is made up of a plurality of metal components. FIG. 21A shows an example in which the elastic section group 3 of the structure 5 is distributed among two metal components 51, 52. The semi-annular metal component 51 has four elastic sections 31 to 34. The semi-annular metal component 52 has four elastic sections 35 to 38. The metal component 51 has top plate portions 101 to 106, bottom plate portions 201 to 206, and side plate portions 401 to 406. The metal component 52 has top plate portions 107 to 112, bottom plate portions 207 to 212, and side plate portions 407 to 412. Detecting units 81, 82 are fixed to the metal component 51. Detecting units 83, 84 are fixed to the metal component 52. The metal component 51 and the metal component 52 are disposed such that the eight elastic sections 31 to 38, the top plate portions 101 to 112, the bottom plate portions 201 to 212, the side plate portions 401 to 412, and the detecting units 81 to 84 are disposed similarly to the structure 5 of FIGS. 11A to 12B.

Figure 21B:
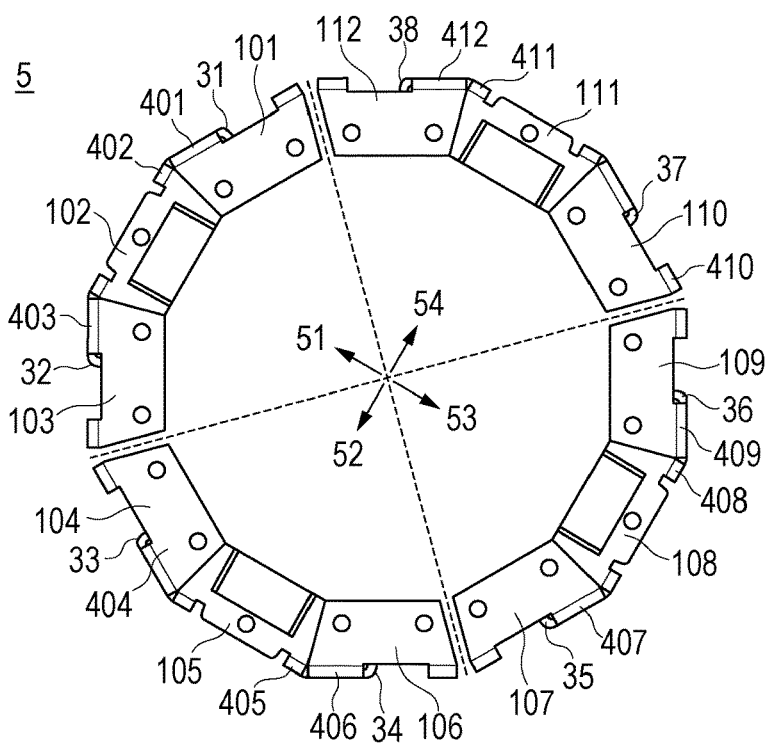

FIG. 21B shows an example in which the elastic section group 3 of the structure 5 is distributed among four metal components 51, 52, 53, 54. The quarter-annular metal component 51 has two elastic sections 31, 32. The quarter-annular metal component 52 has two elastic sections 33, 34. The quarter-annular metal component 53 has two elastic sections 35, 36. The quarter-annular metal component 54 has two elastic sections 37, 38. The metal component 51 has top plate portions 101 to 103, bottom plate portions 201 to 203, and side plate portions 401 to 403. The metal component 52 has top plate portions 104 to 106, bottom plate portions 204 to 206, and side plate portions 404 to 406. The metal component 53 has top plate portions 107 to 109, bottom plate portions 207 to 209, and side plate portions 407 to 409. The metal component 54 has top plate portions 110 to 112, bottom plate portions 210 to 212, and side plate portions 410 to 412. A detecting unit 81 is fixed to the metal component 51. A detecting unit 82 is fixed to the metal component 52. A detecting unit 83 is fixed to the metal component 53. A detecting unit 84 is fixed to the metal component 54.

The metal components 51 to 54 are disposed such that the eight elastic sections 31 to 38, the top plate portions 101 to 112, the bottom plate portions 201 to 212, the side plate portions 401 to 412, and the detecting units 81 to 84 are disposed similarly to the structure 5 of FIGS. 11A to 12B.

When the structure 5 is made up of a plurality of metal components each having at least two elastic sections, the accuracy of the structure 5 is improved by selecting each of the plurality of metal components from among metal components that provide sufficient performance. As the number of elastic sections included in one metal component increases, the yield of the one metal component can decrease. For this reason, by reducing the number of elastic sections included in one metal component to increase the number of metal components, the yield of the structure 5 is improved while the number of elastic sections is equivalent. The structure 5 is divided into two in the example shown in FIG. 21A, and the structure 5 is divided into four in the example shown in FIG. 21B. Alternatively, the structure 5 may be divided into three or may be divided into six. However, as the number of divisions of the structure 5 (the number of metal components having elastic sections) increases, assembly of the structure 5 tends to be complicated, so the number of divisions of the structure 5 is preferably about four.

A plurality of metal components that make up the structure 5 may be prepared by bending each of separate metal components, or a plurality of metal components may be prepared by bending one metal member and then cutting the metal member.

Figure 21C:
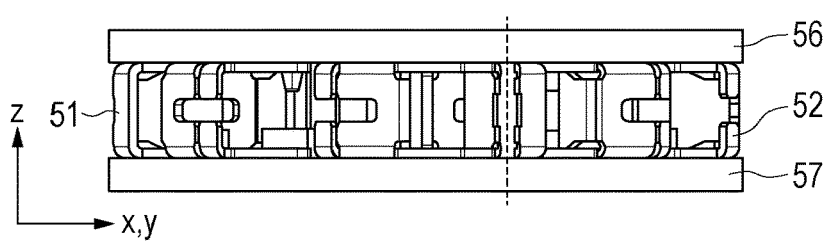

When the structure 5 is made up of a plurality of metal components each having at least two elastic sections, four or more elastic sections disposed separately on these plurality of metal components can similarly deform. Therefore, the plurality of metal components can be coupled by a reinforcement component. In the mode shown in FIG. 21C, the metal component 51 and the metal component 52, shown in FIG. 21A or FIG. 21B, are coupled via the reinforcement component 56. The reinforcement component 56 is joined with the top surface section of the metal component 51 and is joined with the top surface section of the metal component 52. The reinforcement component 56 overlaps the elastic sections of the metal component 51 and the elastic sections of the metal component 52. The metal component 51 and the metal component 52 are coupled via the reinforcement component 57. The reinforcement component 57 is joined with the bottom surface section of the metal component 51 and is joined with the bottom surface section of the metal component 52. The reinforcement component 57 overlaps the elastic sections of the metal component 51 and the elastic sections of the metal component 52. The reinforcement component 56 may be divided into a plurality of reinforcement components 56a, 56b, and the reinforcement component 57 may be divided into a plurality of reinforcement components 57a, 57b. In this way, the mode in which each of the reinforcement components 56, 57 is divided, the mode of FIG. 20B, and the mode of FIG. 21B can be combined. For example, the reinforcement component 56a may couple the metal component 51 with the metal component 52, and the reinforcement component 56b may couple the metal component 53 with the metal component 54. Only with this configuration, the metal component 51 and the metal component 54 are not coupled, and the metal component 52 and the metal component 53 are not coupled. For this reason, additionally, the reinforcement component 57a may couple the metal component 51 with the metal component 54, and the reinforcement component 57b may couple the metal component 52 with the metal component 53. Thus, the mode in which the four metal components 51 to 54 are coupled to one another by the four reinforcement components 56a, 56b, 57a, 57b is obtained.

The mode of FIG. 21B will be more specifically described with reference to FIGS. 22A to 22H. Each of the metal components 51 to 54 shown in FIG. 21B is formed by bending the metal member 50 shown in FIG. 22A.

Figure 22A:
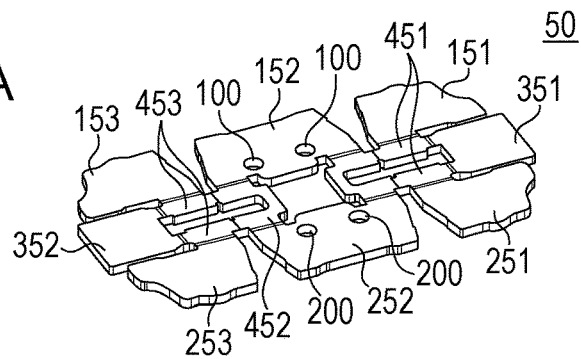
FIGS. 22A to 22H are schematic diagrams illustrating a manufacturing method for a sensor.

In the step shown in FIG. 22A, the metal member 50 is prepared. The metal member 50 has side plate portions 451, 452, 453, top plate portions 151, 152, 153 respectively connected to the side plate portions 451, 452, 453, bottom plate portions 251, 252, 253 respectively connected to the side plate portions 451, 452, 453, and elastic sections 351, 352 respectively connecting with the side plate portions 451, 453.

Figure 22B:
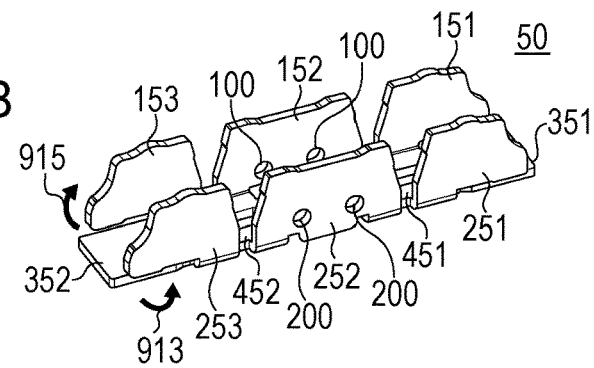

In the step shown in FIG. 22B, a first bending work in which the top plate portions 151 to 153 are bent in the direction of an arrow 915 is performed such that the metal member 50 is bent at a connection between each of the side plate portions 451 to 453 and an associated one of the top plate portions 151 to 153. A second bending work in which the bottom plate portions 251 to 253 are bent in the direction of an arrow 913 is performed such that the metal member 50 is bent at a connection between each of the side plate portions 451 to 453 and an associated one of the bottom plate portions 251 to 253. A bending angle of each of the first and second bending works ranges from 80° to 100° (in this example, 90°).

Figure 22C:
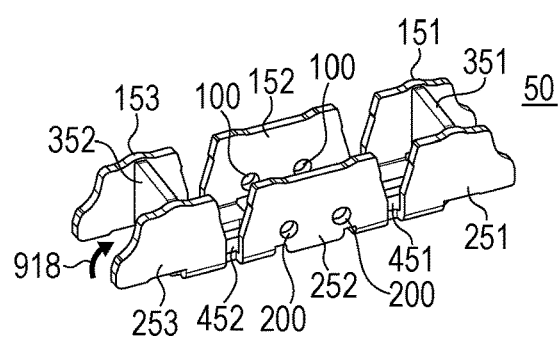

In the step shown in FIG. 22C, a third bending work in which the elastic sections 351, 352 are bent in the direction of an arrow 918 is performed such that the metal member 50 is bent at a connection between each of the side plate portions 451, 453 and an associated one of the elastic sections 351, 352. A bending angle of the third bending work ranges from 80° to 100° (in this example, 90°).

Figure 22D:
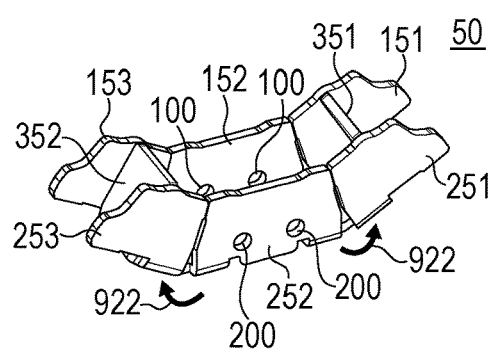

In the step shown in FIG. 22D, a fourth bending work in which the side plate portions 451, 452 are respectively bent in the directions of arrows 922 is performed such that the metal member 50 is bent at a connection between the side plate portion 451 and the side plate portion 452 and at a connection between the side plate portion 452 and the side plate portion 453. A bending angle of the fourth bending work ranges from 20° to 40° (in this example, 30°).

Figure 22E:
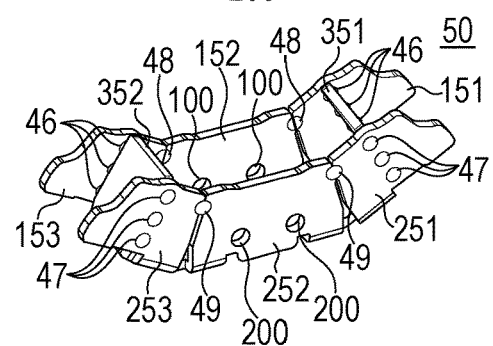

In the step shown in FIG. 22E, the portions of the metal member 50 are welded to each other. The top plate portion 151 and the elastic section 351 are joined by joints 46. The top plate portion 153 and the elastic section 353 are joined by joints 46. The bottom plate portion 251 and the elastic section 352 are joined by joints 47. The bottom plate portion 253 and the elastic section 352 are joined by joints 47. The top plate portion 151 and the top plate portion 152 are joined by a joint 48. The top plate portion 152 and the top plate portion 153 are joined by a joint 48. The bottom plate portion 251 and the bottom plate portion 252 are joined by a joint 49. The bottom plate portion 252 and the bottom plate portion 253 are joined by a joint 49.

In this way, four metal components 51 to 54 each having the elastic sections 351, 352 are prepared.

Figure 22F:
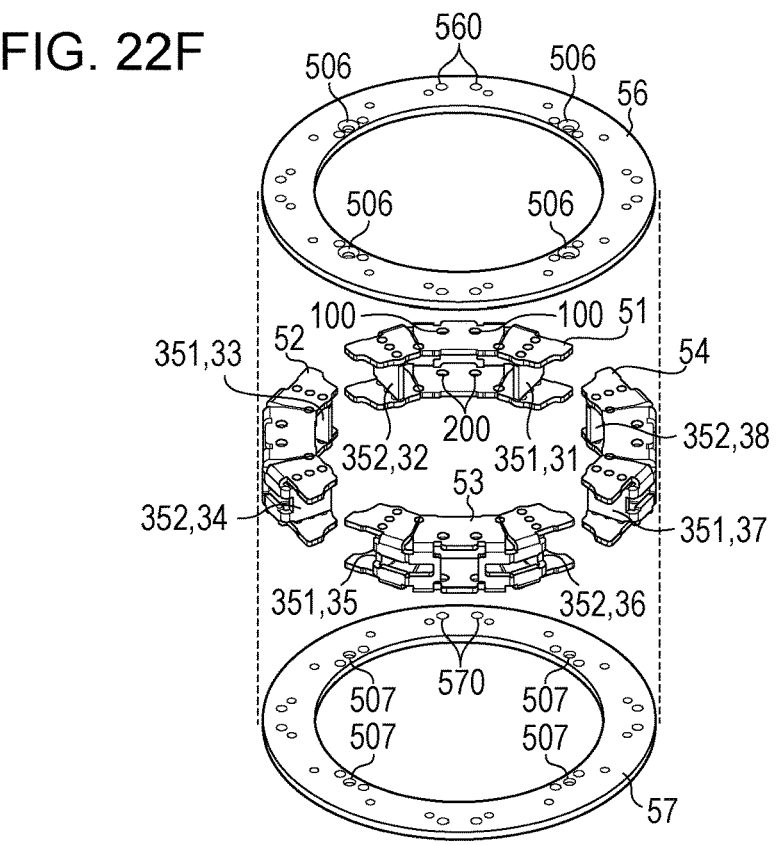

In the step shown in FIG. 22F, in addition to the four metal components 51 to 54, reinforcement components 56, 57 are prepared. The reinforcement component 56 has various fixing holes 560, 506. The reinforcement component 57 has various fixing holes 570, 507. The reinforcement component 56 and the reinforcement component 57 sandwich the four metal components 51 to 54. The metal components 51 to 54 are disposed such that an imaginary circle passes through the elastic sections 351, 352 of each of the metal components 51 to 54. The elastic section 351 of the metal component 51 corresponds to the elastic section 31 in FIGS. 11A to 13D. The elastic section 352 of the metal component 51 corresponds to the elastic section 32 in FIGS. 11A to 13D. The elastic section 351 of the metal component 52 corresponds to the elastic section 33 in FIGS. 11A to 13D. The elastic section 352 of the metal component 52 corresponds to the elastic section 34 in FIGS. 11A to 13D. The elastic section 351 of the metal component 53 corresponds to the elastic section 35 in FIGS. 11A to 13D. The elastic section 352 of the metal component 53 corresponds to the elastic section 36 in FIGS. 11A to 13D. The elastic section 351 of the metal component 54 corresponds to the elastic section 37 in FIG. 11A to 13D. The elastic section 352 of the metal component 54 corresponds to the elastic section 38 in FIGS. 11A to 13D.

The top plate portion 151 of the metal component 51 corresponds to the top plate portion 101 in FIGS. 11A to 13D. The top plate portion 152 of the metal component 51 corresponds to the top plate portion 102 in FIGS. 11A to 13D. The top plate portion 153 of the metal component 51 corresponds to the top plate portion 103 in FIGS. 11A to 13D. The top plate portion 151 of the metal component 52 corresponds to the top plate portion 104 in FIGS. 11A to 13D. The top plate portion 152 of the metal component 52 corresponds to the top plate portion 105 in FIGS. 11A to 13D. The top plate portion 153 of the metal component 52 corresponds to the top plate portion 106 in FIGS. 11A to 13D. The top plate portion 151 of the metal component 53 corresponds to the top plate portion 107 in FIGS. 11A to 13D. The top plate portion 152 of the metal component 53 corresponds to the top plate portion 108 in FIGS. 11A to 13D. The top plate portion 153 of the metal component 53 corresponds to the top plate portion 109 in FIGS. 11A to 13D. The top plate portion 151 of the metal component 54 corresponds to the top plate portion 110 in FIGS. 11A to 13D. The top plate portion 152 of the metal component 54 corresponds to the top plate portion 111 in FIGS. 11A to 13D. The top plate portion 153 of the metal component 54 corresponds to the top plate portion 112 in FIGS. 11A to 13D.

The bottom plate portion 251 of the metal component 51 corresponds to the bottom plate portion 201 in FIGS. 11A to 13D. The bottom plate portion 252 of the metal component 51 corresponds to the bottom plate portion 202 in FIGS. 11A to 13D. The bottom plate portion 253 of the metal component 51 corresponds to the bottom plate portion 203 in FIGS. 11A to 13D. The bottom plate portion 251 of the metal component 52 corresponds to the bottom plate portion 204 in FIGS. 11A to 13D. The bottom plate portion 252 of the metal component 52 corresponds to the bottom plate portion 205 in FIG. 11A to 13D. The bottom plate portion 253 of the metal component 52 corresponds to the bottom plate portion 206 in FIGS. 11A to 13D. The bottom plate portion 251 of the metal component 53 corresponds to the bottom plate portion 207 in FIGS. 11A to 13D. The bottom plate portion 252 of the metal component 53 corresponds to the bottom plate portion 208 in FIGS. 11A to 13D. The bottom plate portion 253 of the metal component 53 corresponds to the bottom plate portion 209 in FIGS. 11A to 13D. The bottom plate portion 251 of the metal component 54 corresponds to the bottom plate portion 210 in FIGS. 11A to 13D. The bottom plate portion 252 of the metal component 54 corresponds to the bottom plate portion 211 in FIGS. 11A to 13D. The bottom plate portion 253 of the metal component 54 corresponds to the bottom plate portion 212 in FIGS. 11A to 13D.

The side plate portion 451 of the metal component 51 corresponds to the side plate portion 401 in FIGS. 11A to 13D. The side plate portion 452 of the metal component 51 corresponds to the side plate portion 402 in FIGS. 11A to 13D. The side plate portion 453 of the metal component 51 corresponds to the side plate portion 403 in FIGS. 11A to 13D. The side plate portion 451 of the metal component 52 corresponds to the side plate portion 404 in FIGS. 11A to 13D. The side plate portion 452 of the metal component 52 corresponds to the side plate portion 405 in FIGS. 11A to 13D. The side plate portion 453 of the metal component 52 corresponds to the side plate portion 406 in FIGS. 11A to 13D. The side plate portion 451 of the metal component 53 corresponds to the side plate portion 407 in FIGS. 11A to 13D. The side plate portion 452 of the metal component 53 corresponds to the side plate portion 408 in FIGS. 11A to 13D. The side plate portion 453 of the metal component 53 corresponds to the side plate portion 409 in FIGS. 11A to 13D. The side plate portion 451 of the metal component 54 corresponds to the side plate portion 410 in FIGS. 11A to 13D. The side plate portion 452 of the metal component 54 corresponds to the side plate portion 411 in FIGS. 11A to 13D. The side plate portion 453 of the metal component 54 corresponds to the side plate portion 412 in FIGS. 11A to 13D.

Figure 22G:
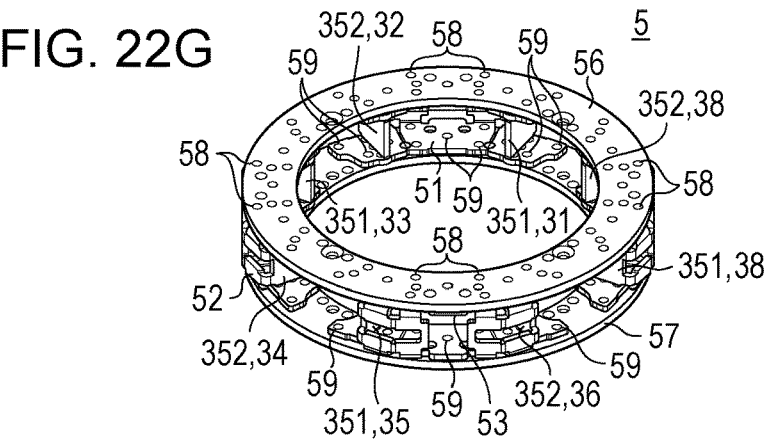

In the step shown in FIG. 22G, the reinforcement component 56 and the top plate portions 151 to 153 of each of the metal components 51 to 54 by joints 58, and the reinforcement component 57 and the bottom plate portions 251 to 253 by joints 59.

Figure 22H:
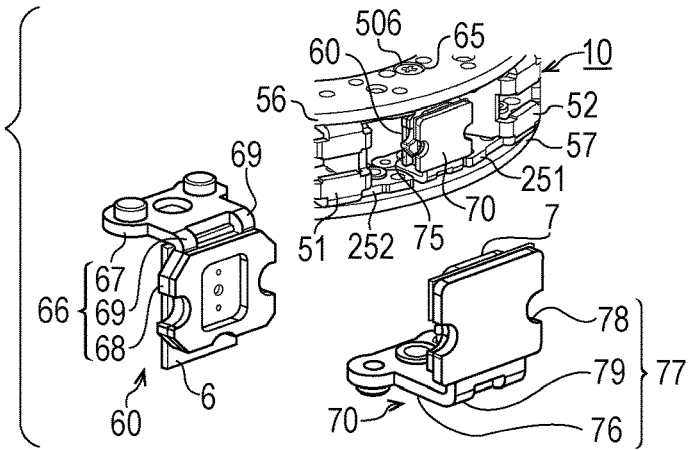

In the step shown in FIG. 22H, a head unit 60 including a component 6 that is the detection head of an encoder and a scale unit 70 including a component 7 that is the scale of the encoder are fixed to the structure 5. The head unit 60 includes the component 6 and a holding component 66 that holds the component 6. The holding component 66 holding the component 6 is fixed to the reinforcement component 56 by a fixing component 65, such as a screw, a rivet, and a bolt. The fixing component 65 for fixing the holding component 66 is inserted into the hole 506 and coupled to the holding component 66. The scale unit 70 includes the component 7 and a holding component 77 that holds the component 7. The holding component 77 for holding the component 7 is fixed to the reinforcement component 57 by a fixing component 75, such as a screw, a rivet, and a bolt. The fixing component 75 for fixing the holding component 77 is inserted into the hole 507 and coupled to the holding component 77.

The holding component 66 has a fixing portion 67 fixed to the reinforcement component 56, and a holding portion 68 holding the component 6. The holding component 66 is bent by bending at a connection 69 between the fixing portion 67 and the holding portion 68. The holding component 77 has a fixing portion 76 fixed to the reinforcement component 57, and a holding portion 78 holding the component 7. The holding component 77 is bent by bending at a connection 79 between the fixing portion 76 and the holding portion 78.

The fixing portion 67 of the holding component 66 in the detecting unit 81 is provided between the top plate portion 153 (which corresponds to a top plate portion 103) of the metal component 51 and the top plate portion 151 (which corresponds to a top plate portion 104) of the metal component 52.

The fixing portion 76 of the holding component 77 in the detecting unit 82 is provided between the bottom plate portion 253 (which corresponds to a bottom plate portion 203) of the metal component 51 and the bottom plate portion 251 (which corresponds to a bottom plate portion 204) of the metal component 52. The fixing portion 67 of the holding component 66 in the detecting unit 82 is provided between the top plate portion 153 (which corresponds to a top plate portion 106) of the metal component 52 and the top plate portion 151 (which corresponds to a top plate portion 107) of the metal component 53. The fixing portion 76 of the holding component 77 in the detecting unit 82 is provided between the bottom plate portion 253 (which corresponds to a bottom plate portion 206) of the metal component 52 and the bottom plate portion 251 (which corresponds to a bottom plate portion 207) of the metal component 53. The fixing portion 67 of the holding component 66 in the detecting unit 83 is provided between the top plate portion 153 (which corresponds to a top plate portion 109) of the metal component 53 and the top plate portion 151 (which corresponds to a top plate portion 110) of the metal component 54. The fixing portion 76 of the holding component 77 in the detecting unit 83 is provided between the bottom plate portion 253 (which corresponds to a bottom plate portion 209) of the metal component 53 and the bottom plate portion 251 (which corresponds to a bottom plate portion 210) of the metal component 54. The fixing portion 67 of the holding component 66 in the detecting unit 84 is provided between the top plate portion 153 (which corresponds to a top plate portion 112) of the metal component 54 and the top plate portion 151 (which corresponds to a top plate portion 101) of the metal component 51. The fixing portion 76 of the holding component 77 in the detecting unit 84 is provided between the bottom plate portion 253 (which corresponds to a bottom plate portion 212) of the metal component 54 and the bottom plate portion 251 (which corresponds to a bottom plate portion 201) of the metal component 51.

The holding portions 68, 78 are respectively bent with respect to the fixing portions 67, 76. The component 6 and the component 7 face each other in the r direction (radial direction). A force (torque) in the θ direction can be detected from a relative displacement between the component 6 and the component 7 in the θ direction resulting from a deformation of the structure 5. Here, the example in which the holding components 66, 77 are respectively fixed to the reinforcement components 56, 57 has been described. Alternatively, the reinforcement components 56, 57 may respectively have holding portions that hold the components 6, 7, and the components 6, 7 may be fixed to the holding portions of the reinforcement components 56, 57.

The sensor 10 can be mounted on various machine devices. Various machine devices each can include a prime mover (electric motor), such as a motor and an engine, and the sensor 10. Various machine devices include video devices, such as cameras, optical devices, such as lenses, business devices, such as printers and copying machines, medical devices, such as CTs and MRIs, industrial devices, such as robots and exposure machines, and transportation devices, such as vehicles, ships, and airplanes. Vehicles can include automobiles, bicycles, and railroad vehicles. Various machine devices may be medical devices or nursing-care devices, such as powered suits and artificial limbs. When the sensor 10 that measures the amount of mechanical energy is mounted on these machine devices and then a force that occurs in a movable portion and near the movable portion, the operations of the machine devices can be controlled.

FIGS. 4A and 4B illustrate examples of the usage mode of the sensor 10. A machine device 1000 including the sensor 10 includes a link 630 and a link 640. A link is a machine element that relatively moves, and a coupling portion between a link and a link is a joint. For example, the link 630 and the link 640 relatively rotate about an axis 680 that is a rotation axis. The sensor 10 is provided between the link 630 and the link 640. The sensor 10 is fixed to the link 630 by fixing members 650, such as screws. The sensor 10 is fixed to the link 640 by fixing members 660, such as screws and bolts. Each of the fixing members 660 can be inserted into at least one of the above-described hole 100 and hole 560. Each of the fixing members 650 can be inserted into at least one of the above-described hole 200 and hole 570. A prime mover (not shown) of the device 1000 relatively moves the link 630 and the link 640.

In the sensor 10 of FIG. 4A, the top surface section 1 of the metal component 51 is fixed to the link 640 by the fixing members 660, and the bottom surface section 2 of the metal component 51 is fixed to the link 630 by the fixing members 650. In the sensor 10 of FIG. 4B, the reinforcement component 56 fixed to the top surface section 1 is fixed to the link 640 by the fixing members 660, and the reinforcement component 57 fixed to the bottom surface section 2 is fixed to the link 630 by the fixing members 650.

Figure 23A:
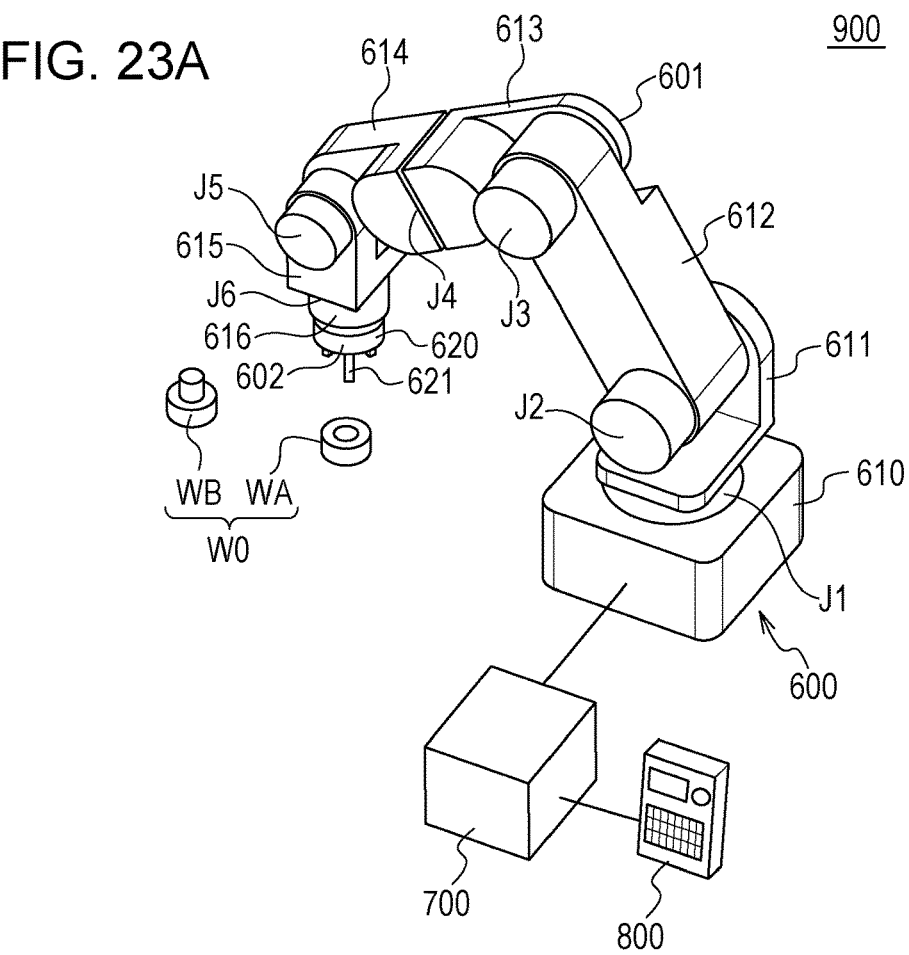
FIGS. 23A and 23B are schematic diagrams each illustrating a device.
Figure 23B:
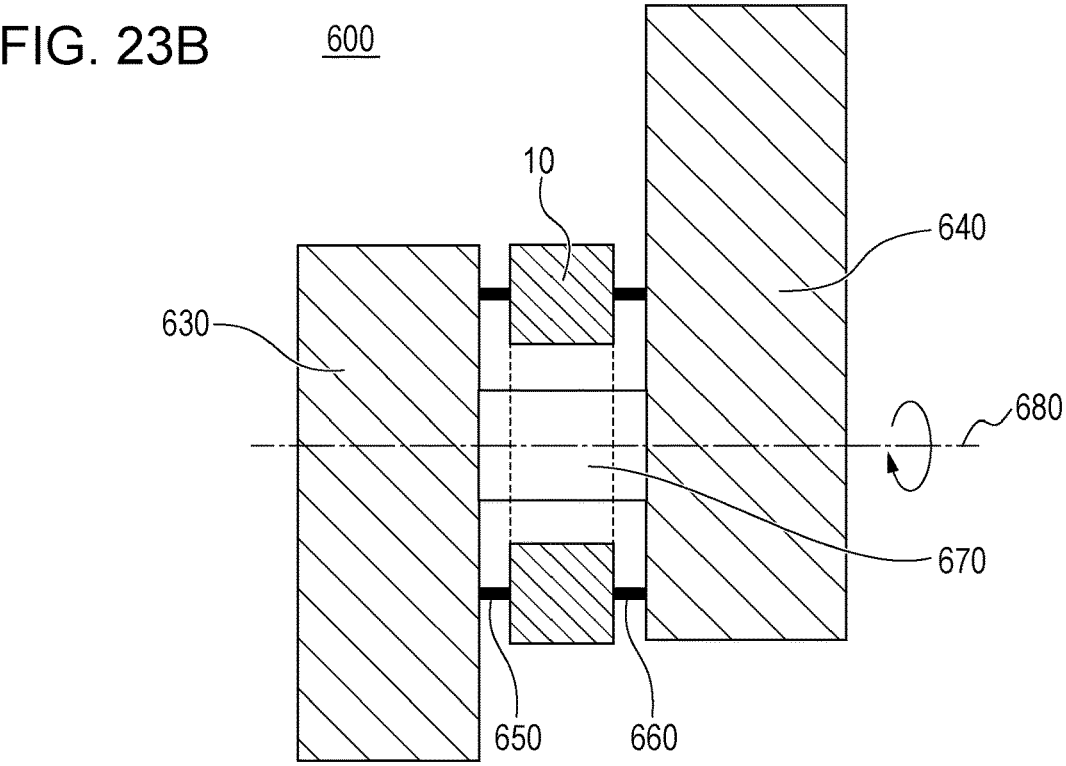

In recent years, a robot 600 as shown in FIGS. 23A and 23B is used. The robot 600 operates in accordance with a robot program for the purpose of production of products. As for production of products that need accuracy in assembly operation, the following control method is used. In the control method, the sensor 10 capable of acquiring mechanical information, such as torque, is disposed in the robot 600, a force that is applied to a joint is measured, and the operation of the robot 600 is controlled. A torque sensor that uses a detector capable of detecting a deformation of the structure 5 that is a component of the sensor 10 and that detects a torque applied to the joint in accordance with the detected deformation and the rigidity of the structure 5 has become a focus of attention as the sensor 10 of this type. In twisting about a rotation axis, a force of Mz is on the rotation axis of torque, and forces in the other directions are other-axis forces. Other-axis forces become a disturbance (other-axis interference) on torque detection. A twisting amount caused by other-axis interference becomes a factor of disturbance on torque detection. When the structure 5 includes the top surface section 1 and the bottom surface section 2 and further includes the reinforcement components 56, 57, other-axis interference is reduced.

FIGS. 5A to 6C schematically illustrate methods of torque detection using the sensor 10. FIGS. 5A to 5C are associated with the mode of FIG. 4A. FIGS. 6A to 6C are associated with the mode of FIG. 4B.

FIG. 5A and FIG. 6A show a state where no torque is occurring. This state is defined as an initial position of the component 6, attached to the top surface section 1, and the component 7.

FIG. 5B and FIG. 6B show a state where, for example, the axis 680 shown in FIG. 4A or FIG. 4B rotates to generate a torque. In this case, the top surface section 1 coupled to the link 640 and the bottom surface section 2 coupled to the link 630 are displaced in the rotation direction. Furthermore, the top surface section 1 and the bottom surface section 2 elastically deform, and the amount of deformation is proportional to the magnitude of torque generated.

Here, in the positional relationship between the component 6 and the component 7 in FIG. 5B or FIG. 6B, there is a change 930 from the initial position shown in FIG. 5A or FIG. 6A. The sensor 10 measures the change 930 and detects the value of torque generated in accordance with the measured value. For this purpose, a rotational rigidity Gz [kNm/rad] that is a torque Nt [kNm] used to rotate the sensor 10 by a unit angle [rad] is obtained in advance by measurement or finite element method. When the rotational angle measured by the component 6 and the component 7 is θ, a torque Nt generated is detected as Nt=Gz×θ [kNm]. In terms of this point, the sensors 10 of FIG. 4A and FIG. 4B can similarly detect a detection target force.

FIG. 5C and FIG. 6C show a state where bending moment 931 as shown in FIG. 4A or FIG. 4B is generated. In this case, with a bending deformation of the top surface section 1, the component 6 is displaced to the left in the drawing. As a result of this displacement, there occurs a displacement 932 from the initial position in the component 6 and the component 7. The displacement caused by the bending moment 931 may appear as other-axis interference to decrease the detection accuracy of the sensor 10.

In the mode of FIG. 6C, the rigidity of the structure 5 increases by the addition of the reinforcement components 56, 57. Therefore, a displacement 933 from the initial position of the component 6 and the component 7 in the event of occurrence of the bending moment 931 is smaller than the displacement 932 in the case of the configuration of FIG. 5C, so the influence of other-axis interference is reduced.

For example, an electrolytic zinc-coated steel (SECC) with a thickness Tm of 1.6 mm is subjected to punching and bending to set the inside diameter (diameter) of the metal component 51 to 78 mm, the outside diameter (diameter) to 106 mm, the thickness Hm to 15.6 mm, and the height Hc to 12.4 mm. The thickness of each of the top surface section, the bottom surface section, and the side surface section is 1.6 mm. The inside diameter (diameter) of each of the reinforcement components 56, 57 is set to 78 mm, the outside diameter (diameter) is set to 106 mm, and each of the thicknesses Sa, Sb to 2.3 mm. The elastic constants of each of the metal component 51 and the reinforcement components 56, 57 are set to a Young's modulus of 195 [GPa] and a Poisson's ratio of 0.29.

Under the above conditions, the rigidity Gb against other-axis bending moment is Gb=169 [kNm/rad] in the mode of FIG. 11C and Gb=591 [kNm/rad] in the mode of FIG. 19B by using a finite element method. In this way, by the addition of the reinforcement components 56, 57, the rigidity becomes about 3.5 times, so it appears that the effect of reducing other-axis interference is large. For the physical properties of the reinforcement components 56, 57, the specific electric resistivity is higher than or equal to 75μΩ·cm and lower than or equal to 85 μΩ·cm at room temperature, and the thermal conductivity is higher than or equal to 0.0340 cal/cm·sec·° C. and lower than or equal to 0.0540 cal/cm·sec·° C. at 100° C. The thermal expansion coefficient of each of the reinforcement components 56, 57 is higher than or equal to $9.8 \times 10^{-6}$/° C. and lower than or equal to $11.8 \times 10^{-6}$/° C. The elastic modulus is higher than or equal to $10.0 \times 10'$ kg/mm$^2$ and lower than or equal to $30.0 \times 10'$ kg/mm$^2$. Each of the reinforcement components 56, 57 contains copper and niobium.

FIG. 23A is a perspective view showing a robot system 900 according to an embodiment. In FIG. 23A, a workpiece WA is, for example, a ring-shaped member, and a workpiece WB is, for example, a member having a protrusion. A product W0 is manufactured by fitting the workpiece WA to the workpiece WB.

The robot system 900 includes a robot 600, a controller 700 that controls the robot 600, and a teaching pendant 800. The robot 600 is one example of the machine device 1000 and, in this example, an articulated robot. The robot 600 includes an articulated robot arm 601, and a robot hand 602 serving as an end effector that is the hand of the robot 600 and attached to the distal end of the robot arm 601.

The controller 700 controls the rotational angle of each of joints J1 to J6 of the robot arm 601. The robot 600 is capable of aiming the hand at a selected three-dimensional location in a selected three-direction posture within a movable range under control of the controller 700.

The teaching pendant 800 is a teaching unit that transmits data at a teaching point to the controller 700 and is used by an operator to designate the operation of the robot 600 mainly at an installation site of the robot system 900. The teaching pendant 800 has, for example, an operating section including operating keys for moving the posture (location and angle) of each joint of the robot arm 601, the location of a reference location disposed at the distal end or the like of the robot 600, or the like. When a robot operation is performed on the operating section of the teaching pendant 800, the controller 700 controls the operation of the robot arm 601 in response to the operation on the teaching pendant 800. At this time, the controller 700 runs a robot control program, and the portions of the robot 600 are controlled.

The robot hand 602 has a hand body 620 and a plurality of fingers 621 supported by the hand body 620 so as to be openable and closable. The workpiece WA can be gripped by causing the plurality of fingers 621 to perform closing operation. The workpiece WA can be released by causing the plurality of fingers 621 to perform opening operation. By gripping the workpiece WA with the plurality of fingers 621, it is possible to perform work to assemble the workpiece WA to the workpiece WB.

The robot arm 601 includes a plurality of links 611 to 616. The plurality of links 611 to 616 is rotatably coupled by the joints J1 to J6. A base 610 of the robot arm 601 is fixed to a stand 150. A driving mechanism having an electric prime mover (electric motor) is provided in each of the joints J1 to J6 of the robot arm 601. The electric motor is, for example, a servo motor. An electric prime mover with an appropriate output power for the magnitude of a torque needed is used as the driving mechanism at each of the joints J1 to J6. The sensor 10 is provided in at least one of the joints J1 to J6. The controller 700 controls the prime mover (motor) in accordance with information obtained from the sensor 10. The mechanisms of the joints J1 to J6 may have similar configurations or may be different.

For example, in the case of each joint of the robot arm 601, the sensor 10 measures a driving torque of the motor (not shown) that drives the joint, that is, a rotational driving force applied from the motor to the link. The sensor 10 is, for example, disposed at a predetermined location on a drive shaft of a drive line made up of a motor or a motor and a speed reducer, disposed inside the joint.

The robot arm 601 shown in FIGS. 23A and 23B is a robot arm having a configuration in which a plurality of links is connected to each other via an associated one of a plurality of joints (six axes) in, for example, a serial link form. The robot hand 602 that is an end effector is connected to a link 616 at the distal end of the robot arm 601. Links 611, 612, 613, 614, 615, 616 of the robot arm 601 each are connected via an associated one of joints, that is, the joints J1, J2, J3, J4, J5, J6 in the present embodiment.

The base 610 (base portion) and link 611 of the robot arm 601 are connected by the joint J1 that rotates around a rotation axis in a Z-axis direction. The joint J1 has, for example, a movable range of about ±180 degrees from the initial posture. The link 611 and link 612 of the robot arm 601 are connected by the joint J2. The rotation axis of the joint J2 coincides with a Y-axis direction in the illustrated state. The joint J2 has, for example, a movable range of about ±80 degrees from the initial posture.

The link 612 and link 613 of the robot arm 601 are connected by the joint J3. The joint J3 has, for example, a movable range of about ±70 degrees from the initial posture. The link 613 and link 614 of the robot arm 601 are connected by the joint J4. The joint J4 has, for example, a movable range of about ±180 degrees from the initial posture.

The link 614 and link 615 of the robot arm 601 are connected by the joint J5. The rotation axis of the joint J5 coincides with the Y-axis direction in the illustrated state. The joint J5 has, for example, a movable range of about ±120 degrees from the initial posture. The link 615 and link 616 of the robot arm 601 are connected by the joint J6. The joint J6 has, for example, a movable range of about ±240 degrees from the initial posture.

As described above, in the present embodiment, the rotation axes of the joints J1, J4, J6 are disposed parallel (or coaxially) with the central axes (alternate long and short dashed line) of coupled two links and are disposed such that a (relative) angle around the rotation axis of the two links can be changed. On the other hand, the rotation axes of the joints J2, J3, J5 are disposed such that a (relative) angle between the central axes (alternate long and short dashed line) of two links coupled by an associated one of the joints intersect can be changed.

The robot hand 602 (end effector), such as an (electric) hand and a (pneumatically-driven) air hand, for performing assembling work or moving work in a production line is connected at the distal end of the link 616 of the robot arm 601. It is assumed that the robot hand 602 (end effector) is attached to the link 616 by a (half) fixing device (not shown), such as screwing, or can be attached by an attaching/detaching device (not shown), such as latching (ratchet). Particularly, when the robot hand 602 is detachable, a system in which the robot arm 601 is controlled and the end effector disposed at a supply location (not shown) is detached and attached or replaced by the operation of the robot itself is also conceivable.

FIG. 23B is a schematic sectional view of one of the joints J1 to J6. The joint connects the link 630 with the link 640. The sensor 10 has an annular shape. A connection component 670 that connects the link 630 with the link 640 is provided in a space surrounded by the sensor 10. The connection component 670 is surrounded by at least four elastic sections (for example, eight elastic sections 31 to 38) included in the sensor 10. The connection component 670 may be a mechanical component, such as a motor and a speed reducer, provided in the link 630 or the link 640 or may be a mechanical shaft (shaft) that connects mechanical components to each other. The connection component 670 may be a wiring component that electrically connects an electrical component provided in the link 630 with an electrical component provided in the link 640. In this way, using the annular sensor 10 to surround the connection component 670 with the sensor 10 is beneficial to reduce the size of the robot 600. Therefore, the annular reinforcement components 56, 57 shown in FIG. 19B are suitable as compared to the disc-shaped reinforcement components 56, 57 shown in FIG. 20A. The structure 5 of the sensor 10 deforms by a force applied to at least one of the link 630 and the link 640, and the deformation is detected by the detector 8. For example, the sensor 10 can be used as a torque sensor that detects a torque around an axis 680.

The robot 600 having a torque sensor and capable of torque control is often used to assemble an automobile engine component with a weight of several kilograms or assemble a component with a weight of several hundreds of grams. On the other hand, the robot 600 is not often used to assemble a small load with a weight of about several grams applied to a component during assembly, such as operating a small component, a thin film, and a sheet with a weight of several grams. This is because the accuracy of force (torque) control of an existing articulated robot is not so high and desired accuracy for assembly in a range of a weight of about several grams applied to a component by the end effector at the distal end of the robot arm 601 has not been achieved. The sensor 10 according to the present embodiment can be used as a low-cost, high-accuracy torque sensor and allows the robot 600 to handle a small workpiece with precise operation.

The robot 600 shown in FIG. 23A may be a cooperative robot. In manufacturing a product with the use of the cooperative robot, the robot 600 cooperatively manufactures a product with a human in the range of 1 m or less from the human. In such a manufacturing method, when the human contacts with the robot 600, the contact is detected by the sensor 10 provided in the robot 600, and control, such as an operation stop, can be performed. By reducing the cost of the sensor 10 provided in the robot 600, the cost of the robot 600 is reduced, so it is possible to reduce the cost of a product manufactured by the manufacturing method using the cooperative robot and to increase the safety of the manufacturing method.

Sixth Embodiment

Figure 24A:
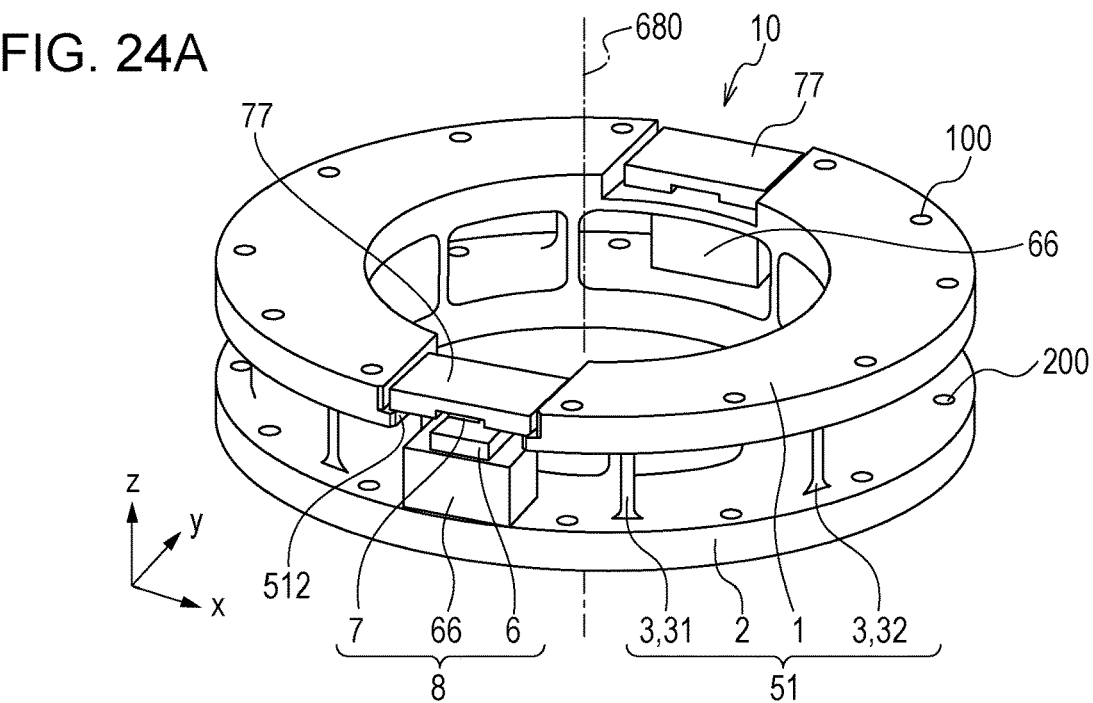
FIGS. 24A to 24C are schematic diagrams illustrating a sensor.

A sensor 10 according to a sixth embodiment will be described with reference to FIGS. 24A to 24C. FIG. 24A is a perspective view showing an example of the configuration of the sensor 10 except reinforcement components 56, 57 shown in FIG. 24B. FIG. 24C is a sectional view of the sensor 10 including the reinforcement components 56, 57.

As shown in FIG. 24A, the sensor 10 is made up of a metal component 51 and detectors 8 that are optical encoders. The two detectors 8 that are optical encoders are, for example, disposed at facing locations on a circle about a rotation axis 680 on which a torque is applied to the metal component 51. Each of the detectors 8 includes a component 7 that is a scale and a component 6 that is a head.

The metal component 51 is made up of a top surface section 1, a bottom surface section 2, and an elastic section group 3 including a plurality of (eight) elastic sections radially disposed to couple the top surface section 1 with the bottom surface section 2. In the example of FIGS. 24A to 24C, holding components 77 that each hold the scale (component 7) are provided at the top surface section 1. The top surface section 1 and the bottom surface section 2 can be fastened to each of measurement targets that are relatively displaced. The top surface section 1 has fixing or positioning holes 100. The bottom surface section 2 also has fixing or positioning holes 200.

Figure 24B:
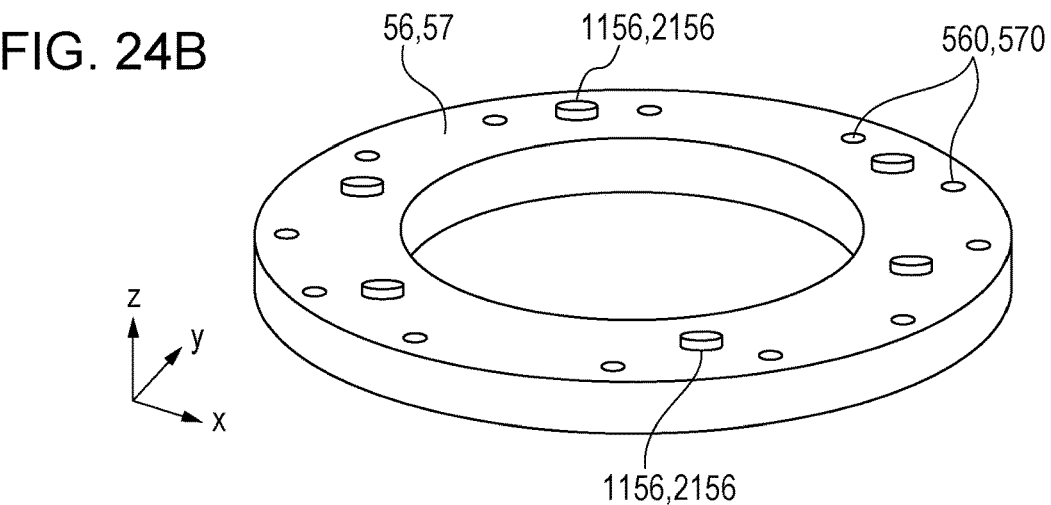
Figure 24C:
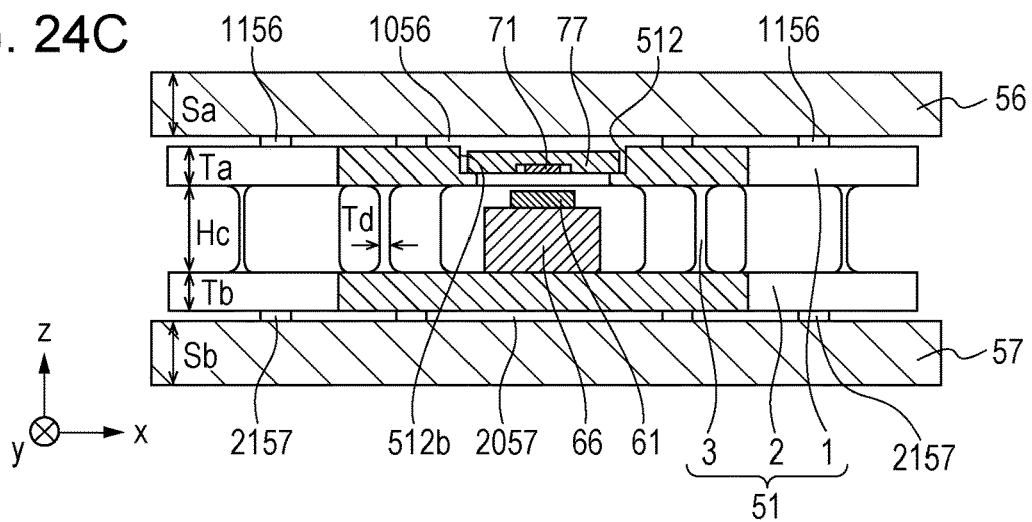

The reinforcement components 56, 57 shown in FIG. 24B are formed in a doughnut shape, a bagel shape, or a ring shape. The reinforcement components 56, 57 can provide flange regions for being respectively fastened to measurement targets that are relatively displaced, for example, the link 640 and the link 630 shown in FIG. 4B. The reinforcement components 56, 57 each have a plurality of (in this example, 12) holes 560 or holes 570 serving as fastening regions for being fastened to the link 640 or the link 630.

The holes 560 can be used to couple the reinforcement component 56 with the top surface section 1, and the holes 570 can be used to couple the reinforcement component 57 with the bottom surface section 2, Each of the reinforcement components 56, 57 has protruding portions 1156 or protruding portions 2157 with a height of less than 1 mm. As shown in FIG. 24C, a gap 1056 according to the height of the protruding portions 1156 is formed between the reinforcement component 56 and the metal component 51, and a gap 2057 according to the height of the protruding portions 2157 is formed between the reinforcement component 57 and the metal component 51. The gap 1056 is provided between the plurality of protruding portions 1156. The gap 2057 is provided between the plurality of protruding portions 2157.

Each of the regions of the metal component 51 is made of the material of a predetermined metal (steel, stainless steel, or the like) having an elastic (spring) modulus according to an intended torque detection range, its desired resolution, and the like. The metal component 51 is formed by machining a metal member.

The elastic section group 3 is configured as, for example, rib-shaped portions that couple the circular or ring-shaped top surface section 1 with the bottom surface section 2. The plurality of the elastic sections of the elastic section group 3 is disposed radially about the rotation axis 680 on which a torque is applied.

For example, the plurality of elastic sections of the elastic section group 3 is disposed at multiple (in this example, eight) locations radially about the rotation axis 680 on which a torque is applied.

Each of the detectors 8 that are optical encoders functions as an optical position sensor (encoder). The optical encoder includes a scale (component 7) and a detection head (component 6) that detects position information from the scale. The detection head (component 6) is an optical detecting portion that detects a relative rotation displacement between the top surface section 1 and the bottom surface section 2.

The component 7 (scale) is attached to the top surface section 1 via the holding component 77. The component 6 (detection head) is attached to the bottom surface section 2 via the holding component 66. The component 7 (scale) is fixed to the metal component 51 via the holding component 77. The component 6 (detection head) is fixed to the metal component 51 via the holding component 66.

In this example, the holding component 77 is fixed to a supporting section 512 of the metal component 51. As shown in FIG. 24C, the supporting section 512 has a recess shape and is provided at the top surface section 1 as a whole. A cutaway portion (opening portion) for facing the component 7 and the component 6 is formed at the outer peripheral side of the recess.

The holding component 66 is fixed to the bottom surface section 2 of the metal component 51. The component 7 that is a detection head is a reflective optical sensor including a light emitting element and a light receiving element (not shown). A scale pattern (not shown in details) is disposed on the surface of a pattern surface of the component 7 (scale), facing the component 6 (detection head). The scale pattern is configured by, for example, regularly varying light and dark or reflectivity in a specific pattern.

The scale pattern may be made up of not only a single line but also a plurality of lines of light and dark patterns (for example, different in arrangement phase) depending on the type of detection computation. The pitch of a scale pattern is determined according to a resolution or the like used to detect a location. In recent years, with an increase in the accuracy and resolution of encoders, scale patterns with a pitch of μm order are available.

The detection head applies light from the light emitting element to the scale, and the light receiving element receives light reflected from the scale. Here, when a torque around the rotation axis 680 is applied and, as a result, the metal component 51 deforms around the rotation axis, a relative position between the detection head and the scale changes, so the irradiation position of light applied to the scale shifts on the scale.

At this time, when the light applied to the scale passes through the pattern on the scale, the amount of light detected by the light receiving element of the detection head changes. A relative movement amount between the scale and the detection head is detected from the change in the amount of light. The amount of movement detected by the detection head is converted to a torque applied to the metal component 51 by a torque detection control section (not shown) made up of a control routine that a CPU runs. The torque detection control section may be made up of a torque detection control section made by hardware. An output value (the amount of movement) of the detection head is converted to a torque detection value by using a sensitivity coefficient for converting the amount of movement detected by the detection head to a torque applied to the metal component 51 by using the torque detection control section.

In this way, the sensor 10 can detect a torque around the rotation axis 680 on which a torque is applied.

The thickness Ta of the top surface section 1 shown in FIG. 24C corresponds to each of the thicknesses T3, T5, T6 in FIG. 7, and the thickness Tb of the bottom surface section 2 corresponds to each of the thicknesses T4, T7, T8 in FIG. 7. The thickness Sa of the reinforcement component 56 shown in FIG. 24C corresponds to each of the thicknesses S1, S2, S5, S7, S8 in FIG. 7, and the thickness Sb of the reinforcement component 57 corresponds to each of the thicknesses S3, S4, S6, S9, S10 in FIG. 7. The thickness Td of each of the elastic sections of the elastic section group 3 shown in FIG. 24C corresponds to each of the thicknesses T1, T2 in FIG. 7. The height Hc of each of the elastic sections of the elastic section group 3 shown in FIG. 24C corresponds to the distance D4 in FIG. 7. Td<[Ta & Tb]<[Sa & Sb]<Hc is satisfied. For example, Td=1.6 mm, Ta=Tb=3.2 mm, Sa=Sb=4.8 mm, and Hc=9.6 mm.

Seventh Embodiment

A sensor 10 according to a seventh embodiment will be described with reference to FIGS. 25A to 26. In the present embodiment, an elastic section group 3 in a structure 5 is made up of a plurality of block-shaped metal components 51, 52, 53, 54. Each of the metal components 51, 52, 53, 54 is formed by machining a metal member.

FIG. 25A is a perspective view of the metal components 51, 52, 53, 54. Each of the metal components 51, 52, 53, 54 has two elastic sections 31, 32, metal portions 11, 12, 13 that make up a top surface section 1, and metal portions 21, 22, 23 that make up a bottom surface section 2. A head unit 60 including the head of an encoder and a holding component holding the head is fixed to the metal portion 13. A scale unit 70 including the scale of the encoder and a holding component holding the scale is fixed to the metal portion 23.

FIG. 25B is an exploded view of the sensor 10. The sensor 10 has a structure such that the four metal components 51, 52, 53, 54 each having two elastic sections 31, 32 are sandwiched by reinforcement components 56, 57. The eight elastic sections are disposed such that a circle about the rotation axis of the sensor 10 passes through the eight elastic sections. Each of the reinforcement components 56, 57 has grooves 566 or grooves 576 with substantially the same width of each of the metal components 51, 52, 53, 54.

FIG. 25C shows a state where the metal components 51, 52, 53, 54 are coupled to the reinforcement component 57. The metal components 51, 52, 53, 54 are respectively fitted to grooves 576 of the reinforcement component 57. The sensor 10 as shown in FIG. 25D can be manufactured by fixing the reinforcement component 56 to the metal components 51, 52, 53, 54 in the state shown in FIG. 25C. For example, the holes 560 of the reinforcement component 56 and the holes 100 of the metal components 51 to 54 are fixed by screws, and the holes 570 of the reinforcement component 57 and the holes 200 of the metal components 51 to 54 are fixed by screws. Threaded grooves can be formed in the metal components 51 to 54.

Figure 26:
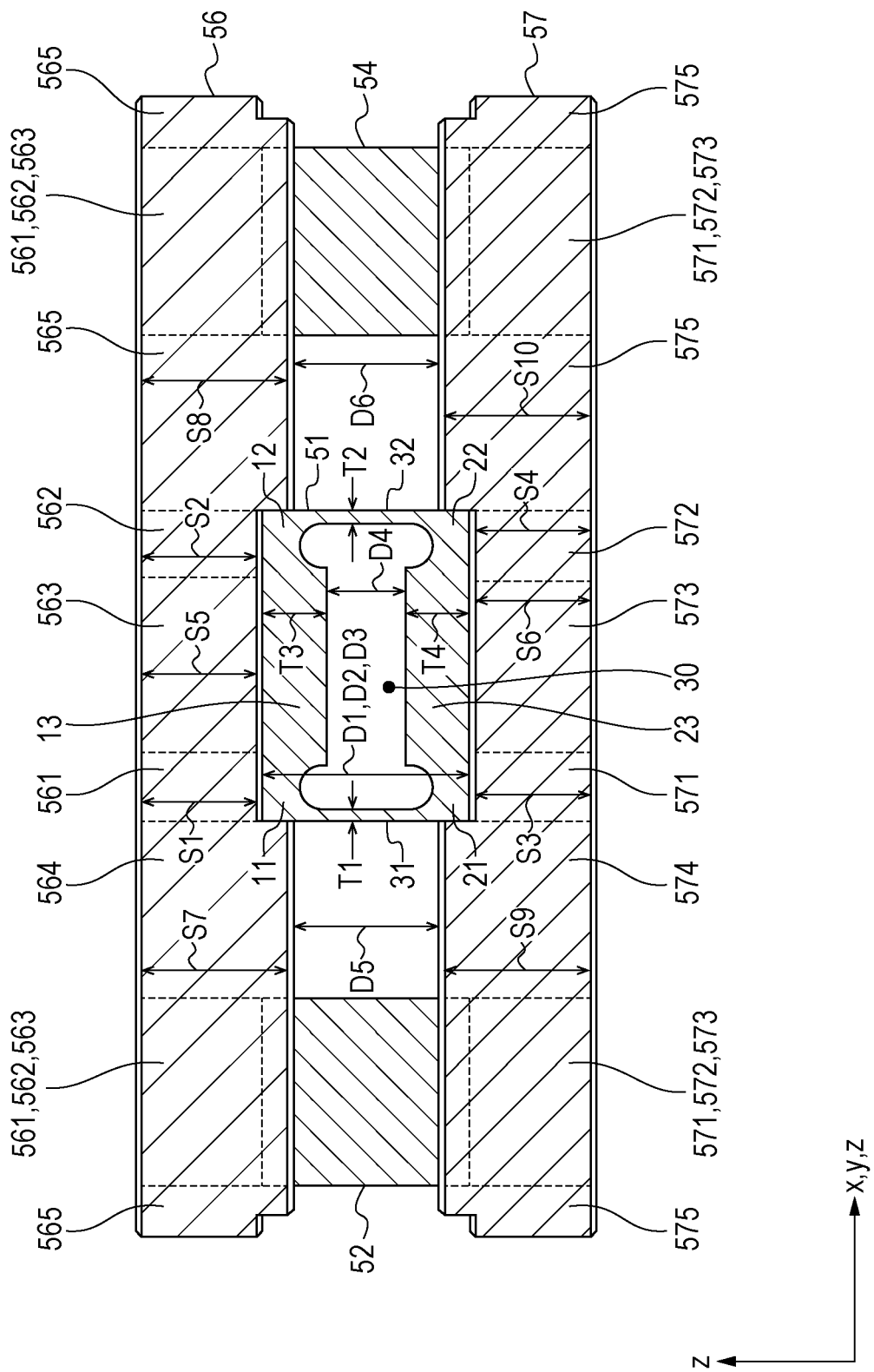
FIG. 26 is a schematic diagram illustrating a sensor.

FIG. 26 shows a side view of the sensor 10 shown in FIG. 25D. The metal components 51 to 54 are located between the reinforcement component 56 and the reinforcement component 57. In this example, each of the thicknesses S1, S2 of overlapping portions 561, 562 is equal to the thickness S5 of a relay portion 563 and may be different from the thickness S5 of the relay portion 563. Each of the thicknesses S7, S8 of extended portions 564, 565 is greater than each of the thicknesses S1, S2 of the overlapping portions 561, 562 and the thickness S5 of the relay portion 563 ([S1 & S2 & S5]<[S7 & S8]). The extended portions 564, 565 couple the overlapping portions 561, 562 associated with each of the plurality of metal components 51 to 54. The extended portions 574, 575 couple (relay) the overlapping portions 571, 572 associated with each of the plurality of metal components 51 to 54. For example, the extended portion 564 couples (relays) the overlapping portion 561 overlapping the elastic section 31 of the metal component 51 with the overlapping portion 562 overlapping the elastic section 32 of the metal component 52. For example, the extended portion 565 couples (relays) the overlapping portion 562 overlapping the elastic section 32 of the metal component 51 with the overlapping portion 561 overlapping the elastic section 31 of the metal component 54.

The distance D5 between the extended portion 564 and the extended portion 574 is shorter than the distance D1 between the overlapping portion 561 and the overlapping portion 571. The distance D6 between the extended portion 565 and the extended portion 575 is shorter than the distance D2 between the overlapping portion 562 and the overlapping portion 572. Each of the thicknesses S2, S4 of the overlapping portions 571, 572 is equal to the thickness S6 of the relay portion 573 and may be different from the thickness S6 of the relay portion 573. Each of the thicknesses S9, S10 of the extended portions 574, 575 is greater than each of the thicknesses S3, S4 of the overlapping portions 571, 572 and the thickness S6 of the relay portion 573 ([S3 & S4 & S6]<[S9 & S10]). In this example, the distance between the overlapping portion 561 and the metal component 51 is zero, and the distance between the overlapping portion 572 and the metal component 51 is zero. In the present embodiment, since the extended portions 564, 565, 574, 575 do not contact with the metal components 51 to 54, friction between each of the metal components 51 to 54 and each of the reinforcement components 56, 57 is reduced. Each of the thicknesses S5, S6 of the relay portions 563, 573 is greater than each of the thicknesses T3, T4 of the metal portions 13, 23 [S5 & S6]>[T3 & T4]). A difference between the thickness T1 of the elastic section 31 and the thickness T3 of the metal portion 13 is greater than a difference between the thickness S5 of the relay portion 563 and the thickness T3 of the metal portion 13 (|T3−T1|>S5−T31). A difference between the thickness T2 of the elastic section 32 and the thickness T4 of the metal portion 23 is greater than a difference between the thickness S6 of the relay portion 573 and the thickness T4 of the metal portion 23. The distance D4 between the metal portion 13 and the metal portion 23 can be longer than or equal to a quarter and less than or equal to a half of the distance D3 between the relay portion 563 and the relay portion 573 (D3×¼ D4 D3×½).

In one example of the present embodiment, each of the reinforcement components 56, 57 has an annular shape with an outside diameter of 100 mm to 200 mm and an inside diameter of 20 mm to 80 mm, each of the thicknesses S1 to S6 ranges from 9 mm to 13 mm, and each of the thicknesses S7 to S10 ranges from 13 mm to 17 mm. As for the metal components 51 to 54, each of T1 and T2 ranges from 1 mm to 2 mm, each of T3 and T4 ranges from 1 mm to 8 mm, each of D1 to D3 ranges from 15 mm to 25 mm, D4 ranges from 2 mm to 6 mm, and each of D5 and D6 ranges from 10 mm to 20 mm.

Eighth Embodiment

Figure 27A:
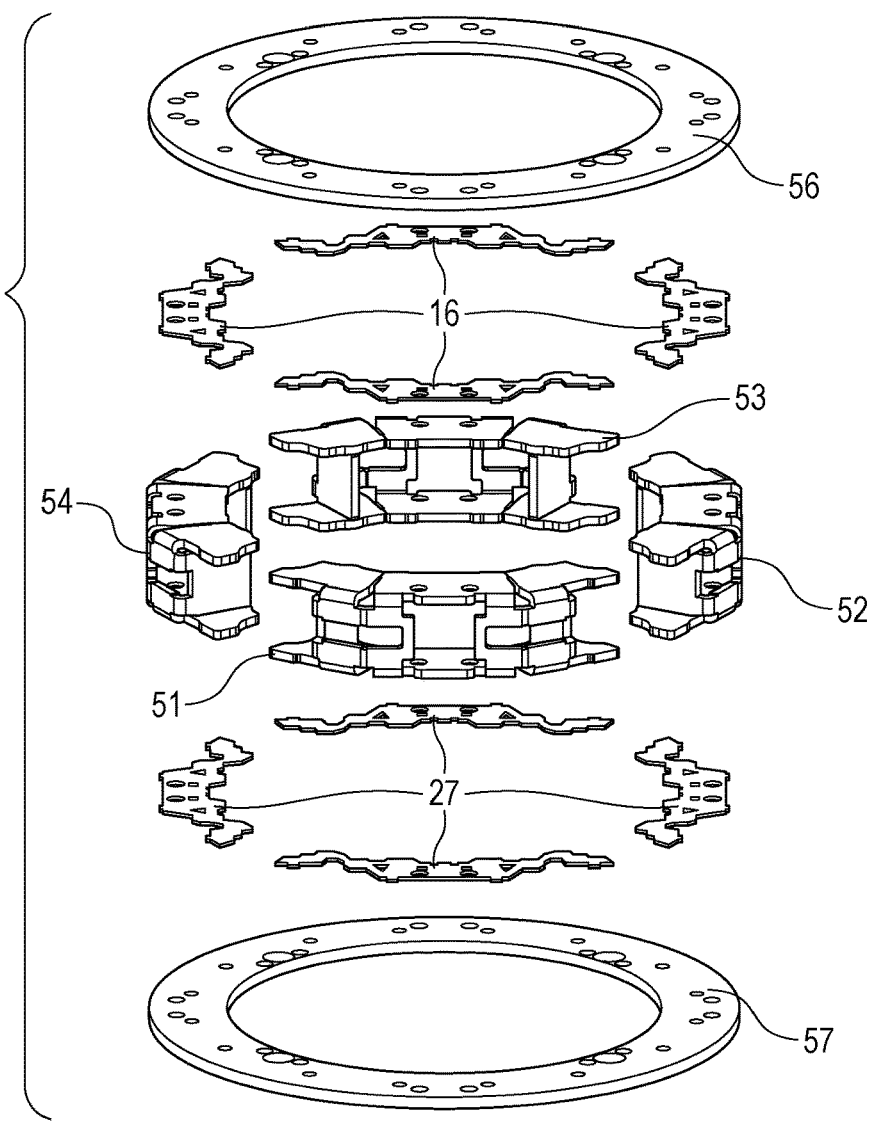
FIGS. 27A and 27B are schematic diagrams illustrating a sensor.

FIG. 27A shows a mode in which shims 16, 27 are used in addition to forming a structure 5 by using metal components 51 to 54 and reinforcement components 56, 57. The four shims 16 are disposed between the reinforcement component 56 and the four metal components 51 to 54. The four shims 27 are disposed between the reinforcement component 57 and the four metal components 51 to 54. Here, each set of the shims 16, 27 is divided into four. Alternatively, Single continuous shims may be used as in the case of the reinforcement components 56, 57.

Figure 27B:
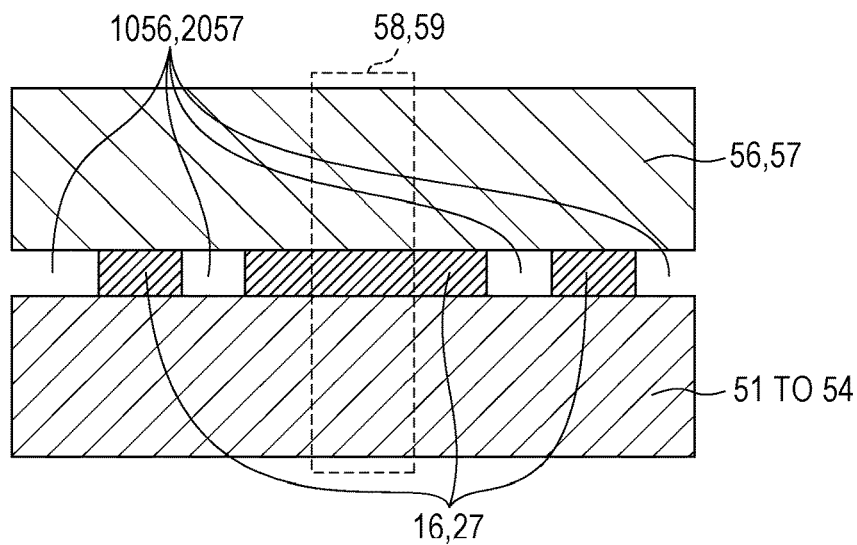

As shown in FIG. 27B, the gap 1056 equivalent to the thickness of the shims 16 is formed by the shims 16 between the reinforcement component 56 and the metal components 51 to 54, and the gap 2057 equivalent to the thickness of the shims 27 is formed by the shims 27 between the reinforcement component 57 and the metal components 51 to 54. Joints 58 can be formed by welding the reinforcement component 56, the shims 16, and the metal components 51 to 54 together. Joints 59 can be formed by welding the reinforcement component 57, the shims 27, and the metal components 51 to 54 together. The area in which the shims 16 and the metal components 51 to 54 are welded to each other to the area of the shims 16 is preferably higher than or equal to 25% and may be lower than or equal to 75%. The area in which the shims 27 and the metal components 51 to 54 are welded to each other to the area of the shims 27 is preferably higher than or equal to 25% and may be lower than or equal to 75%. The area in which the shims 16 and the metal components 51 to 54 are not welded to each other to the area of the shims 16 is preferably higher than or equal to 25% and may be lower than or equal to 75%. The area in which the shims 27 and the metal components 51 to 54 are not welded to each other to the area of the shims 27 is preferably higher than or equal to 25% and may be lower than or equal to 75%.

The area (the area when viewed in plan in the z direction) of each of the reinforcement components 56, 57 is, for example, 3800 mm², and the area of each of the top surface section 1 and the bottom surface section 2, which is the sum of the areas of the metal components 51 to 54, is, for example, 2500 mm². Assuming that the entire top surface section 1 and the entire bottom surface section 2 of the metal components 51 to 54 overlap the reinforcement components 56, 57, the area in which the reinforcement components 56, 57 overlap the metal components 51 to 54 is 2500 mm². The total area of the four shims 16 is, for example, 1700 mm², and the same applies to the four shims 27. The thickness of each of the shims 16, 27 is, for example, 30 µm. The area of a portion of the top surface section 1, not overlapping the shims 16, is 800 mm² (=2500 mm²−1700 mm²), and the area of the gap 1056 is also 800 mm². The area of a portion of the bottom surface section 2, not overlapping the shims 27, is 800 mm² (=2500 mm²−1700 mm²), and the area of the gap 2057 is also 800 mm². The area in which the reinforcement component 56 faces the metal components 51 to 54 via the gap 1056 to the area in which the reinforcement component 56 overlaps the metal components 51 to 54 is 32% (=800 mm²÷2500 mm²). The area in which the reinforcement component 57 faces the metal components 51 to 54 via the gap 2057 to the area in which the reinforcement component 57 overlaps the metal components 51 to 54 is 32% (=800 mm²÷2500 mm²). The area of one of the welding portions 58 (substantially circular shape) is about 20 mm², and, when the welding portions 58 are provided at 48 locations, the total area of the welding portions 58 is 960 mm². The area of one of the welding portions 59 (substantially circular shape) is about 20 mm², and, when the welding portions 59 are provided at 48 locations, the total area of the welding portions 59 is 960 mm². The area of the welding portions 58 (960 mm²) to the area of the shims 16 (1700 mm²) is 56.5%. The area of the welding portions 59 (960 mm²) to the area of the shims 27 (1700 mm²) is 56.5%. 43.5% of the area of the shims 16 is not welded. 43.5% of the area of the shims 27 is not welded.

Figure 28A:
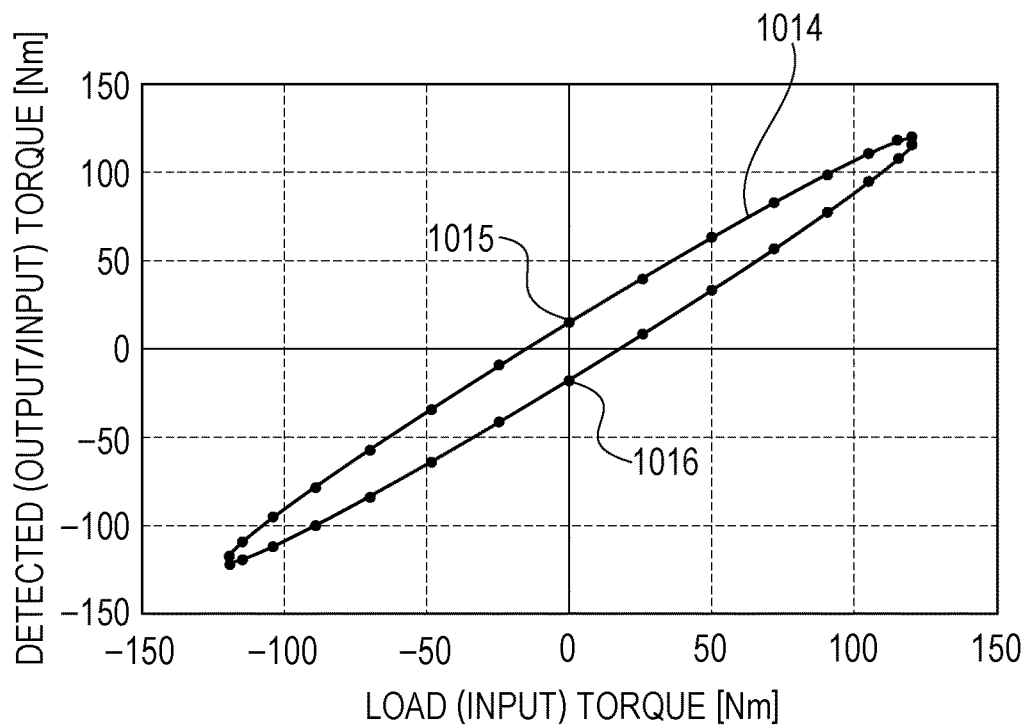
FIGS. 28A and 28B are graphs illustrating the sensor.
Figure 28B:
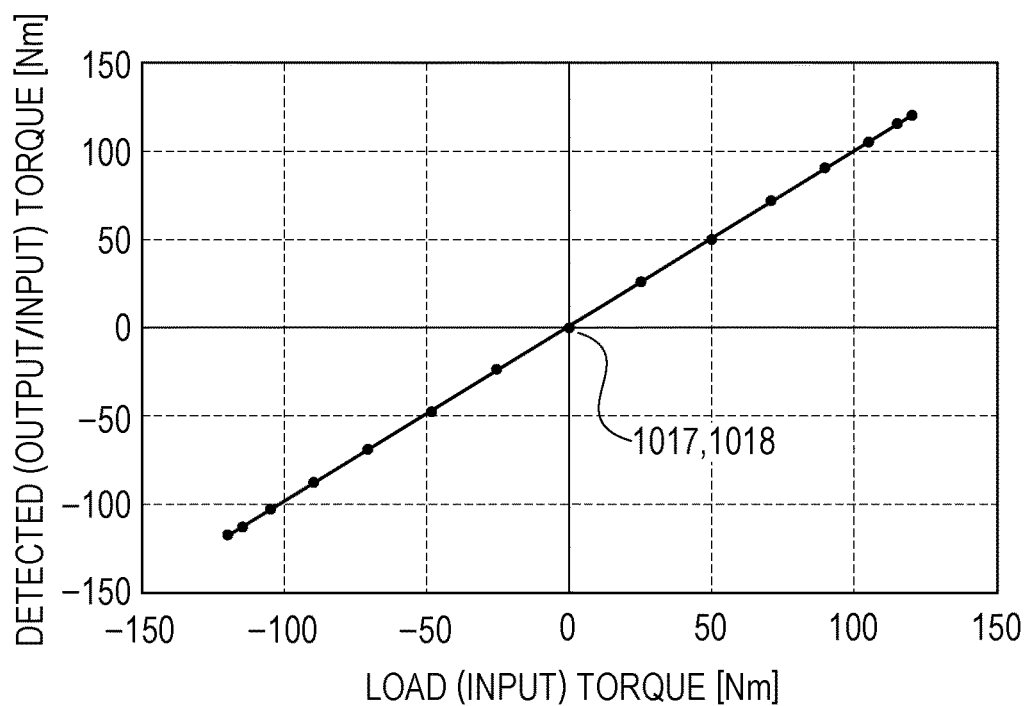

FIGS. 28A and 28B show the relationship between load (input) torque and detected (output) torque for comparison when a torque shown in the θ direction of FIGS. 4A and 4B is loaded in the sensor 10 according to the embodiment as shown in FIGS. 31A to 32B. In acquiring the characteristics of FIGS. 28A and 28B, a load (input) torque is successively changed in order of 0, +120, −120, 0 [Nm]. In FIGS. 28A and 28B, when the torque is changing in a direction from a negative value toward a positive value, the curve is convex downward; whereas, when the torque is changing in a direction from a positive value toward a negative value, the curve is convex upward. FIG. 28A shows the characteristics of the sensor 10 in the case where the shims 16, 27 shown in FIG. 27 are omitted and the gaps 1056, 2057 are not provided. FIG. 28B shows the characteristics of the sensor 10 in the case where the gaps 1056, 2057 are provided by the shims 16, 27 as shown in FIGS. 27A and 27B.

In the sensor 10 in which the gaps 1056, 2057 are not provided, friction between each of the metal components 51 to 54 and each of the reinforcement components 56, 57 is relatively large, so rotation due to a load of torque delays. Therefore, there is a large difference in output torque depending on the direction of rotation. For example, as shown in FIG. 28A, when the load (input) torque is zero, the detected (output) torque is a value of 1015 and a value of 1016, value 1015 is +15 Nm, value 1016 is −15 Nm, and there is a difference from a load (input) torque in each case. On the other hand, in the sensor 10 in which the gaps 1056, 2057 are provided, friction between each of the metal components 51 to 54 and each of the reinforcement components 56, 57 is relatively small. Therefore, a delay of rotation due to a load of torque is difficult to occur, and a difference in output torque is difficult to occur depending on the direction of rotation. For example, as shown in FIG. 28B, value 1017 and value 1018 that are detected (output) torques in the case where the load (input) torque is zero are respectively +0.8 Nm, −0.8 Nm, and a difference from the load (input) is small as compared to the case of FIG. 28A.

Figure 29A:
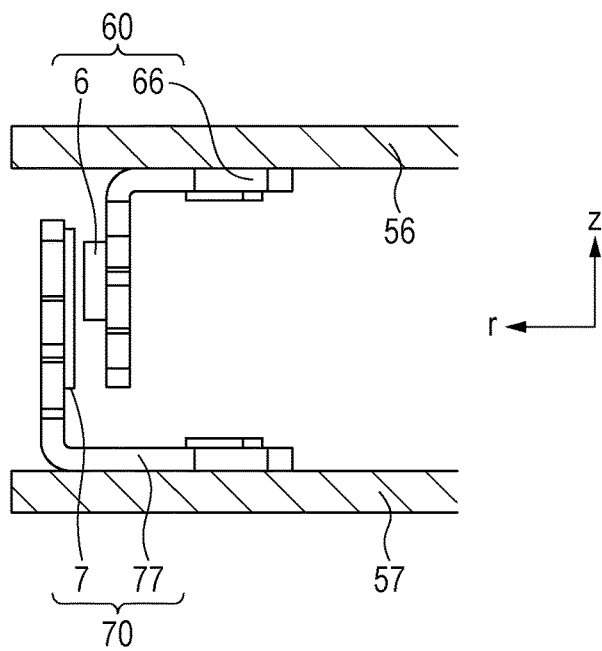
FIGS. 29A to 29C are schematic diagram illustrating the sensor.

FIG. 29A shows a mode in which the head unit 60 including the component 6 (detection head) and the holding component 66 holding the component 6 faces the scale unit 70 including the component 7 (scale) and the holding component 77 holding the component 7 in the r direction (radial direction).

The holding component 66 is fixed to the reinforcement component 56. The holding component 77 is fixed to the reinforcement component 57.

Figure 29B:
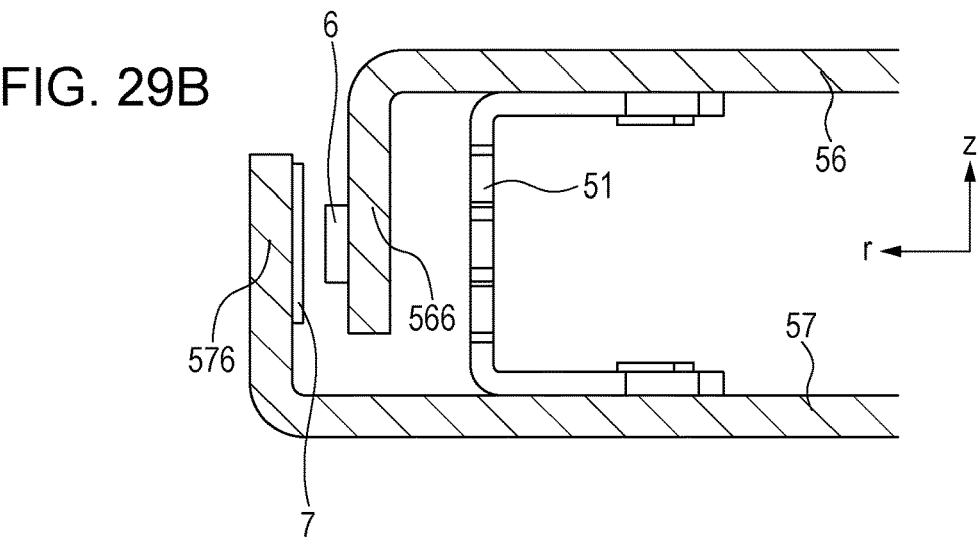

In FIG. 29B, the reinforcement component 56 has an expanded portion 566, and the component 6 is fixed to the expanded portion 566. The reinforcement component 57 has an expanded portion 576, and the component 7 is fixed to the expanded portion 576.

In FIG. 29B, the reinforcement component 56 has an expanded portion 566, and the component 6 is fixed to the expanded portion 566. The reinforcement component 57 has an expanded portion 576, and the component 7 is fixed to the expanded portion 576.

Figure 29C:
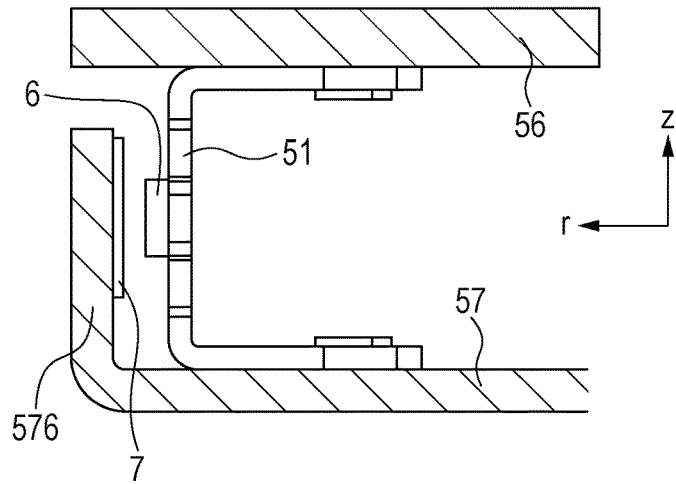

In FIG. 29C, the component 6 is fixed to the metal component 51. The reinforcement component 57 has an expanded portion 576, and the component 7 is fixed to the expanded portion 576.

Ninth Embodiment

A sensor 10 according to a ninth embodiment will be described with reference to FIGS. 30A to 34.

Figure 30A:
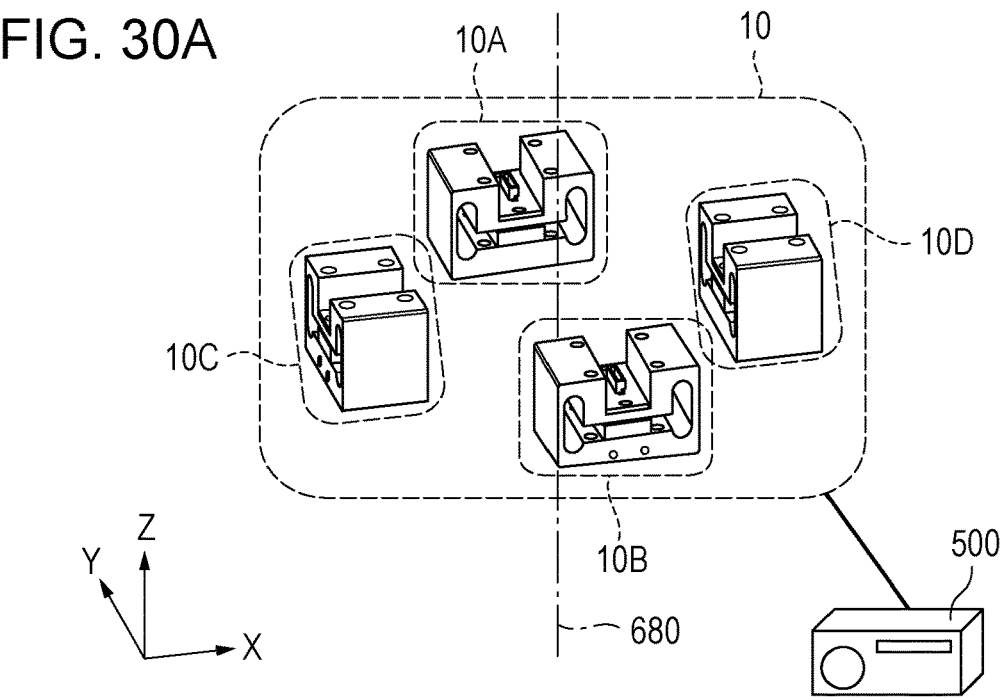
FIGS. 30A to 30C are schematic diagrams illustrating a device and a sensor.

FIG. 30A shows the configuration of the sensor 10 according to the ninth embodiment. In FIG. 30A, the sensor 10 includes a sensor module 10A, a sensor module 10B disposed so as to face the sensor module 10A, a sensor module 10C disposed in the rotation direction by 900 from each of the sensor modules 10A, 10B, and a sensor module 10D disposed so as to face the sensor module 10C, and includes a controller 500 that controls the sensor modules. Each of the sensor modules 10A, 10B, 10C, 10D detects a torque applied in the rotation direction Mo.

Figure 30B:
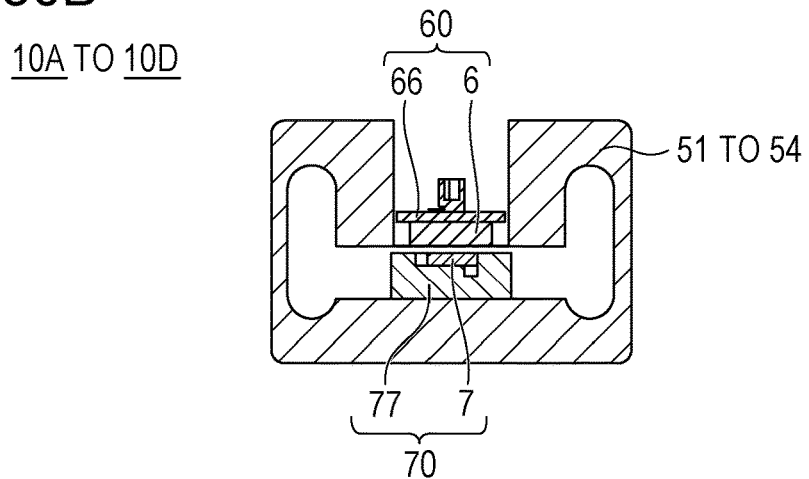
Figure 30C:
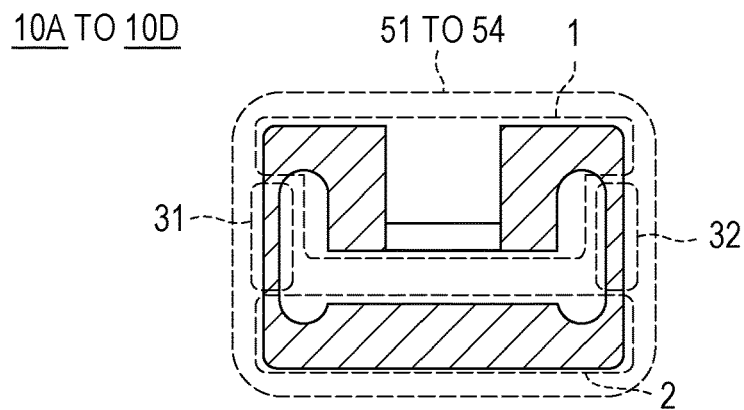

FIGS. 30B and 30C show the configuration of each of the sensor modules of the sensor 10 according to the ninth embodiment. FIGS. 25A to 25D show a configuration in the case where the sensor modules 10A to 10D are installed between a reinforcement component 56 and a reinforcement component 57. In FIGS. 30B and 30C, each of the sensor modules 10A to 10D includes an associated one of the metal components 51 to 54 each including a top surface section 1, a bottom surface section 2, and elastic sections 31, 32, a component 6 of an associated one of detecting units 81 to 84, and a component 7 of an associated one of the detecting units 81 to 84. The component 6 of each of the detecting units 81 to 84 is fixed to the top surface section 1 of the same one of the detecting units 81 to 84, and the component 7 of each of the detecting units 81 to 84 is fixed to the bottom surface section 2 of the same one of the detecting units 81 to 84. The component 6 and the component 7 face each other via a space. Each of the sensor modules 10A to 10D includes a holding component 77 holding the component 7 and a holding component 66 made up of a collar and fixed to an associated one of the metal components 51 to 54. The component 6 is a component, such as a detection head provided in a detection substrate. The component 7 is a component, such as a scale that reflects light emitted from a light source on the detection substrate.

Each of the metal components 51 to 54 includes the elastic sections 31, 32 and a clearance R portion at a connecting portion with the top surface section 1. The clearance R portion should be provided in designing the elastic sections 31, 32, and it is possible to contribute to suppressing the heights of the metal components 51 to 54.

Each of the regions of the metal components 51 to 54 is made of a predetermined material, such as resin and metal (steel, stainless steel, or the like), having an elastic (spring) modulus according to an intended torque detection range, its desired resolution, and the like. The metal components 51 to 54 may be manufactured by a 3D printer.

Specifically, slice data that is 3D printer data may be created from the design data (for example, CAD data) of the metal components 51 to 54, and the metal components 51 to 54 may be manufactured by inputting the data to an existing 3D printer.

The top surface section 1 and the bottom surface section 2 each are formed in, for example, a square shape or a rectangular shape as shown in the drawing.

The top surface section 1 is fixed to the reinforcement component 56. The bottom surface section 2 is fixed to the reinforcement component 57.

The elastic sections 31, 32 are configured as, for example, rib-shaped members that couple the square or rectangular-shaped top surface section 1 with the square or rectangular-shaped bottom surface section 2. The plurality of the elastic sections 31, 32 is disposed to face each other about the rotation axis 680 on which a torque is applied.

For example, the elastic sections 31, 32 are disposed at multiple (in this example, eight) locations in opposite positions about the rotation axis 680 on which a torque is applied. The top surface section 1 and the bottom surface section 2 have a plurality of (in this example, 16) holes 100 (for example, screw holes or tap holes) disposed to be fastened to the prime mover 631 and the reinforcement component 57.

A head unit 60 and a scale unit 70 function as an optical position sensor (encoder). As shown in FIGS. 30B and 30C, the scale unit 70 includes the component 7, such as a scale, and the head unit 60 includes the component 6, such as a detection head that detects position information from the component 7, such as a scale. The component 6, such as a detection head, is an optical detecting portion that detects a relative rotation displacement between the top surface section 1 and the bottom surface section 2.

The component 7, such as a scale, is fixed to each of the metal components 51 to 54 by double-sided adhesive tape or adhesive. The component 6, such as a detection head, is fixed to an associated one of the metal components 51 to 54 via the holding component 66.

The component 6, such as a detection head, is a reflective optical sensor including a light emitting element and a light receiving element (not shown). A scale pattern (not shown in details) is disposed on the surface of a pattern surface of the component 7, such as a scale, facing the component 6, such as a detection head. The scale pattern is configured by, for example, regularly varying light and dark or reflectivity in a specific pattern.

The scale pattern may be made up of not only a single line but also a plurality of lines of light and dark patterns (for example, different in arrangement phase) depending on the type of detection computation. The pitch of a scale pattern is determined according to a resolution or the like used to detect a location. In recent years, with an increase in the accuracy and resolution of encoders, scale patterns with a pitch of µm order are available.

The component 6, such as a detection head, applies light from the light emitting element to the component 7, such as a scale, and the light receiving element receives light reflected from the component 7, such as a scale. Here, when a torque around the rotation axis 680 is applied and, as a result, the metal components 51 to 54 deform in the x-axis direction, a relative position between the component 6, such as a detection head, and the component 7, such as a scale, changes, so the irradiation position of light applied to the component 7, such as a scale, shifts on the component 7, such as a scale.

At this time, when the light applied to the component 7, such as a scale, passes through the pattern on the component 7, such as a scale, the amount of light detected by the light receiving element of the component 6, such as a detection head, changes. A relative movement amount between the component 7, such as a scale, and the component 6, such as a detection head, is detected from the change in the amount of light. The amount of movement detected by the component 6, such as a detection head, is converted to a torque applied to an associated one of the metal components 51 to 54 by the torque detection control section made up of a control routine that the controller 500 runs. The torque detection control section may be made up of a torque detection control section made by hardware. An output value (the amount of movement) of the component 6, such as a detection head, is converted to a torque detection value by using a sensitivity coefficient for converting the amount of movement detected by the component 6, such as a detection head, to a torque applied to an associated one of the metal components 51 to 54 by using the torque detection control section. For example, the amount of movement detected by the component 6, such as a detection head, may be configured to be magnetically or electrostatically detected. For example, the detecting unit of the component 6, such as a detection head, may be a capacitance displacement sensor. The detecting unit may be a strain gauge. A displacement of an associated one of the metal components 51 to 54 may be detected by a strain gauge bonded to any one of the elastic sections 31, 32.

The description has been made by taking the sensor module 10A as an example, and the sensor modules 10B to 10D also have similar configurations, so the description is omitted. The sensor modules 10B to 10D, as in the case of the sensor module 10A, are fixed to the reinforcement component 56 and the reinforcement component 57. As described above, the sensor modules 10A to 10D are capable of detecting a torque around the rotation axis 680 applied between the reinforcement component 56 and the reinforcement component 57.

In the present embodiment, as shown in FIG. 30A, the two sensor modules 10A, 10B are disposed in opposite positions along the same diameter with reference to the rotation axis 680. In this case, as described above, mean value calculation processing to average torque detection values respectively output from the detection units 70 of the two sensor modules 10A, 10B is performed. Thus, it is possible to eliminate the influence of other-axis forces that work other than around the rotation axis 680 to which an intended torque detection value is applied. A detection value concerning a relative displacement is obtained from the sensor modules 10A, 10B disposed at line-symmetric locations along the same diameter passing through the rotation axis 680 or point-symmetric locations with respect to the rotation axis 680. Therefore, by averaging the outputs of the sensor modules 10A, 10B, high-accuracy, high-reliability relative displacement information or a torque detection value based on the relative displacement information can be acquired. With the above configuration, a torque around the rotation axis 680 can be detected from a plurality of individual sensor modules independent of one another. Thus, even when one or some regions fail, it is possible to repair or replace individual sensor modules, so it is possible to provide a torque sensor 10 that contributes to improvement in yield.

Another structure of the sensor 10 according to the ninth embodiment will be described with reference to FIGS. 25A to 25D. In the present embodiment, an elastic section group 3 in a structure 5 is made up of a plurality of block-shaped metal components 51, 52, 53, 54. Each of the metal components 51, 52, 53, 54 is formed by machining a metal member.

FIG. 25A is a perspective view of the metal components 51, 52, 53, 54. Each of the metal components 51, 52, 53, 54 has two elastic sections 31, 32, metal portions 11, 12, 13 that make up a top surface section 1, and metal portions 21, 22, 23 that make up a bottom surface section 2. A head unit 60 including the head of an encoder and a holding component holding the head is fixed to the metal portion 13. A scale unit 70 including the scale of the encoder and a holding component holding the scale is fixed to the metal portion 23.

FIG. 25B is an exploded view of the sensor 10. The sensor 10 has a structure such that the four metal components 51, 52, 53, 54 each having two elastic sections 31, 32 are sandwiched by reinforcement components 56, 57. The eight elastic sections are disposed such that a circle about the rotation axis of the sensor 10 passes through the eight elastic sections. Each of the reinforcement components 56, 57 has grooves 566 or grooves 576 with substantially the same width of each of the metal components 51, 52, 53, 54.

FIG. 25C shows a state where the metal components 51, 52, 53, 54 are coupled to the reinforcement component 57. The metal components 51, 52, 53, 54 are respectively fitted to grooves 576 of the reinforcement component 57. The sensor 10 as shown in FIG. 25D can be manufactured by fixing the reinforcement component 56 to the metal components 51, 52, 53, 54 in the state shown in FIG. 25C. For example, the holes 560 of the reinforcement component 56 and the holes 100 of the metal components 51 to 54 are fixed by screws, and the holes 570 of the reinforcement component 57 and the holes 200 of the metal components 51 to 54 are fixed by screws. Threaded grooves can be formed in the metal components 51 to 54.

The structure shown in FIGS. 25A to 26, and 30A to 30C will be described with reference to FIG. 7. The metal components 51 to 54 are located between the reinforcement component 56 and the reinforcement component 57. In this example, each of the thicknesses S1, S2 of overlapping portions 561, 562 is equal to the thickness S5 of a relay portion 563 and may be different from the thickness S5 of the relay portion 563. Each of the thicknesses S7, S8 of extended portions 564, 565 is greater than each of the thicknesses S1, S2 of the overlapping portions 561, 562 and the thickness S5 of the relay portion 563 ([S1 & S2 & S5]<[S7 & S8]). The extended portions 564, 565 couple the overlapping portions 561, 562 associated with each of the plurality of metal components 51 to 54. The extended portions 574, 575 couple (relay) the overlapping portions 571, 572 associated with each of the plurality of metal components 51 to 54. For example, the extended portion 564 couples (relays) the overlapping portion 561 overlapping the elastic section 31 of the metal component 51 with the overlapping portion 562 overlapping the elastic section 32 of the metal component 52. For example, the extended portion 565 couples (relays) the overlapping portion 562 overlapping the elastic section 32 of the metal component 51 with the overlapping portion 561 overlapping the elastic section 31 of the metal component 54.

The distance D5 between the extended portion 564 and the extended portion 574 is shorter than the distance D1 between the overlapping portion 561 and the overlapping portion 571. The distance D6 between the extended portion 565 and the extended portion 575 is shorter than the distance D2 between the overlapping portion 562 and the overlapping portion 572. Each of the thicknesses S2, S4 of the overlapping portions 571, 572 is equal to the thickness S6 of the relay portion 573 and may be different from the thickness S6 of the relay portion 573. Each of the thicknesses S9, S10 of the extended portions 574, 575 is greater than each of the thicknesses S3, S4 of the overlapping portions 571, 572 and the thickness S6 of the relay portion 573 ([S3 & S4 & S6]<[S9 & S10]). In this example, the distance between the overlapping portion 561 and the metal component 51 is zero, and the distance between the overlapping portion 572 and the metal component 51 is zero. In the present embodiment, since the extended portions 564, 565, 574, 575 do not contact with the metal components 51 to 54, friction between each of the metal components 51 to 54 and each of the reinforcement components 56, 57 is reduced. Each of the thicknesses S5, S6 of the relay portions 563, 573 is greater than each of the thicknesses T3, T4 of the metal portions 13, 23 [S5 & S6]>[T3 & T4]). A difference between the thickness T1 of the elastic section 31 and the thickness T3 of the metal portion 13 is greater than a difference between the thickness S5 of the relay portion 563 and the thickness T3 of the metal portion 13 (|T3−T1|>|S5−T31|). A difference between the thickness T2 of the elastic section 32 and the thickness T4 of the metal portion 23 is greater than a difference between the thickness S6 of the relay portion 573 and the thickness T4 of the metal portion 23. The distance D4 between the metal portion 13 and the metal portion 23 can be longer than or equal to a quarter and less than or equal to a half of the distance D3 between the relay portion 563 and the relay portion 573 (D3×¼≤D4≤D3×½).

In one example of the present embodiment, each of the reinforcement components 56, 57 has an annular shape with an outside diameter of 100 mm to 200 mm and an inside diameter of 20 mm to 80 mm, each of the thicknesses S1 to S6 ranges from 9 mm to 13 mm, and each of the thicknesses S7 to S10 ranges from 13 mm to 17 mm. As for the metal components 51 to 54, each of T1 and T2 ranges from 1 mm to 2 mm, each of T3 and T4 ranges from 1 mm to 8 mm, each of D1 to D3 ranges from 15 mm to 25 mm, D4 ranges from 2 mm to 6 mm, and each of D5 and D6 ranges from 10 mm to 20 mm.

As shown in FIGS. 25B and 25C, the reinforcement component 57 has the grooves 576 for positioning the sensor modules 10A to 10D. The grooves 566 may be provided in the reinforcement component 56, and the grooves 576 may be provided in the reinforcement component 57. Alternatively, the grooves may be provided only in any one of the reinforcement components 56, 57. A mechanism positioning the sensor modules may be a cutaway portion that a part of the reinforcement components 56, 57 is cut out or may be a positioning pin. The grooves 576 may be any grooves as long as the grooves are capable of positioning the sensor modules 10A to 10D with respect to the rotation axis. A torque detection value is calculated by using a sensitivity coefficient for converting the amount of movement to a torque applied to an associated one of the metal components 51 to 54. On the other hand, a torque detection value changes in the amount of movement according to a distance in the radial direction from the rotation axis. Therefore, high-accuracy torque detection is possible by the grooves 576 that fix the sensor modules 10A to 10D to set locations.

Figure 31A:
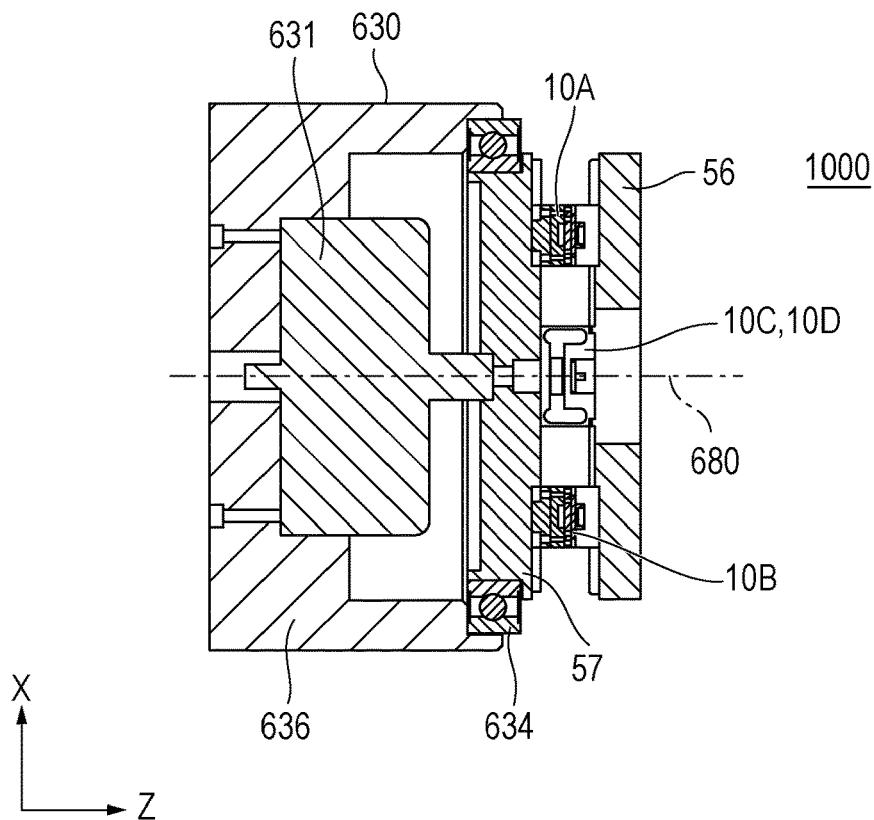
FIGS. 31A and 31B are schematic diagrams illustrating the device and the sensor.

FIG. 31A is a schematic sectional view of one joint in an articulated robot. The joint connects a frame 636 with the reinforcement component 57. The prime mover 631 is fixed to the frame 636. An outer ring of a bearing 634 is fixedly press-fitted or bonded to the frame 636. The reinforcement component 57 and the sensor modules 10A to 10D are fixed by the fixing method shown in FIGS. 25A to 25D. The reinforcement component 56 is also similarly fixed. The rotating shaft of the prime mover 631 is fixed to the reinforcement component 57. An inner ring of the bearing 634 is fixedly bonded to the reinforcement component 57. The elastic sections of the sensor modules 10A to 10D deform by a force applied to any one of the frame 636 and the reinforcement component 57, and the deformation is detected by a detector. Even in a state of being mounted in a robot joint in this way, the sensor modules 10A to 10D can be used as a torque detecting unit that detects a torque around the rotation axis 680. The reinforcement component 56 shown in FIG. 25B corresponds to the reinforcement component 56, and the reinforcement component 57 shown in FIG. 25B corresponds to the reinforcement component 57. In other words, by using the reinforcement component 57 that is a robot joint member, a compact torque detecting unit is provided. Instead of the reinforcement component 57, the reinforcement component 56 shown in FIG. 25B may be is fixedly bonded to the inner ring of the bearing 634.

Figure 31B:
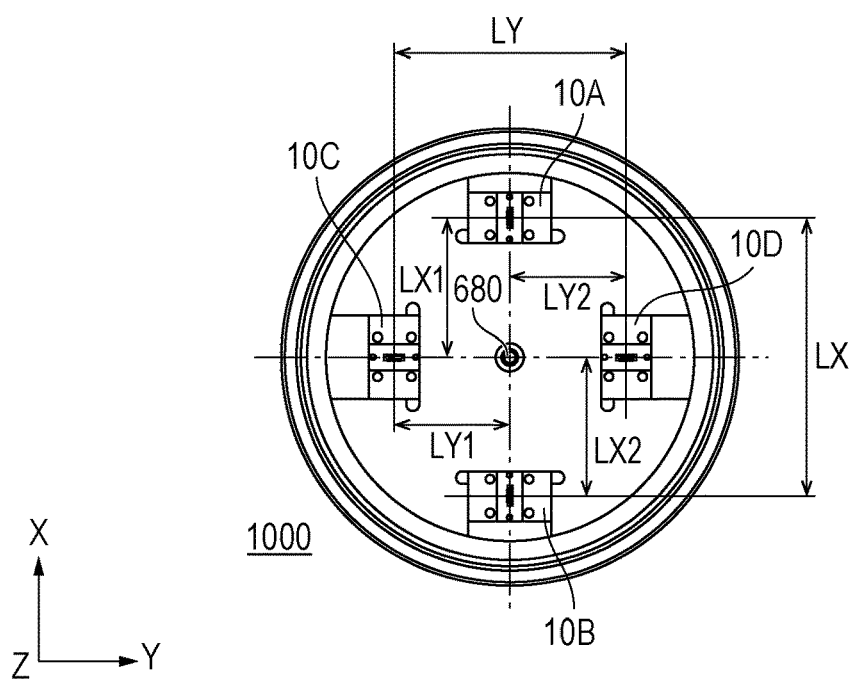

With the sensor 10, as shown in FIG. 31B, the distance LY between the sensor modules 10A, 10B and the distance LX between the sensor modules 10C, 10D may be equal to each other (LX=LY) or may be different from each other (LX>LY or LX<LY).

The sensor 10 can be installed at a selected location where maintenance (replacement and repair) after assembly to a device, such as an articulated robot, is easy. On the other hand, a torque detection value is calculated by using a sensitivity coefficient for converting the amount of movement to a torque applied to an associated one of the metal components 51 to 54, and the amount of movement changes depending on a distance in the radial direction from the rotation axis. To take measures against this, the sensitivity coefficient of each sensor module, obtained in advance, can be corrected according to a distance in the radial direction. An example in which the outputs of the sensor modules 10A, 10B are adapted to the outputs of the sensor modules 10C, 10D will be described below. Where the sensitivity coefficient of each of the sensor modules 10A, 10B, obtained in advance, is K1 and the corrected sensitivity coefficient is K2, correction can be made as K2=(LX/LY)×K1. Thus, a high-accuracy torque detecting unit is provided even when a distance in the radial direction from the rotation axis is different as in the case of the sensor modules 10A, 10B and the sensor modules 10C, 10D.

In FIG. 31B, the distance LX between the metal component 51 and the metal component 52 and the distance LY between the metal component 53 and the metal component 54 may be different from each other. The distance LX1 from the axis 680 to the metal component 51 and the distance LX2 from the axis 680 to the metal component 52 may be different from each other. The distance LY1 from the axis 680 to the metal component 53 and the distance LY2 from the axis 680 to the metal component 54 may be different from each other.

Figure 32A:
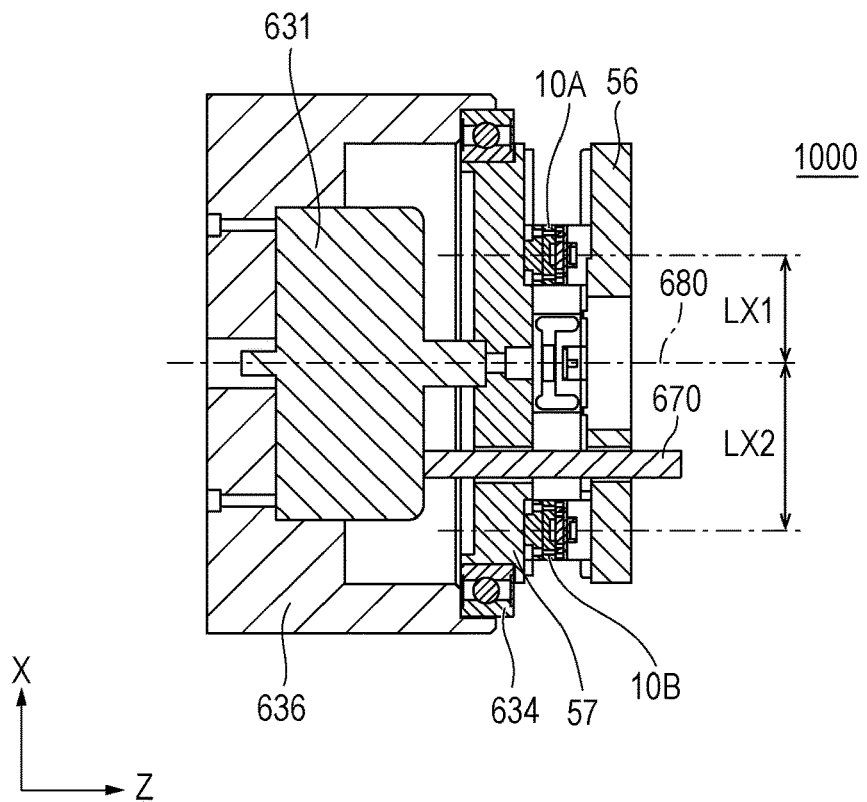
FIGS. 32A and 32B are schematic diagrams illustrating the device and the sensor.

In FIG. 32A, in the articulated robot, several types of connection components 670 are running inside the joint. In the present embodiment, a cable connected to the prime mover 631 is typically shown as the connection component 670. A layout example of sensor modules in the case where the connection component 670 passes between the sensor module 10A and the sensor module 10B and the path of the connection component 670 is disposed adjacent to the sensor module 10B will be described. When the connection component 670 pass along a shortest route, a sensor module can unintentionally block the route. As shown in FIG. 31B, by installing the sensor 10 according to the present embodiment to suit to the path of the connection component 670, the passage of the connection component 670 is ensured. In this case, the distance LX1 from the rotation axis 680 to the sensor module 10A and the distance LX2 from the rotation axis 680 to the sensor module 10B satisfy LX2>LX1.

Figure 32B:
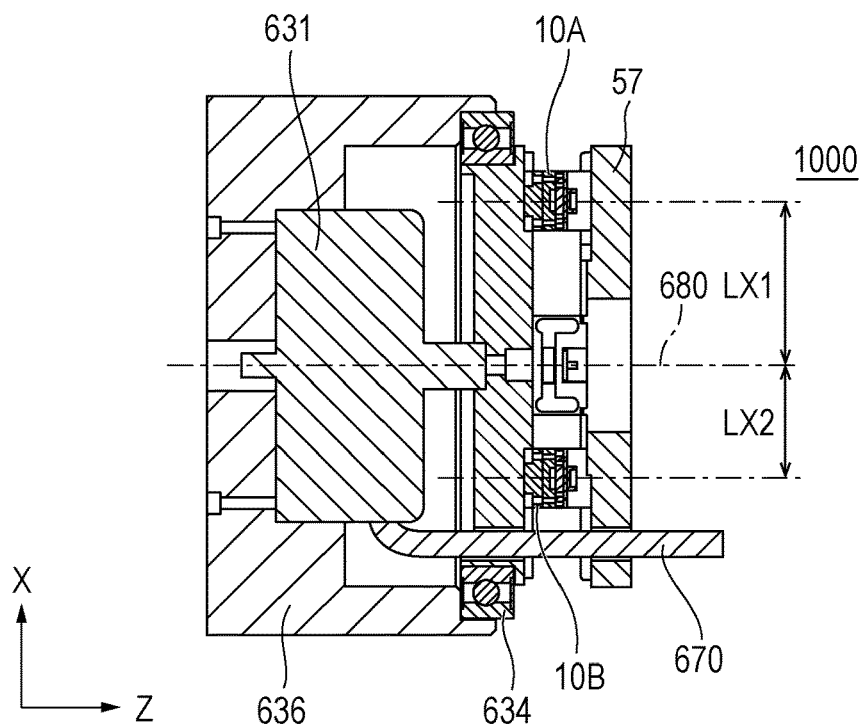

FIG. 32B shows a layout example of the sensor modules 10A to 10D in the case where the connection component 670 is mounted on the outer side of the sensor module 10B. In the present embodiment, the connection component 670 connected to the prime mover 631 is described as an example, and the present embodiment is also effective in other connection components 670, such as a communication cable. In this case, by disposing the sensor module 10B close to the rotation axis 680, the passage of the connection component 670 is ensured. When the sensor modules 10A, 10B at this time are disposed such that the distance L1 from the rotation axis 680 to the center of the sensor module 10A and the distance L2 from the rotation axis 680 to the center of the sensor module 10B satisfy LY1>LX2, the path of the connection component 670 is ensured. In this way, the layout of sensor modules suitable for arrangement of joint component members is provided by taking advantage of the characteristic that the sensor modules of the sensor 10 can be individually installed. Thus, it is possible to provide a torque detecting unit appropriate for a robot arm. In the present embodiment, the connection component 670 has been described as an example of the joint component member; however, any member other than the sensor 10 is applicable. For example, a motor, a speed reducer, a bearing, and a seal correspond to joint component members.

Figure 33A:
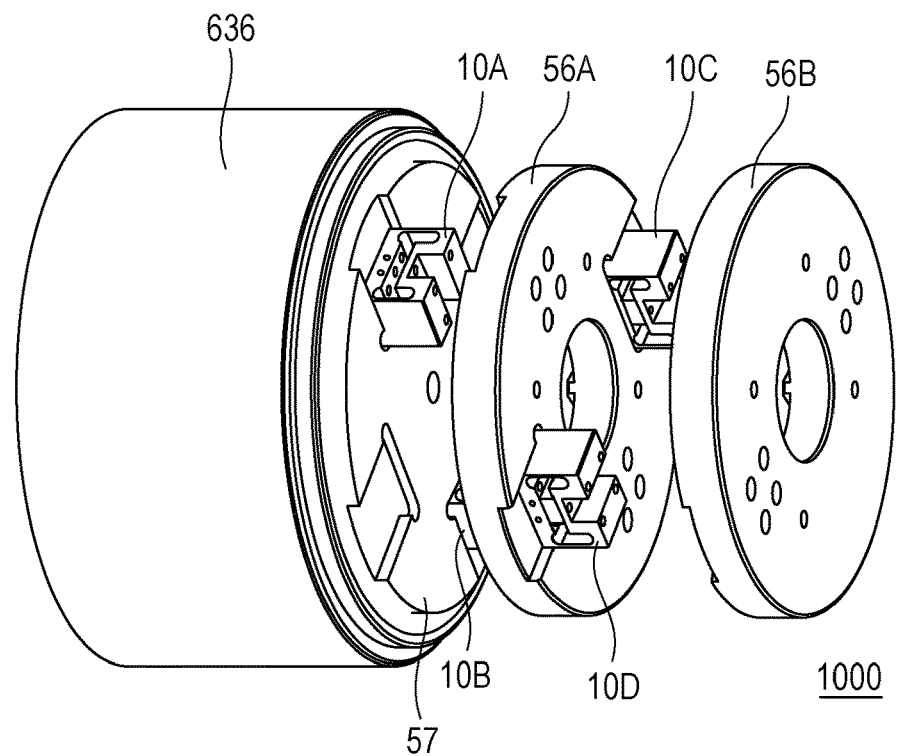
FIGS. 33A and 33B are schematic diagrams illustrating the device and the sensor.
Figure 33B:
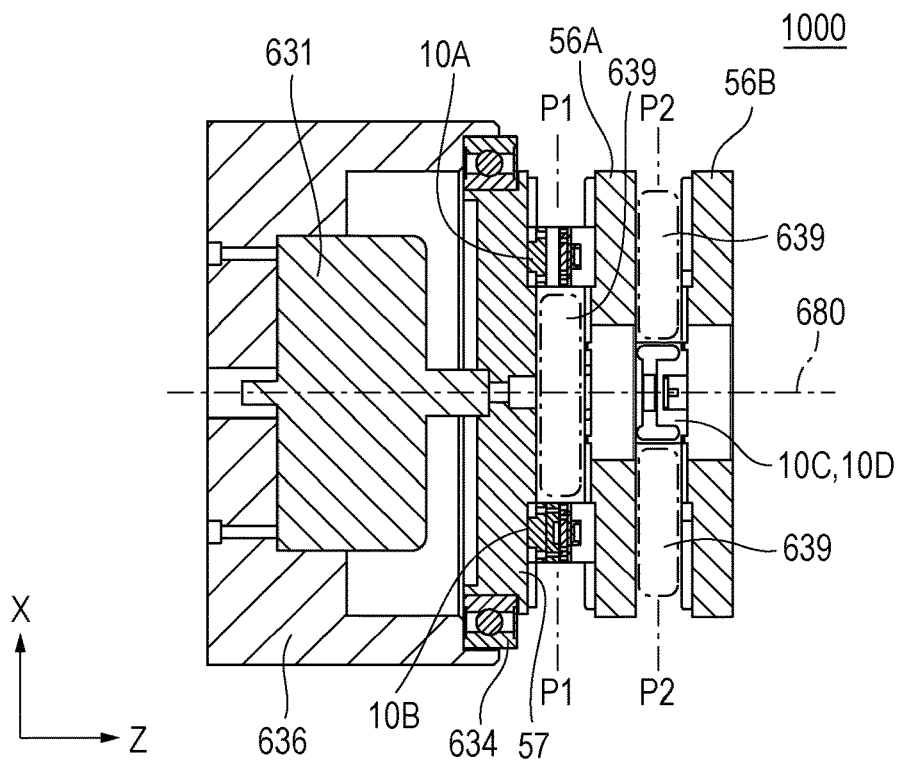

In FIGS. 33A and 33B, the sensor 10 is not necessarily installed in the same plane. The sensor modules 10A, 10B are installed between the reinforcement component 57 and a reinforcement component 56A. Furthermore, the sensor modules 10C, 10D are installed between the reinforcement component 56A and a reinforcement component 56B.

In this way, the sensor modules 10A to 10D can be installed so as to be shifted in the Z direction. The sensor modules 10A to 10D can be installed at locations where maintenance (replacement and repair) after assembly to an articulated robot is easy as described above. Furthermore, in this case, an available space 639 where there is no sensor module is provided. The available space 639 can be used to fix the connection component 670 of the prime mover 631 or to fix a control substrate or the like. When the rigidity of the torque sensor 10 itself is not sufficient with reference to a rigidity value desired for an articulated robot, it is possible to easily increase the rigidity by assembling the metal components 51 to 54 with a selected number of sensor modules to the available space 639.

Another installation method for the sensor modules 10A to 10D will be described with reference to FIG. 34. The sensor modules 10A to 10D in FIG. 34 are fastened to the reinforcement component 56 and the reinforcement component 57 in the Z direction. However, the sensor 10 is often desired to have a low profile when the sensor 10 is intended to be installed in a robot. Therefore, approach in the Z direction can be difficult to make it difficult to repair and replace sensor modules. FIG. 34 shows a mode in which the sensor 10 is installed in the reinforcement component 56 and the reinforcement component 57 as the one improving such difficulties. Each of the sensor modules 10A to 10D has holes 100 that allow fastening in the X and Y directions. The reinforcement component 57 has holes 570 for fastening the reinforcement component 57 to the sensor modules 10A to 10D in the X and Y directions. Thus, it is possible to remove or install the sensor modules 10A to 10D by sliding the sensor modules 10A to 10D in the X and Y directions. Fixing components 75 (fastening components) for fastening, such as screws, are fitted into the holes 100, 570, and the sensor modules 10A to 10D are fastened to the reinforcement component 57. This configuration exercise the advantageous effect in mounting the sensor 10 to a robot that needs a thin-profile sensor 10, so a torque sensor that contributes to improvement in the yield of a robot is provided.

According to the present embodiment, even when, for example, any one of the four detecting units 81 to 84 or any one of the four metal components 51 to 54 has a malfunction, repair or replacement is possible without removing the entire torque sensor 10. Therefore, a torque sensor that contributes to ensuring the accuracy of the device 1000 is provided.

Tenth Embodiment

Figure 35A:
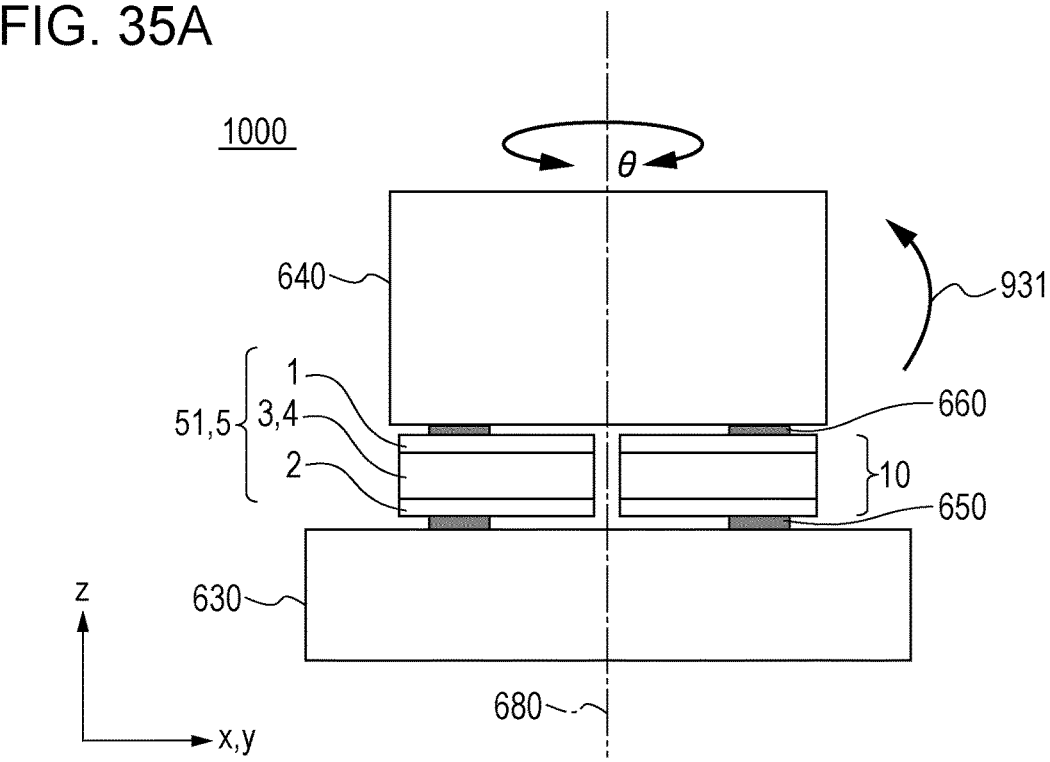
FIGS. 35A and 35B are schematic diagrams illustrating a device and a sensor.
Figure 35B:
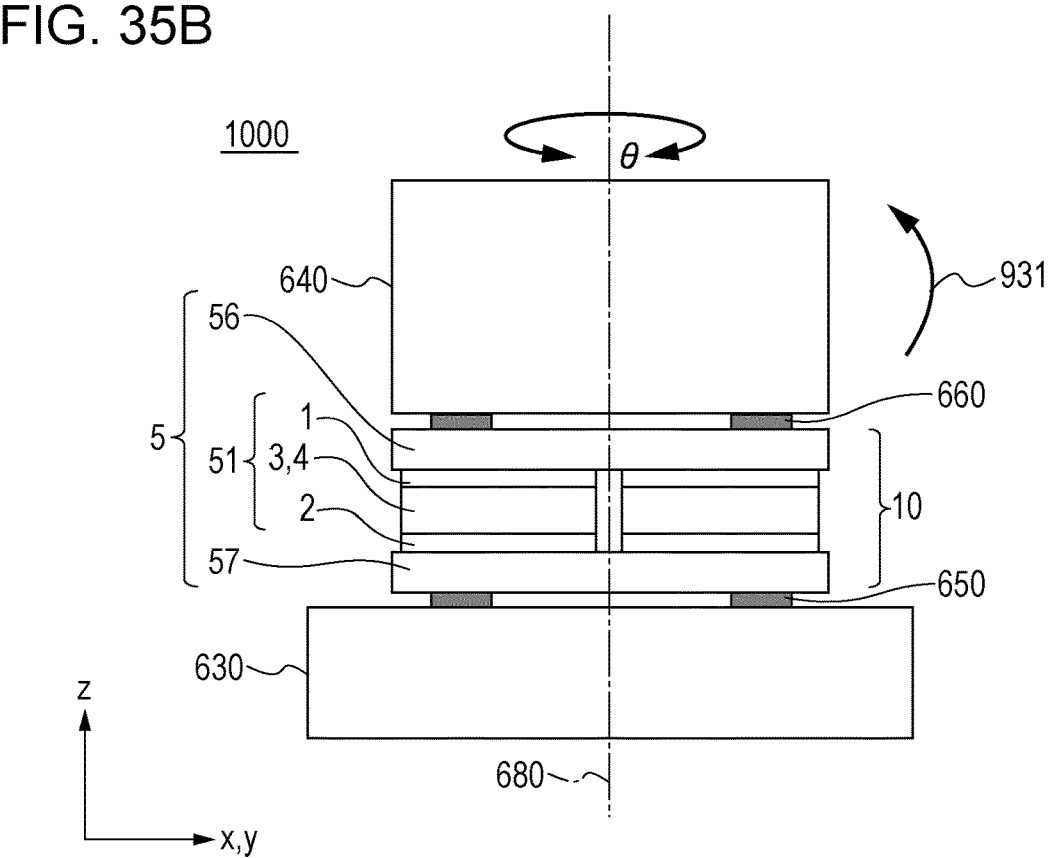

FIGS. 35A and 35B illustrate examples of a mode in which a sensor 10 is used as a torque sensor. A machine device 1000 including the sensor 10 includes a link 630 and a link 640. A link is a machine element that relatively moves, and a coupling portion between a link and a link is a joint. For example, the link 630 and the link 640 relatively rotate about an axis 680 that is a rotation axis. The sensor 10 is provided between the link 630 and the link 640.

The sensor 10 is fixed to the link 630 by fixing members 650, such as screws. The sensor 10 is fixed to the link 640 by fixing members 660, such as screws and bolts.

In the sensor 10 of FIG. 35A, the top surface section 1 of the metal component 51 is fixed to the link 640 by the fixing members 660, and the bottom surface section 2 of the metal component 51 is fixed to the link 630 by the fixing members 650. In the sensor 10 of FIG. 35B, the reinforcement component 56 fixed to the top surface section 1 is fixed to the link 640 by the fixing members 660, and the reinforcement component 57 fixed to the bottom surface section 2 is fixed to the link 630 by the fixing members 650.

FIGS. 5A to 6C schematically illustrate methods of torque detection using the sensor 10. FIGS. 5A to 5C are associated with the mode of FIG. 35A. FIGS. 6A to 6C are associated with the mode of FIG. 35B.

FIG. 5A and FIG. 6A show a state where no torque is occurring. This state is defined as an initial position of the component 6, attached to the top surface section 1, and the component 7.

FIG. 5B and FIG. 6B show a state where, for example, the axis 680 shown in FIG. 35A or FIG. 35B rotates to generate a torque. In this case, the top surface section 1 coupled to the link 640 and the bottom surface section 2 coupled to the link 630 are displaced in the rotation direction. Furthermore, the top surface section 1 and the bottom surface section 2 elastically deform, and the amount of deformation is proportional to the magnitude of torque generated.

Here, in the positional relationship between the component 6 and the component 7 in FIG. 5B or FIG. 6B, there is a change 930 from the initial position shown in FIG. 5A or FIG. 6A. The sensor 10 measures the change 930 and detects the value of torque generated in accordance with the measured value. For this purpose, a rotational rigidity Gz [kNm/rad] that is a torque Nt [kNm] used to rotate the sensor 10 by a unit angle [rad] is obtained in advance by measurement or finite element method. When the rotational angle measured by the component 6 and the component 7 is θ, a torque Nt generated is detected as Nt=Gz×θ [kNm]. In terms of this point, the sensors 10 of FIG. 35A and FIG. 35B can similarly detect a detection target force.

FIG. 5C and FIG. 6C show a state where bending moment 931 as shown in FIG. 35A or FIG. 35B is generated. In this case, with a bending deformation of the top surface section 1, the component 6 is displaced to the left in the drawing. As a result of this displacement, there occurs a displacement 932 from the initial position in the component 6 and the component 7. The displacement caused by the bending moment 931 may appear as other-axis interference to decrease the detection accuracy of the sensor 10.

In the mode of FIG. 6C, the rigidity of the structure 5 increases by the addition of the reinforcement components 56, 57. Therefore, a displacement 933 from the initial position of the component 6 and the component 7 in the event of occurrence of the bending moment 931 is smaller than the displacement 932 in the case of the configuration of FIG. 5C, so the influence of other-axis interference is reduced.

FIG. 36A is a perspective view showing a robot system 900 according to an embodiment. In FIG. 36A, a workpiece WA is, for example, a ring-shaped member, and a workpiece WB is, for example, a member having a protrusion. A product W0 is manufactured by fitting the workpiece WA to the workpiece WB.

The robot system 900 includes a robot 600, a controller 700 that controls the robot 600, and a teaching pendant 800. The robot 600 is one example of the machine device 1000 and, in this example, an articulated robot. The robot 600 includes an articulated robot arm 601, and a robot hand 602 serving as an end effector that is the hand of the robot 600 and attached to the distal end of the robot arm 601.

The controller 700 controls the rotational angle of each of joints J1 to J6 of the robot arm 601. The robot 600 is capable of aiming the hand at a selected three-dimensional location in a selected three-direction posture within a movable range under control of the controller 700.

The teaching pendant 800 is a teaching unit that transmits data at a teaching point to the controller 700 and is used by an operator to designate the operation of the robot 600 mainly at an installation site of the robot system 900. The teaching pendant 800 has, for example, an operating section including operating keys for moving the posture (location and angle) of each joint of the robot arm 601, the location of a reference location disposed at the distal end or the like of the robot 600, or the like. When a robot operation is performed on the operating section of the teaching pendant 800, the controller 700 controls the operation of the robot arm 601 in response to the operation on the teaching pendant 800. At this time, the controller 700 runs a robot control program, and the portions of the robot 600 are controlled.

The robot hand 602 has a hand body 620 and a plurality of fingers 621 supported by the hand body 620 so as to be openable and closable. The workpiece WA can be gripped by causing the plurality of fingers 621 to perform closing operation. The workpiece WA can be released by causing the plurality of fingers 621 to perform opening operation. By gripping the workpiece WA with the plurality of fingers 621, it is possible to perform work to assemble the workpiece WA to the workpiece WB.

The robot arm 601 includes a plurality of links 611 to 616. The plurality of links 611 to 616 is rotatably coupled by the joints J1 to J6. A base 610 of the robot arm 601 is fixed to a stand 150. A driving mechanism having an electric prime mover (electric motor) is provided in each of the joints J1 to J6 of the robot arm 601. The electric motor is, for example, a servo motor. An electric prime mover with an appropriate output power for the magnitude of a torque needed is used as the driving mechanism at each of the joints J1 to J6. The sensor 10 is provided in at least one of the joints J1 to J6. The controller 700 controls the prime mover (motor) in accordance with information obtained from the sensor 10. Since the sensor 10 includes the plurality of sensor modules 10A to 10D, information obtained from the sensor 10 is based on signals respectively output from the detecting units 81 to 84 of the plurality of sensor modules 10A to 10D. As described above, signals output from the plurality of detecting units 81 to 84 can be statistically processed. The mechanisms of the joints J1 to J6 may have similar configurations or may be different.

For example, in the case of each joint of the robot arm 601, the sensor 10 measures a driving torque of the motor (not shown) that drives the joint, that is, a rotational driving force applied from the motor to the link. The sensor 10 is, for example, disposed at a predetermined location on a drive shaft of a drive line made up of a motor or a motor and a speed reducer, disposed inside the joint.

The robot arm 601 shown in FIGS. 36A and 36B is a robot arm having a configuration in which a plurality of links is connected to each other via an associated one of a plurality of joints (six axes) in, for example, a serial link form. The robot hand 602 that is an end effector is connected to a link 616 at the distal end of the robot arm 601. Links 611, 612, 613, 614, 615, 616 of the robot arm 601 each are connected via an associated one of joints, that is, the joints J1, J2, J3, J4, J5, J6 in the present embodiment.

The base 610 (base portion) and link 611 of the robot arm 601 are connected by the joint J1 that rotates around a rotation axis in a Z-axis direction. The joint J1 has, for example, a movable range of about ±180 degrees from the initial posture. The link 611 and link 612 of the robot arm 601 are connected by the joint J2. The rotation axis of the joint J2 coincides with a Y-axis direction in the illustrated state. The joint J2 has, for example, a movable range of about ±80 degrees from the initial posture.

The link 612 and link 613 of the robot arm 601 are connected by the joint J3. The joint J3 has, for example, a movable range of about ±70 degrees from the initial posture. The link 613 and link 614 of the robot arm 601 are connected by the joint J4. The joint J4 has, for example, a movable range of about ±180 degrees from the initial posture.

The link 614 and link 615 of the robot arm 601 are connected by the joint J5. The rotation axis of the joint J5 coincides with the Y-axis direction in the illustrated state. The joint J5 has, for example, a movable range of about ±120 degrees from the initial posture. The link 615 and link 616 of the robot arm 601 are connected by the joint J6. The joint J6 has, for example, a movable range of about ±240 degrees from the initial posture.

As described above, in the present embodiment, the rotation axes of the joints J1, J4, J6 are disposed parallel (or coaxially) with the central axes (alternate long and short dashed line) of coupled two links and are disposed such that a (relative) angle around the rotation axis of the two links can be changed. On the other hand, the rotation axes of the joints J2, J3, J5 are disposed such that a (relative) angle between the central axes (alternate long and short dashed line) of two links coupled by an associated one of the joints intersect can be changed.

A first link is one of the link 630 and the link 640, and a second link is the other one of the link 630 and the link 640. Each of the first link and the second link can be any one of the links 611 to 616. A third link that relatively moves with respect to the second link is displaced with respect to the second link in at least one of an axial direction along an axis different from the rotation axis 680 and a rotation direction of which the rotation axis is the different axis. The joint between the first link and the second link may be any one of the joints J1 to J6. The joint between the second link and the third link may be a joint next to the joint between the first link and the second link. When the joint between the first link and the second link is J1, one of the first link and the second link can be the base 610.

The robot hand 602 (end effector), such as an (electric) hand and a (pneumatically-driven) air hand, for performing assembling work or moving work in a production line is connected at the distal end of the link 616 of the robot arm 601. It is assumed that the robot hand 602 (end effector) is attached to the link 616 by a (half) fixing device (not shown), such as screwing, or can be attached by an attaching/detaching device (not shown), such as latching (ratchet). Particularly, when the robot hand 602 is detachable, a system in which the robot arm 601 is controlled and the end effector disposed at a supply location (not shown) is detached and attached or replaced by the operation of the robot itself is also conceivable.

FIG. 36B is a schematic sectional view of one of the joints J1 to J6. The joint connects the link 630 with the link 640. The link 630 includes a connecting member 635 supported by the bearing 634. The connecting member 635 and the sensor 10 are coupled to each other by the fixing member 650. Each of the fixing members 660 can be inserted into at least one of the above-described hole 100 and hole 560. Each of the fixing members 650 can be inserted into at least one of the above-described hole 200 and hole 570. The link 630 includes a motor 631 (a prime mover or an electric motor) that relatively moves the link 630 and the link 640. A rotating shaft 632 of the motor 631 is connected to a speed reducer 633. The speed reducer 633 is coupled to the connecting member 635. In this way, the prime mover (motor 631) and the sensor 10 are coupled via the speed reducer 633. Since the sensor 10 includes the plurality of sensor modules 10A to 10D, the prime mover and the plurality of sensor modules 10A to 10D are coupled via the speed reducer 633. The sensor 10 has an annular shape. A connection component 670 that connects the link 630 with the link 640 is provided in a space surrounded by the sensor 10. The connection component 670 is surrounded by at least four elastic sections (for example, eight elastic sections 31 to 38) included in the sensor 10. The connection component 670 may be a mechanical component, such as the motor 631 and the speed reducer 633, provided in the link 630 or the link 640 or may be a mechanical shaft (shaft) that connects mechanical components to each other. The connection component 670 may be a wiring component that electrically connects an electrical component provided in the link 630 with an electrical component provided in the link 640. In this way, using the annular sensor 10 to surround the connection component 670 with the sensor 10 is beneficial to reduce the size of the robot 600. Therefore, the annular reinforcement components 56, 57 shown in FIG. 19B are suitable as compared to the disc-shaped reinforcement components 56, 57 shown in FIG. 20A. The structure 5 of the sensor 10 deforms by a force applied to at least one of the link 630 and the link 640, and the deformation is detected by the detector 8. For example, the sensor 10 can be used as a torque sensor that detects a torque around an axis 680.

The robot 600 having a torque sensor and capable of torque control is often used to assemble an automobile engine component with a weight of several kilograms or assemble a component with a weight of several hundreds of grams. On the other hand, the robot 600 is not often used to assemble a small load with a weight of about several grams applied to a component during assembly, such as operating a small component, a thin film, and a sheet with a weight of several grams. This is because the accuracy of force (torque) control of an existing articulated robot is not so high and desired accuracy for assembly in a range of a weight of about several grams applied to a component by the end effector at the distal end of the robot arm 601 has not been achieved. The sensor 10 according to the present embodiment can be used as a low-cost, high-accuracy torque sensor and allows the robot 600 to handle a small workpiece with precise operation.

The robot 600 shown in FIG. 36A may be a cooperative robot. In manufacturing a product with the use of the cooperative robot, the robot 600 cooperatively manufactures a product with a human in the range of 1 m or less from the human. In such a manufacturing method, when the human contacts with the robot 600, the contact is detected by the sensor 10 provided in the robot 600, and control, such as an operation stop, can be performed. By reducing the cost of the sensor 10 provided in the robot 600, the cost of the robot 600 is reduced, so it is possible to reduce the cost of a product manufactured by the manufacturing method using the cooperative robot and to increase the safety of the manufacturing method.

Eleventh Embodiment

Figure 37A:
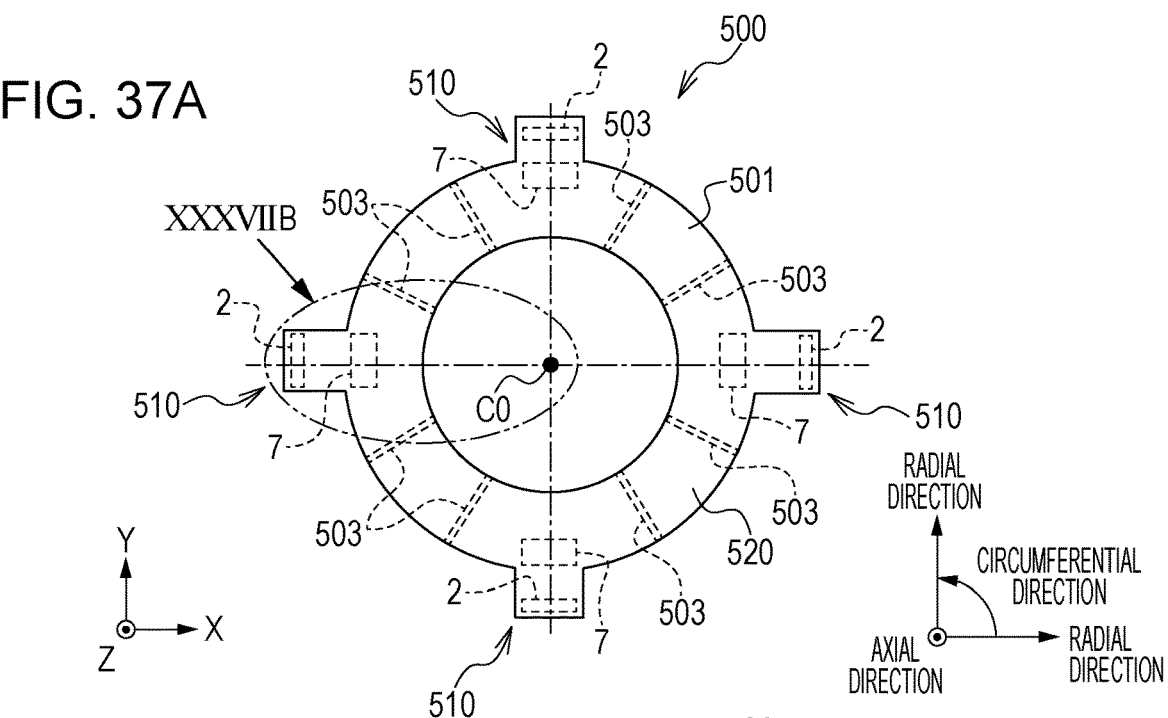
FIG. 37A is a top view of a sensor according to an eleventh embodiment.
Figure 37B:
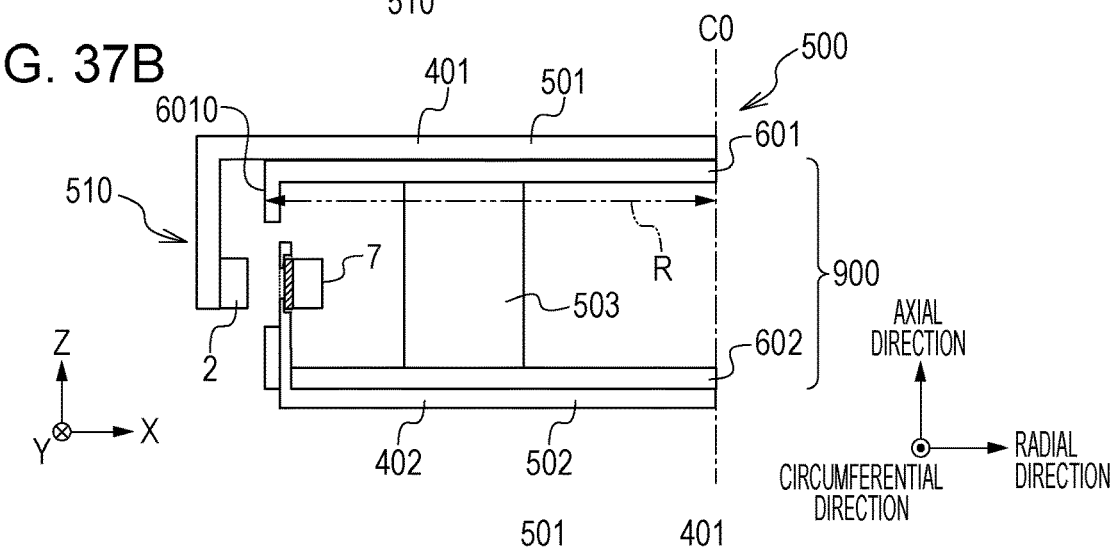
FIG. 37B is a schematic diagram of a portion surrounded by the circle XXXVIIB in FIG. 37A when viewed in a Y direction.
Figure 37C:
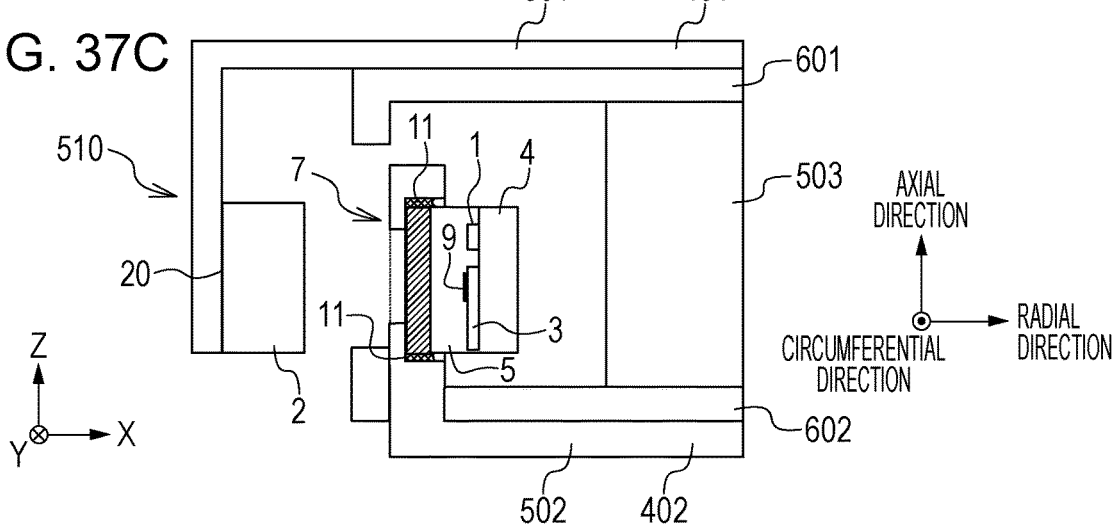
FIG. 37C is an enlarged diagram of a relevant portion of FIG. 37B.

FIG. 37A is a top view of a torque sensor as an example of a sensor 500 according to the present embodiment. FIG. 37B is a schematic diagram of a portion surrounded by the circle XXXVIIB in FIG. 37A when viewed in the Y direction. FIG. 37C is an enlarged diagram of a relevant portion of FIG. 37B.

The sensor 500 is made up of an encoder 510 and a structure 520. The encoder 510 is made up of a detection head 7 and a scale 2. A structure 520 is made up of a supporting section 501, a supporting section 502, and a structural section 900. The structural section 900 has a coupling portion 601 disposed between the supporting section 501 and an elastic section 503 and has a coupling portion 602 disposed between the supporting section 502 and an elastic section 503. There is a plurality of the elastic sections 503 that couple the supporting section 501 with the supporting section 502. A portion where the supporting section 501 is coupled to the elastic section 503 is a coupling portion 401. A portion where the supporting section 502 is coupled to the elastic section 503 is a coupling portion 402.

The plurality of elastic sections 503 is arranged at predetermined intervals along a circle of which the center coincides with a rotational axis CO.

The coupling portions 601, 602 and the elastic sections 503 are made of a homogeneous material and are integrated. However, by providing the supporting sections 501, 502 on both upper and lower sides of the coupling portions 601, 602, the coupling portions 601, 602 are reinforced, and only the elastic sections 503 are configured to elastically deform by a force applied to the structure 520. The coupling portion 601 is, for example, a first coupling portion, and the coupling portion 602 is, for example, a second coupling portion.

The supporting sections 501, 502 are plate-shaped members and have, for example, an annular shape about the rotational axis CO as shown in FIG. 37A. The supporting section 501 is relatively displaceable in a rotation direction about the rotational axis CO with respect to the supporting section 502. The shape of each of the supporting sections 501, 502 is not limited thereto and may be, for example, a disc shape.

The supporting section 501 and the supporting section 502 are disposed so as to face each other with a space in the Z direction that is a direction in which the rotational axis CO extends. Each of the elastic sections 503 is disposed between the supporting sections 501, 502 and coupled to the coupling portions 601, 602.

The supporting section 501 is fixed to the elastic sections 503 via the coupling portion 601, and the supporting section 502 is fixed to the elastic sections 503 via the coupling portion 602.

The elastic sections 503 deform by a force applied to the structure 520 and are arranged at intervals at the outer periphery of the sensor 500 along the circumferential direction of the rotational axis CO or in the circumferential direction.

The supporting section 501 supports one of the scale 2 and the detection head 7, and the supporting section 502 supports the other one of the scale 2 and the detection head 7. In the present embodiment, the supporting section 501 supports the scale 2, and the supporting section 502 supports the detection head 7.

When a torque in the rotation direction is applied between the supporting sections 501, 502, the elastic sections 503 deform according to the magnitude of torque applied. The coupling portion 601 is relatively rotationally displaced about the rotational axis CO with respect to the coupling portion 602 by the amount of rotation corresponding to the amount of deformation. The elastic sections 503 are made of a material having an intended measurement range of torque and an elastic modulus, that is, a spring modulus, according to resolution and the like needed. The material of the elastic sections 503 is, for example, resin or metal, and examples of the metal include steel and stainless steel. In the present embodiment, the coupling portions 601, 602 and the elastic sections 503 are made of the same material and integrated, and are formed as one unit. The term "integrated" means that there is no attachment portion, coupling portion, or the like between each of the coupling portions 601, 602 and each of the elastic sections 503.

The material of the coupling portions 601, 602 and the elastic sections 503 may be the one formed by plating a base material made of metal or other than metal. In the present embodiment, steel electrolytic cold commercial (SECC) is used, and the coupling portions 601, 602 and the elastic sections 503 are prepared by folding a sheet metal made of SECC.

The structural section 900 is manufactured by folding a sheet metal. Thus, in comparison with an existing sensor manufactured by cutting, a sensor can be manufactured at low cost. Since the coupling portions 601, 602 and the elastic sections 503 are integrally formed from a sheet metal, the thickness is uniform. A sheet metal made of SECC is similarly used for the supporting sections 501, 502 as well.

SECC used in the present embodiment is a steel grade made by electrogalvanizing steel plate cold commercial (SPCC) that is a cold-rolled steel. SPCC is a steel sheet made from carbon, manganese, phosphorus, and sulfur. The material characteristics of SPCC used in the present embodiment are as follows.

The melting point is higher than or equal to 1510° C. and lower than or equal to 1550° C., the specific gravity is greater than or equal to 7.8 g/cm$^3$ and less than or equal to 7.9 g/cm$^3$, the electrical resistance is greater than or equal to 0.085 μΩ·m and less than or equal to 0.1 μΩ·m, and the specific heat is higher than or equal to 440 kJ/kg·K and lower than or equal to 480 kJ/kg·K. The volume specific heat is higher than or equal to 3.3 W/cm$^3$·K and lower than or equal to 3.9 W/cm$^3$·K, the coefficient of linear thermal expansion is higher than or equal to 10×10$^6$/K and lower than or equal to 12×10$^6$/K, the Young's modulus is greater than or equal to 200 GPa and less than or equal to 220 GPa, and the Poisson's ratio is higher than or equal to 0.25 and lower than or equal to 0.35.

The sensor 500 according to the present embodiment detects a torque applied in the circumferential direction of rotation about the rotational axis CO. At this time, a torque applied in the Z-axis direction, that is, an axial direction of rotation, should not be detected as much as possible. Therefore, the coupling portion 401 between the supporting section 501 and each of the elastic sections 503 and the coupling portion 402 between the supporting section 502 and each of the elastic sections 503 are coupled along the axial direction of rotation. The elastic sections 503 are disposed on the outer ring of the sensor 500 to increase the amount of displacement of each of the elastic sections 503 when external force (torque) is applied. However, the elastic sections 503 do not necessarily need to be disposed on the outer ring and can be disposed along the circumferential direction of rotation. In addition, the supporting section 501 serving as a support member is attached to the surface of the coupling portion 601, opposite to the elastic sections 503, and the supporting section 502 serving as a support member is attached to the surface of the coupling portion 602, opposite to the elastic sections 503. Thus, a torque applied in the axial direction of rotation is not detected as much as possible, and a torque applied in the circumferential direction of rotation, which is a measurement direction, can be accurately detected.

In the present embodiment, since the scale 2 and the detection head 7 are attached to the supporting sections 501, 502 serving as support members, it is difficult to detect a torque applied in the axial direction of rotation as compared to the case where the scale 2 and the detection head 7 are attached to the coupling portions 601, 602.

The scale 2 and the detection head 7 according to the present embodiment are arranged in the radial direction of the annular supporting sections 501, 502, that is, the scale 2 and the detection head 7 sets a torque detection direction to a direction in which the supporting sections 501, 502 relatively rotate. With this configuration, in comparison with the case where the scale 2 and the detection head 7 are arranged in the axial direction of rotation, that is, a direction in which the supporting sections 501, 502 overlap, the scale 2 and the detection head 7 can be disposed on the further outer peripheral side of the sensor 500. Thus, the amount of displacement of the scale 2 at the time when a torque is applied to the sensor 500 increases, with the result that the torque detection accuracy is improved. The scale 2 and the detection head 7 are disposed at locations close to the elastic sections 503, that is, at locations facing the elastic sections 503. Thus, a displacement of the elastic sections 503 can be more accurately measured.

The scale 2 can be disposed outward by a distance R or longer from the rotational axis CO to an end portion 6010 of each of the coupling portions 601, 602 in the radial direction, and a surface 20 facing the rotational axis CO-side surface of the scale 2 should be disposed outward by the distance R or longer. The distance R is, for example, longer than or equal to 3 cm and shorter than or equal to 7 cm. Here, the scale 2 is taken as an example. Alternatively, the detection head 7 may be disposed outward by the distance R or longer.

The sensor 500 measures a torque by detecting a relative displacement between the coupling portion 601 and the coupling portion 602, that is, a displacement in the rotation direction between the coupling portion 601 and the coupling portion 602. The only one encoder 510 is capable of measuring a torque; however, a plurality of the encoders 510 is suitably provided in the circumferential direction of the supporting sections 501, 502. The number of the plurality of encoders is more preferably four. In the present embodiment, the sensor 500 has four encoders 510.

The four encoders 510 have the same configuration. The four encoders 510 are disposed at equal intervals at 90-degree symmetrical locations about the rotational axis CO. The number of the encoders 510 included in the sensor 500 is preferably four; however, the number of the encoders 510 is not limited. The number of the encoders 510 included in the sensor 500 may be one, two, three, or five or more.

Each of the encoders 510 is an incremental or absolute encoder. In the present embodiment, the description will be made on the assumption that an incremental encoder is taken as an example; however, an absolute encoder may be used. Each of the encoders 510 is suitably an optical, capacitance, or magnetic encoder. Of these, an optical encoder capable of achieving high detection resolution is more suitable. Therefore, in the present embodiment, each of the encoders 510 is an optical encoder.

When an optical encoder is used, the scale 2 (or the detection head 7) is attached to the inside of the folded portion of the supporting section 501, so the folded portion has a light shielding effect against external light.

Each of the encoders 510 may be a linear encoder or a rotary encoder. A relative displacement in the rotation direction between the supporting section 501 and the supporting section 502 about the rotational axis CO is a small displacement at the location of each of the encoders 510 and may be regarded as a displacement in a translational direction. Thus, in the present embodiment, a linear encoder is adopted as each of the encoders 510. The encoder 510 is a reflective type in the present embodiment and may be a transmission type. Each of the encoders 510 is capable of detecting a relative displacement in the rotation direction about the rotational axis CO, that is, a relative displacement in a tangential direction, of the supporting section 502 to the supporting section 501.

Each of the encoders 510 includes the scale 2 and the detection head 7 disposed to face the scale 2. The detection head 7 includes a light transmission member 6, a light source 1, a light receiving unit 3, and a printed circuit board 4. The light transmission member 6 passes light. The light source 1, the light receiving unit 3, and the printed circuit board 4 serve as a detection unit fixed to the light transmission member 6 and arranged to process information from the scale 2. The light transmission member 6 is present between the detection unit and the scale 2 and can be, for example, glass, plastics, or the like. The light transmission member 6 is suitably glass. The rotational axis CO is the rotation axis of the structure 520 in a direction heading from the detection head 7 toward the scale 2.

The light transmission member 6 of the detection head 7 is bonded to the supporting section 502 by adhesive 11 that contacts with the light transmission member 6 and the supporting section 502. The light transmission member 6 is directly bonded to the supporting section 502. A resin 5 that coats the detection unit and the printed circuit board 4 may also be directly bonded to the supporting section 502.

In the present embodiment, the detection head 7 is bonded to the supporting section 502 and is supported by the supporting section 502. The scale 2 is bonded to the supporting section 501 and is supported by the supporting section 501. In other words, the supporting sections 501, 502, the scale 2, and the detection head 7 are directly bonded without intervening a component, such as a sensor stay. Thus, the number of the attachment portions and coupling portions that make up the sensor 500 is minimum, so, even when there occurs an environmental change, such as a temperature rise around the sensor 500, a torque value τ can be obtained with high accuracy.

Next, the configuration of the detection head 7 will be described with reference to FIG. 37C.

The detection head 7 includes the light transmission member 6, the light source 1, the light receiving unit 3, and the printed circuit board 4. The light source 1, the light receiving unit 3, and the printed circuit board 4 serve as the detection unit. An example in which a current-blocking point emitting LED is used as the light source 1 used in the present embodiment will be described. Diverging light is applied from the light source 1 to the scale 2, and reflected light is received by the light receiving unit 3. Light applied from the light source 1 to the scale 2 may be light with any wavelength; however, the wavelength is preferably greater than or equal to 550 nm and less than or equal to 1000 nm and more preferably greater than or equal to 650 nm and less than or equal to 900 nm.

The light receiving unit 3 has a light receiving element array 9. The light source 1 and the light receiving unit 3 are mounted on the printed circuit board 4 and is encapsulated by the transparent resin 5 that passes light. The transparent light transmission member 6 that passes light is disposed on the surface of the resin 5. With this configuration, the light source 1 and the light receiving unit 3 are protected by the resin 5 and the light transmission member 6.

Even in a state where no glass or the like serving as the light transmission member 6 is present on the surface of the resin 5 and the resin 5 is in a non-protected state, the resin 5 can function as the light transmission member 6. In this case, the resin 5 is bonded to the supporting section 502 by the adhesive 11 that contacts with the resin 5 and the supporting section 502. In the present embodiment, the light transmission member 6 of the detection head 7 is bonded to the supporting section 502. Alternatively, not only the light transmission member 6 but also the printed circuit board 4 and the resin 5 may be bonded to the supporting section 502. The refractive indices of the resin 5 and the light transmission member 6 are higher than or equal to 1.2 and lower than or equal to 1.8, and a difference in the refractive index between the resin 5 and the light transmission member 6 is preferably less than or equal to 0.2 and more preferably equal to each other.

The supporting section 502 has an opening portion, and no shielding material is present between the scale 2 and the detection head 7.

The distance between the scale 2 and the detection head 7 can be, for example, longer than or equal to 0.2 mm and is preferably longer than or equal to 0.6 mm. The distance between the scale 2 and the detection head 7 can be, for example, shorter than or equal to 1.2 mm and is preferably shorter than or equal to 1.0 mm. The distance between the scale 2 and the detection head 7 is more suitably longer than or equal to 0.6 mm and shorter than or equal to 1.0 mm.

The thickness of the light transmission member 6 is preferably greater than or equal to 0.2 mm and more preferably greater than or equal to 0.6 mm. The thickness of the light transmission member 6 is preferably less than or equal to 1.2 mm and more preferably less than or equal to 1.0 mm.

The thickness of the resin 5 is preferably greater than or equal to 0.4 mm and is preferably greater than or equal to 0.6 mm. The thickness of the resin 5 is preferably less than or equal to 1.1 mm and more preferably less than or equal to 0.9 mm. The distance between the light transmission member 6 and the detection unit 10 is preferably, for example, longer than or equal to 0.4 mm and shorter than or equal to 1.4 mm.

As shown in FIG. 37C, when the adhesive 11 is applied to a bonding location between the supporting section 502 and the detection head 7, the liquid surface can be meniscus. Ordinary adhesive can be used as the adhesive 11; however, when two-liquid mixing curing or ultraviolet curing adhesive is used as the adhesive 11, fixing is possible at any timing. With the use of the encoder 510, a relative displacement between the coupling portion 601 and the coupling portion 602 can be measured as a relative amount with a starting point set to a certain reference position.

Next, a method of forming the sensor 500 according to the present embodiment will be described with reference to FIG. 38A to FIG. 39C.

Figure 38A:
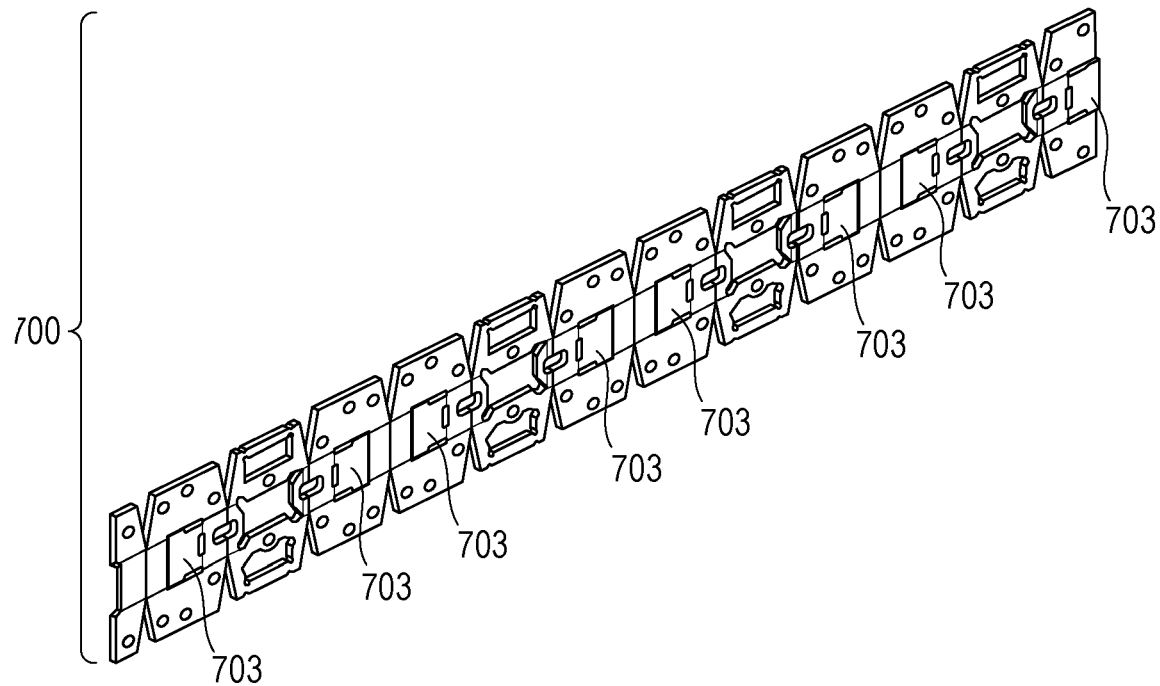
FIG. 38A is a perspective view of a steel sheet according to the eleventh embodiment.
Figure 38B:
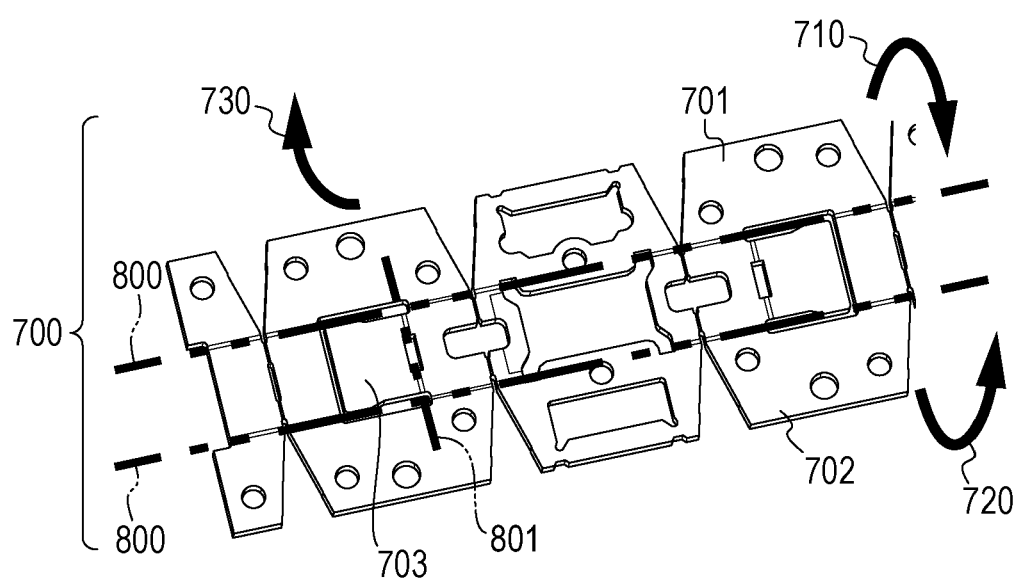
FIG. 38B is an enlarged diagram of a relevant portion of FIG. 38A.
Figure 38C:
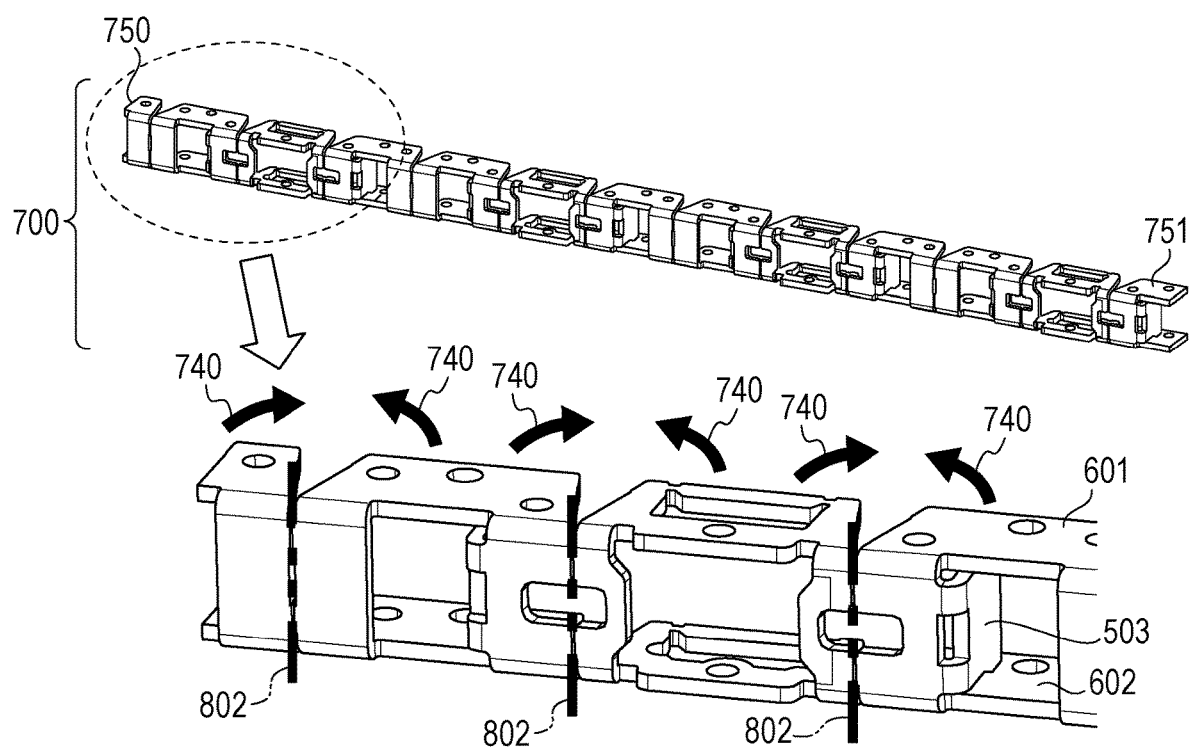
FIG. 38C is a schematic diagram showing a process when a sensor is manufactured.

FIG. 38A is a steel sheet 700 with a uniform thickness. The steel sheet 700 has a region 703 flexibly foldable. FIG. 38B is an enlarged view of a relevant portion of FIG. 38A. FIG. 38C is a view showing an assembling step for the steel sheet 700.

A foldable region 701 and a foldable region 702 are respectively folded in the direction of an arrow 710 and the direction of an arrow 720 with lines 800 used as folding lines. The region 703 is folded in the direction of an arrow 730 with a line 801 used as a folding line. The folded regions 701, 702 will be the coupling portions 601, 602 in the sensor 500, and the region 703 will be the elastic section 503 in the sensor 500.

Figure 39A:
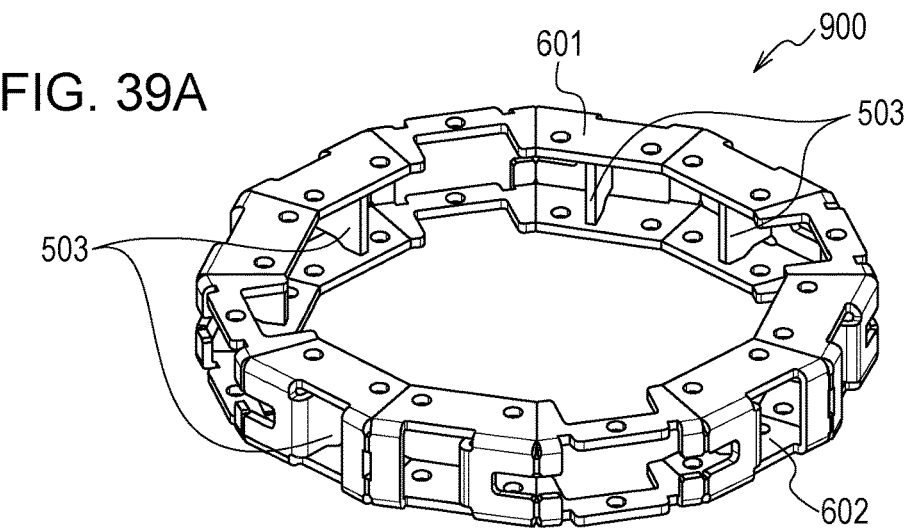
FIG. 39A is a perspective view of a structural section according to the eleventh embodiment.

The steel sheet 700 folded along the folding lines is folded in the directions of arrows 740 with lines 802 used as folding lines. The structural section 900 of FIG. 39A is formed by mating an end portion 750 with an end portion 751.

Figure 39B:
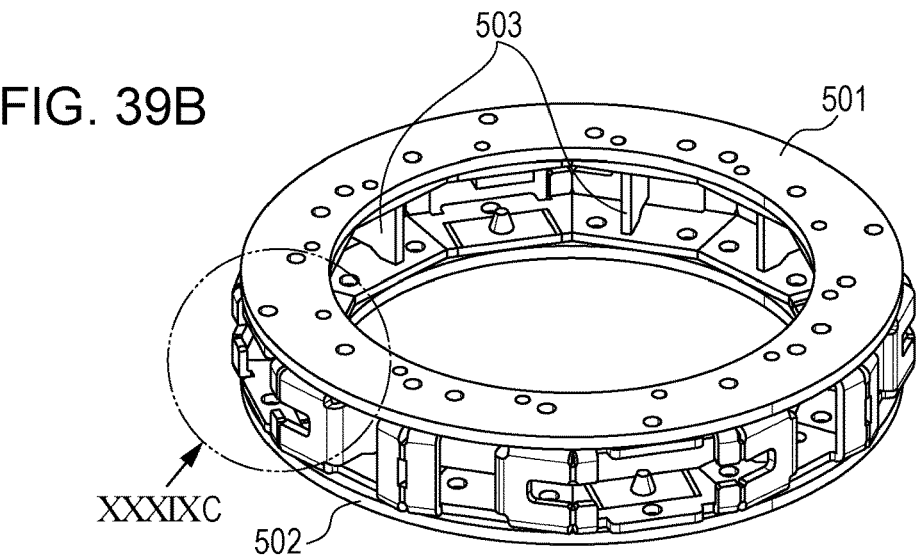
FIG. 39B is a perspective view of a structure according to the eleventh embodiment.

Subsequently, as shown in FIG. 39B, the supporting section 501 and the supporting section 502 are provided on both sides of the structural section 900. FIG. 39B shows a state where the supporting sections 501, 502 are provided but the scale 2 and the detection head 7 are not attached.

Figure 39C:
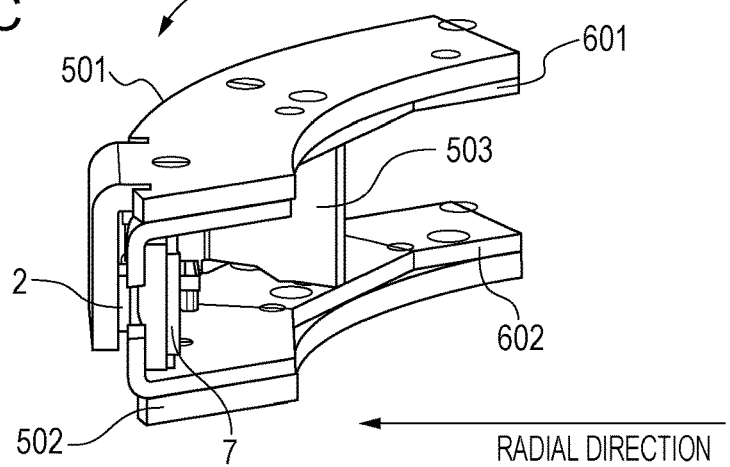
FIG. 39C is an enlarged diagram of a portion surrounded by the circle XXXIXC in FIG. 39B.

FIG. 39C is a partially enlarged view of a portion surrounded by the circle XXXIXC of FIG. 39B where the scale 2 and the detection head 7 are attached to the supporting sections 501, 502. The supporting sections 501, 502 are bent, and the scale 2 and the detection head 7 are attached along the radial direction of rotation at the tips of the bent portions. Thus, the sensor 500 is manufactured. By providing the scale 2 or the detection head 7 at the tip of the bent portion, that is, the outer ring of the sensor 500, a displacement of the elastic section 503 can be measured.

Figure 40A:
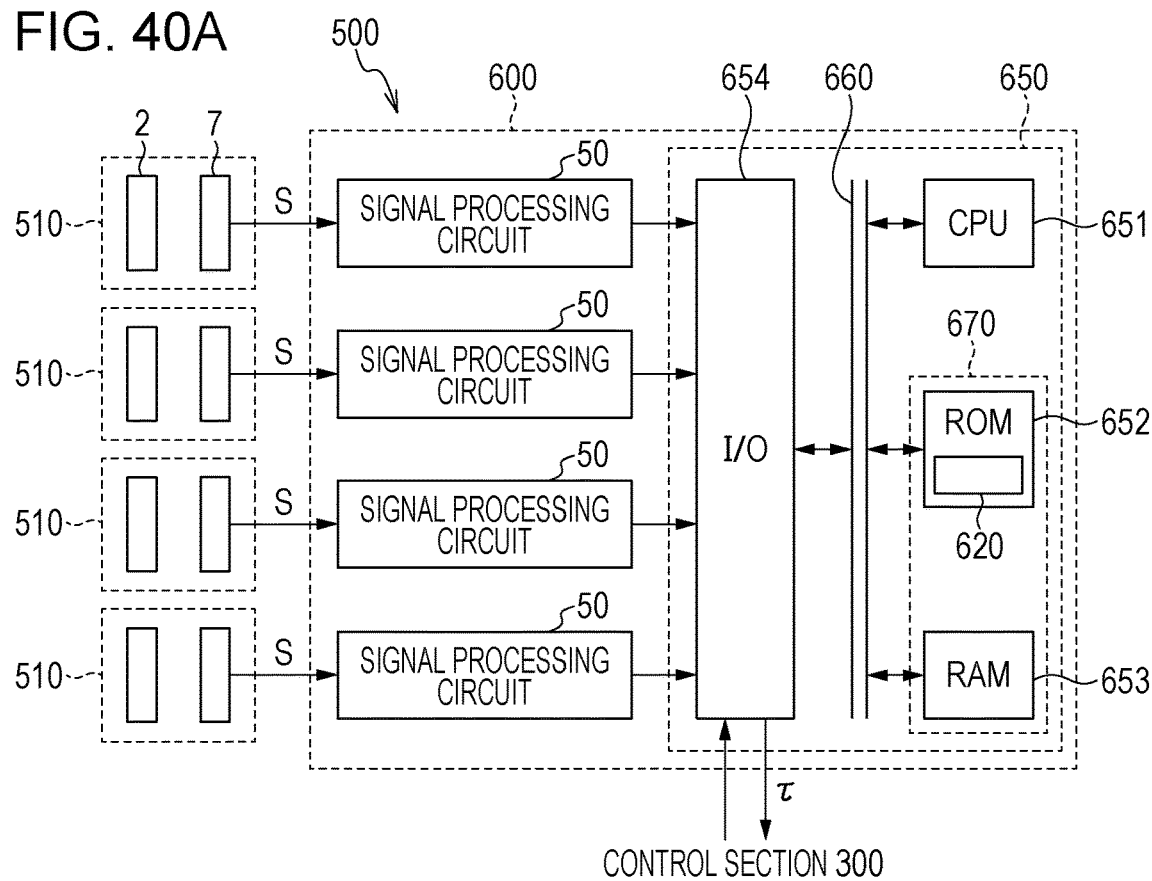
FIG. 40A is a block diagram of the configuration of the sensor according to the eleventh embodiment.

FIG. 40A is a block diagram showing the configuration of an arithmetic processing unit 600 of the sensor 500 according to the present embodiment. The arithmetic processing unit 600 includes, for example, four signal processing circuits 50 equal in number to the encoders 510, and a computer 650 connected to the four signal processing circuits 50. The computer 650 is, for example, a microcomputer. Hereinafter, an example of the configuration of the computer 650 will be described.

The computer 650 includes a central processing unit (CPU) 651 as a processor that is an example of a processing unit. The computer 650 includes a read only memory (ROM) 652 storing a program 620 for causing the CPU 651 to execute calculation processing to obtain a torque value ti, and a random access memory (RAM) 653 used to temporarily store data and the like. The computer 650 includes an input/output (I/O) 654 that is an interface with the signal processing circuits 50 and external connection devices, for example, a control section 300, an external storage (not shown), and the like. The CPU 651, the ROM 652, the RAM 653, and the I/O 654 are connected by a bus 660 so as to communicate with one another.

A torque value t is torque information, that is, torque data, and may be a normalized value. The CPU 651 acquires phase information from the signal processing circuits 50, obtains a torque value τ by executing calculation processing in accordance with the program 620 and outputs the obtained torque value τ to the control section 300.

In the present embodiment, the ROM 652 and the RAM 653 are provided to make up a storage device 670 that is an example of a storage section. The configuration of the storage device 670 is not limited thereto. The storage device 670 may be an internal storage, or an external storage, or a combination of an internal storage and an external storage.

In the present embodiment, a non-transitory recording medium readable by the computer 650 is the ROM 652, and the program 620 is stored in the ROM 652; however, the configuration is not limited thereto. The program 620 may be recorded on any recording medium as long as the recording medium is a non-transitory recording medium readable by the computer 650. Examples of the recording medium for supplying the program 620 to the computer 650 include a flexible disk, an optical disk, a magneto-optical disc, a magnetic tape, and a nonvolatile memory.

The arithmetic processing unit 600 obtains relative displacement information between the coupling portion 601 and the coupling portion 602 in accordance with a detected signal S that is an encoder signal from the detection head 7 of each encoder 510. Then, the arithmetic processing unit 600 converts the obtained displacement information to a torque value τ and outputs the torque value τ to the control section 300. The CPU 651 executes a process of interpolating information obtained by the detection head 7 from the scale 2 as a detected signal S, a process of writing and reading information to and from the storage device 670, and a process of, for example, outputting a position signal.

Figure 40B:
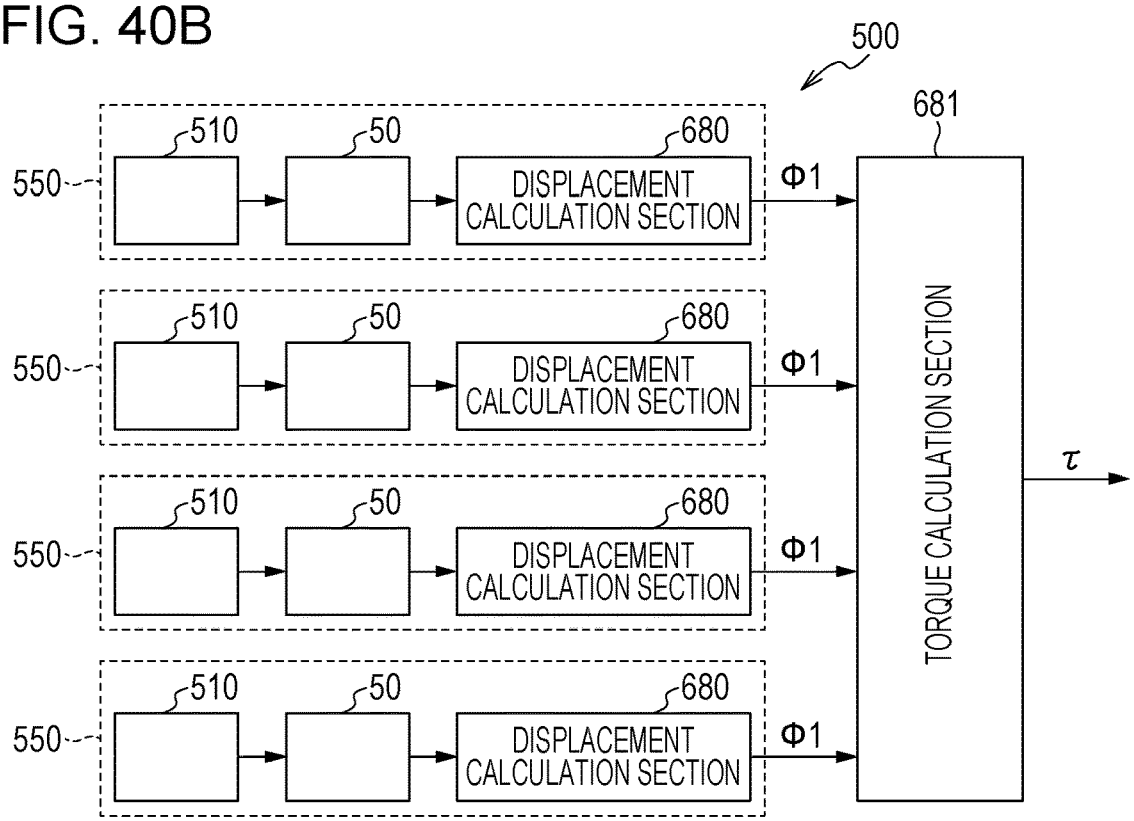
FIG. 40B is a block diagram of the functions of a sensor according to the eleventh embodiment.

FIG. 40B is a block diagram showing the functions of the sensor 500 according to the present embodiment.

The sensor 500 includes a plurality of, for example, four encoder devices 550, as examples of a plurality of displacement detecting units. Each of the encoder devices 550 includes the encoder 510, the signal processing circuit 50, and the functions of part of the computer 650 shown in FIG. 40A. When the CPU 651 shown in FIG. 40A runs the program 620, the CPU 651 functions as displacement calculation sections 680 and a torque calculation section 681, shown in FIG. 40B.

In other words, the CPU 651 functions as the displacement calculation sections 680 of the encoder devices 550.

The CPU 651 functions as the torque calculation section 681 of the sensor 500, which calculates a torque value τ by using a phase (D1 that is displacement information calculated by each displacement calculation section 680. Calculation processing of the phase $\Phi 1$ by each displacement calculation section 680 will be described later. The phase $\Phi 1$ is relative displacement information of the coupling portion 601 to the coupling portion 602 resulting from an elastic deformation of the elastic sections 503 according to a torque applied to the sensor 500, not including an elastic deformation of the coupling portion 601.

Figure 41A:
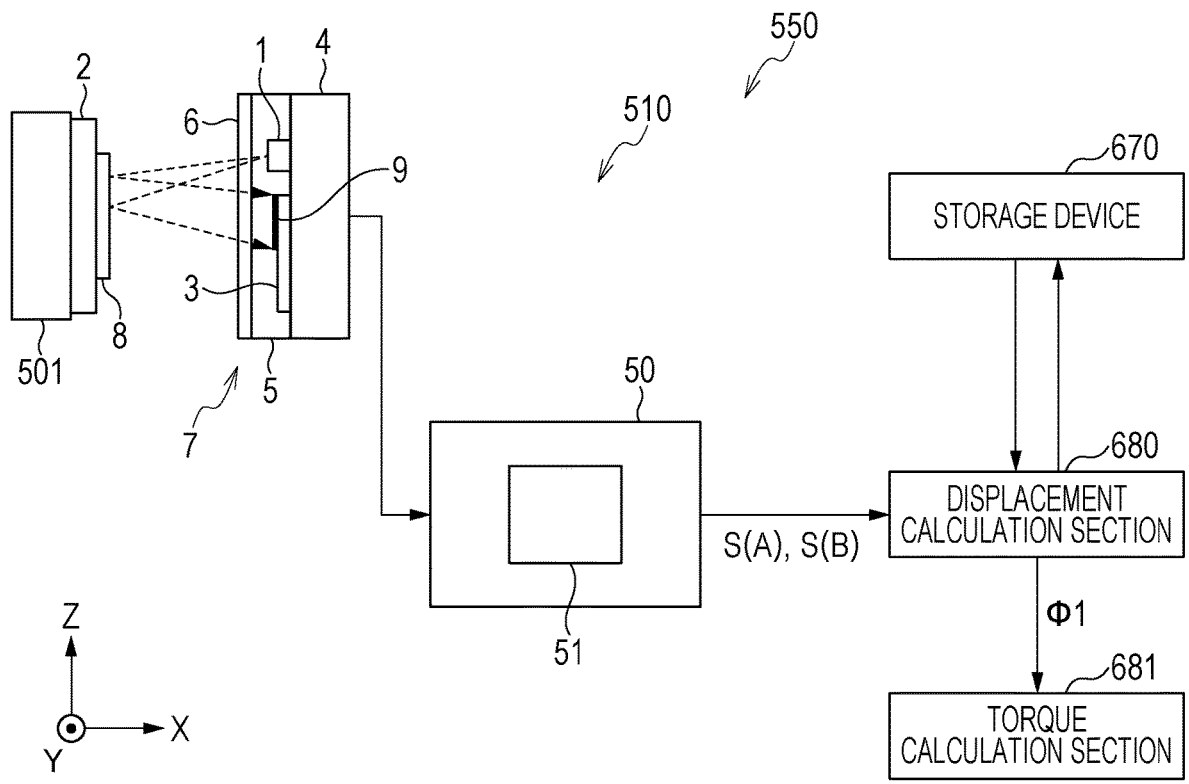
FIG. 41A is a schematic diagram of an encoder device that is an example of a displacement detecting unit according to the eleventh embodiment.
Figure 41B:
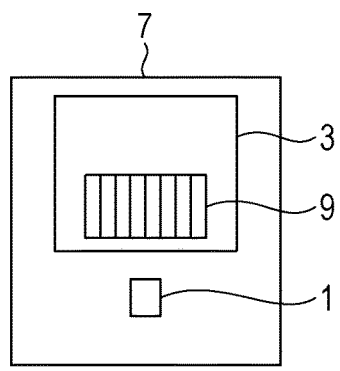
FIG. 41B is a plan view of a detection head according to the eleventh embodiment.

The encoder device 550 according to the present embodiment will be described with reference to FIGS. 41A and 41B. FIG. 41A is a schematic diagram of the encoder device 550 according to the present embodiment when viewed in the Y direction. FIG. 41B is a plan view of the detection head 7 according to the present embodiment when viewed in the X direction.

The scale 2 translates in the circumferential direction of rotation relatively to the detection head 7. It is assumed that the moving direction of the scale 2 that translates relatively to the detection head 7 is the X direction or the Y direction that intersects with the X direction, and a direction that intersects with the X direction and the Y direction is the Z direction. The X direction, the Y direction, and the Z direction can be directions orthogonal to one another. The X direction and the Y direction are also measurement directions in the encoder 510.

The detection head 7 is disposed at a position facing the scale 2 in the X direction or the Y direction. The detection head 7 includes the light source 1 made up of an LED, which is an example of a light emitting unit, and the light receiving unit 3. The light receiving unit 3 is disposed with a space in the X direction or the Y direction from the light source 1.

The encoder device 550 will be described with reference to FIGS. 41A and 41B. A scale truck 8 is provided on the surface of the scale 2. Diverging beams emitted from the light source 1 are applied to the scale truck 8 of the scale 2 in an oblique direction. Beams are reflected from the scale truck 8 toward the light receiving element array 9 of the detection head 7.

The signal processing circuit 50 is a semiconductor element made up of, for example, an IC chip. The signal processing circuit 50 is, for example, mounted on the surface of the printed circuit board 4. The arrangement location of the signal processing circuit 50 is not limited thereto and may be disposed in a place different from a place on the printed circuit board 4. In FIG. 41A, the signal processing circuit 50 is illustrated in a place different from a place on the printed circuit board 4 for the sake of convenience of description. The signal processing circuit 50 includes a circuit portion 51 that processes a detected signal S acquired from the light receiving element array 9, of the detected signal S.

Figure 42:
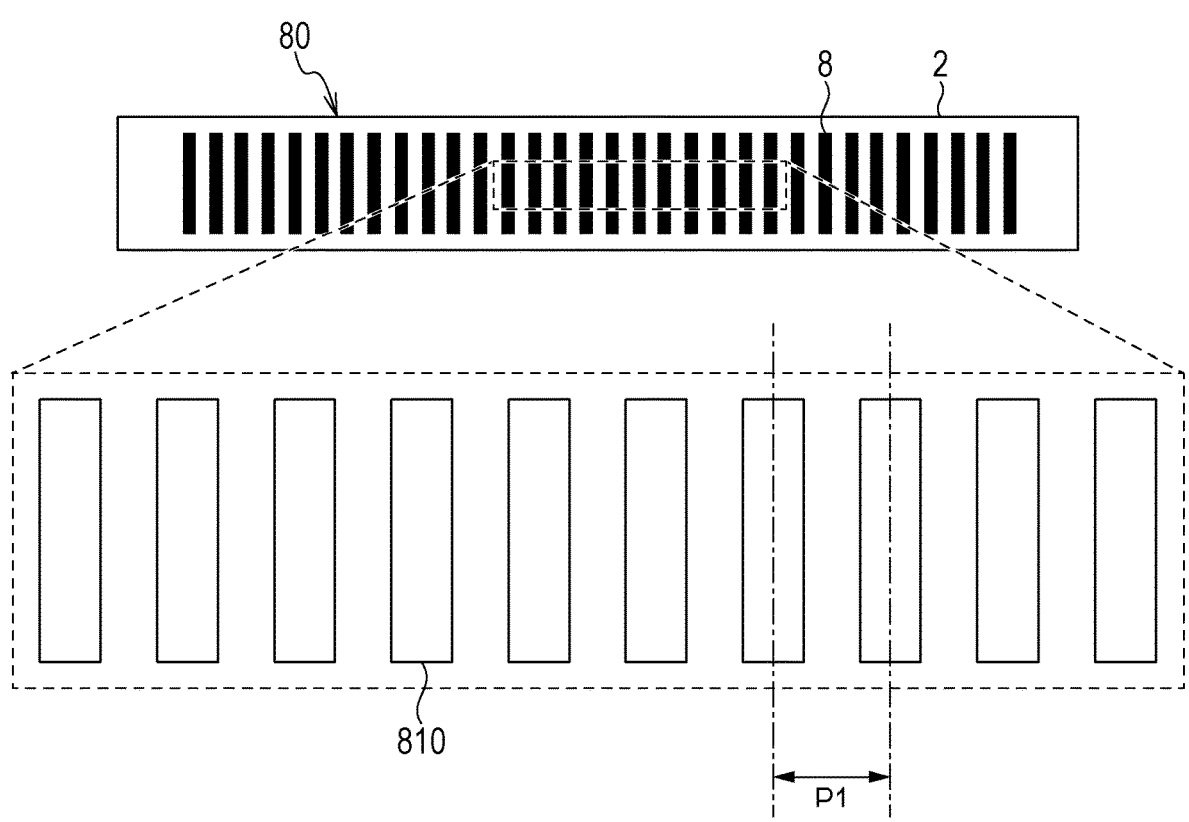
FIG. 42 is a diagram illustrating a scale according to the eleventh embodiment.

Next, the configuration of the scale 2 will be described with reference to FIG. 42. The scale 2 has a pattern portion 80. The detection head 7 reads the pattern portion 80 of the scale 2 and outputs a detected signal S to the signal processing circuit 50. The pattern portion 80 is formed in the scale truck 8.

Beams received by the light receiving element array 9 are converted to electrical signals. Each electrical signal is transmitted to the circuit portion 51 of the signal processing circuit 50 as an associated detected signal S.

Patterns 810 of the scale truck 8 are disposed with a space in the X direction or the Y direction at a predetermined pitch P1. The pitch P1 used to measure a torque can be a pitch as small as possible. By narrowing the pitch P1, the sensor 500 with high resolution is implemented. Hereinafter, the case where the pitch P1 is 100 μm will be described.

The scale 2 has, for example, a base material like glass. The pattern portion 80 is formed by patterning chromium films on the base material. The base material of the scale 2 may be resin, such as polycarbonate, or metal, such as SUS. The pattern portion 80 should function as a reflection film and may be an aluminum film.

Figure 43:
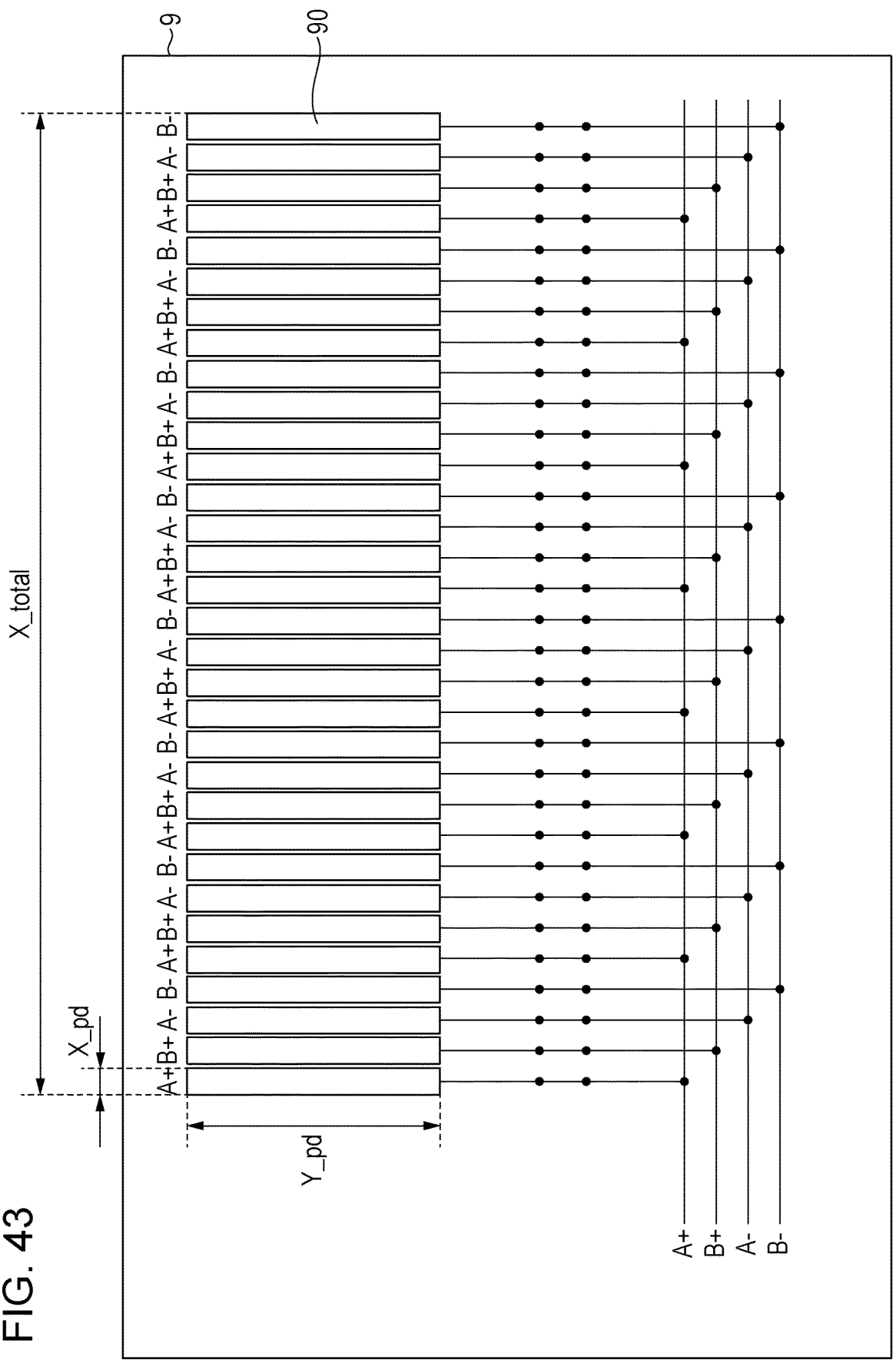
FIG. 43 is a plan view of a light receiving element array according to the eleventh embodiment.

FIG. 43 is a plan view of the light receiving element array 9 according to the present embodiment. The light receiving element array 9 has a plurality of, for example, 32 light receiving elements 90 arranged with a pitch of 50 μm in the X direction. For example, the width X_pd of each of the light receiving elements 90 in the X direction is 50 μm, and the width Y_pd of each of the light receiving elements 90 in the Y direction is 800 μm. The total width X_total of the light receiving element array 9 is 1600 μm.

The patterns 810 on the scale 2 are double in size on the light receiving element array 9.

Therefore, a detection range on the scale 2 is, for example, a range of 800 μm in the X direction and 400 μm in the Y direction. A detected signal of the light receiving element array 9 is output to the circuit portion 51 shown in FIG. 41A.

Twelfth Embodiment

Next, a method of attaching an encoder 510 according to the present embodiment will be described with reference to FIGS. 44A to 44D. The present embodiment differs from the eleventh embodiment in that attachment portions 310, 320 are provided between the supporting sections 501, 502 and between the detection head 7 and the scale 2.

Figure 44D:
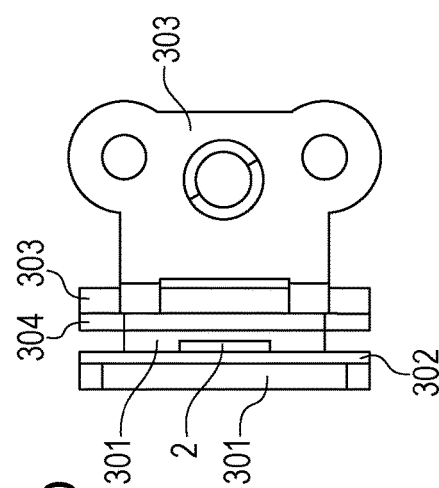
FIG. 44D is a bottom view of an attachment portion.
Figure 44C:
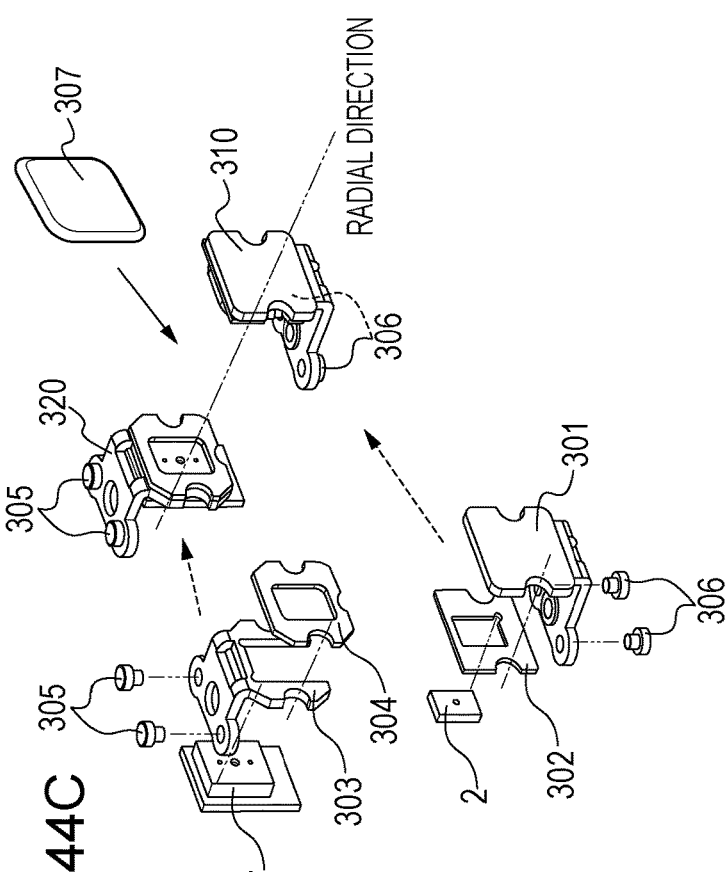
FIG. 44C is a diagram showing a method of mounting an encoder.
Figure 44A:
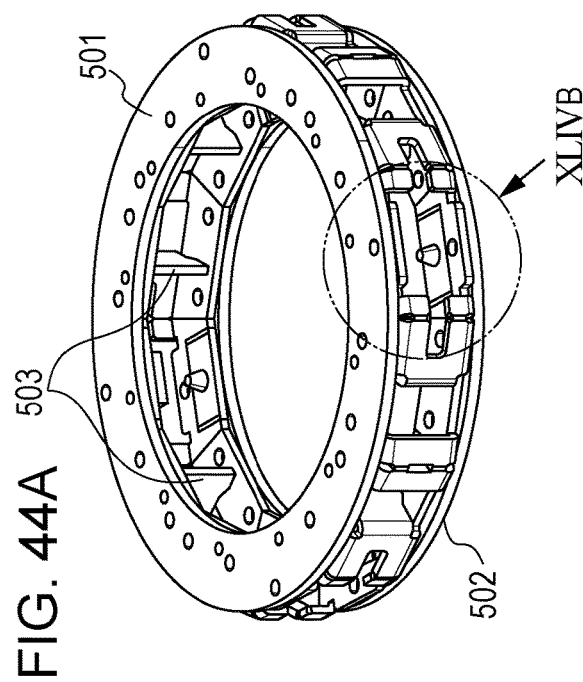
FIG. 44A is a perspective view of a structure according to a twelfth embodiment.
Figure 44B:
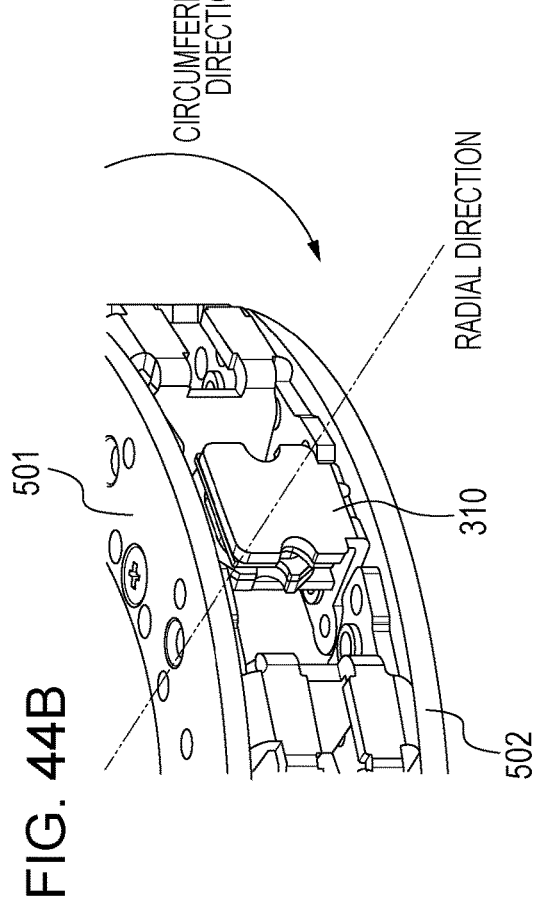
FIG. 44B is an enlarged diagram of a portion surrounded by the circle XLIVB in FIG. 44A.

FIG. 44A is a view in which the supporting sections 501, 502 are provided on both upper and lower sides of the structural section 900. FIG. 44B is an enlarged view of a portion surrounded by the circle XLIVB in FIG. 44A. FIG. 44C is a view showing a method of attaching the encoder 510. FIG. 44D is a bottom view of the encoder 510 after the encoder 510 is attached.

In the present embodiment, the scale 2 and the detection head 7 are attached to the attachment portions 310, 320, and the attachment portions 310, 320 are fixed to the supporting sections 501, 502.

The attachment portion 310 is made up of a component portion 301 and a component portion 302. The attachment portion 310 is formed by combining the component portions 301, 302, and the scale 2 is attached to the attachment portion 310. Similarly, the attachment portion 320 is made up of a component portion 303 and a component portion 304. The attachment portion 320 is formed by combining the component portions 303, 304, and the detection head 7 is attached to the attachment portion 320.

The attachment portion 310 is positioned on one of the supporting section 501 and the supporting section 502 by pins 305. The attachment portion 320 is positioned on the other one of the supporting section 501 and the supporting section 502 by pins 306. The supporting section 501 has holes with the same diameter as the pins 305, and the attachment portion 320 is positioned by fitting the pins 305 to the holes. The supporting section 502 has holes with the same diameter as the pins 306, and the attachment portion 310 is positioned by fitting the pins 306 to the holes.

In the present embodiment, a sponge sealer 307 is sandwiched between the component portion 302 and the component portion 304. Thus, entry of dust and the like to around the sensor 500 is prevented. The component portion 302 has a hole for positioning the scale 2. In FIG. 44D, although the sealer 307 is not shown, the sealer 307 is provided between the component portion 302 and the component portion 304 to block entry of dust and the like to around the scale 2.

When the attachment portions 320, 310 are respectively attached to the supporting sections 501, 502, the attachment portion 320 can be positioned by fitting, to recesses provided in the component portions 303, 304, shafts with the same diameter as the recesses, and the attachment portion 310 can be positioned by fitting, to recesses provided in the component portions 301, 302, shafts with the same diameter as the recesses.

One of the detection head 7 and the scale 2 can be attached to the attachment portion 310, and the other one of the detection head 7 and the scale 2 can be attached to the attachment portion 320. One of the attachment portion 310 and the attachment portion 320 can be attached to the supporting section 501, and the other one of the attachment portion 310 and the attachment portion 320 can be attached to the supporting section 502.

Thirteenth Embodiment

Next, a robot system 100 that is an example of a system equipped with the sensor 500 according to the eleventh embodiment will be described with reference to FIGS. 45 to 47.

Figure 45:
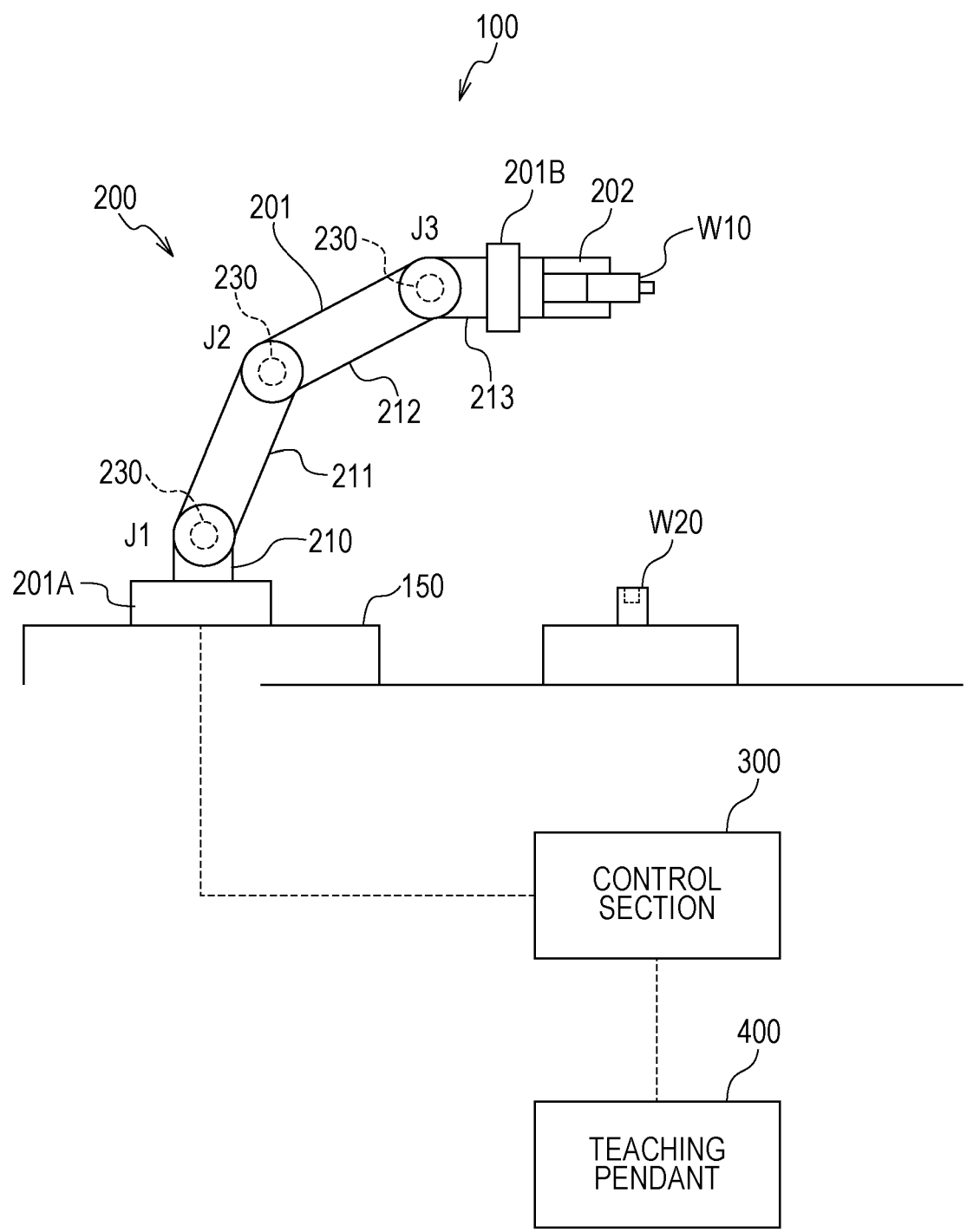
FIG. 45 is a diagram illustrating a robot system according to a thirteenth embodiment.

FIG. 45 is a diagram illustrating the robot system 100 according to the present embodiment. As shown in FIG. 45, the robot system 100 includes a robot 200 and a control section 300. The robot 200 is capable of performing work for manufacturing a product, for example, work for manufacturing a product by gripping a first workpiece W10 and assembling the gripped first workpiece W10 to a second workpiece W20. Even when a worker is nearby, the robot 200 is capable of performing work in cooperation with the worker.

A machine device is, for example, the robot 200. The control section 300 that controls the machine device is, for example, a robot controller and controls the robot 200. A teaching pendant 400 that is an example of a teaching device can be connected to the control section 300. The teaching pendant 400 is a device that teaches the robot 200, and outputs teaching data to the control section 300. The control section 300 generates trajectory data in accordance with the teaching data and causes the robot 200 to operate in accordance with the trajectory data.

The robot 200 includes a robot arm 201 and a robot hand 202 that is an example of an end effector. The robot arm 201 is, for example, a vertical articulated robot arm. A fixed end 201A that is the proximal end of the robot arm 201 is fixed to a stand 150. The robot hand 202 is attached to a free end 201B that is the distal end of the robot arm 201. The robot arm 201 has a plurality of links 210, 211, 212, 213. The links 210, 211, 212, 213 are rotatably coupled by joints J1, J2, J3. A drive unit 230 is provided in each of the joints J1 to J3 of the robot arm 201. A drive unit with an appropriate output power for a torque used is used as the drive unit 230 in each of the joints J1 to J3.

Hereinafter, in the robot arm 201, the joint J1 will be typically described as an example, and the description of the other joints J2, J3 is omitted because of similar configurations although the size or performance is different.

Figure 46:
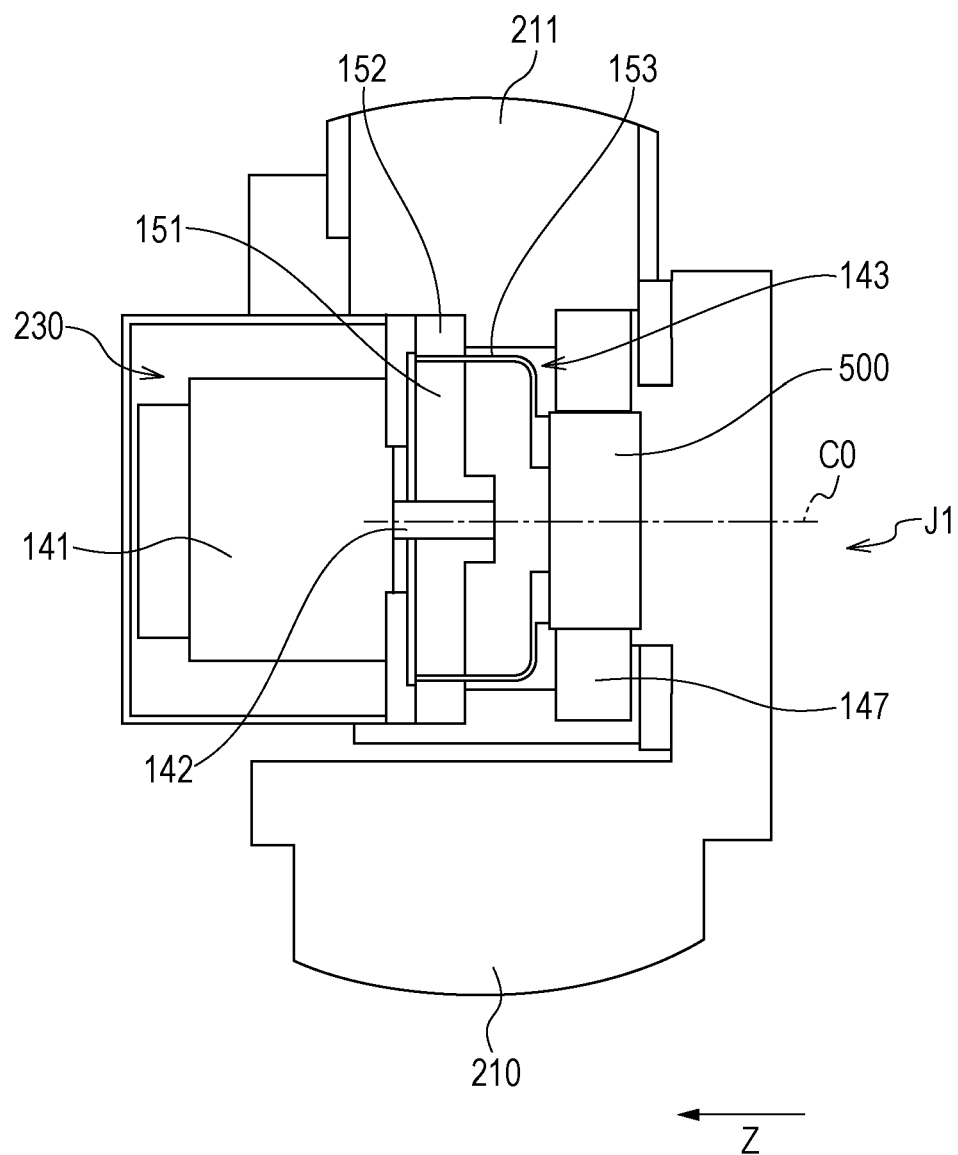
FIG. 46 is a partially sectional view showing a joint of a robot arm according to the thirteenth embodiment.

FIG. 46 is a partially sectional view showing the joint J1 of the robot arm 201 according to the present embodiment. The drive unit 230 includes an electric motor 141 that is a rotational driving source, a speed reducer 143 connected to a rotating shaft 142 of the motor 141 and arranged to reduce and transmit the rotation of the rotating shaft 142 to the sensor 500, and the sensor 500 disposed on the output side of the speed reducer 143. The rotating shaft 142 of the motor 141 rotates about the rotational axis CO. The link 210 and the link 211 are coupled rotatably via a cross roller bearing 147. The motor 141 is a servo motor and is, for example, a brushless DC servo motor or an AC servo motor. The motor 141 generates heat, and the temperature of the motor 141 can be, for example, higher than or equal to 90° C. The temperature around the sensor 500 rises due to heat radiated from the motor 141, and, in addition, the temperature of the adhesive 11 bonding the supporting section 501 with the detection head 7 rises, so the adhesive 11 can be loosened.

Particularly, when the temperature of the adhesive 11 becomes a temperature higher than the glass transition point of the adhesive 11, the adhesive 11 tends to be loosened. The glass transition point of the adhesive 11, for example, ranges from 40° C. to 80° C.

Therefore, when the motor 141 is driven and the temperature of the motor 141 becomes a temperature higher than the glass transition point of the adhesive 11, the adhesive 11 tends to be loosened.

As the distance between the sensor 500 and the motor 141 reduces, and when, for example, the distance is shorter than or equal to 3 cm, the temperature around the sensor 500 tends to rise due to heat radiated from the motor 141.

The speed reducer 143 is a wave gear speed reducer in the present embodiment. The speed reducer 143 includes a wave generator 151 that is an example of an input shaft and a circular spline 152 that is an example of an output shaft. The wave generator 151 is coupled to the rotating shaft 142 of the motor 141. The circular spline 152 is fixed to the link 211. The circular spline 152 is coupled to the link 211. Alternatively, the circular spline 152 may be integrated with the link 211.

The speed reducer 143 is disposed between the wave generator 151 and the circular spline 152 and includes a flexible spline 153 coupled to the link 210 via the sensor 500. The flexible spline 153 is formed in a cup shape. The flexible spline 153 deflects to be deformed into an elliptical shape by the wave generator 151 and meshes with the circular spline 152 at the long axis part of the elliptical shape. As the wave generator 151 rotates, the long axis part of the elliptical shape in the flexible spline 153 rotates, and the meshing point between the flexible spline 153 and the circular spline 152 shifts in the rotation direction of the wave generator 151. As the wave generator 151 rotates one revolution, the circular spline 152 relatively rotates with respect to the flexible spline 153 by the teeth number difference between the flexible spline 153 and the circular spline 152.

Thus, the circular spline 152 is reduced in speed at a predetermined speed reducing ratio with respect to the rotation of the wave generator 151 and relatively rotates with respect to the flexible spline 153. Therefore, the link 211 to which the circular spline 152 is coupled relatively rotates around the rotational axis CO with respect to the link 210 to which the flexible spline 153 is coupled via the sensor 500.

The sensor 500 is disposed on the flexible spline 153 that is the output side of the speed reducer 143. In other words, the sensor 500 is disposed between the link 210 and the flexible spline 153 of the speed reducer 143, that is, between the link 210 that is an example of the first link and the link 211 that is an example of the second link. The sensor 500 measures a torque around the rotational axis CO between the link 210 and the link 211, and outputs an electrical signal (digital signal) according to a torque value $\tau$ that is a measured value to the control section 300. The control section 300 controls the robot 200 in accordance with a torque value.

Figure 47:
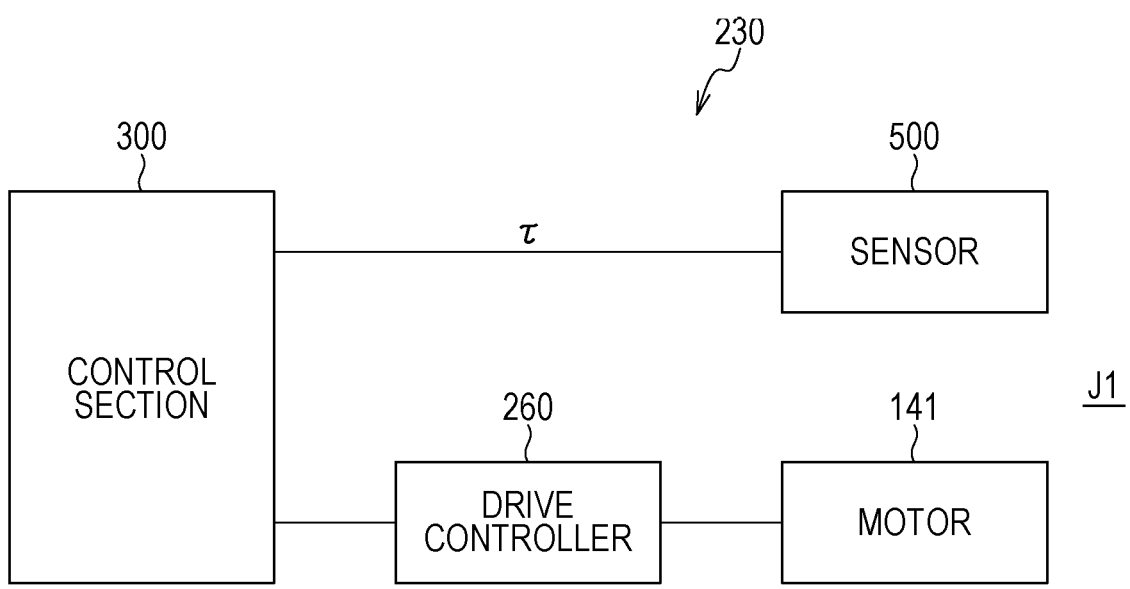
FIG. 47 is a block diagram showing a control system of the joint of the robot arm according to the thirteenth embodiment.

FIG. 47 is a block diagram showing a control system of the joint J1 of the robot arm 201 in the present embodiment. The drive unit 230 includes a drive controller 260 electrically connected to the motor 141 and the control section 300. The sensor 500 of the drive unit 230 is electrically connected to the control section 300.

The control section 300 is to generally control the overall robot system. In other words, the control section 300 controls the operation of the robot 200. There are position control and force control to control the operation of the robot 200.

The control section 300, during position control, generates an operation command in accordance with the location of the hand of the robot 200 and outputs the generated operation command to the drive controller 260. The control section 300, during force control, generates an operation command in accordance with a torque value $\tau$ that is a measured value from the sensor 500 and outputs the generated operation command to the drive controller 260. The drive controller 260 drives the motor 141 by controlling the current supplied to the motor 141 in accordance with the operation command.

During force control, the control section 300 causes the robot 200 to operate in accordance with a torque value $\tau$ that is the output of the sensor 500. Therefore, the performance of force control of the robot 200 depends on the accuracy, that is, resolution, of the sensor 500.

Next, a control method for the robot 200 will be described.

When the robot 200 operates, the control section 300 controls the robot 200 such that the robot 200 operates in accordance with trajectory data according to a robot program including teaching data. During then, the control section 300 supplies drive current to the motor 141 of each of the joints J1 to J3 to drive each of the joints J1 to J3. A torque that is a load may be applied or may be not applied from an outside to each of the joints J1 to J3.

After the robot 200 starts operation, the displacement calculation section 680 detects a phase $\Phi 1$ indicating the amount of displacement in the X direction from the patterns 810. In other words, the displacement calculation section 680 obtains the amount of relative displacement of the scale 2 in the X direction with respect to the detection head 7 as a phase $\Phi 1$ by using sinusoidal signals S(A), S(B) from the circuit portion 51.

The control section 300 acquires a torque value $\tau$ from the sensor 500 during control of the robot 200 in accordance with the detected result.

The phase $\Phi 1$ is obtained from the following expression.

$$\Phi 1 = \text{ATAN2}[S(A), S(B)]$$

ATAN2[Y,X] is an arctangent function that determines a quadrant and converts the phase to a phase of 0 to $2\pi$.

Before calculation of the expression (3), the offsets of amplifiers, gain ratios included in the sinusoidal signals S(A), S(B) due to gain variations and the like, and offset errors may be corrected with correction values obtained in advance. For example, in each of the sinusoidal signals S(A), S(B), a gain ratio, that is, an amplitude ratio, can be calculated from ((maximum value)−(minimum value))/2, and a correction value for equalizing the signal amplitudes can be calculated. Similarly, an offset error amount can be calculated from ((maximum value)+(minimum value))/2, and a correction value for correcting the offset error value can be calculated in advance. These correction values can be stored in the storage device 670.

Thus, the displacement calculation section 680 obtains a phase $\Phi 1$ from the sinusoidal signals S(A), S(B).

Then, the torque calculation section 681 calculates a torque value $\tau$ in accordance with four phases $\Phi 1$ respectively obtained for the four encoders 510. For example, the torque calculation section 681 calculates a torque value $\tau$ by, for example, averaging the four phases $\Phi 1$ and multiplying the average value by a sensitivity coefficient proportional to a predetermined coefficient, for example, the elastic modulus of the elastic sections 503. A method of calculating a torque value $\tau$ is not limited thereto. Alternatively, a torque value $\tau$ may be obtained by converting the phases (D 1 to temporary torque values and averaging the four temporary torque values. The displacement calculation section 680 outputs the calculated torque value $\tau$ to the control section 300.

The present invention may also be implemented by a process in which a program that implements one or more functions of the above-described embodiments is supplied to a system or a device via a network or a storage medium and one or more processors in a computer of the system or device read and run the program. Alternatively, embodiments of the present invention may be implemented by a circuit (for example, ASIC) that implements one or more functions.

The sensor 500 according to the present embodiment is applicable to not only industrial devices, such as robots, but also transportation devices, such as automobiles, electronic devices, such as cameras, business devices, such as printers, medical devices, such as CTs, industrial devices, such as exposure apparatuses, assist devices, such as artificial arms, artificial legs, and power assist suits, and other devices. In these devices, a machine or the like can be controlled by a controller in accordance with a signal detected by the sensor 500.

In the above-described embodiment, a torque sensor has been described as an example of the sensor 500; however, the sensor 500 is not limited to a torque sensor. When the embodiment of the present invention is applied to, for example, a device (sensor) that detects a displacement, such as a displacement detecting unit, a potentiometer, and a strain gauge, it is possible to suppress a decrease in the accuracy of the sensor.

The specification describes the following configurations.

Configuration I-1

A sensor including: a structure; and a detector arranged to detect a deformation of the structure, wherein
the structure has at least four elastic sections discretely disposed in an imaginary plane,
the structure includes at least one metal component formed by bending a metal member, and
the one metal component has at least two elastic sections of the four elastic sections.

Configuration I-2

The sensor according to Configuration I-1, wherein the one metal component has a side surface section discretely disposed in the plane.

Configuration I-3

The sensor according to Configuration I-2, wherein each of the two elastic sections is connected to the side surface section, and the metal member is bent by bending at a connection between the side surface section and each of the two elastic sections.

Configuration I-4

The sensor according to Configuration I-3, wherein the connection with each of the two elastic sections includes a first part and a second part arranged in a direction perpendicular to the plane, and an air gap is disposed between the first part and the second part.

Configuration I-5

The sensor according to any one of Configurations I-1 to I-4, wherein the one metal component has a top surface section and a bottom surface section facing the top surface section, and the two elastic sections are provided such that the plane is located between the top surface section and the bottom surface section.

Configuration I-6

The sensor according to Configuration I-5, wherein the one metal component has side surface section connected to the top surface section and the bottom surface section, the metal member is bent by bending at a connection between the top surface section and the side surface section, and the metal member is bent by bending at a connection between the bottom surface section and the side surface section.

Configuration I-7

The sensor according to Configuration I-5 or I-6, wherein each of the two elastic sections is connected to the top surface section, and the metal member is bent by bending at a connection between the top surface section and each of the two elastic sections.

Configuration I-8

The sensor according to any one of Configurations I-5 to I-7, wherein each of the two elastic sections is welded to at least one of the top surface section and the bottom surface section.

Configuration I-9

The sensor according to Configuration I-6, wherein the top surface section is made up of a plurality of top plate portions arranged along the plane, the bottom surface section is made up of a plurality of bottom plate portions arranged along the plane, the side surface section is made up of a plurality of side plate portions arranged along the plane, the metal member is bent by bending at a connection between a first side plate portion and a second side plate portion of the plurality of side plate portions, the metal member is bent by bending at a connection between the first side plate portion and a first top plate portion of the plurality of top plate portions, the metal member is bent by bending at a connection between the second side plate portion and a second top plate portion of the plurality of top plate portions, the metal member is bent by bending at a connection between the first side plate portion and a first bottom plate portion of the plurality of bottom plate portions, the metal member is bent by bending at a connection between the second side plate portion and a second bottom plate portion of the plurality of bottom plate portions, an inferior angle formed between the first side plate portion and the second side plate portion is larger than each of an inferior angle formed by the first top plate portion and the first side plate portion, an inferior angle formed between the second top plate portion and the second side plate portion, an inferior angle formed between the first bottom plate portion and the first side plate portion, and an inferior angle formed between the second bottom plate portion and the second side plate portion, and of the two elastic sections, a first elastic section overlaps at least one of the first top plate portion and the first bottom plate portion.

Configuration I-10

The sensor according to Configuration I-9, wherein the first top plate portion and the second top plate portion are welded to each other, and the first bottom plate portion and the second bottom plate portion are welded to each other.

Configuration I-11

The sensor according to Configuration I-9 or I-10, wherein the metal member is bent by bending at a connection between the second side plate portion and a third side plate portion of the plurality of side plate portions, the metal member is bent by bending at a connection between the third side plate portion and a third top plate portion of the plurality of top plate portions, the metal member is bent by bending at a connection between the third side plate portion and a third bottom plate portion of the plurality of bottom plate portions, an inferior angle formed between the second side plate portion and the third side plate portion is larger than each of an inferior angle formed between the third top plate portion and the third side plate portion and an inferior angle formed between the third bottom plate portion and the third side plate portion, and of the two elastic sections, a second elastic section overlaps at least one of the third top plate portion and the third bottom plate portion.

Configuration I-12

The sensor according to Configuration I-11, wherein a first component of the detector is fixed to the second top plate portion, and a second component of the detector is fixed to the second bottom plate portion.

Configuration I-13

The sensor according to any one of Configurations I-1 to I-12, wherein the four elastic sections are disposed in the plane such that an imaginary circle passes through the four elastic sections.

Configuration I-14

The sensor according to any one of Configurations I-1 to I-13, wherein the one metal component has four elastic sections of the four elastic sections.

Configuration I-15

The sensor according to any one of Configurations I-1 to I-14, wherein the metal member is a cold-rolled steel.

Configuration I-16

The sensor according to any one of Configurations I-1 to I-13, wherein the one metal component is defined as a first metal component, the structure includes a second metal component, and the second metal component has two elastic sections of the four elastic sections, different from the two elastic sections of the first metal component.

Configuration I-17

The sensor according to any one of Configurations I-1 to I-16, wherein the structure includes a reinforcement component that overlaps a plurality of elastic sections of the four elastic sections, the reinforcement component is coupled to the one metal component, and a thickness of the reinforcement component is greater than a thickness of the metal member and less than a height of the metal component.

Configuration I-18

The sensor according to any one of Configurations I-1 to I-17, wherein the structure includes a first reinforcement overlapping a plurality of elastic sections of the four elastic sections and a second reinforcement component overlapping the plurality of elastic sections, the one metal component is disposed between the first reinforcement component and the second reinforcement component, and the one metal component is coupled to the first reinforcement component and the second reinforcement component.

Configuration I-19

The sensor according to Configuration I-18, wherein the first reinforcement component and the second reinforcement component overlap four elastic sections of the four elastic sections.

Configuration I-20

The sensor according to Configuration I-18 or I-19, wherein each of the first reinforcement component and the second reinforcement component is welded to the one metal component.

Configuration I-21

A device including a first link; a second link arranged to relatively move with respect to the first link; and the sensor according to any one of Configurations I-1 to I-20, coupled to the first link and the second link.

Configuration II-1

A sensor including: a structure having at least four elastic sections
discretely disposed in an imaginary plane; and
a detector arranged to detect a deformation of the structure, wherein
the structure includes
a metal component having at least a first elastic section and a second elastic section of the four elastic sections,
a first reinforcement component coupled to the metal component, and
a second reinforcement component coupled to the metal component, wherein
the first reinforcement component is disposed on one side with respect to the plane, and
the second reinforcement component is disposed on the other side with respect to the plane, Configuration II-2

The sensor according to Configuration II-1, wherein the first reinforcement component has a first overlapping portion overlapping the first elastic section, a second overlapping portion overlapping the second elastic section, and a first relay portion connecting the first overlapping portion with the second overlapping portion, and
the second reinforcement component has a third overlapping portion overlapping the first elastic section, a fourth overlapping portion overlapping the second elastic section, and a second relay portion connecting the third overlapping portion with the fourth overlapping portion.

Configuration II-3

The sensor according to Configuration II-2, wherein a distance between the first overlapping portion and the metal component is shorter than a thickness of the first elastic section, and a distance between the fourth overlapping portion and the metal component is shorter than a thickness of the second elastic section.

Configuration II-4

The sensor according to Configuration II-2 or II-3, wherein the metal component has a first metal portion that satisfies at least one of overlapping the first relay portion and coupling the first elastic section to the second elastic section, a second metal portion that satisfies at least one of overlapping the second relay portion and coupling the first elastic section to the second elastic section, and an air gap is provided between the first metal portion and the second metal portion.

Configuration II-5

The sensor according to Configuration II-4, wherein a thickness of the first relay portion is greater than a thickness of the first metal portion, and
a thickness of the second relay portion is greater than a thickness of the second metal portion.

Configuration II-6

The sensor according to Configuration II-4 or II-5, wherein a thickness of the first relay portion is less than a distance between the first metal portion and the second metal portion, and
a thickness of the second relay portion is less than the distance between the first metal portion and the second metal portion.

Configuration II-7

The sensor according to any one of Configurations II-4 to II-6, wherein a difference between a thickness of the first elastic section and a thickness of the first metal portion is less than a difference between a thickness of the first relay portion and the thickness of the first metal portion, and
a difference between a thickness of the second elastic section and a thickness of the second metal portion is less than a difference between a thickness of the second relay portion and the thickness of the second metal portion.

Configuration II-8

The sensor according to any one of Configurations II-4 to II-7, wherein a distance between the first metal portion and the second metal portion is longer than or equal to two thirds of a distance between the first relay portion and the second relay portion.

Configuration II-9

The sensor according to any one of Configurations II-4 to II-8, wherein a thickness of the first relay portion is between a distance from the first metal portion to the second metal portion and a thickness of the first metal portion, and a thickness of the second relay portion is between a distance from the first metal portion to the second metal portion and a thickness of the second metal portion.

Configuration II-10

The sensor according to any one of Configurations II-2 to II-9, wherein at least one of the following conditions is satisfied: a thickness of the first overlapping portion is less than a distance between the first overlapping portion and the third overlapping portion;
a thickness of the third overlapping portion is less than the distance between the first overlapping portion and the third overlapping portion;
a thickness of the first relay portion is less than a distance between the first relay portion and the second relay portion;
a thickness of the second relay portion is less than the distance between the first relay portion and the second relay portion;
the thickness of the first relay portion is greater than a thickness of the first elastic section; the thickness of the second relay portion is greater than a thickness of the second elastic section;
a distance between the first overlapping portion and the metal component is shorter than the thickness of the first overlapping portion;
a distance between the third overlapping portion and the metal component is shorter than the thickness of the third overlapping portion;

a distance between the first relay portion and the metal component is shorter than the thickness of the first relay portion; and
a distance between the second relay portion and the metal component is shorter than the thickness of the second relay portion.

Configuration II-11

The sensor according to any one of Configurations II-1 to II-10, wherein a gap is provided between the first reinforcement component and the metal component.

Configuration II-12

The sensor according to Configuration II-11, wherein an area in which the first reinforcement component faces the metal component via the gap to an area in which the first reinforcement component overlaps the metal component is higher than or equal to 25%.

Configuration II-13

The sensor according to Configuration II-11 or II-12, wherein any one of the first reinforcement component and the metal component has a plurality of protruding portions, and the gap is provided between the plurality of protruding portions.

Configuration II-14

The sensor according to Configuration II-11 or II-12, wherein a shim is provided between the first reinforcement component and the metal component.

Configuration II-15

The sensor according to any one of Configurations II-1 to II-14, wherein the metal component is formed by bending a metal member.

Configuration II-16

The sensor according to any one of Configurations II-1 to II-14, wherein the metal component is formed by machining a metal member.

Configuration II-17

The sensor according to any one of Configurations II-1 to II-16, wherein the first reinforcement component and the second reinforcement component are welded to the metal component.

Configuration II-18

The sensor according to any one of Configurations II-1 to II-17, wherein the metal component including the first elastic section and the second elastic section is defined as a first metal component, and the structure includes a second metal component having at least a third elastic section and a fourth elastic section of the four elastic sections.

Configuration II-19

The sensor according to Configuration II-18, wherein the first reinforcement component is coupled to the second metal component,
the second reinforcement component is coupled to the second metal component, and
the second metal component is provided between the first reinforcement component and the second reinforcement component.

Configuration II-20

The sensor according to any one of Configurations II-1 to II-19, wherein the four elastic sections are disposed in the plane such that an imaginary circle passes through the four elastic sections.

Configuration II-21

A device including a first link; a second link arranged to relatively move with respect to the first link; and the sensor according to any one of Configurations II-1 to II-20, coupled to the first link and the second link.

Configuration II-22

The device according to Configuration II-21, wherein the device is an articulated robot.

Configuration II-23

The device according to Configuration II-21 or II-22, further including a prime mover arranged to relatively move the first link and the second link.

Configuration II-24

The device according to Configuration II-23, wherein the prime mover and the sensor are coupled to each other via a speed reducer.

Configuration II-25

A system including: the device according to Configuration II-23 or II-24; and a controller configured to control the prime mover in accordance with information obtained from the sensor.

Configuration II-26

A manufacturing method for a product, including: manufacturing a product such that the device according to any one of Configurations II-21 to II-25 cooperates with a human within a range of 1 m from the human.

Configuration III-1

A device comprising: a first link; a second link; a first module; and a second module, wherein
the first link and the second link are arranged to be displaced from each other in at least one direction of an axial direction along a certain axis and a rotation direction about the certain axis as a rotation axis,
the first module includes a first metal component having a first elastic section group arranged to deform in accordance with a displacement of the second link with respect to
the first link in the one direction, and a first detecting unit arranged to output a first signal according to a deformation of the first elastic section group, and the second module includes a second metal component having a second elastic section group arranged to deform in accordance with a displacement of the second link with respect to the first link in the one direction, and a second detecting unit arranged to output a second signal according to a deformation of the second elastic section group.

Configuration III-2

The device according to Configuration III-1, wherein at least two elastic sections included in the first elastic section group and at least two elastic sections included in the second elastic section group are discretely disposed in an imaginary plane.

Configuration III-3

The device according to Configuration III-1 or III-2, further comprising a third module and a fourth module, wherein
the third module includes a third metal component having a third elastic section group arranged to deform in accordance with a displacement of the second link with respect to
the first link in the one direction, and a third detecting unit arranged to output a signal according to a deformation of the third elastic section group, and
the fourth module includes a fourth metal component having a fourth elastic section group arranged to deform in accordance with a displacement of the second link with respect to
the first link in the one direction, and a fourth detecting unit arranged to output a signal according to a deformation of the second elastic section group.

Configuration III-4

The device according to Configuration III-3, wherein at least two elastic sections included in the third elastic section group and at least two elastic sections included in the fourth elastic section group are discretely disposed in an imaginary plane.

Configuration III-5

The device according to Configuration III-3, wherein at least two elastic sections included in the first elastic section group, at least two elastic sections included in the second elastic section group, at least two elastic sections included in the third elastic section group, and at least two elastic sections included in the fourth elastic section group are discretely disposed in an imaginary plane.

Configuration III-6

The device according to Configuration III-3, wherein at least two elastic sections included in the first elastic section group and at least two elastic sections included in the second elastic section group are not disposed in an imaginary first plane but discretely disposed in an imaginary second plane, and
at least two elastic sections included in the third elastic section group and at least two elastic sections included in the fourth elastic section group are not disposed in the second plane but discretely disposed in the first plane.

Configuration III-7

The device according to any one of Configurations III-1 to III-6, wherein the first module and the second module are arranged in the axial direction.

Configuration III-8

The device according to any one of Configurations III-1 to III-7, wherein the one direction is the rotation direction.

Configuration III-9

The device according to Configuration III-8, wherein a distance from the certain axis of the first metal component and a distance from the certain axis of the second metal component are different from each other.

Configuration III-10

The device according to any one of Configurations III-1 to III-9, wherein each of the first module and the second module is arranged to detect a torque applied in the rotation direction.

Configuration III-11

The device according to any one of Configurations III-1 to III-10, wherein the first metal component has a first top surface section and a first bottom surface section coupled to each other via the first elastic section group, a first component of the first detecting unit is fixed to the first top surface section, a second component of the first detecting unit is fixed to the first bottom surface section, and the first component and the second component face each other via a space, and
the second metal component has a second top surface section and a second bottom surface section coupled to each other via the second elastic section group, a third component of the second detecting unit is fixed to the second top surface section, a fourth component of the second detecting unit is fixed to the second bottom surface section, and the third component and the fourth component face each other via a space.

Configuration III-12

The device according to any one of Configurations III-1 to III-11, wherein each of the first detecting unit and the second detecting unit is an optical encoder.

Configuration III-13

The device according to any one of Configurations III-1 to III-12, further comprising: a first reinforcement component coupled to the first metal component and the second metal component; and
a second reinforcement component coupled to the first metal component and the second metal component, wherein
the first metal component and the second metal component are disposed between the first reinforcement component and the second reinforcement component.

Configuration III-14

The device according to Configuration III-13, wherein each of the first metal component and the second metal component is fastened to the first reinforcement component by a screw.

Configuration III-15

The device according to any one of Configurations III-1 to III-14, wherein the first module or the second module is replaceable with another module.

Configuration III-16

The device according to any one of Configurations III-1 to III-15, wherein each of the first metal component and the second metal component is formed by bending a metal member.

Configuration III-17

The device according to any one of Configurations III-1 to III-15, wherein each of the first metal component and the second metal component is formed by machining a metal member.

Configuration III-18

The device according to any one of Configurations III-1 to III-17, further comprising a third link, wherein the second link and the third link are arranged to be displaced from each other along at least one direction of an axial direction along another axis different from the certain axis and a rotation direction about the another axis as a rotation axis.

Configuration III-19

The device according to any one of Configurations III-1 to III-18, further including a cable passing through between the first module and the second module.

Configuration III-20

The device according to any one of Configurations III-1 to III-19, further including a prime mover arranged to relatively move the first link and the second link.

Configuration III-21

The device according to Configuration III-20, wherein the prime mover is coupled to the first module and the second module via a speed reducer.

Configuration III-22

The device according to any one of Configurations III-1 to III-21, wherein the device is an articulated robot.

Configuration III-23

A system including: the device according to Configuration III-20 or III-21; and a controller configured to control the prime mover in accordance with information obtained from the first signal and the second signal.

Configuration III-24

A manufacturing method for a product, including: manufacturing a product such that the device according to any one of Configurations III-1 to III-23 cooperates with a human within a range of 1 m from the human.

Configuration IV-1

A sensor including: a first supporting section; a second supporting section facing the first supporting section;
 a plurality of elastic sections coupling the first supporting section to the second supporting section; and
 a scale fixed to the first supporting section; and a detection head facing the scale and fixed to the second supporting section, wherein
 the sensor is arranged to detect rotation of the second supporting section relative to the first supporting section with the scale and the detection head,
 the plurality of elastic sections is arranged in a circumferential direction of the rotation, a coupling portion between the first supporting section and each of the plurality of elastic sections and a coupling portion between the second supporting section and each of the plurality of elastic sections are disposed along an axial direction of the rotation, and the scale and the detection head are arranged in a radial direction of the rotation.

Configuration IV-2

The sensor according to Configuration IV-1, further including: a first coupling portion provided between the first supporting section and each of the elastic sections, and a second coupling portion provided between the second supporting section and each of the elastic sections, wherein the first coupling portion and the second coupling portion are integrated with the elastic sections.

Configuration IV-3

A sensor including: a first supporting section; a second supporting section facing the first supporting section;
 a plurality of elastic sections coupling the first supporting section to the second supporting section, wherein
 the sensor is arranged to detect rotation of the second supporting section relative to the first supporting section with an encoder made up of a scale and a detection head facing the scale,
 the elastic sections are arranged in a circle with a center that coincides with a center of the rotation,
 the sensor further including a first coupling portion provided between the first supporting section and each of the elastic sections and a second coupling portion provided between the second supporting section and each of the elastic sections,
 the scale is fixed to the first supporting section, the detection head is fixed to the second supporting section, and
 the scale and the detection head are arranged in a radial direction of the rotation.

Configuration IV-4

The sensor according to Configuration IV-3, wherein the first coupling portion and the second coupling portion are integrated with the elastic sections.

Configuration IV-5

The sensor according to any one of Configurations IV-2 to IV-4, wherein the first coupling portion, the second coupling portion, and the elastic sections are made of one material.

Configuration IV-6

The sensor according to any one of Configurations IV-2 to IV-5, wherein the plurality of elastic sections couples the first coupling portion to the second coupling portion in an axial direction of the rotation.

Configuration IV-7

The sensor according to any one of Configurations IV-1 to IV-6, wherein one of the scale and the detection head is bonded to the first supporting section, and the other one of the scale and the detection head is bonded to the second supporting section.

Configuration IV-8

The sensor according to any one of Configurations IV-1 to IV-7, wherein the plurality of elastic sections is arranged around the sensor.

Configuration IV-9

The sensor according to any one of Configurations IV-2 to IV-6, wherein one of the scale and the detection head, fixed to the first supporting section, has a surface facing a surface adjacent to an axis of the rotation, and the face is disposed at a location away by a distance R or longer from a center of the rotation to an end portion in a radial direction of the rotation of the first coupling portion.

Configuration IV-10

The sensor according to Configuration IV-9, wherein the other one of the scale and the detection head, fixed to the second supporting section, is disposed at a location by a distance shorter than the distance R.

Configuration IV-11

The sensor according to Configuration IV-9 or IV-10, wherein the first coupling portion, the second coupling portion, and the elastic sections are made from a sheet metal.

Configuration IV-12

The sensor according to Configuration IV-11, wherein the sheet metal is a plated sheet metal.

Configuration IV-13

The sensor according to any one of Configurations IV-1 to IV-12, wherein the scale has a pattern portion, and the detection head is arranged to read the pattern portion and output a detected signal.

Configuration IV-14

The sensor according to any one of Configurations IV-1 to IV-13, wherein a distance between the detection head and the scale is longer than or equal to 0.2 mm and shorter than or equal to 1.2 mm.

Configuration IV-15

The sealer according to any one of Configurations IV-1 to IV-14, further including a sealer sealing a gap between the scale and the detection head.

Configuration IV-16

A device including the sensor according to any one of Configurations IV-1 to IV-15; a machine; and a controller configured to control the machine in accordance with a signal output from the detection head.

Configuration IV-17

A manufacturing method in which the device according to Configuration IV-16 is a robot, the robot holds a workpiece and manufactures a product.

The above-described embodiments may be modified as needed without departing from the technical idea. For example, a plurality of embodiments may be combined. The matter of part of at least one embodiment may be deleted or replaced. A new matter may be added to at least one embodiment.

The disclosed content of the specification includes not only the ones explicitly described in the specification but also all the matter that can be understood from the specification and the drawings attached to the specification. The disclosed content of the specification includes complements of individual concepts described in the specification. In other words, when, for example, "A is B" is described in the specification, even if the description that "A is not B" is omitted, the specification may be regarded describing that "A is not B". This is because, when "A is B", it is assumed that the case "A is not B" is considered.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-175762 filed Oct. 27, 2021, Japanese Patent Application No. 2021-175763 filed Oct. 27, 2021, Japanese Patent Application No. 2021-185817 filed Nov. 15, 2021, and Japanese Patent Application No. 2021-213786 filed Dec. 28, 2021 which are hereby incorporated by reference herein in their entirety.

What is claimed is:

1. A sensor comprising:
   a structure; and
   a detector arranged to detect a deformation of the structure, wherein
   the structure has at least four elastic sections discretely disposed in an imaginary plane,
   the structure includes at least one metal component formed by bending a metal member,
   the one metal component has a top surface section disposed on one side of the plane and facing the plane, a bottom surface section disposed on the other side of the plane and facing the plane, and at least one elastic section of the four elastic sections, and
   the detector is arranged to output a signal according to a relative displacement between the top surface section and the bottom surface section in a direction along the plane,
   wherein the one metal component is defined as a first metal component, the structure includes a second metal component, the second metal component has at least one plastic section of the four elastic sections, different from the one elastic section of the first metal component.

2. The sensor according to claim 1, wherein the four elastic sections are disposed in the plane such that an imaginary circle passes through the four elastic sections.

3. The sensor according to claim 1, wherein the one metal component has four elastic sections of the four elastic sections.

4. The sensor according to claim 1, wherein the metal member is a cold-rolled steel.

5. The sensor according to claim 1, wherein the structure includes a reinforcement component that overlaps a plurality of elastic sections of the four elastic sections, the reinforcement component is coupled to the one metal component, and a thickness of the reinforcement component is greater than a thickness of the metal member and less than a height of the metal component.

6. The sensor according to claim 1, wherein the structure includes a first reinforcement component overlapping a plurality of elastic sections of the four elastic sections and a second reinforcement component overlapping a plurality of elastic sections of the four elastic sections, the one metal component is disposed between the first reinforcement component and the second reinforcement component, and the one metal component is coupled to the first reinforcement component and the second reinforcement component.

7. The sensor according to claim 6, wherein each of the first reinforcement component and the second reinforcement component is welded to the one metal component.

8. A device comprising:
   a first link;
   a second link arranged to relatively move with respect to the first link;
   the sensor according to claim 1, coupled to the first link and the second link; and
   a prime mover arranged to relatively move the first link and the second link.

9. A system comprising:
   the device according to claim 8; and a controller configured to control the prime mover in accordance with information obtained from the detector.

10. A manufacturing method for a product, comprising manufacturing a product such that a device according to claim 8 handles a workpiece to manufacture the product.

11. The sensor according to claim 1, wherein the one metal component has a side surface section discretely disposed in the plane.

12. The sensor according to claim 11, wherein the one elastic section is connected to the side surface section, and the metal member is bent by bending at a connection between the side surface section and each of the one elastic section.

13. The sensor according to claim 12, wherein the connection with each of the one elastic section includes a first part and a second part arranged in a direction perpendicular to the plane, and an air gap is disposed between the first part and the second part.

14. The sensor according to claim 1, wherein the plane is located between the top surface section and the bottom surface section.

15. The sensor according to claim 1, wherein the one metal component has a side surface section connected to the top surface section and the bottom surface section, the metal member is bent by bending at a connection between the top surface section and the side surface section, and the metal member is bent by bending at a connection between the bottom surface section and the side surface section.

16. The sensor according to claim 1, wherein the one elastic section is connected to the top surface section, and the metal member is bent by bending at a connection between the top surface section and each of the one elastic section.

17. A sensor comprising:
   a structure; and
   a detector arranged to detect a deformation of the structure, wherein
   the structure has at least four elastic sections discretely disposed in an imaginary plane,
   the structure includes at least one metal component formed by bending a metal member,
   the one metal component has a top surface section disposed on one side of the plane and facing the plane, a bottom surface section disposed on the other side of the plane and facing the plane, and at least one elastic section of the four elastic sections, and
   the detector is arranged to output a signal according to a relative displacement between the top surface section and the bottom surface section in a direction along the plane, wherein the one elastic section is welded to at least one of the top surface section and the bottom surface section.

18. A device comprising:
a first link;
a second link arranged to relatively move with respect to the first link;
the sensor according to claim 17, coupled to the first link and the second link; and
a prime mover arranged to relatively move the first link and the second link.

19. A manufacturing method for a product, comprising manufacturing a product such that a device according to claim 18 handles a workpiece to manufacture the product.

20. A sensor comprising:
a structure; and
a detector arranged to detect a deformation of the structure, wherein
the structure has at least four elastic sections discretely disposed in an imaginary plane,
the structure includes at least one metal component formed by bending a metal member,
the one metal component has a top surface section disposed on one side of the plane and facing the plane, a bottom surface section disposed on the other side of the plane and facing the plane, and at least one elastic section of the four elastic sections, and
the detector is arranged to output a signal according to a relative displacement between the top surface section and the bottom surface section in a direction along the plane,
the one metal component has a side surface section connected to the top surface section and the bottom surface section, the metal member is bent by bending at a connection between the top surface and the side surface section, and the metal member is bent by bending at a connection between the bottom surface section and the side surface section, wherein
the top surface section is made up of a plurality of top plate portions arranged along the plane,
the bottom surface section is made up of a plurality of bottom plate portions arranged along the plane,
the side surface section is made up of a plurality of side plate portions arranged along the plane,
the metal member is bent by bending at a connection between a first side plate portion and a second side plate portion of the plurality of side plate portions,
the metal member is bent by bending at a connection between the first side plate portion and a first top plate portion of the plurality of top plate portions,
the metal member is bent by bending at a connection between the second side plate portion and a second top plate portion of the plurality of top plate portions,
the metal member is bent by bending at a connection between the first side plate portion and a first bottom plate portion of the plurality of bottom plate portions,
the metal member is bent by bending at a connection between the second side plate portion and a second bottom plate portion of the plurality of bottom plate portions,
an inferior angle formed between the first side plate portion and the second side plate portion is larger than each of an inferior angle formed between the first top plate portion and the first side plate portion, an inferior angle formed between the second top plate portion and the second side plate portion, an inferior angle formed between the first bottom plate portion and the first side plate portion, and an inferior angle formed between the second bottom plate portion and the second side plate portion, and a first elastic section of the four elastic sections overlaps at least one of the first top plate portion and the first bottom plate portion.

21. The sensor according to claim 20, wherein the first top plate portion and the second top plate portion are welded to each other, and the first bottom plate portion and the second bottom plate portion are welded to each other.

22. The sensor according to claim 20, wherein
the metal member is bent by bending at a connection between the second side plate portion and a third side plate portion of the plurality of side plate portions,
the metal member is bent by bending at a connection between the third side plate portion and a third top plate portion of the plurality of top plate portions,
the metal member is bent by bending at a connection between the third side plate portion and a third bottom plate portion of the plurality of bottom plate portions,
an inferior angle formed between the second side plate portion and the third side plate portion is larger than each of an inferior angle formed between the third top plate portion and the third side plate portion and an inferior angle formed between the third bottom plate portion and the third side plate portion, and
a second elastic section of the four elastic sections overlaps at least one of the third top plate portion and the third bottom plate portion.

23. The sensor according to claim 22, wherein a first component of the detector is fixed to the second top plate portion, and a second component of the detector is fixed to the second bottom plate portion.

24. The sensor according to amended claim 20, wherein the one metal component is defined as a first metal component, the structure includes a second metal component, the second metal component has at least one elastic section of the four elastic sections, different from the one elastic section of the first metal component.

25. A device comprising:
a first link;
a second link arranged to relatively move with respect to the first link;
the sensor according to claim 20, coupled to the first link and the second link; and
a prime mover arranged to relatively move the first link and the second link.

26. A manufacturing method for a product, comprising manufacturing a product such that a device according to claim 25 handles a workpiece to manufacture the product.

27. A sensor comprising:
a structure having at least four elastic sections discretely disposed in an imaginary plane; and
a detector arranged to detect a deformation of the structure, wherein
the structure includes
a metal component having at least one elastic section of the four elastic sections,
a first reinforcement component coupled to the metal component and overlapping at least a first elastic section and a second elastic section of the four elastic sections, and
a second reinforcement component coupled to the metal component and overlapping at least a third elastic section and a fourth elastic section of the four elastic sections,
the first reinforcement component is disposed on one side with respect to the plane, and the second reinforcement component is disposed on the other side with respect to the plane, the metal component has a first joint with the first reinforcement component,
the metal component has a second joint with the second reinforcement component,
the first joint is disposed on one side with respect to the plane, and
the second joint is disposed on the other side with respect to the plane,
wherein the metal component having the first elastic section and the second elastic section is defined as a first metal component, the structure includes a second metal component having at least the third elastic section and the fourth elastic section of the four elastic sections, the first reinforcement component is coupled to the second metal component, the second reinforcement component is coupled to the second metal component, and the second metal component is provided between the first reinforcement and the second reinforcement component.

28. The sensor according to claim 27, wherein the metal component is formed by bending a metal member.

29. The sensor according to claim 27, wherein the metal component is formed by machining a metal member.

30. The sensor according to claim 27, wherein the first reinforcement component and the second reinforcement component are welded to the metal component.

31. The sensor according to claim 27, wherein the four elastic sections are disposed in the plane such that an imaginary circle passes through the four elastic sections.

32. A device comprising:
a first link;
a second link arranged to relatively move with respect to the first link;
the sensor according to claim 27, coupled to the first link and the second link;
a prime mover arranged to relatively move the first link and the second link; and
a speed reducer, wherein
the prime mover and the sensor are coupled via the speed reducer.

33. A manufacturing method for a product, comprising manufacturing a product such that the device according to claim 32, cooperatively manufactures the product with a human within a range of 1 m from the human.

34. A manufacturing method for a product, comprising manufacturing a product such that a device according to claim 32 handles a workpiece to manufacture the product.

35. The sensor according to claim 27, wherein
the first reinforcement component has a first overlapping portion overlapping the first elastic section, a second overlapping portion overlapping the second elastic section, and a first relay portion connecting the first overlapping portion with the second overlapping portion, and
the second reinforcement component has a third overlapping portion overlapping the first elastic section, a fourth overlapping portion overlapping the second elastic section, and a second relay portion connecting the third overlapping portion with the fourth overlapping portion.

36. The sensor according to claim 35, wherein a distance between the first overlapping portion and the metal component is shorter than a thickness of the first elastic section, and a distance between the fourth overlapping portion and the metal component is shorter than a thickness of the second elastic section.

37. The sensor according to claim 35, wherein
the metal component has
a first metal portion that satisfies at least one of overlapping the first relay portion and coupling the first elastic section to the second elastic section, and
a second metal portion that satisfies at least one of overlapping the second relay portion and coupling the first elastic section to the second elastic section, and
an air gap is provided between the first metal portion and the second metal portion.

38. The sensor according to claim 37, wherein
a thickness of the first relay portion is greater than a thickness of the first metal portion, and
a thickness of the second relay portion is greater than a thickness of the second metal portion.

39. The sensor according to claim 37, wherein
a thickness of the first relay portion is less than a distance between the first metal portion and the second metal portion, and
a thickness of the second relay portion is less than the distance between the first metal portion and the second metal portion.

40. The sensor according to claim 37, wherein
a difference between a thickness of the first elastic section and a thickness of the first metal portion is less than a difference between a thickness of the first relay portion and the thickness of the first metal portion, and
a difference between a thickness of the second elastic section and a thickness of the second metal portion is less than a difference between a thickness of the second relay portion and the thickness of the second metal portion.

41. The sensor according to claim 37, wherein a distance between the first metal portion and the second metal portion is longer than or equal to two thirds of a distance between the first relay portion and the second relay portion.

42. The sensor according to claim 37, wherein a thickness of the first relay portion is between a distance from the first metal portion to the second metal portion and a thickness of the first metal portion, and a thickness of the second relay portion is between the distance from the first metal portion to the second metal portion and a thickness of the second metal portion.

43. The sensor according to claim 37, wherein
at least one of the following conditions is satisfied: a thickness of the first overlapping portion is less than a distance between the first overlapping portion and the third overlapping portion;
a thickness of the third overlapping portion is less than the distance between the first overlapping portion and the third overlapping portion;
a thickness of the first relay portion is less than a distance between the first relay portion and the second relay portion;
a thickness of the second relay portion is less than the distance between the first relay portion and the second relay portion;
the thickness of the first relay portion is greater than a thickness of the first elastic section;
the thickness of the second relay portion is greater than a thickness of the second elastic section;
a distance between the first overlapping portion and the metal component is shorter than the thickness of the first overlapping portion;
a distance between the third overlapping portion and the metal component is shorter than the thickness of the third overlapping portion;

a distance between the first relay portion and the metal component is shorter than the thickness of the first relay portion; and a distance between the second relay portion and the metal component is shorter than the thickness of the second relay portion.

44. A sensor comprising:

a structure having at least four elastic sections discretely disposed in an imaginary plane; and a detector arranged to detect a deformation of the structure, wherein the structure includes
- a metal component having at least one elastic section of the four elastic sections,
- a first reinforcement component coupled to the metal component and overlapping at least a first elastic section and a second elastic section of the four elastic sections, and
- a second reinforcement component coupled to the metal component and overlapping at least a third elastic section and a fourth elastic section of the four elastic sections, the first reinforcement component is disposed on one side with respect to the plane, and the second reinforcement component is disposed on the other side with respect to the plane, the metal component has a first joint with the first reinforcement component, the metal component has a second joint with the second reinforcement component, the first joint is disposed on one side with respect to the plane, and the second joint is disposed on the other side with respect to the plane, wherein a gap is provided between the first reinforcement component and the metal component.

45. The sensor according to claim 44, wherein an area in which the first reinforcement component faces the metal component via the gap to an area in which the first reinforcement component overlaps the metal component is higher than or equal to 25%.

46. The sensor according to claim 44, wherein any one of the first reinforcement component and the metal component has a plurality of protruding portions, and the gap is provided between the plurality of protruding portions.

47. The sensor according to claim 44, wherein a shim is provided between the first reinforcement component and the metal component.

48. The sensor according to claim 44, wherein the metal component having the first elastic section and the second elastic section is defined as a first metal component, the structure includes a second metal component having at least the third elastic section and the fourth elastic section of the four elastic sections, the first reinforcement component is coupled to the second metal component, the second reinforcement component is coupled to the second metal component, and the second metal component is provided between the first reinforcement component and the second reinforcement component.

49. A device comprising:
- a first link;
- a second link arranged to relatively move with respect to the first link;
- the second according to claim 44, coupled to the first link and the second link; and
- a prime mover arranged to relatively move the first link and the second link.

50. A manufacturing method for a product, comprising manufacturing a product such that a device according to claim 49 handles a workpiece to manufacture the product.

* * * * *